United States Patent
Smith et al.

(10) Patent No.: US 12,113,948 B1
(45) Date of Patent: Oct. 8, 2024

(54) SYSTEMS AND METHODS OF MANAGING SPATIAL GROUPS IN MULTI-USER COMMUNICATION SESSIONS

(71) Applicant: Apple Inc., Cupertino, CA (US)

(72) Inventors: Connor A. Smith, Sunnyvale, CA (US); Willem Mattelaer, San Jose, CA (US); Joseph P. Cerra, San Francisco, CA (US); Kevin Lee, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/421,827

(22) Filed: Jan. 24, 2024

Related U.S. Application Data

(60) Provisional application No. 63/587,595, filed on Oct. 3, 2023, provisional application No. 63/578,616, filed
(Continued)

(51) Int. Cl.
*H04N 13/117* (2018.01)
*H04N 13/194* (2018.01)

(52) U.S. Cl.
CPC ......... *H04N 13/117* (2018.05); *H04N 13/194* (2018.05)

(58) Field of Classification Search
CPC ........................... H04N 13/117; H04N 13/194
(Continued)

(56) References Cited

U.S. PATENT DOCUMENTS

| 1,173,824 A | 2/1916 | Mckee |
| 5,515,488 A | 5/1996 | Hoppe et al. |

(Continued)

FOREIGN PATENT DOCUMENTS

| CA | 3033344 A1 | 2/2018 |
| CN | 104714771 A | 6/2015 |

(Continued)

OTHER PUBLICATIONS

AquaSnap Window Manager: dock, snap, tile, organize [online], Nurgo Software, Available online at: <https://www.nurgo-software.com/products/aquasnap>, [retrieved on Jun. 27, 2023], 5 pages.
(Continued)

*Primary Examiner* — Tung T Vo
(74) *Attorney, Agent, or Firm* — Kubota & Basol LLP

(57) ABSTRACT

Some examples of the disclosure are directed to systems and methods for managing locations of users in a spatial group within a communication session based on the display of shared content in a three-dimensional environment. In some examples, a first electronic device and a second electronic device are in communication within a communication session. In some examples, the first electronic device displays a three-dimensional environment including an avatar corresponding to a user of the second electronic device. In some examples, in response to detecting an input corresponding to a request to display shared content in the three-dimensional environment, if the shared content is a first type of content, the first electronic device positions the avatar a first distance away from the viewpoint, and if the shared content is a second type of content, the first electronic device positions the avatar a second distance away from the viewpoint.

20 Claims, 50 Drawing Sheets

Related U.S. Application Data on Aug. 24, 2023, provisional application No. 63/514,327, filed on Jul. 18, 2023, provisional application No. 63/506,116, filed on Jun. 4, 2023.

(58) Field of Classification Search
USPC .......................................................... 348/43
See application file for complete search history.

(56) References Cited

U.S. PATENT DOCUMENTS

| | | |
|---|---|---|
| 5,524,195 A | 6/1996 | Clanton et al. |
| 5,610,828 A | 3/1997 | Kodosky et al. |
| 5,737,553 A | 4/1998 | Bartok |
| 5,740,440 A | 4/1998 | West |
| 5,751,287 A | 5/1998 | Hahn et al. |
| 5,758,122 A | 5/1998 | Corda et al. |
| 5,794,178 A | 8/1998 | Caid et al. |
| 5,877,766 A | 3/1999 | Bates et al. |
| 5,900,849 A | 5/1999 | Gallery |
| 5,933,143 A | 8/1999 | Kobayashi |
| 5,990,886 A | 11/1999 | Serdy et al. |
| 6,061,060 A | 5/2000 | Berry et al. |
| 6,108,004 A | 8/2000 | Medl |
| 6,112,015 A | 8/2000 | Planas et al. |
| 6,154,559 A | 11/2000 | Beardsley |
| 6,456,296 B1 | 9/2002 | Cataudella et al. |
| 6,584,465 B1 | 6/2003 | Zhu et al. |
| 6,756,997 B1 | 6/2004 | Ward et al. |
| 7,035,903 B1 | 4/2006 | Baldonado |
| 7,137,074 B1 | 11/2006 | Newton et al. |
| 7,230,629 B2 | 6/2007 | Reynolds et al. |
| 8,793,620 B2 | 7/2014 | Stafford |
| 8,803,873 B2 | 8/2014 | Yoo et al. |
| 8,866,880 B2 * | 10/2014 | Tan .................. H04N 7/144 348/42 |
| 8,947,323 B1 | 2/2015 | Raffle et al. |
| 8,970,478 B2 | 3/2015 | Johansson |
| 8,970,629 B2 | 3/2015 | Kim et al. |
| 8,994,718 B2 | 3/2015 | Latta et al. |
| 9,007,301 B1 | 4/2015 | Raffle et al. |
| 9,108,109 B2 | 8/2015 | Pare et al. |
| 9,185,062 B1 | 11/2015 | Yang et al. |
| 9,201,500 B2 | 12/2015 | Srinivasan et al. |
| 9,256,785 B2 | 2/2016 | Qvarfordt |
| 9,400,559 B2 | 7/2016 | Latta et al. |
| 9,448,635 B2 | 9/2016 | Macdougall et al. |
| 9,465,479 B2 | 10/2016 | Cho et al. |
| 9,526,127 B1 | 12/2016 | Taubman et al. |
| 9,544,257 B2 | 1/2017 | Ogundokun et al. |
| 9,563,331 B2 | 2/2017 | Poulos et al. |
| 9,575,559 B2 | 2/2017 | Andrysco |
| 9,681,112 B2 | 6/2017 | Son |
| 9,684,372 B2 | 6/2017 | Xun et al. |
| 9,734,402 B2 | 8/2017 | Jang et al. |
| 9,778,814 B2 | 10/2017 | Ambrus et al. |
| 9,851,866 B2 | 12/2017 | Goossens et al. |
| 9,886,087 B1 | 2/2018 | Wald et al. |
| 9,933,833 B2 | 4/2018 | Tu et al. |
| 9,934,614 B2 | 4/2018 | Ramsby et al. |
| 10,049,460 B2 | 8/2018 | Romano et al. |
| 10,203,764 B2 | 2/2019 | Katz et al. |
| 10,307,671 B2 | 6/2019 | Barney et al. |
| 10,353,532 B1 | 7/2019 | Holz et al. |
| 10,394,320 B2 | 8/2019 | George-svahn et al. |
| 10,534,439 B2 | 1/2020 | Raffa et al. |
| 10,664,048 B2 | 5/2020 | Cieplinski et al. |
| 10,664,050 B2 | 5/2020 | Alcaide et al. |
| 10,699,488 B1 | 6/2020 | Terrano |
| 10,732,721 B1 | 8/2020 | Clements |
| 10,754,434 B2 | 8/2020 | Hall et al. |
| 10,768,693 B2 | 9/2020 | Powderly et al. |
| 10,861,242 B2 | 12/2020 | Lacey et al. |
| 10,890,967 B2 | 1/2021 | Stellmach et al. |
| 10,956,724 B1 | 3/2021 | Terrano |
| 10,983,663 B2 | 4/2021 | Iglesias |
| 11,055,920 B1 | 7/2021 | Bramwell et al. |
| 11,079,995 B1 * | 8/2021 | Hulbert ............... G06F 3/04845 |
| 11,082,463 B2 | 8/2021 | Felman |
| 11,112,875 B1 | 9/2021 | Zhou et al. |
| 11,199,898 B2 | 12/2021 | Blume et al. |
| 11,200,742 B1 | 12/2021 | Post et al. |
| 11,294,472 B2 | 4/2022 | Tang et al. |
| 11,294,475 B1 | 4/2022 | Pinchon et al. |
| 11,340,756 B2 | 5/2022 | Faulkner et al. |
| 11,348,300 B2 | 5/2022 | Zimmermann et al. |
| 11,461,973 B2 | 10/2022 | Pinchon |
| 11,573,363 B2 | 2/2023 | Zou et al. |
| 11,574,452 B2 | 2/2023 | Berliner et al. |
| 11,720,171 B2 | 8/2023 | Pastrana Vicente et al. |
| 11,726,577 B2 | 8/2023 | Katz |
| 11,733,824 B2 | 8/2023 | Iskandar et al. |
| 11,762,457 B1 | 9/2023 | Ikkai et al. |
| 2001/0047250 A1 | 11/2001 | Schuller et al. |
| 2002/0044152 A1 | 4/2002 | Abbott et al. |
| 2003/0151611 A1 | 8/2003 | Turpin et al. |
| 2003/0222924 A1 | 12/2003 | Baron |
| 2004/0059784 A1 | 3/2004 | Caughey |
| 2004/0243926 A1 | 12/2004 | Trenbeath et al. |
| 2005/0100210 A1 | 5/2005 | Rice et al. |
| 2005/0138572 A1 | 6/2005 | Good et al. |
| 2005/0144570 A1 | 6/2005 | Loverin et al. |
| 2005/0144571 A1 | 6/2005 | Loverin et al. |
| 2005/0198143 A1 | 9/2005 | Moody et al. |
| 2006/0080702 A1 | 4/2006 | Diez et al. |
| 2006/0283214 A1 | 12/2006 | Donadon et al. |
| 2008/0211771 A1 | 9/2008 | Richardson |
| 2009/0064035 A1 | 3/2009 | Shibata et al. |
| 2009/0231356 A1 | 9/2009 | Barnes et al. |
| 2010/0097375 A1 | 4/2010 | Tadaishi et al. |
| 2010/0150526 A1 | 6/2010 | Rose et al. |
| 2010/0188503 A1 | 7/2010 | Tsai et al. |
| 2011/0018895 A1 | 1/2011 | Buzyn et al. |
| 2011/0018896 A1 | 1/2011 | Buzyn et al. |
| 2011/0169927 A1 * | 7/2011 | Mages ................ G06F 3/04815 348/51 |
| 2011/0216060 A1 | 9/2011 | Weising et al. |
| 2011/0254865 A1 | 10/2011 | Yee et al. |
| 2011/0310001 A1 | 12/2011 | Madau et al. |
| 2012/0086624 A1 | 4/2012 | Thompson et al. |
| 2012/0113223 A1 | 5/2012 | Hilliges et al. |
| 2012/0151416 A1 | 6/2012 | Bell et al. |
| 2012/0170840 A1 | 7/2012 | Caruso et al. |
| 2012/0218395 A1 | 8/2012 | Andersen et al. |
| 2012/0257035 A1 | 10/2012 | Larsen |
| 2013/0127850 A1 | 5/2013 | Bindon |
| 2013/0211843 A1 | 8/2013 | Clarkson |
| 2013/0229345 A1 | 9/2013 | Day et al. |
| 2013/0271397 A1 | 10/2013 | Hildreth et al. |
| 2013/0278501 A1 | 10/2013 | Bulzacki |
| 2013/0286004 A1 | 10/2013 | Mcculloch et al. |
| 2013/0326364 A1 | 12/2013 | Latta et al. |
| 2013/0342564 A1 | 12/2013 | Kinnebrew et al. |
| 2013/0342570 A1 | 12/2013 | Kinnebrew et al. |
| 2014/0002338 A1 | 1/2014 | Raffa et al. |
| 2014/0028548 A1 | 1/2014 | Bychkov et al. |
| 2014/0075361 A1 | 3/2014 | Reynolds et al. |
| 2014/0108942 A1 | 4/2014 | Freeman et al. |
| 2014/0125584 A1 | 5/2014 | Xun et al. |
| 2014/0198017 A1 | 7/2014 | Lamb et al. |
| 2014/0258942 A1 | 9/2014 | Kutliroff et al. |
| 2014/0282272 A1 | 9/2014 | Kies et al. |
| 2014/0320404 A1 | 10/2014 | Kasahara |
| 2014/0347391 A1 | 11/2014 | Keane et al. |
| 2015/0035822 A1 | 2/2015 | Arsan et al. |
| 2015/0035832 A1 | 2/2015 | Sugden et al. |
| 2015/0042679 A1 | 2/2015 | Järvenpää |
| 2015/0067580 A1 | 3/2015 | Um et al. |
| 2015/0123890 A1 | 5/2015 | Kapur et al. |
| 2015/0177937 A1 | 6/2015 | Poletto et al. |
| 2015/0187093 A1 | 7/2015 | Chu et al. |
| 2015/0205106 A1 | 7/2015 | Norden |
| 2015/0220152 A1 | 8/2015 | Tait et al. |
| 2015/0227285 A1 | 8/2015 | Lee et al. |
| 2015/0242095 A1 | 8/2015 | Sonnenberg |

(56) References Cited

U.S. PATENT DOCUMENTS

| | | |
|---|---|---|
| 2015/0317832 A1 | 11/2015 | Ebstyne et al. |
| 2015/0331576 A1 | 11/2015 | Piya et al. |
| 2015/0332091 A1 | 11/2015 | Kim et al. |
| 2015/0370323 A1 | 12/2015 | Cieplinski et al. |
| 2016/0015470 A1 | 1/2016 | Border |
| 2016/0018898 A1 | 1/2016 | Tu et al. |
| 2016/0018900 A1 | 1/2016 | Tu et al. |
| 2016/0026242 A1 | 1/2016 | Burns et al. |
| 2016/0026253 A1 | 1/2016 | Bradski et al. |
| 2016/0062636 A1 | 3/2016 | Jung et al. |
| 2016/0093108 A1 | 3/2016 | Mao et al. |
| 2016/0098094 A1 | 4/2016 | Minkkinen |
| 2016/0171304 A1 | 6/2016 | Golding et al. |
| 2016/0196692 A1 | 7/2016 | Kjallstrom et al. |
| 2016/0253063 A1 | 9/2016 | Critchlow |
| 2016/0253821 A1 | 9/2016 | Romano et al. |
| 2016/0275702 A1 | 9/2016 | Reynolds et al. |
| 2016/0306434 A1 | 10/2016 | Ferrin |
| 2016/0313890 A1 | 10/2016 | Walline et al. |
| 2016/0350973 A1* | 12/2016 | Shapira .................. G06F 3/011 |
| 2016/0379409 A1 | 12/2016 | Gavriliuc et al. |
| 2017/0038829 A1 | 2/2017 | Lanier et al. |
| 2017/0038837 A1 | 2/2017 | Faaborg et al. |
| 2017/0038849 A1 | 2/2017 | Hwang |
| 2017/0039770 A1 | 2/2017 | Lanier et al. |
| 2017/0046872 A1 | 2/2017 | Geselowitz et al. |
| 2017/0060230 A1 | 3/2017 | Faaborg et al. |
| 2017/0123487 A1 | 5/2017 | Hazra et al. |
| 2017/0131964 A1 | 5/2017 | Baek et al. |
| 2017/0132694 A1 | 5/2017 | Damy |
| 2017/0132822 A1 | 5/2017 | Marschke et al. |
| 2017/0153866 A1 | 6/2017 | Grinberg et al. |
| 2017/0206691 A1 | 7/2017 | Harrises et al. |
| 2017/0228130 A1 | 8/2017 | Palmaro |
| 2017/0285737 A1 | 10/2017 | Khalid et al. |
| 2017/0315715 A1 | 11/2017 | Fujita et al. |
| 2017/0344223 A1 | 11/2017 | Holzer et al. |
| 2017/0358141 A1 | 12/2017 | Stafford et al. |
| 2018/0045963 A1 | 2/2018 | Hoover et al. |
| 2018/0075658 A1 | 3/2018 | Lanier et al. |
| 2018/0081519 A1 | 3/2018 | Kim |
| 2018/0095634 A1 | 4/2018 | Alexander |
| 2018/0095635 A1 | 4/2018 | Valdivia et al. |
| 2018/0101223 A1 | 4/2018 | Ishihara et al. |
| 2018/0114364 A1 | 4/2018 | Mcphee et al. |
| 2018/0150997 A1 | 5/2018 | Austin |
| 2018/0158222 A1 | 6/2018 | Hayashi |
| 2018/0181199 A1 | 6/2018 | Harvey et al. |
| 2018/0188802 A1 | 7/2018 | Okumura |
| 2018/0210628 A1 | 7/2018 | Mcphee et al. |
| 2018/0239144 A1 | 8/2018 | Woods et al. |
| 2018/0300023 A1 | 10/2018 | Hein |
| 2018/0315248 A1 | 11/2018 | Bastov et al. |
| 2018/0322701 A1 | 11/2018 | Pahud et al. |
| 2018/0348861 A1 | 12/2018 | Uscinski et al. |
| 2019/0034076 A1 | 1/2019 | Vinayak et al. |
| 2019/0050062 A1 | 2/2019 | Chen et al. |
| 2019/0080572 A1 | 3/2019 | Kim et al. |
| 2019/0088149 A1 | 3/2019 | Fink et al. |
| 2019/0094979 A1 | 3/2019 | Hall et al. |
| 2019/0101991 A1 | 4/2019 | Brennan |
| 2019/0130633 A1 | 5/2019 | Haddad et al. |
| 2019/0130733 A1 | 5/2019 | Hodge |
| 2019/0146128 A1 | 5/2019 | Cao et al. |
| 2019/0204906 A1 | 7/2019 | Ross et al. |
| 2019/0227763 A1 | 7/2019 | Kaufthal |
| 2019/0251884 A1* | 8/2019 | Burns .................. G09G 5/14 |
| 2019/0258365 A1 | 8/2019 | Zurmoehle et al. |
| 2019/0310757 A1 | 10/2019 | Lee et al. |
| 2019/0324529 A1 | 10/2019 | Stellmach et al. |
| 2019/0339770 A1 | 11/2019 | Kurlethimar et al. |
| 2019/0362557 A1 | 11/2019 | Lacey et al. |
| 2019/0370492 A1 | 12/2019 | Falchuk et al. |
| 2019/0371072 A1 | 12/2019 | Lindberg et al. |
| 2019/0377487 A1 | 12/2019 | Bailey et al. |
| 2019/0379765 A1 | 12/2019 | Fajt et al. |
| 2019/0384406 A1 | 12/2019 | Smith et al. |
| 2020/0004401 A1 | 1/2020 | Hwang et al. |
| 2020/0043243 A1 | 2/2020 | Bhushan et al. |
| 2020/0082602 A1 | 3/2020 | Jones |
| 2020/0089314 A1 | 3/2020 | Poupyrev et al. |
| 2020/0098140 A1 | 3/2020 | Jagnow et al. |
| 2020/0098173 A1 | 3/2020 | Mccall |
| 2020/0117213 A1 | 4/2020 | Tian et al. |
| 2020/0128232 A1* | 4/2020 | Hwang ................ A61B 5/0022 |
| 2020/0159017 A1 | 5/2020 | Lin et al. |
| 2020/0225747 A1 | 7/2020 | Bar-zeev et al. |
| 2020/0225830 A1 | 7/2020 | Tang et al. |
| 2020/0226814 A1 | 7/2020 | Tang et al. |
| 2020/0356221 A1 | 11/2020 | Behzadi et al. |
| 2020/0357374 A1 | 11/2020 | Verweij et al. |
| 2020/0387228 A1 | 12/2020 | Ravasz et al. |
| 2021/0074062 A1 | 3/2021 | Madonna et al. |
| 2021/0090337 A1 | 3/2021 | Ravasz et al. |
| 2021/0096726 A1 | 4/2021 | Faulkner et al. |
| 2021/0125414 A1* | 4/2021 | Berkebile ................ G06F 3/017 |
| 2021/0191600 A1 | 6/2021 | Lemay et al. |
| 2021/0295602 A1 | 9/2021 | Scapel et al. |
| 2021/0303074 A1 | 9/2021 | Vanblon et al. |
| 2021/0319617 A1 | 10/2021 | Ahn et al. |
| 2021/0327140 A1 | 10/2021 | Rothkopf et al. |
| 2021/0339134 A1 | 11/2021 | Knoppert |
| 2021/0350564 A1 | 11/2021 | Peuhkurinen et al. |
| 2021/0375022 A1 | 12/2021 | Lee et al. |
| 2022/0011855 A1 | 1/2022 | Hazra et al. |
| 2022/0030197 A1 | 1/2022 | Ishimoto |
| 2022/0070241 A1* | 3/2022 | Yerli ....................... G06T 19/00 |
| 2022/0083197 A1 | 3/2022 | Rockel et al. |
| 2022/0092862 A1 | 3/2022 | Faulkner et al. |
| 2022/0101593 A1 | 3/2022 | Rockel et al. |
| 2022/0101612 A1 | 3/2022 | Palangie et al. |
| 2022/0104910 A1 | 4/2022 | Shelton et al. |
| 2022/0121344 A1 | 4/2022 | Pastrana Vicente et al. |
| 2022/0137705 A1 | 5/2022 | Hashimoto et al. |
| 2022/0155909 A1 | 5/2022 | Kawashima et al. |
| 2022/0157083 A1 | 5/2022 | Jandhyala et al. |
| 2022/0187907 A1 | 6/2022 | Lee et al. |
| 2022/0191570 A1 | 6/2022 | Reid et al. |
| 2022/0229524 A1 | 7/2022 | Mckenzie et al. |
| 2022/0229534 A1 | 7/2022 | Terre et al. |
| 2022/0245888 A1 | 8/2022 | Singh et al. |
| 2022/0253149 A1 | 8/2022 | Berliner et al. |
| 2022/0255995 A1* | 8/2022 | Berliner .................. G06T 15/20 |
| 2022/0276720 A1 | 9/2022 | Yasui |
| 2022/0326837 A1 | 10/2022 | Dessero et al. |
| 2022/0413691 A1 | 12/2022 | Becker et al. |
| 2023/0004216 A1 | 1/2023 | Rodgers et al. |
| 2023/0008537 A1 | 1/2023 | Henderson et al. |
| 2023/0068660 A1 | 3/2023 | Brent et al. |
| 2023/0069764 A1 | 3/2023 | Jonker et al. |
| 2023/0074080 A1 | 3/2023 | Miller et al. |
| 2023/0093979 A1 | 3/2023 | Stauber et al. |
| 2023/0133579 A1 | 5/2023 | Chang et al. |
| 2023/0152935 A1 | 5/2023 | Mckenzie et al. |
| 2023/0154122 A1 | 5/2023 | Dascola et al. |
| 2023/0163987 A1 | 5/2023 | Young et al. |
| 2023/0168788 A1 | 6/2023 | Faulkner et al. |
| 2023/0185426 A1 | 6/2023 | Rockel et al. |
| 2023/0186577 A1 | 6/2023 | Rockel et al. |
| 2023/0244857 A1 | 8/2023 | Weiss et al. |
| 2023/0273706 A1 | 8/2023 | Smith et al. |
| 2023/0274504 A1* | 8/2023 | Ren ........................... G06T 7/20 |
| | | 345/419 |
| 2023/0308610 A1 | 9/2023 | Henderson et al. |
| 2023/0315385 A1 | 10/2023 | Akmal et al. |
| 2023/0316634 A1 | 10/2023 | Chiu et al. |
| 2023/0325004 A1 | 10/2023 | Burns et al. |
| 2023/0350539 A1 | 11/2023 | Owen et al. |
| 2023/0384907 A1 | 11/2023 | Boesel et al. |
| 2023/0388357 A1* | 11/2023 | Faulkner ................ H04N 7/157 |
| 2024/0086031 A1 | 3/2024 | Palangie et al. |
| 2024/0086032 A1 | 3/2024 | Palangie et al. |
| 2024/0087256 A1 | 3/2024 | Hylak et al. |
| 2024/0094863 A1 | 3/2024 | Smith et al. |

(56) References Cited

U.S. PATENT DOCUMENTS

| | | | |
|---|---|---|---|
| 2024/0095984 | A1 | 3/2024 | Ren et al. |
| 2024/0103613 | A1 | 3/2024 | Chawda et al. |
| 2024/0103684 | A1 | 3/2024 | Yu et al. |
| 2024/0103707 | A1 | 3/2024 | Henderson et al. |
| 2024/0104836 | A1 | 3/2024 | Dessero et al. |
| 2024/0104873 | A1* | 3/2024 | Pastrana Vicente .. G06F 3/0482 |
| 2024/0104877 | A1 | 3/2024 | Henderson et al. |
| 2024/0111479 | A1 | 4/2024 | Paul |
| 2024/0119682 | A1* | 4/2024 | Rudman ................ G06V 20/20 |
| 2024/0221291 | A1 | 7/2024 | Henderson et al. |

FOREIGN PATENT DOCUMENTS

| | | | |
|---|---|---|---|
| CN | 105264461 | A | 1/2016 |
| CN | 105264478 | A | 1/2016 |
| CN | 108633307 | A | 10/2018 |
| CN | 110476142 | A | 11/2019 |
| CN | 110673718 | A | 1/2020 |
| EP | 2741175 | A2 | 6/2014 |
| EP | 2947545 | A1 | 11/2015 |
| EP | 3503101 | A1 | 6/2019 |
| EP | 3588255 | A1 | 1/2020 |
| EP | 3654147 | A1 | 5/2020 |
| JP | H10-51711 | A | 2/1998 |
| JP | 2005-215144 | A | 8/2005 |
| JP | 2012-234550 | A | 11/2012 |
| JP | 2013-196158 | A | 9/2013 |
| JP | 2013-257716 | A | 12/2013 |
| JP | 2014-514652 | A | 6/2014 |
| JP | 2015-515040 | A | 5/2015 |
| JP | 2015-118332 | A | 6/2015 |
| JP | 2016-194744 | A | 11/2016 |
| JP | 2017-27206 | A | 2/2017 |
| JP | 2018-5516 | A | 1/2018 |
| JP | 2019-169154 | A | 10/2019 |
| JP | 2022-53334 | A | 4/2022 |
| KR | 10-2016-0012139 | A | 2/2016 |
| KR | 10-2019-0100957 | A | 8/2019 |
| WO | 2019/142560 | A1 | 7/2019 |
| WO | 2019/217163 | A1 | 11/2019 |
| WO | 2020/066682 | A1 | 4/2020 |
| WO | 2021/202783 | A1 | 10/2021 |
| WO | 2022/046340 | A1 | 3/2022 |
| WO | 2022/055822 | A1 | 3/2022 |
| WO | 2022/066399 | A1 | 3/2022 |
| WO | 2022/164881 | A1 | 8/2022 |
| WO | 2023/141535 | A1 | 7/2023 |

OTHER PUBLICATIONS

Corrected Notice of Allowability received for U.S. Appl. No. 17/659,147, mailed on Feb. 14, 2024, 6 pages.
Corrected Notice of Allowability received for U.S. Appl. No. 17/932,655, mailed on Oct. 12, 2023, 2 pages.
Corrected Notice of Allowance received for U.S. Appl. No. 17/478,593, mailed on Dec. 21, 2022, 2 pages.
Extended European Search Report received for European Patent Application No. 23158818.7, mailed on Jul. 3, 2023, 12 pages.
Extended European Search Report received for European Patent Application No. 23158929.2, mailed on Jun. 27, 2023, 12 pages.
Final Office Action received for U.S. Appl. No. 17/448,875, mailed on Mar. 16, 2023, 24 pages.
Final Office Action received for U.S. Appl. No. 17/659,147, mailed on Oct. 4, 2023, 17 pages.
Home | Virtual Desktop [online], Virtual Desktop, Available online at: <https://www.vrdesktop.net>, [retrieved on Jun. 29, 2023], 4 pages.
International Search Report received for PCT Application No. PCT/US2022/076603, mailed on Jan. 9, 2023, 4 pages.
International Search Report received for PCT Application No. PCT/US2023/017335, mailed on Aug. 22, 2023, 6 pages.
International Search Report received for PCT Application No. PCT/US2023/018213, mailed on Jul. 26, 2023, 6 pages.
International Search Report received for PCT Application No. PCT/US2023/019458, mailed on Aug. 8, 2023, 7 pages.
International Search Report received for PCT Application No. PCT/US2023/060943, mailed on Jun. 6, 2023, 7 pages.
International Search Report received for PCT Patent Application No. PCT/US2021/050948, mailed on Mar. 4, 2022, 6 pages.
International Search Report received for PCT Patent Application No. PCT/US2021/071595, mailed on Mar. 17, 2022, 7 pages.
International Search Report received for PCT Patent Application No. PCT/US2021/071596, mailed on Apr. 8, 2022, 7 pages.
International Search Report received for PCT Patent Application No. PCT/US2022/013208, mailed on Apr. 26, 2022, 7 pages.
International Search Report received for PCT Patent Application No. PCT/US2022/071704, mailed on Aug. 26, 2022, 6 pages.
Non-Final Office Action received for U.S. Appl. No. 17/448,875, mailed on Oct. 6, 2022, 25 pages.
Non-Final Office Action received for U.S. Appl. No. 17/448,875, mailed on Sep. 29, 2023, 30 pages.
Non-Final Office Action received for U.S. Appl. No. 17/580,495, mailed on Dec. 11, 2023, 27 pages.
Non-Final Office Action received for U.S. Appl. No. 18/182,300, mailed on Oct. 26, 2023, 29 pages.
Non-Final Office Action received for U.S. Appl. No. 17/659,147, mailed on Mar. 16, 2023, 19 pages.
Non-Final Office Action received for U.S. Appl. No. 17/932,655, mailed on Apr. 20, 2023, 10 pages.
Notice of Allowance received for U.S. Appl. No. 17/448,876, mailed on Apr. 7, 2022, 9 pages.
Notice of Allowance received for U.S. Appl. No. 17/448,876, mailed on Jul. 20, 2022, 8 pages.
Notice of Allowance received for U.S. Appl. No. 17/478,593, mailed on Aug. 31, 2022, 10 pages.
Notice of Allowance received for U.S. Appl. No. 17/580,495, mailed on Jun. 6, 2023, 6 pages.
Notice of Allowance received for U.S. Appl. No. 17/580,495, mailed on Nov. 30, 2022, 12 pages.
Notice of Allowance received for U.S. Appl. No. 17/659,147, mailed on Jan. 26, 2024, 13 pages.
Notice of Allowance received for U.S. Appl. No. 17/932,655, mailed on Jan. 24, 2024, 7 pages.
Notice of Allowance received for U.S. Appl. No. 17/932,655, mailed on Sep. 29, 2023, 7 pages.
Notice of Allowance received for U.S. Appl. No. 18/154,757, mailed on Jan. 23, 2024, 10 pages.
Restriction Requirement received for U.S. Appl. No. 17/932,999, mailed on Oct. 3, 2023, 6 pages.
Bhowmick, Shimmila, "Explorations on Body-Gesture Based Object Selection on HMD Based VR Interfaces for Dense and Occluded Dense Virtual Environments", Report: State of the Art Seminar, Department of Design Indian Institute of Technology, Guwahati, Nov. 2018, 25 pages.
Bolt et al., "Two-Handed Gesture in Multi-Modal Natural Dialog", Uist '92, 5th Annual Symposium on User Interface Software And Technology. Proceedings Of the ACM Symposium on User Interface Software And Technology, Monterey, Nov. 15-18, 1992, pp. 7-14.
Brennan, Dominic, "4 Virtual Reality Desktops for Vive, Rift, and Windows VR Compared", [online]. Road to VR, Available online at: <https://www.roadtovr.com/virtual-reality-desktop-compared-oculus-rift-htc-vive/>, [retrieved on Jun. 29, 2023], Jan. 3, 2018, 4 pages.
Camalich, Sergio, "CSS Buttons with Pseudo-elements", Available online at: <https://tympanus.net/codrops/2012/01/11/css-buttons-with-pseudo-elements/>, [retrieved on Jul. 12, 2017], Jan. 11, 2012, 8 pages.
Chatterjee et al., "Gaze+Gesture: Expressive, Precise and Targeted Free-Space Interactions", ICMI '15, Nov. 9-13, 2015, 8 pages.
Lin et al., "Towards Naturally Grabbing and Moving Objects in VR", IS&T International Symposium on Electronic Imaging and The Engineering Reality of Virtual Reality, 2016, 6 pages.

(56) References Cited

OTHER PUBLICATIONS

Mcgill et al., "Expanding The Bounds Of Seated Virtual Workspaces", University of Glasgow, Available online at: <https://core.ac.uk/download/pdf/323988271.pdf>, [retrieved on Jun. 27, 2023], Jun. 5, 2020, 44 pages.

Pfeuffer et al., "Gaze + Pinch Interaction in Virtual Reality", In Proceedings of SUI '17, Brighton, United Kingdom, Oct. 16-17, 2017, pp. 99-108.

Corrected Notice of Allowability received for U.S. Appl. No. 17/448,875, mailed on Apr. 24, 2024, 4 pages.

Extended European Search Report received for European Patent Application No. 23197572.3, mailed on Feb. 19, 2024, 7 pages.

Final Office Action received for U.S. Appl. No. 17/580,495, mailed on May 13, 2024, 29 pages.

Non-Final Office Action received for U.S. Appl. No. 18/157,040, mailed on May 2, 2024, 25 pages.

Non-Final Office Action received for U.S. Appl. No. 18/182,300, mailed on May 29, 2024, 33 pages.

Non-Final Office Action received for U.S. Appl. No. 18/305,201, mailed on May 23, 2024, 11 pages.

Notice of Allowance received for U.S. Appl. No. 17/659,147, mailed on May 29, 2024, 13 pages.

Notice of Allowance received for U.S. Appl. No. 18/154,757, mailed on May 10, 2024, 12 pages.

Notice of Allowance received for U.S. Appl. No. 18/423,187, mailed on Jun. 5, 2024, 9 pages.

Corrected Notice of Allowability received for U.S. Appl. No. 18/465,098, mailed on Mar. 13, 2024, 3 pages.

European Search Report received for European Patent Application No. 21791153.6, mailed on Mar. 22, 2024, 5 pages.

Final Office Action received for U.S. Appl. No. 18/182,300, mailed on Feb. 16, 2024, 32 pages.

International Search Report received for PCT Patent Application No. PCT/US2023/074257, mailed on Nov. 21, 2023, 5 pages.

International Search Report received for PCT Patent Application No. PCT/US2023/074950, mailed on Jan. 3, 2024, 9 pages.

International Search Report received for PCT Patent Application No. PCT/US2023/074979, mailed on Feb. 26, 2024, 6 pages.

Non-Final Office Action received for U.S. Appl. No. 17/932,999, mailed on Feb. 23, 2024, 22 pages.

Notice of Allowance received for U.S. Appl. No. 17/448,875, mailed on Apr. 17, 2024, 8 pages.

Notice of Allowance received for U.S. Appl. No. 18/421,675, mailed on Apr. 11, 2024, 9 pages.

Notice of Allowance received for U.S. Appl. No. 18/463,739, mailed on Feb. 1, 2024, 10 pages.

Notice of Allowance received for U.S. Appl. No. 18/463,739, mailed on Oct. 30, 2023, 11 pages.

Notice of Allowance received for U.S. Appl. No. 18/465,098, mailed on Mar. 4, 2024, 6 pages.

Notice of Allowance received for U.S. Appl. No. 18/465,098, mailed on Nov. 17, 2023, 8 pages.

Search Report received for Chinese Patent Application No. 202310873465.7, mailed on Feb. 1, 2024, 5 pages (2 pages of English Translation and 3 pages of Official Copy).

European Search Report received for European Patent Application No. 21801378.7, mailed on Jul. 10, 2024, 5 pages.

Notice of Allowance received for U.S. Appl. No. 17/448,875, mailed on Jul. 12, 2024, 8 pages.

Notice of Allowance received for U.S. Appl. No. 18/421,675, mailed on Jul. 31, 2024, 8 pages.

Notice of Allowance received for U.S. Appl. No. 18/463,739, mailed on Jun. 17, 2024, 9 pages.

Notice of Allowance received for U.S. Appl. No. 18/465,098, mailed on Jun. 20, 2024, 8 pages.

\* cited by examiner

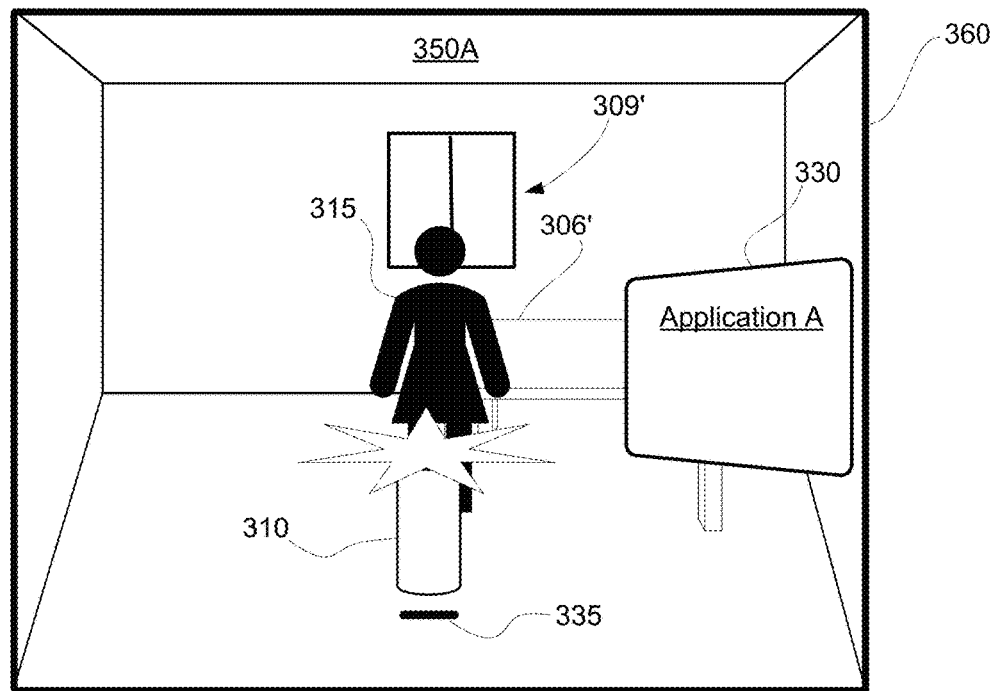
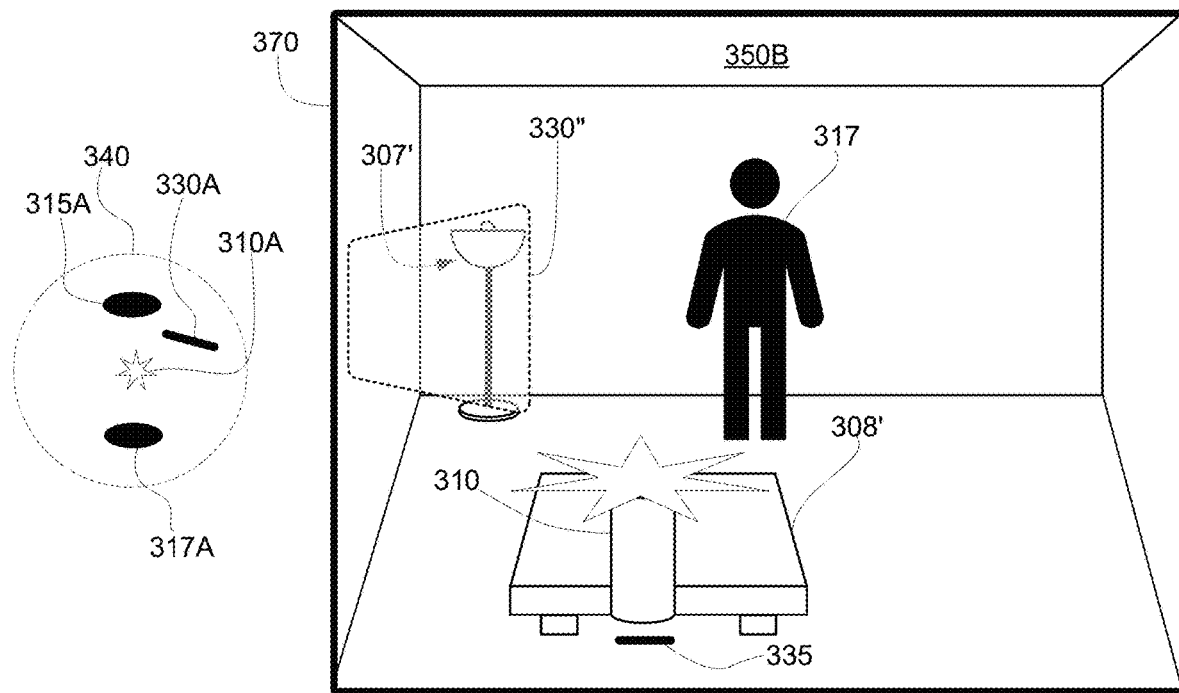
FIG. 3

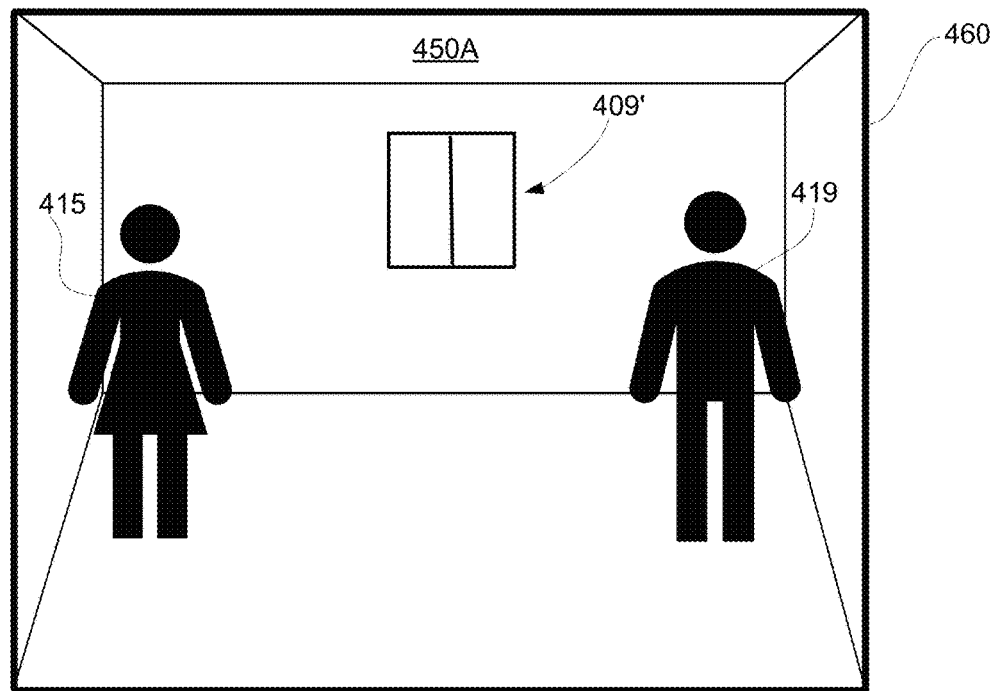
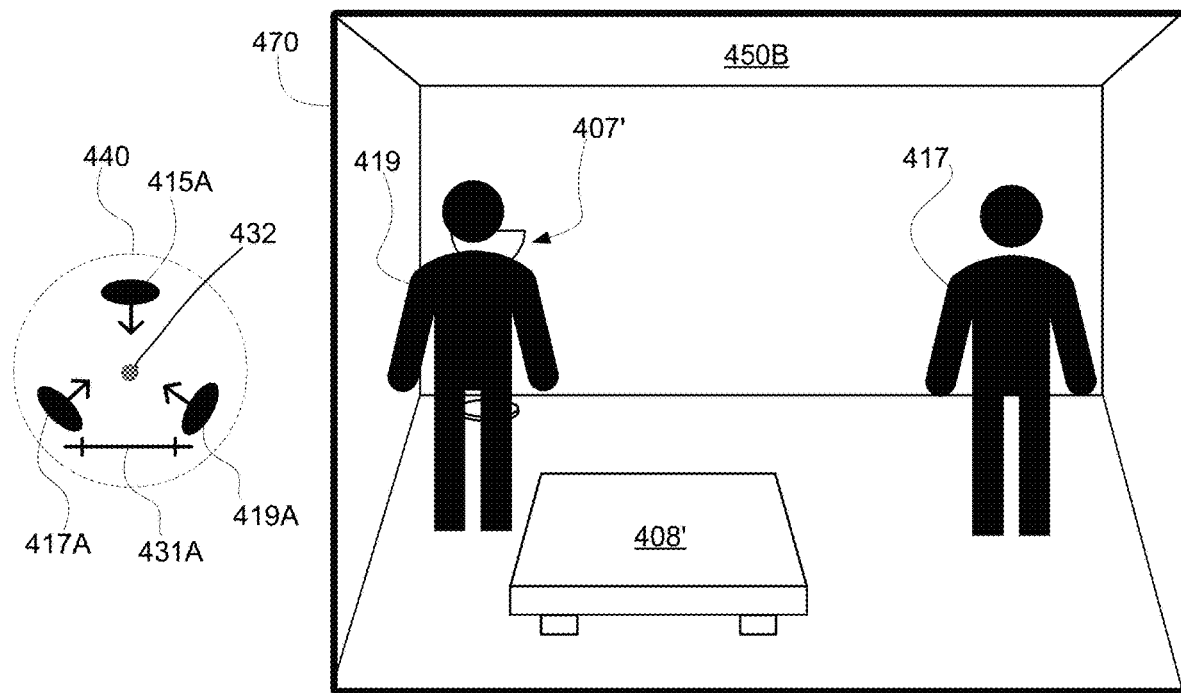
FIG. 4A

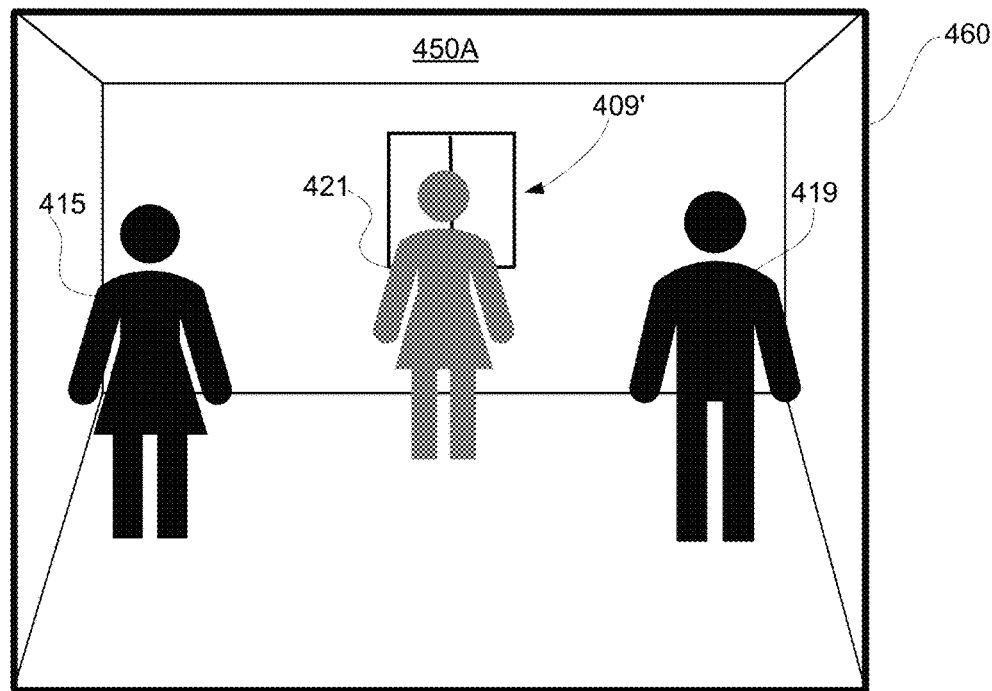
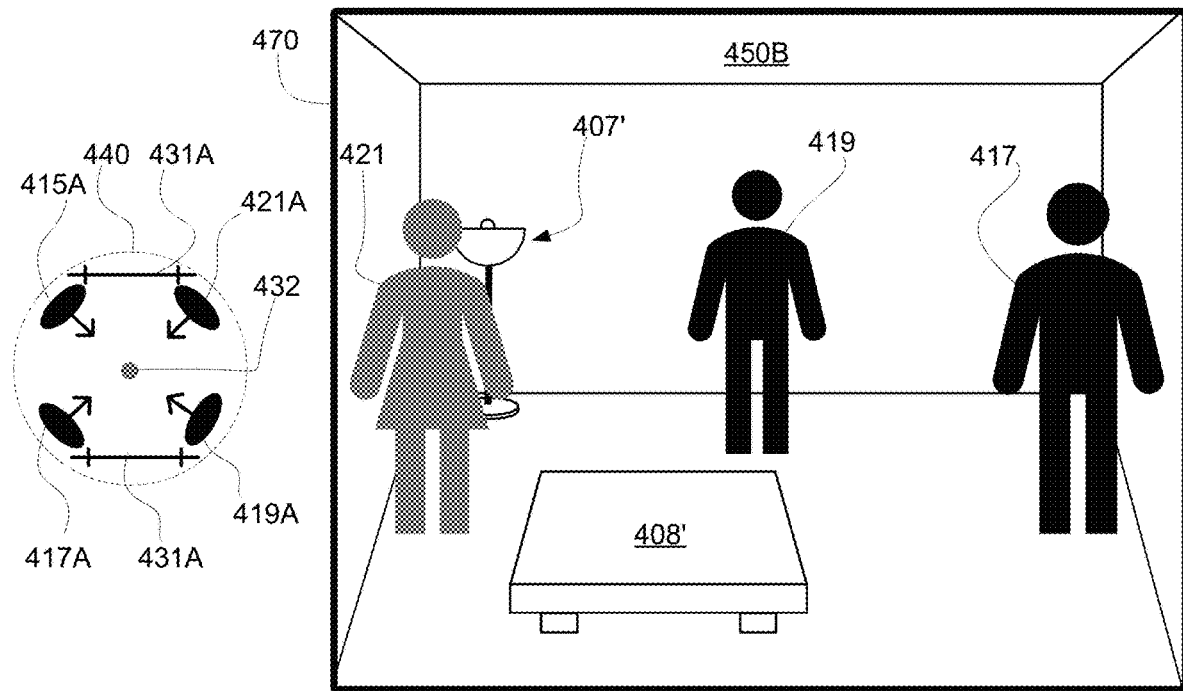
FIG. 4B

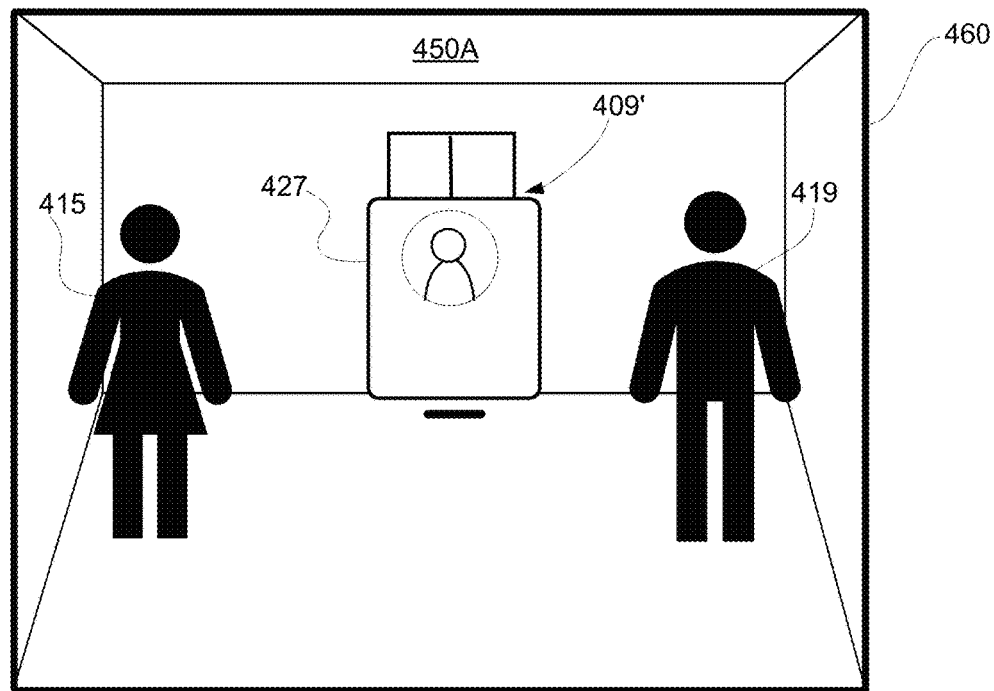
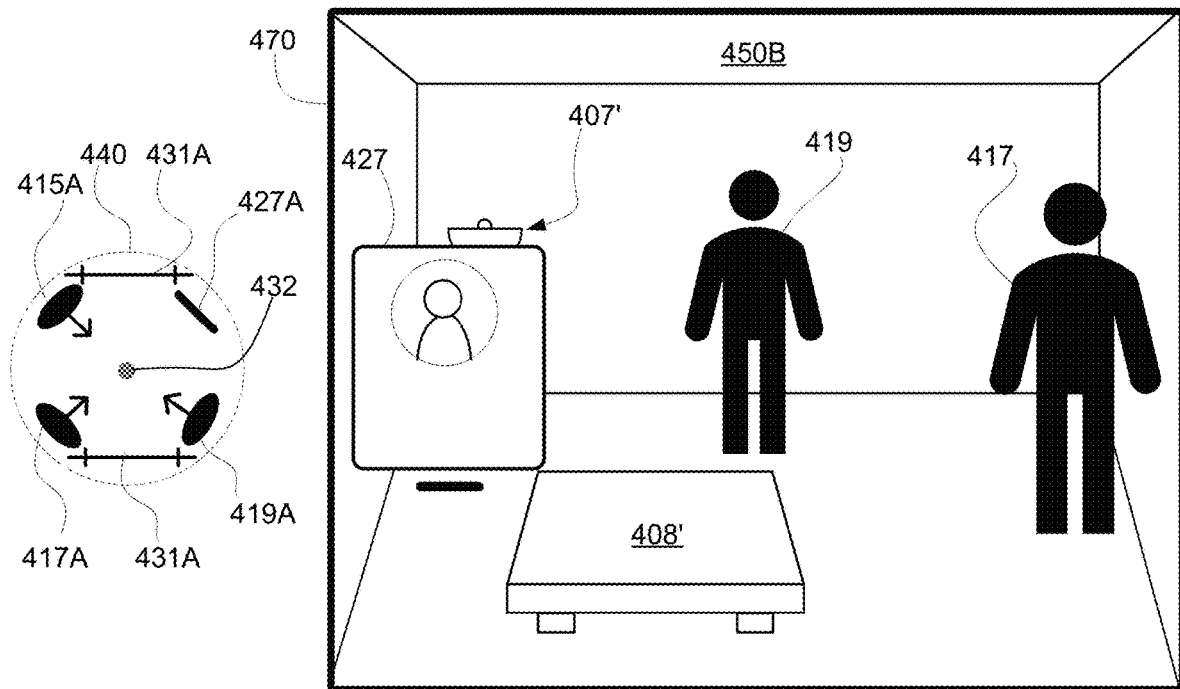
FIG. 4C

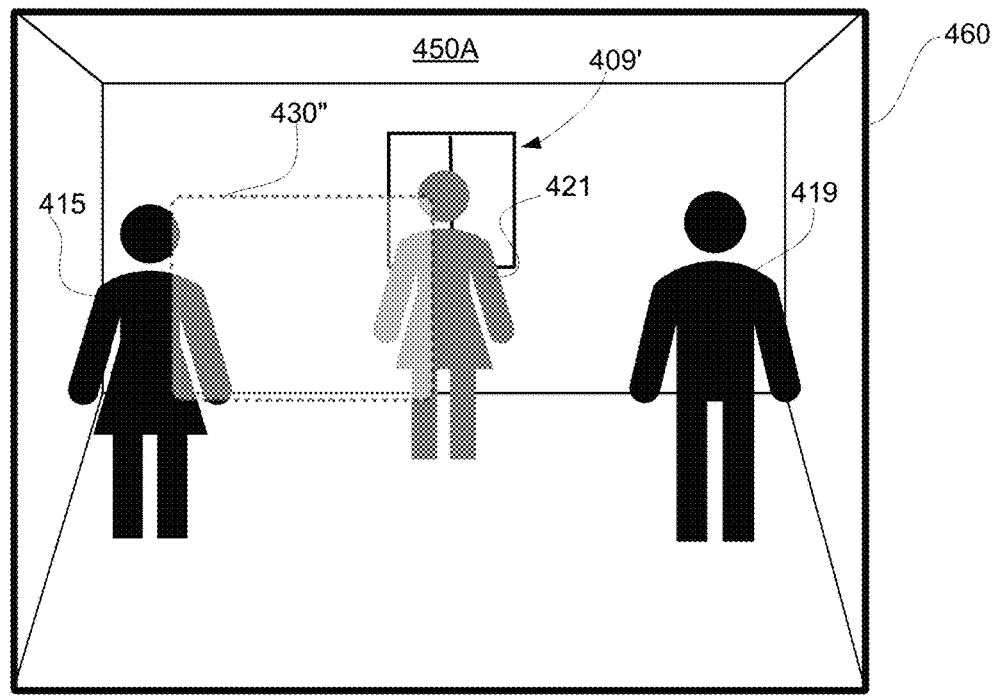
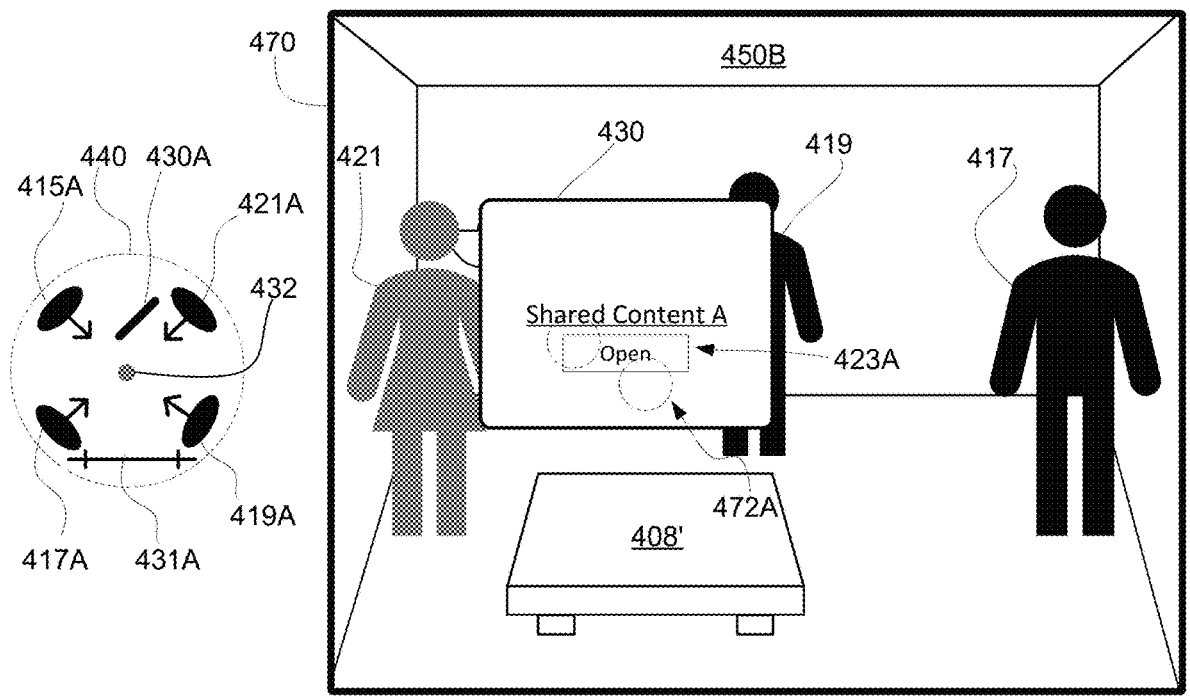
FIG. 4D

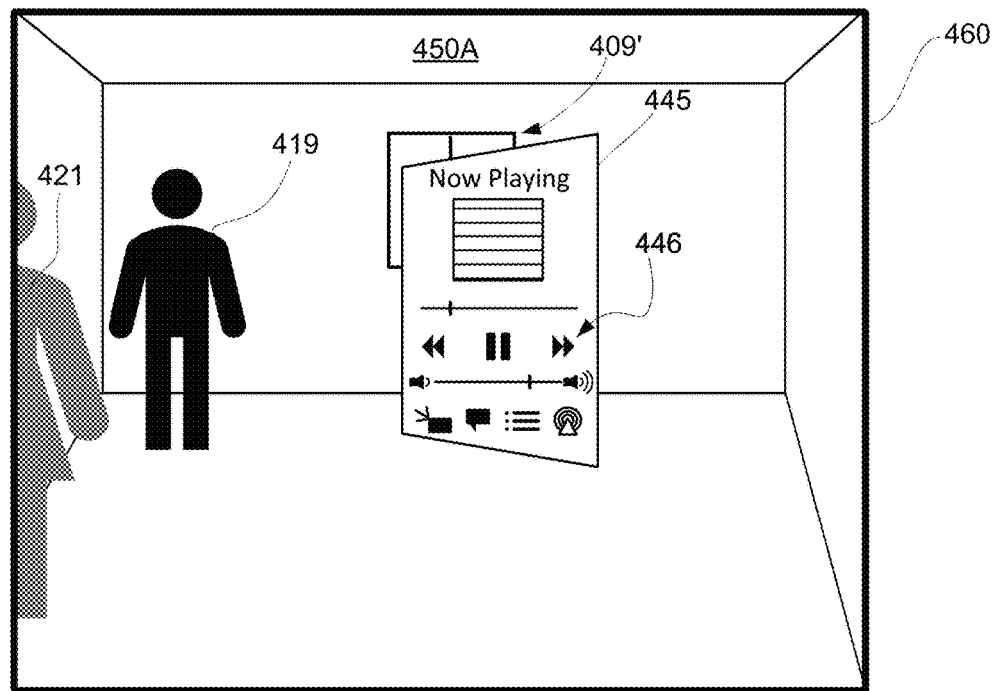
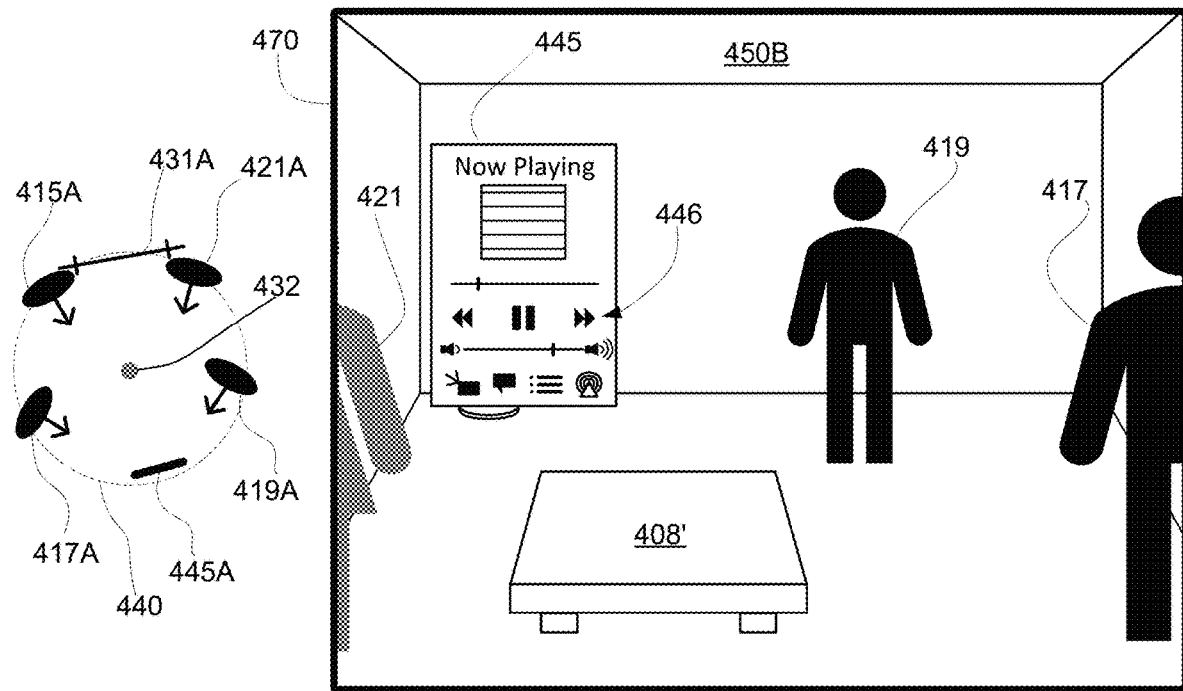
FIG. 4E

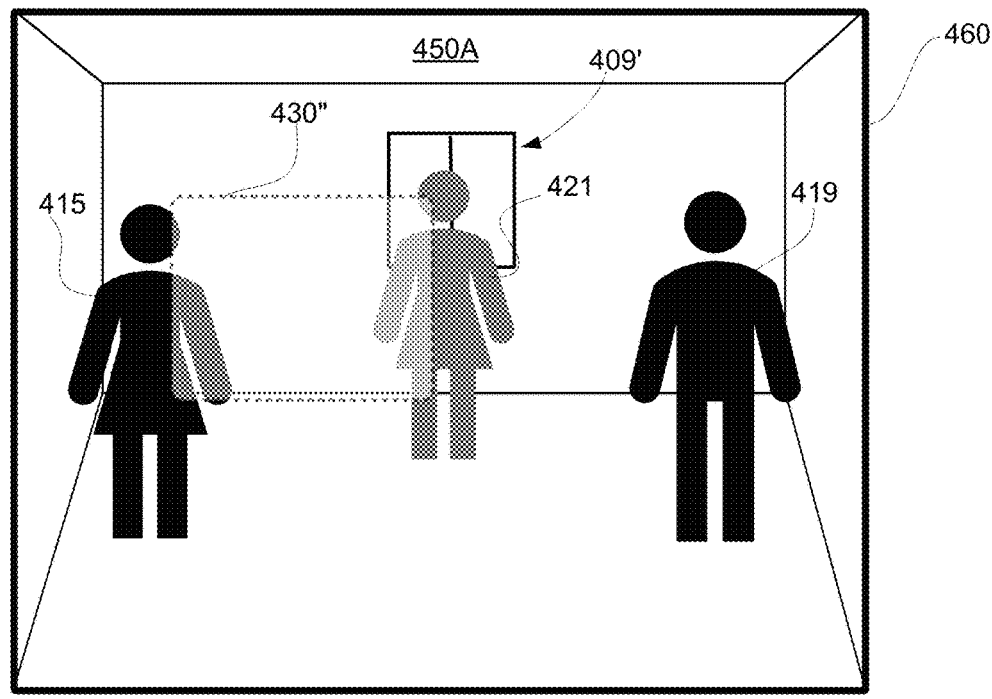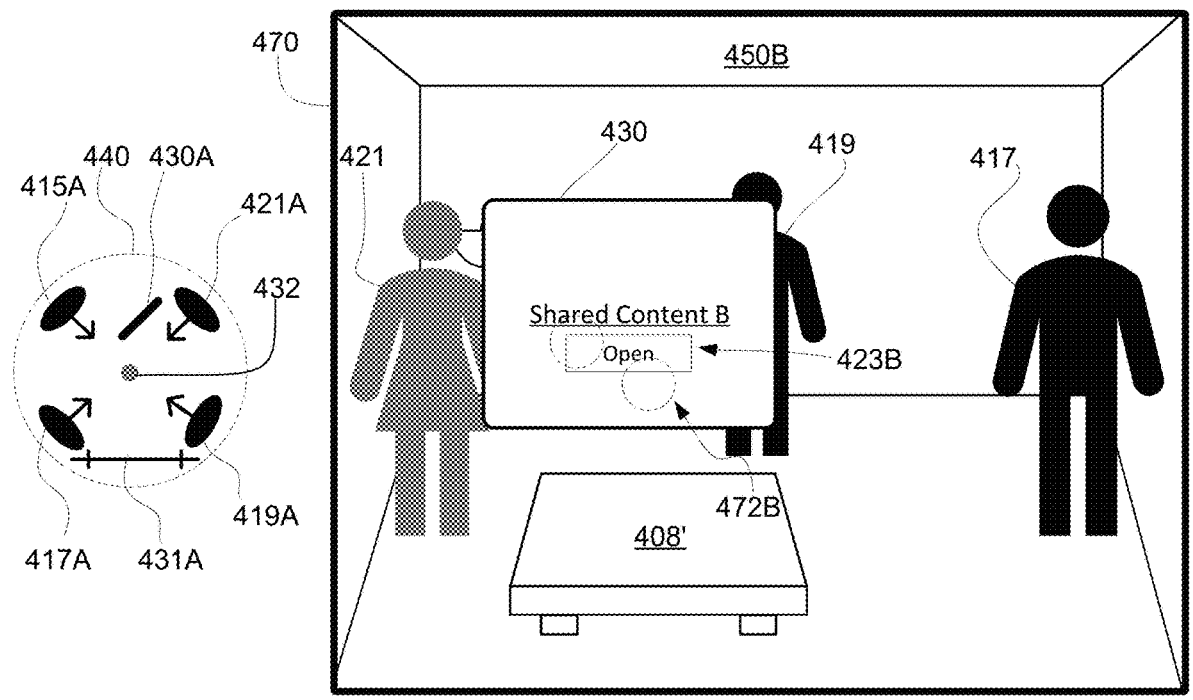
FIG. 4F

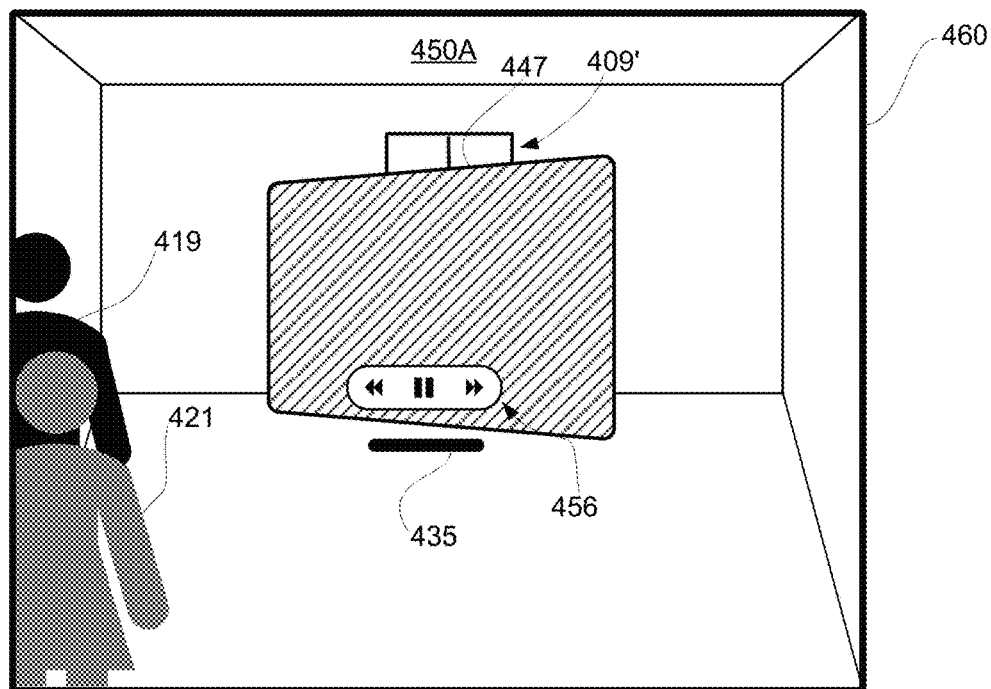
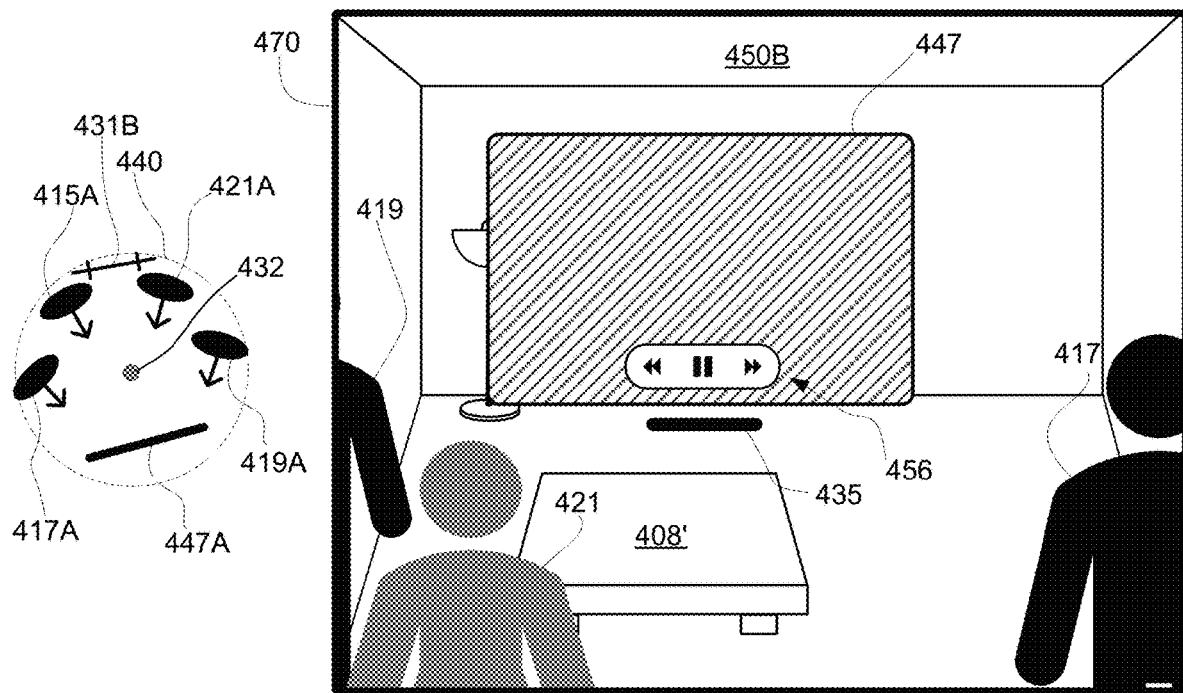
FIG. 4G

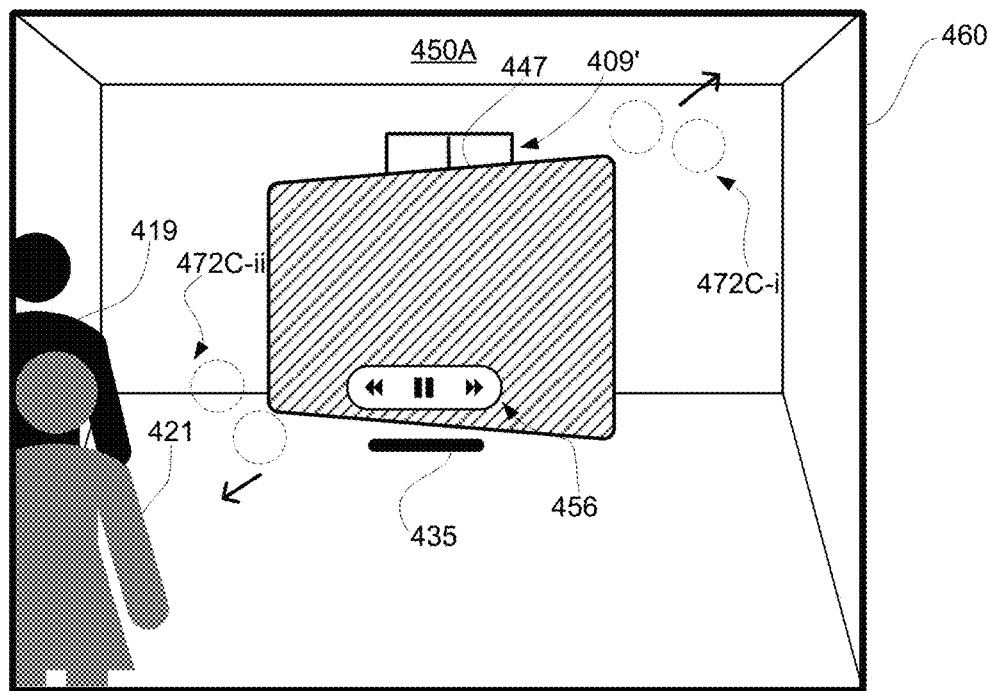
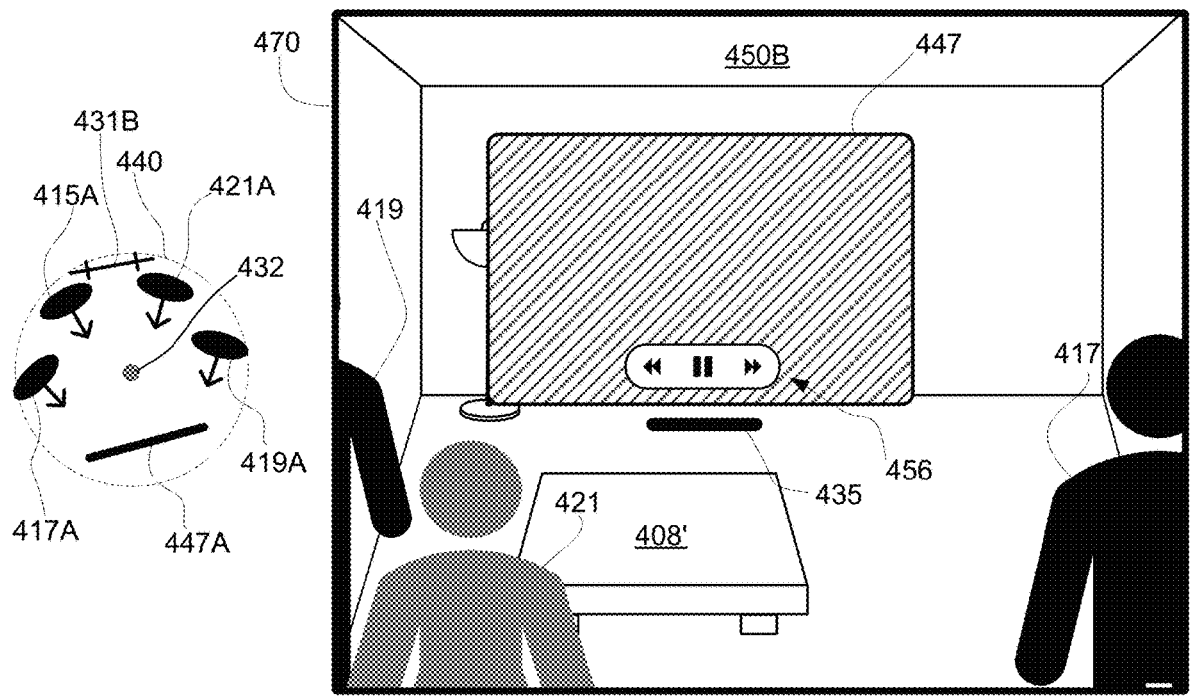
FIG. 4H

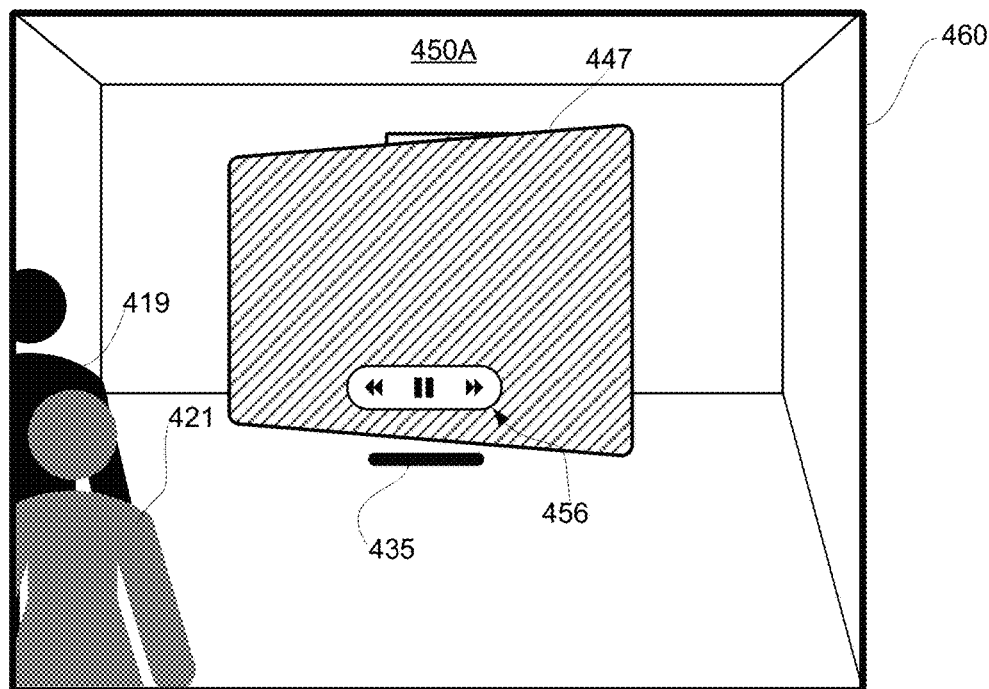
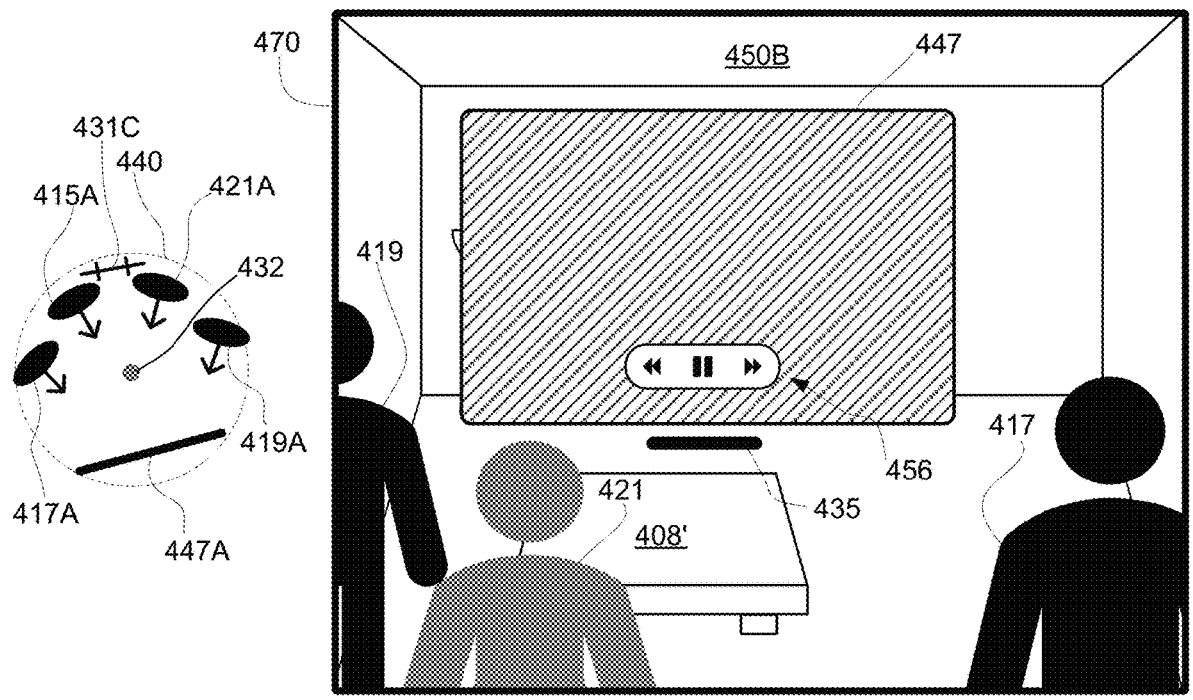
FIG. 4I

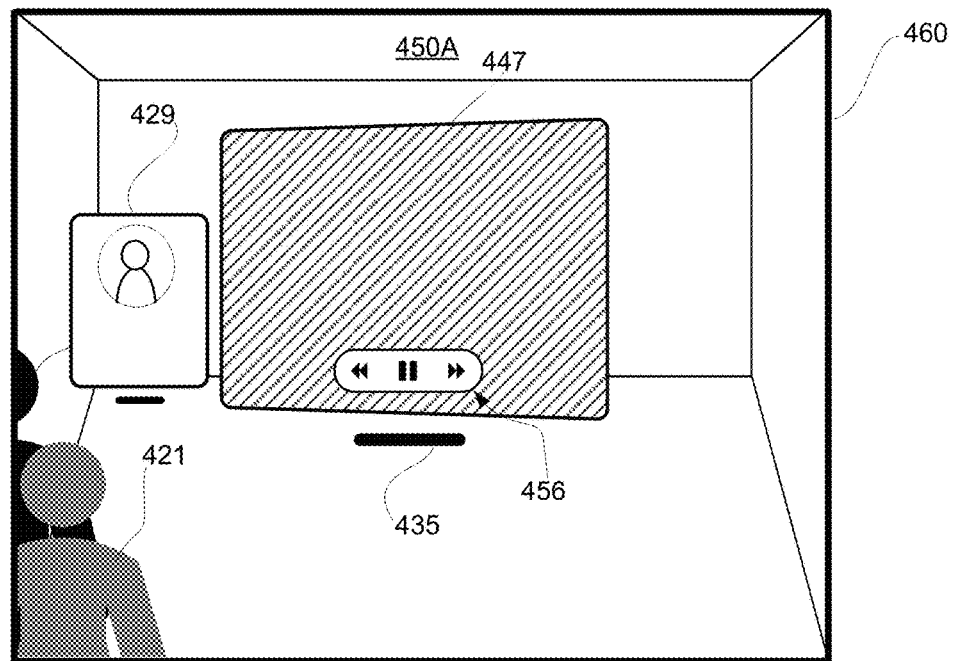
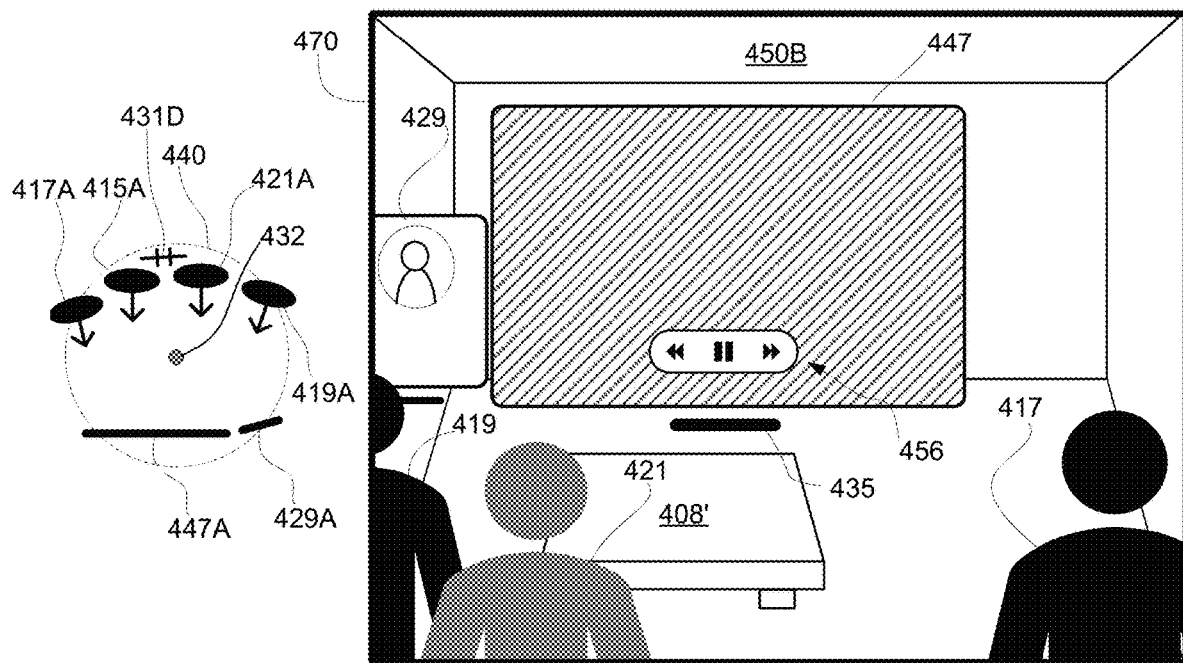
FIG. 4J

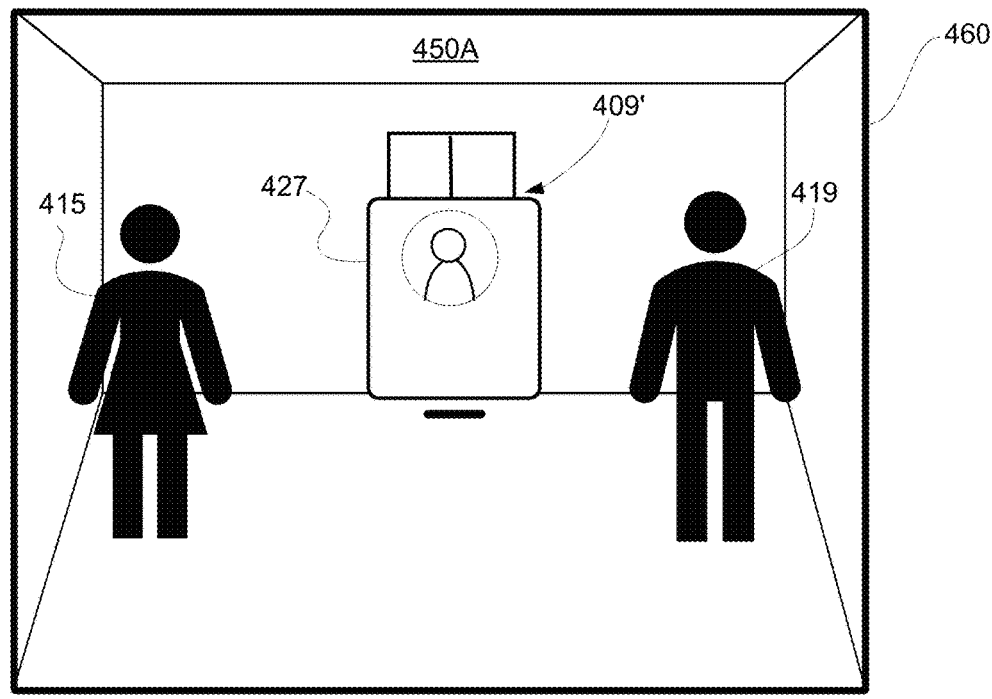
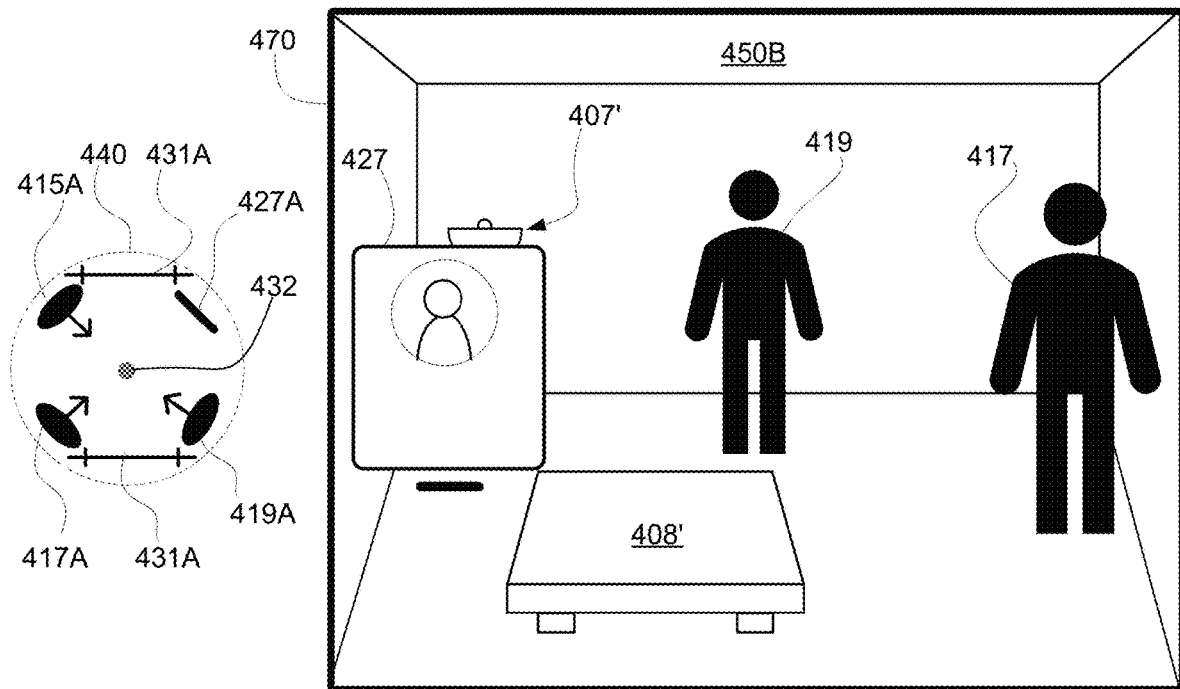
FIG. 4K

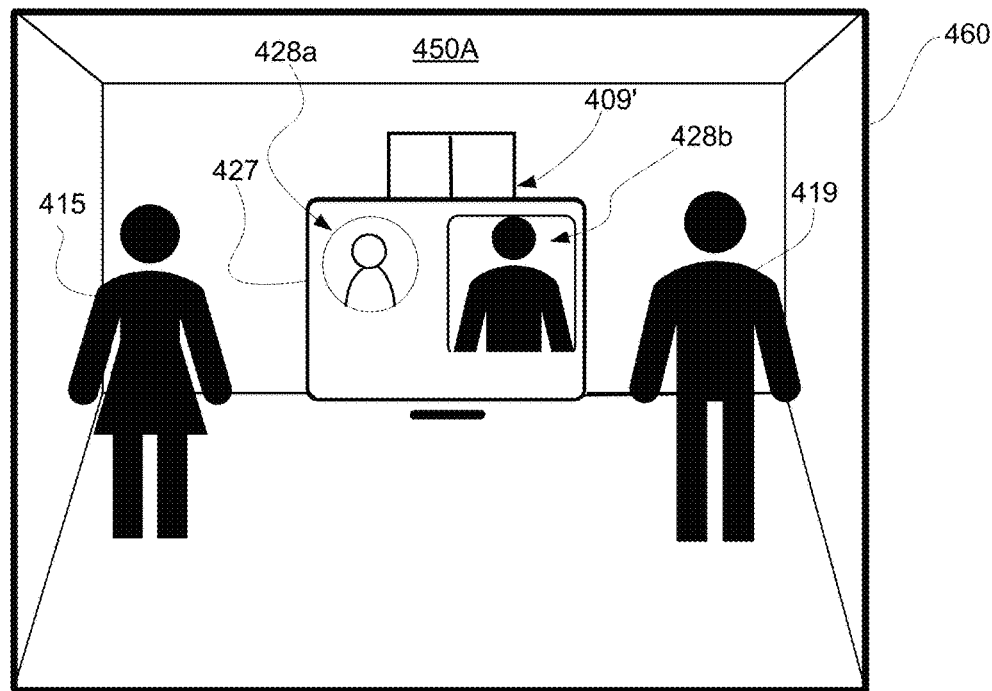
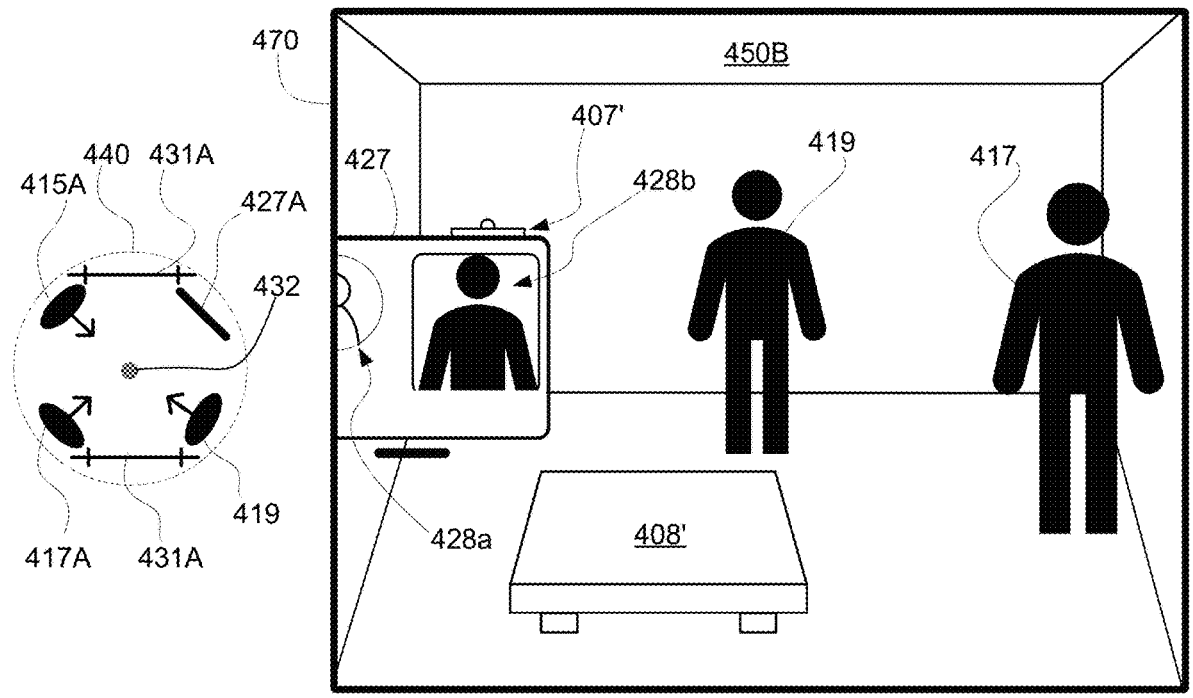
FIG. 4L

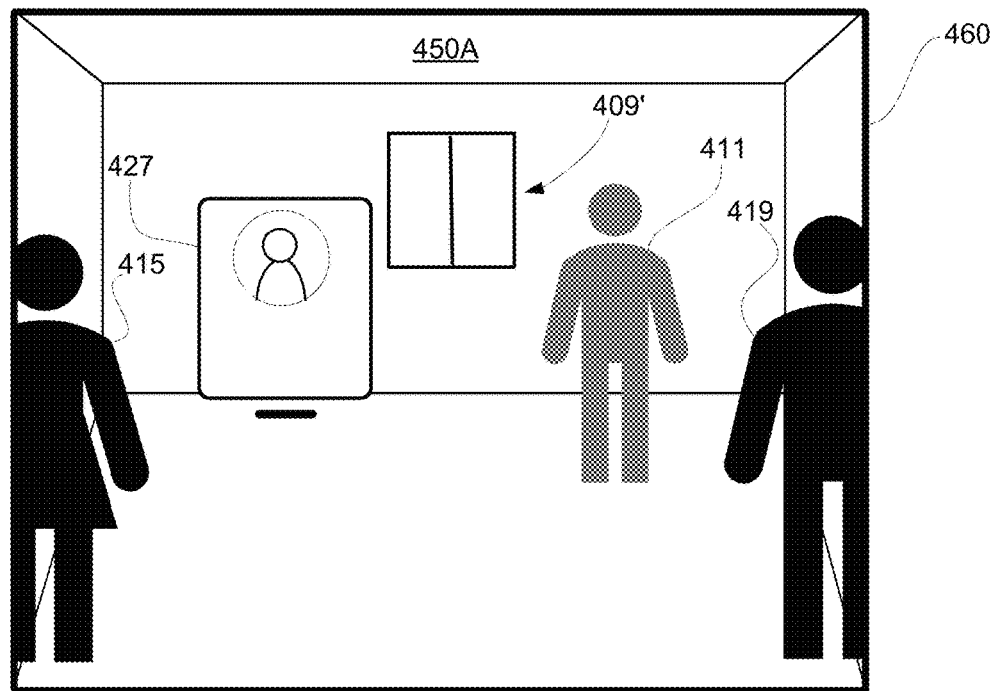
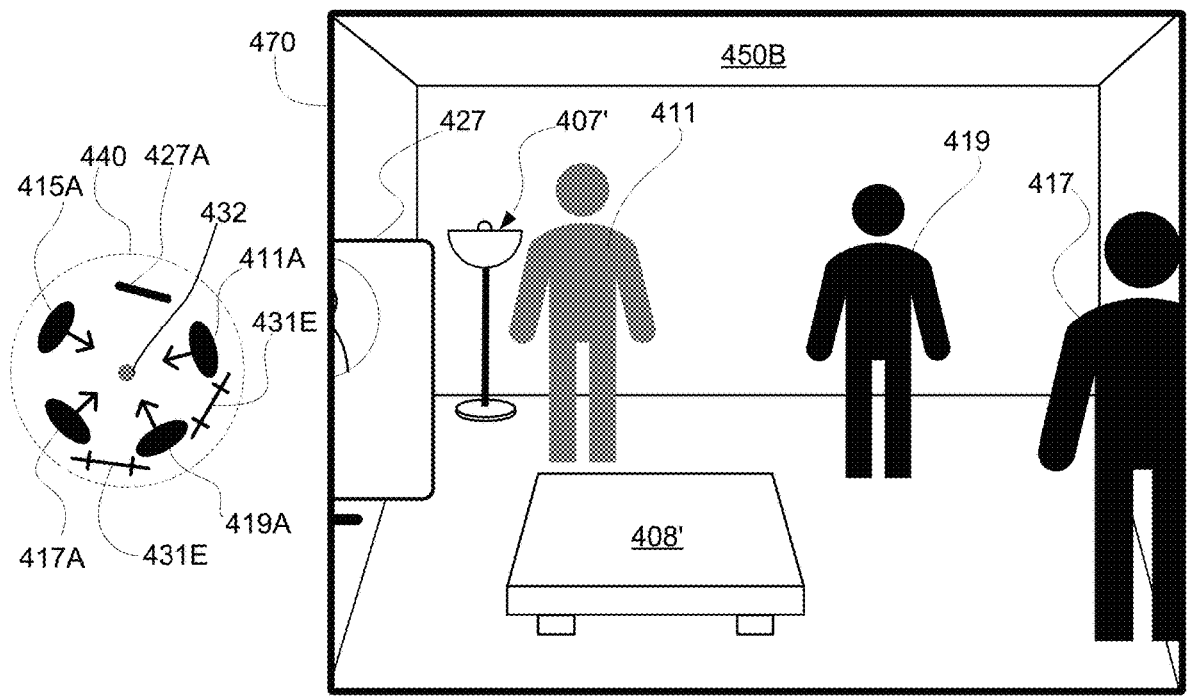
FIG. 4M

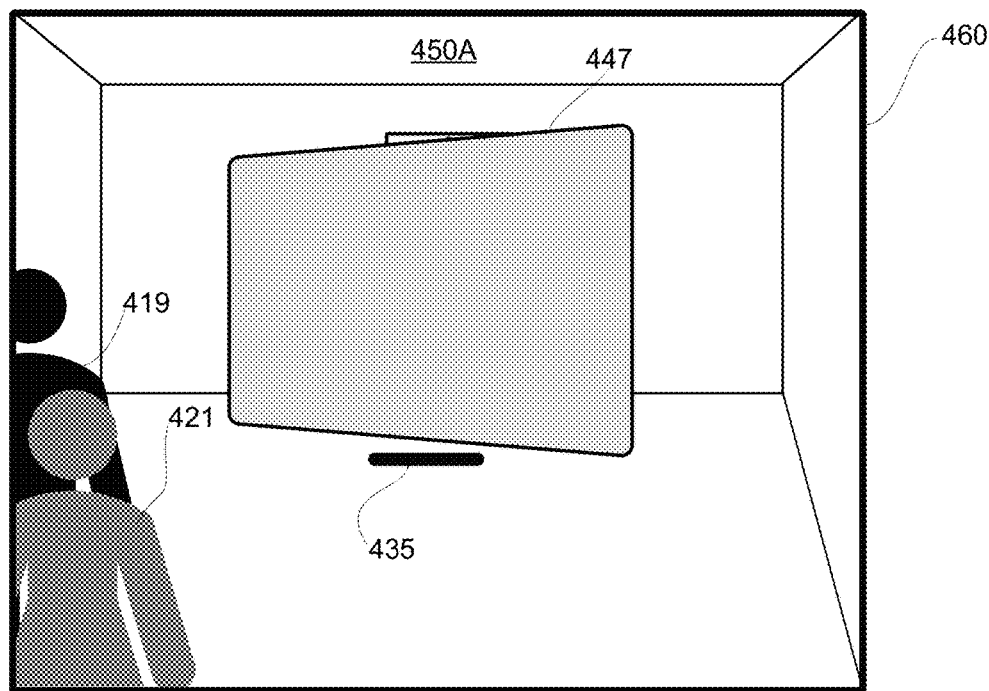
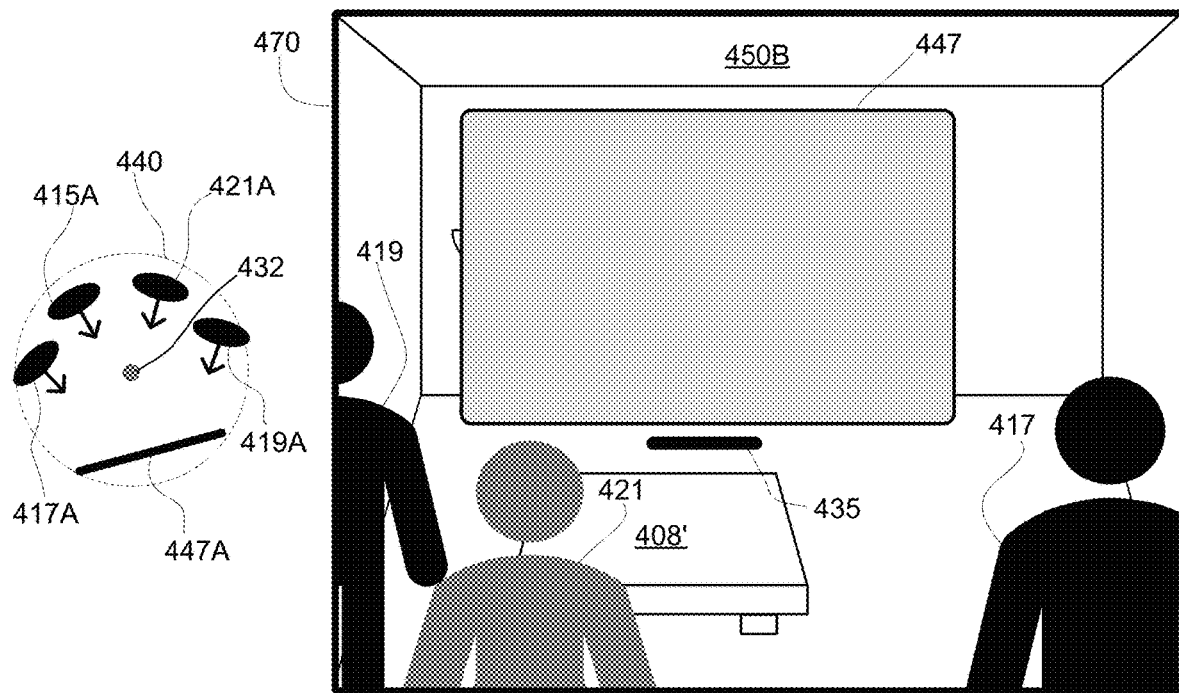
FIG. 4N

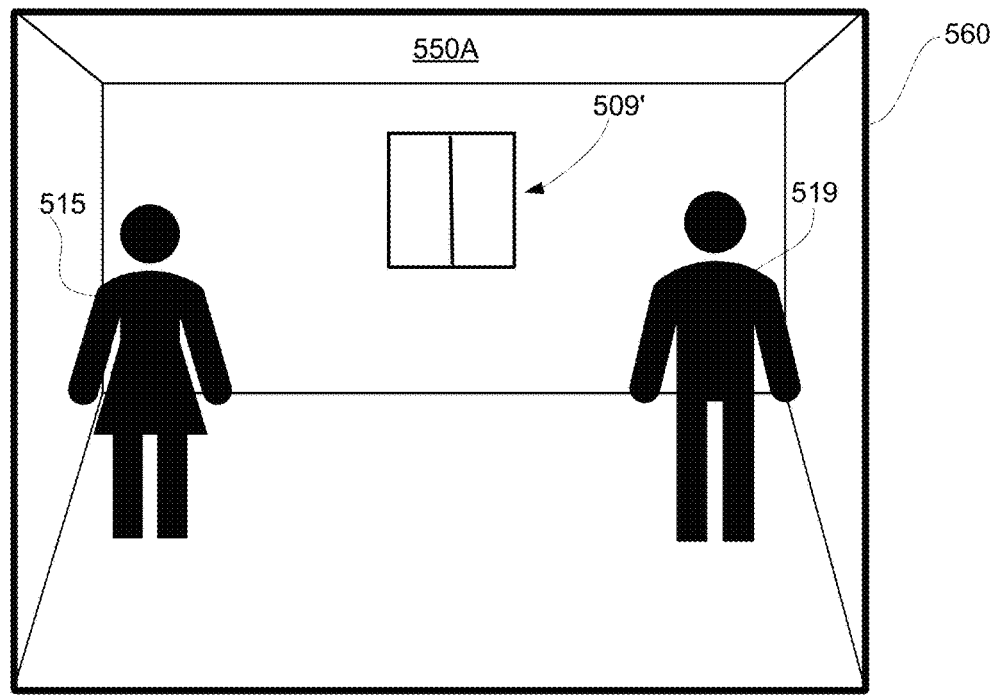
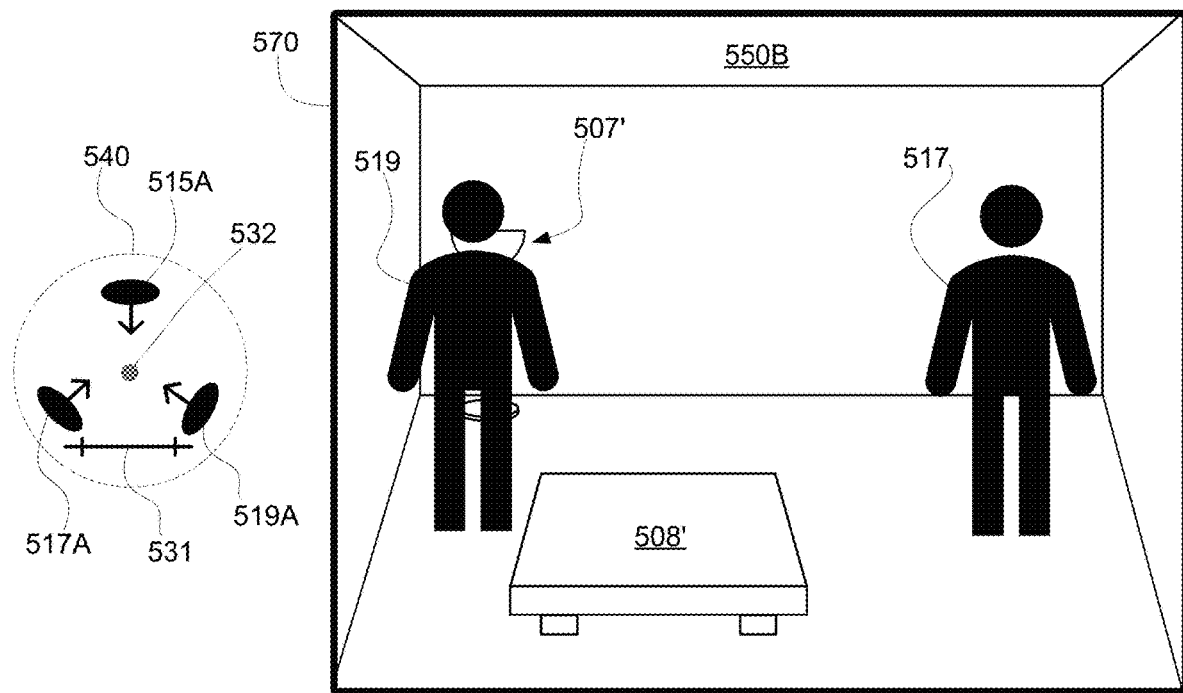
FIG. 5A

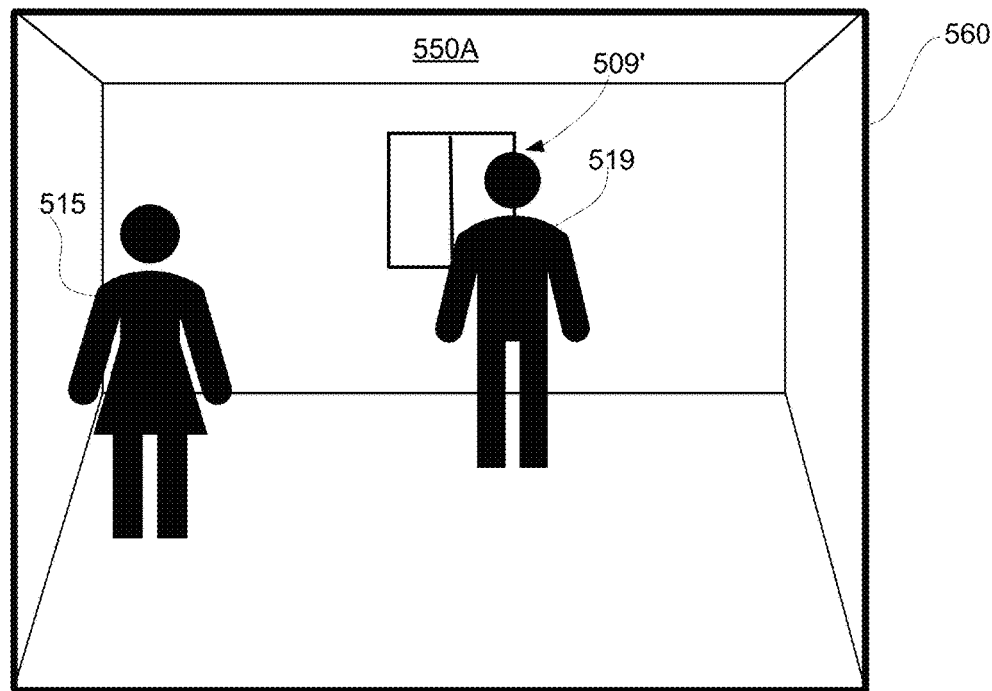
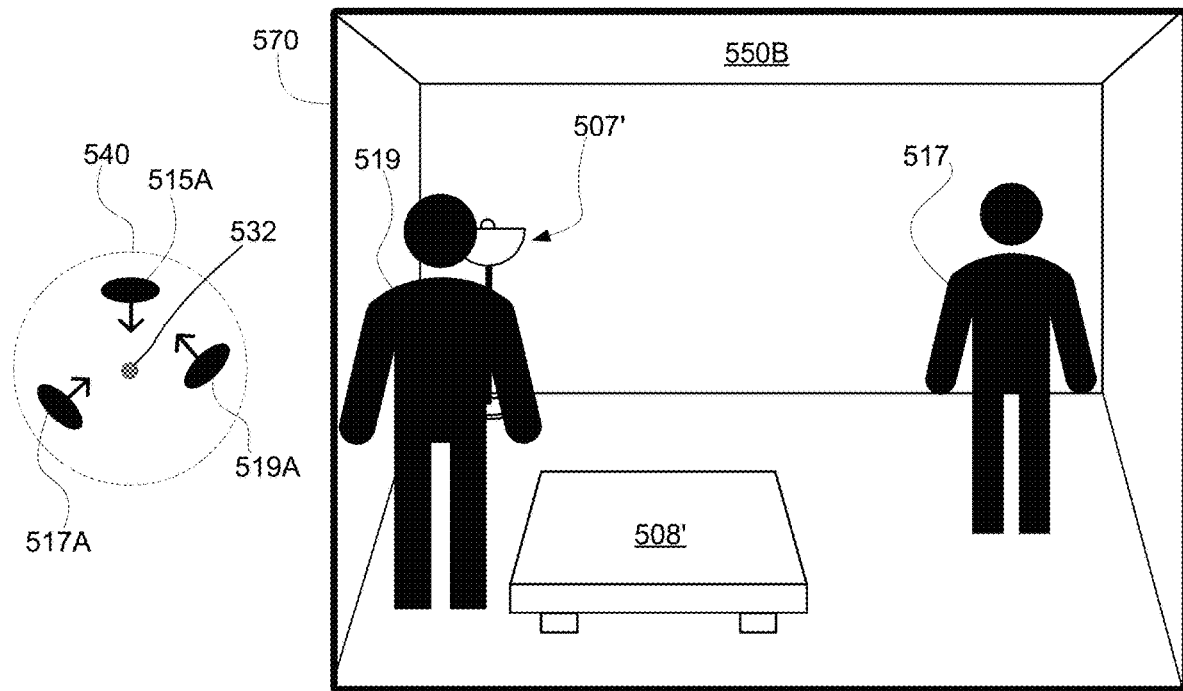
FIG. 5B

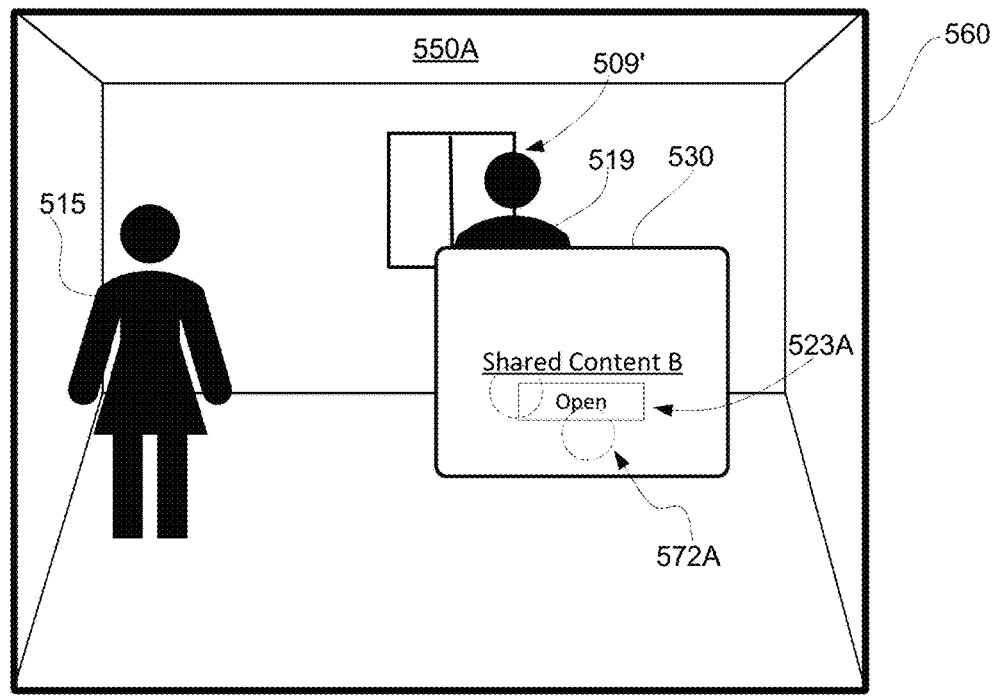
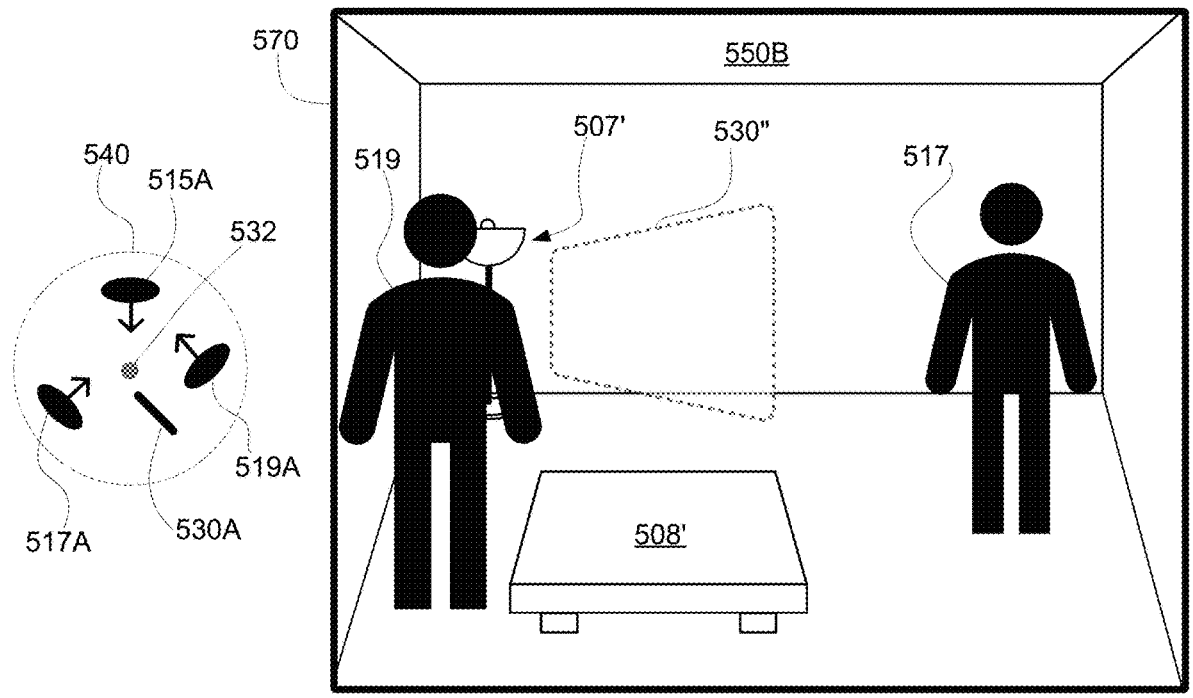
FIG. 5C

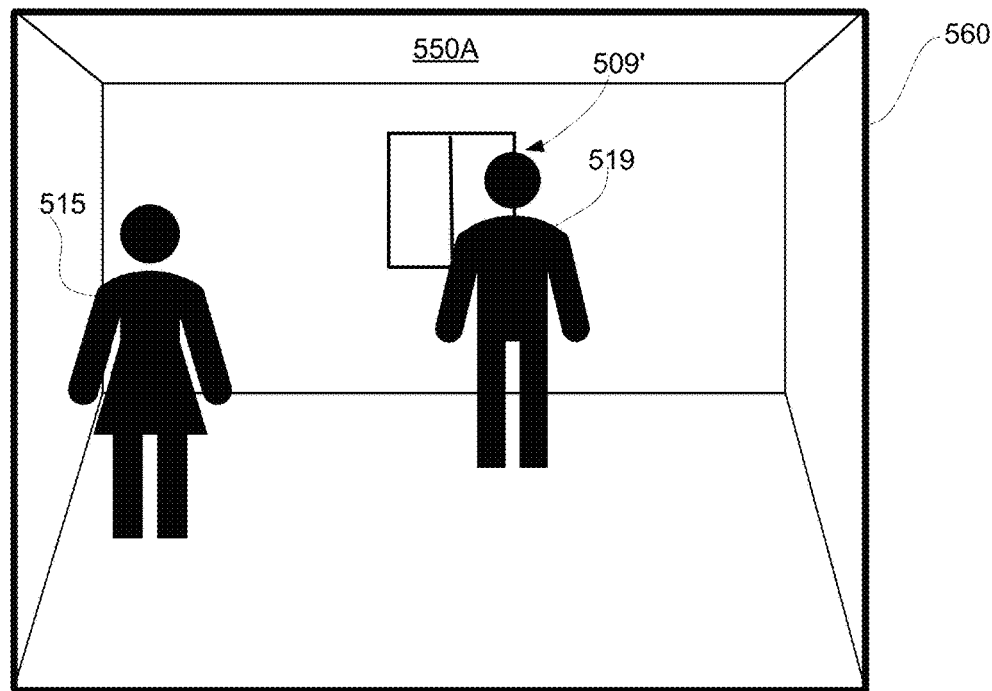
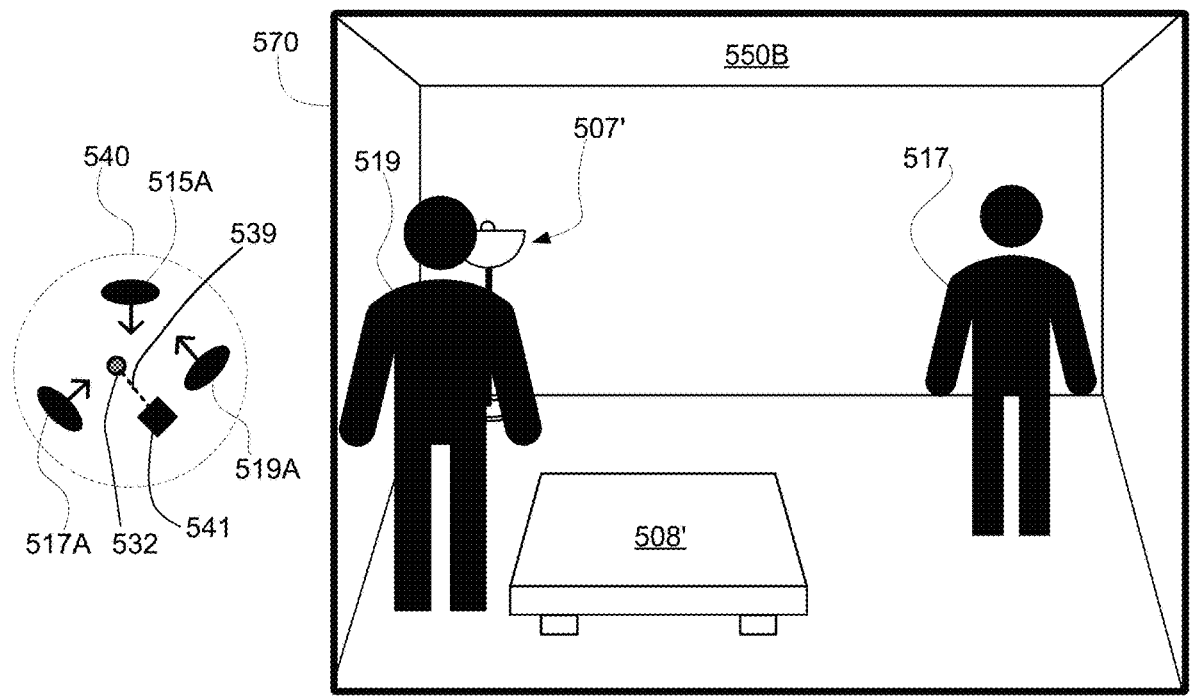
FIG. 5D

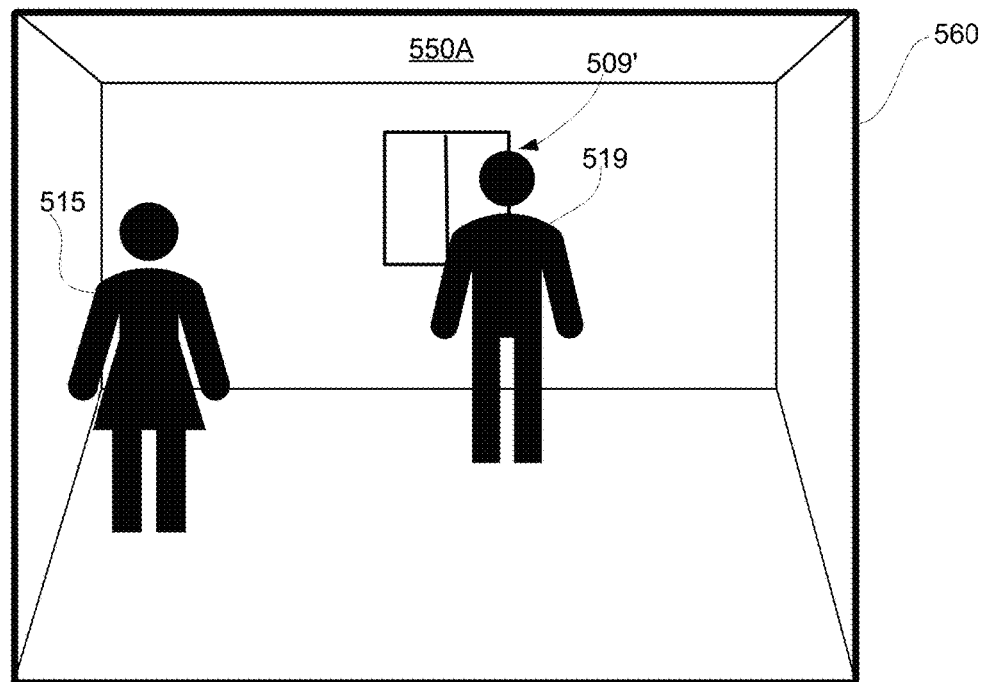
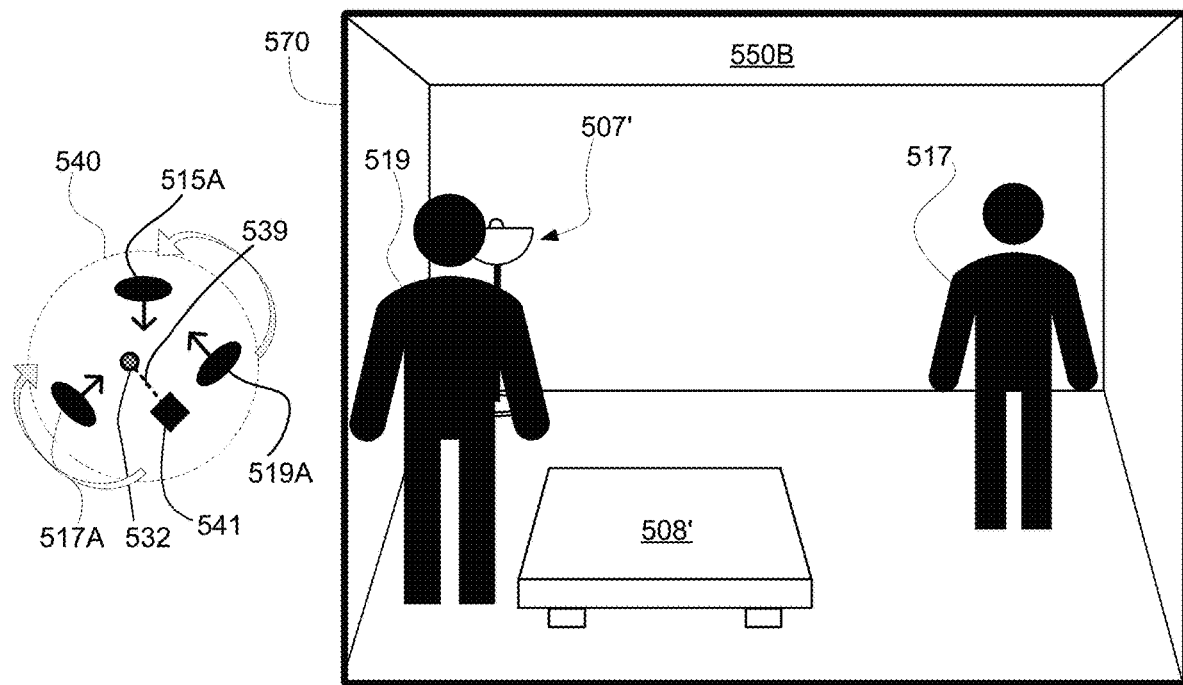
FIG. 5E

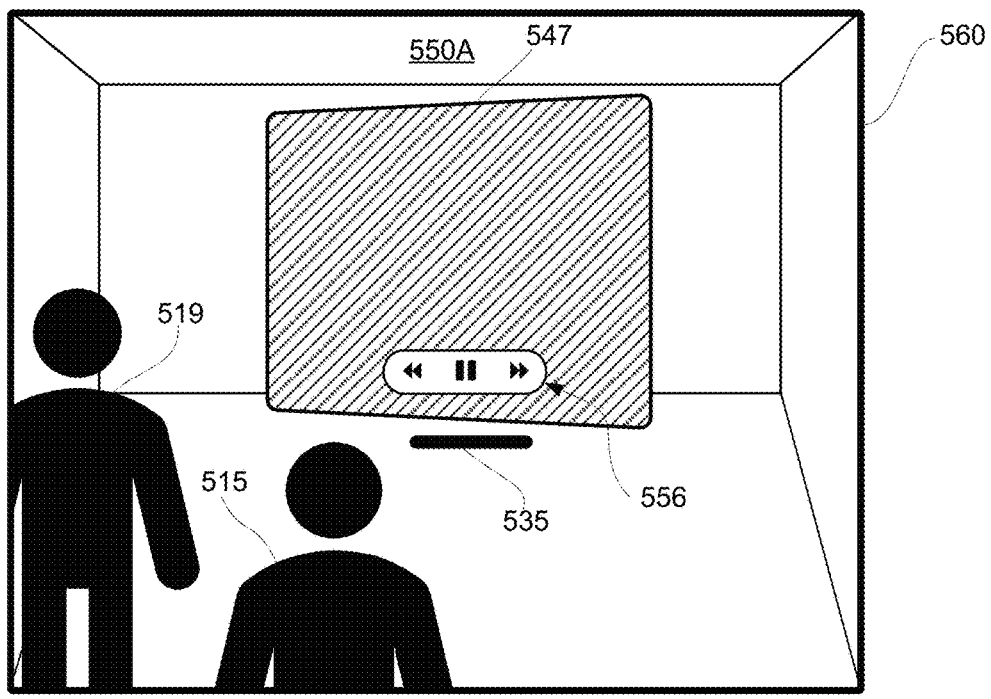
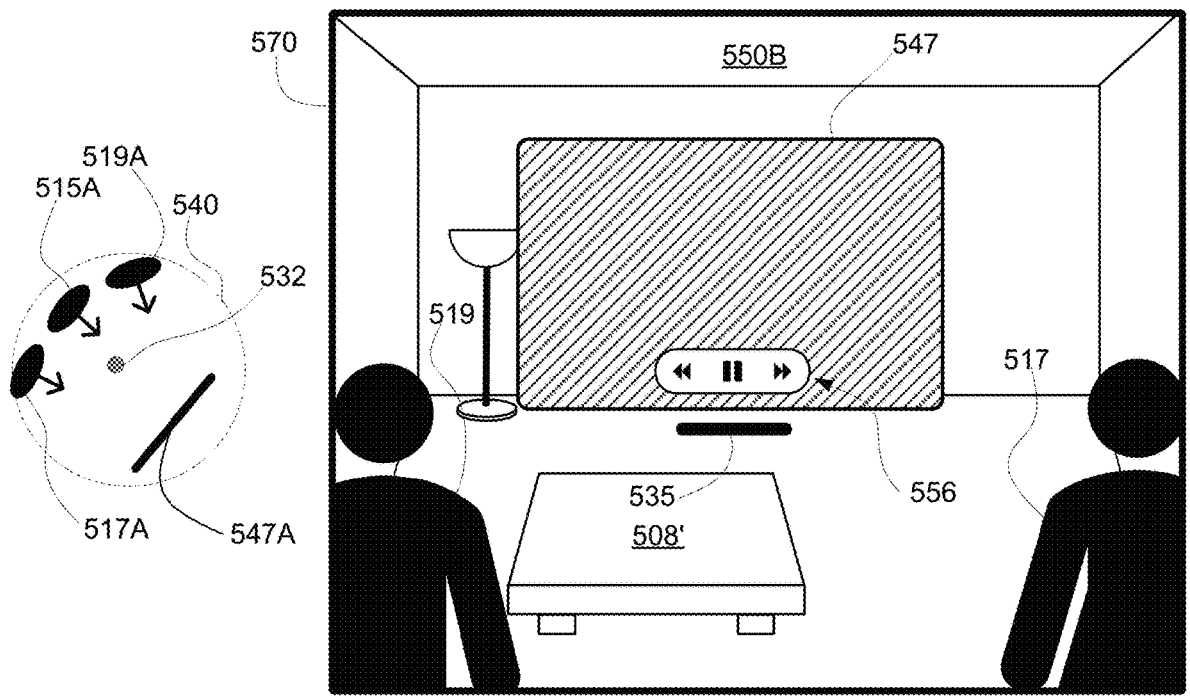
FIG. 5F

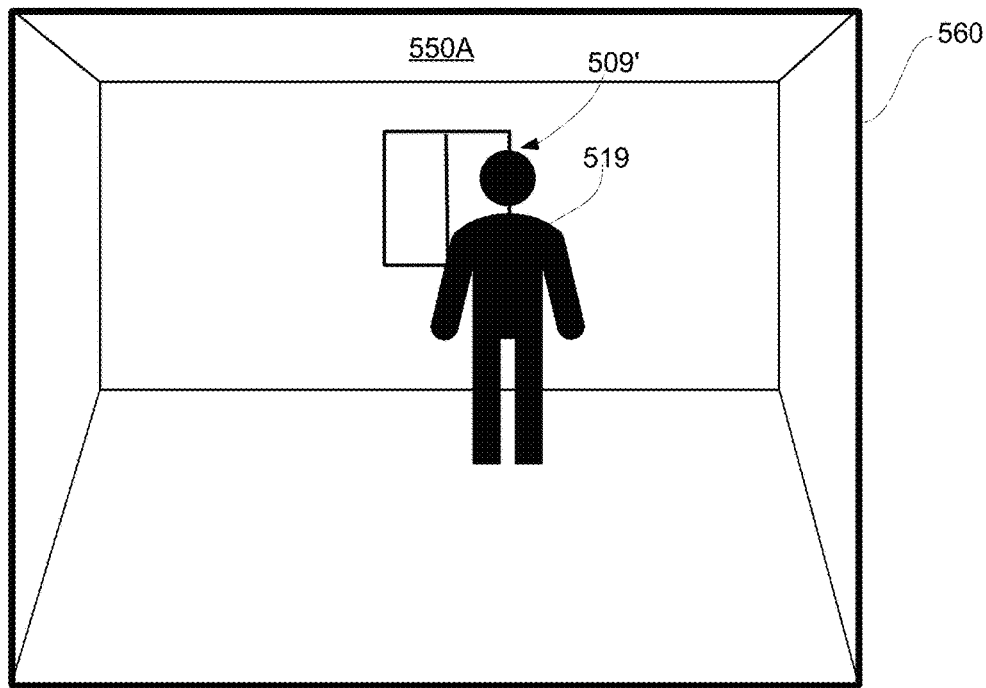
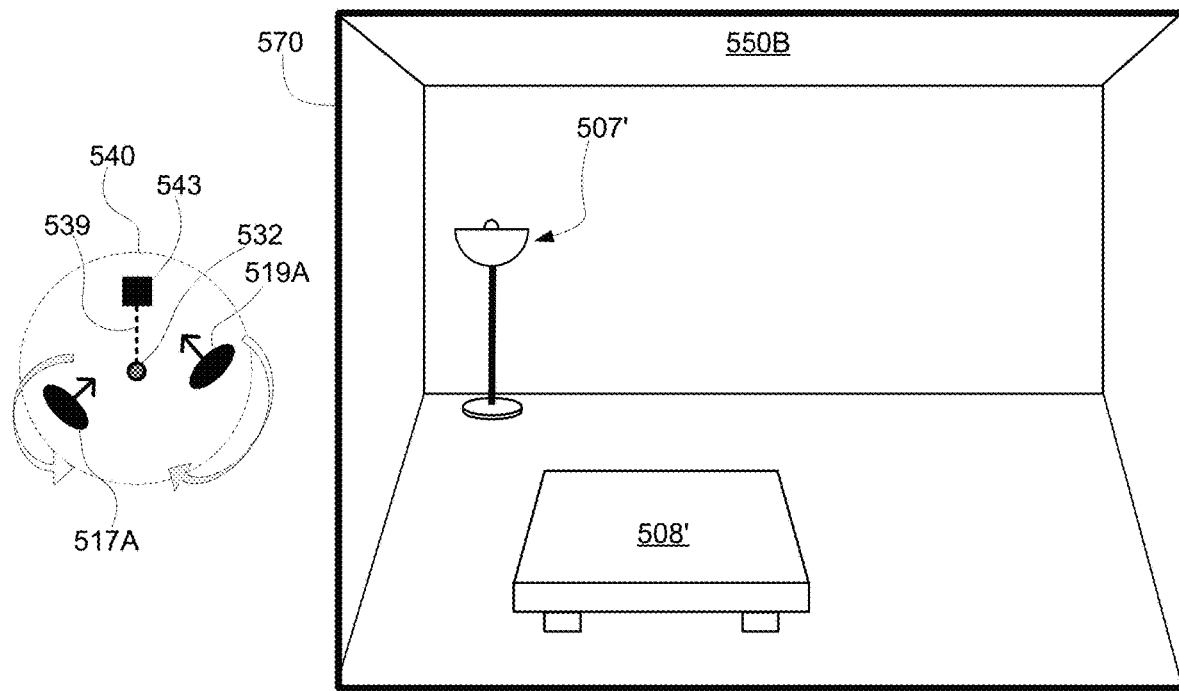
FIG. 5H

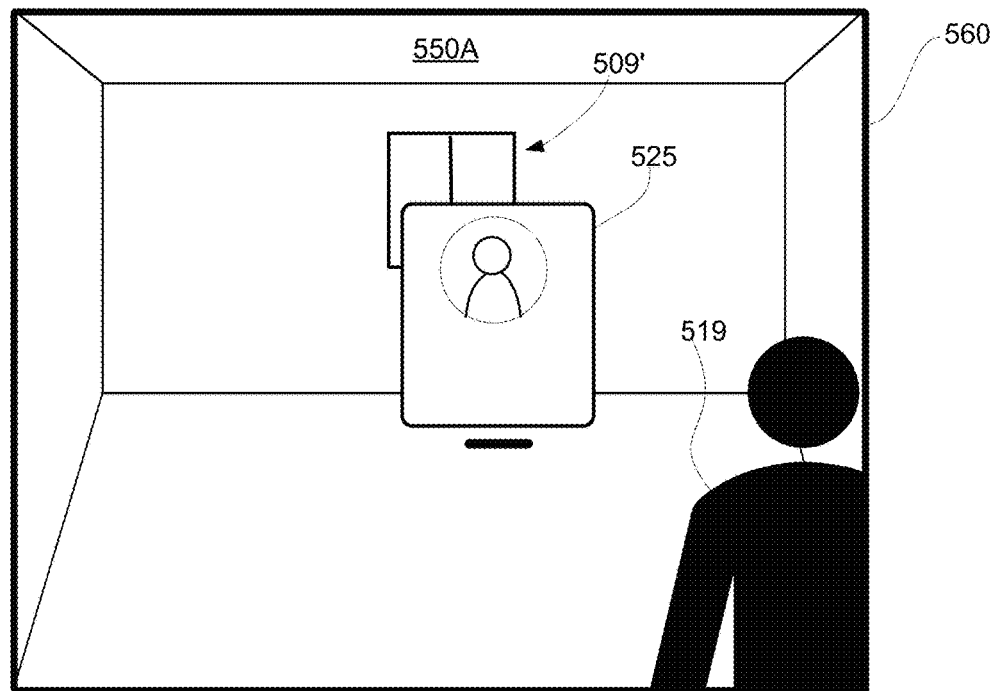
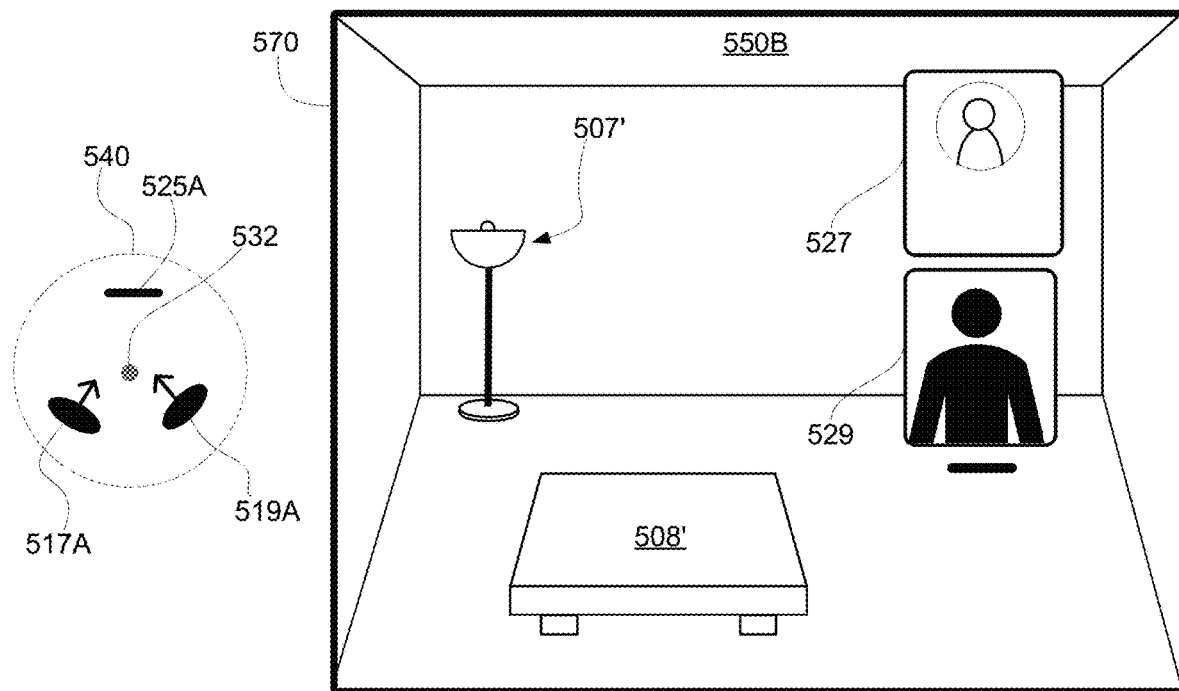
FIG. 5I

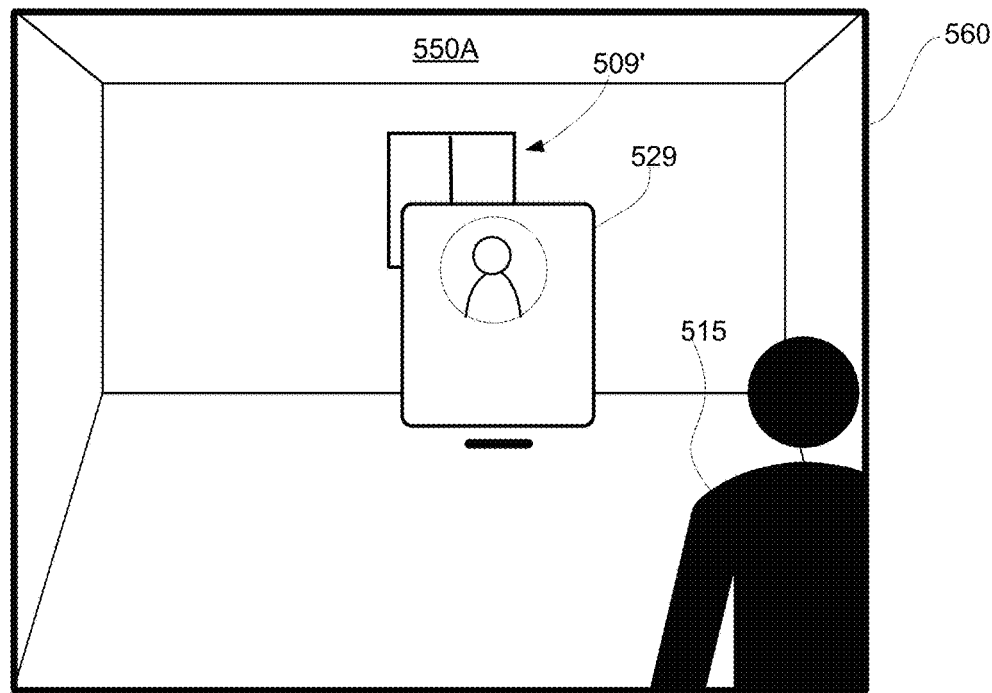
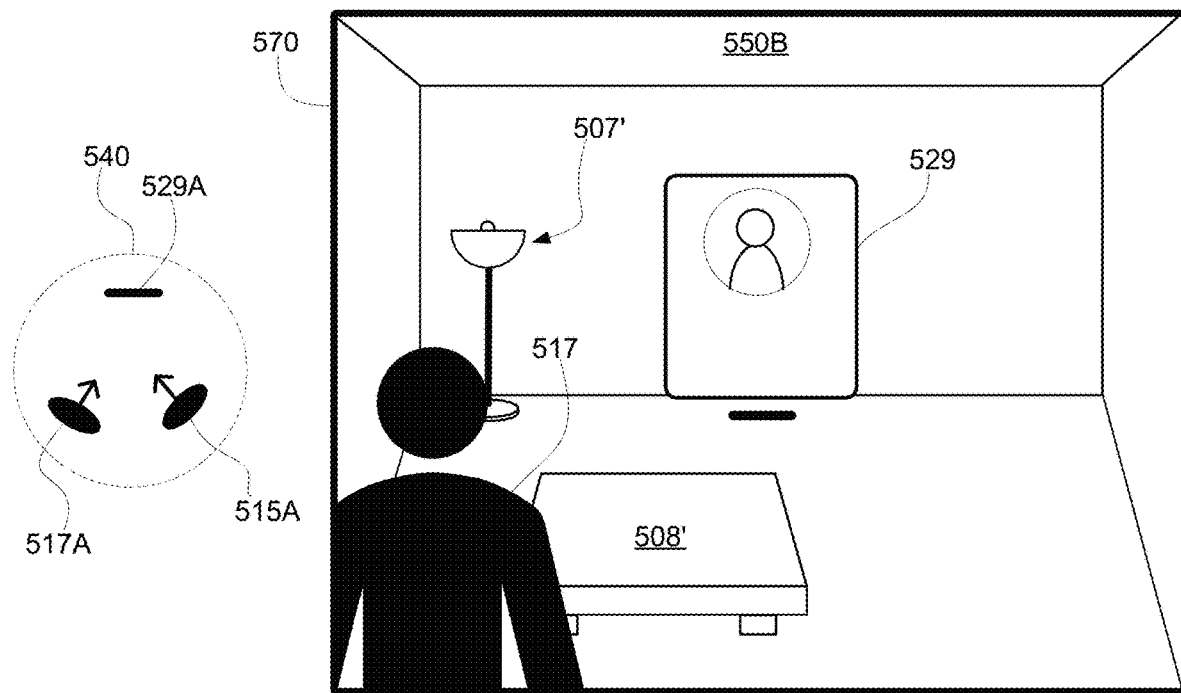
FIG. 5J

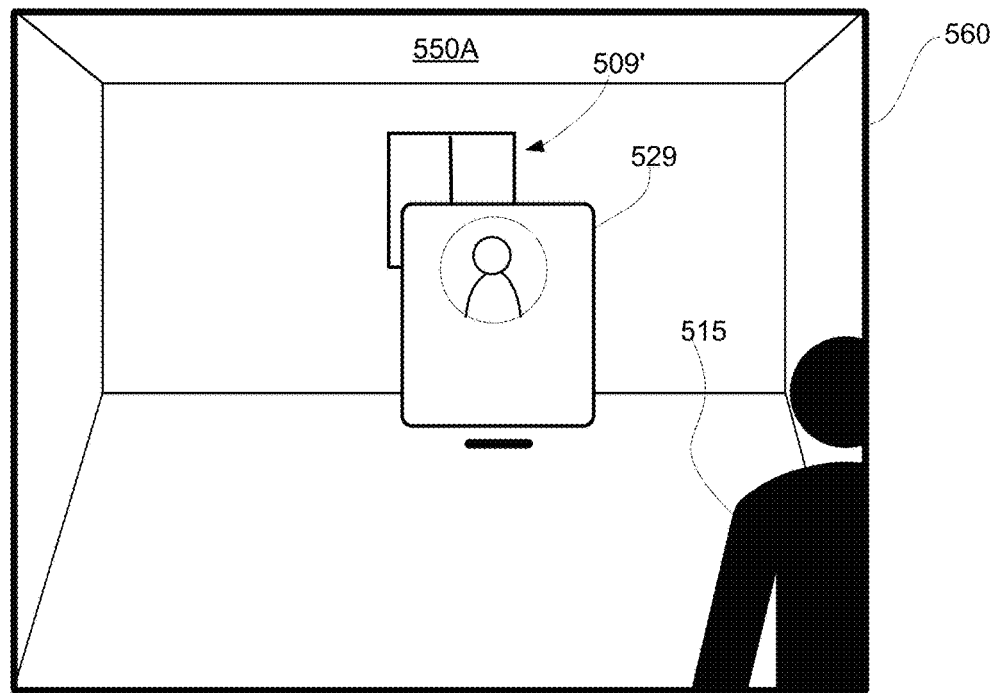
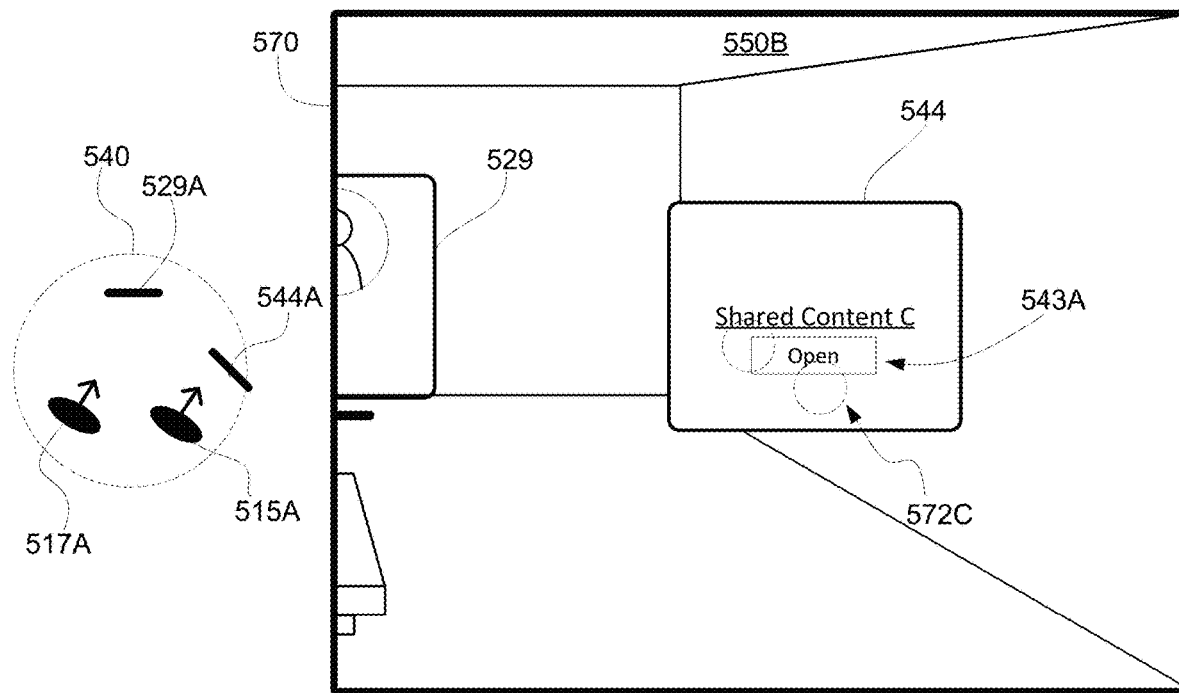
FIG. 5K

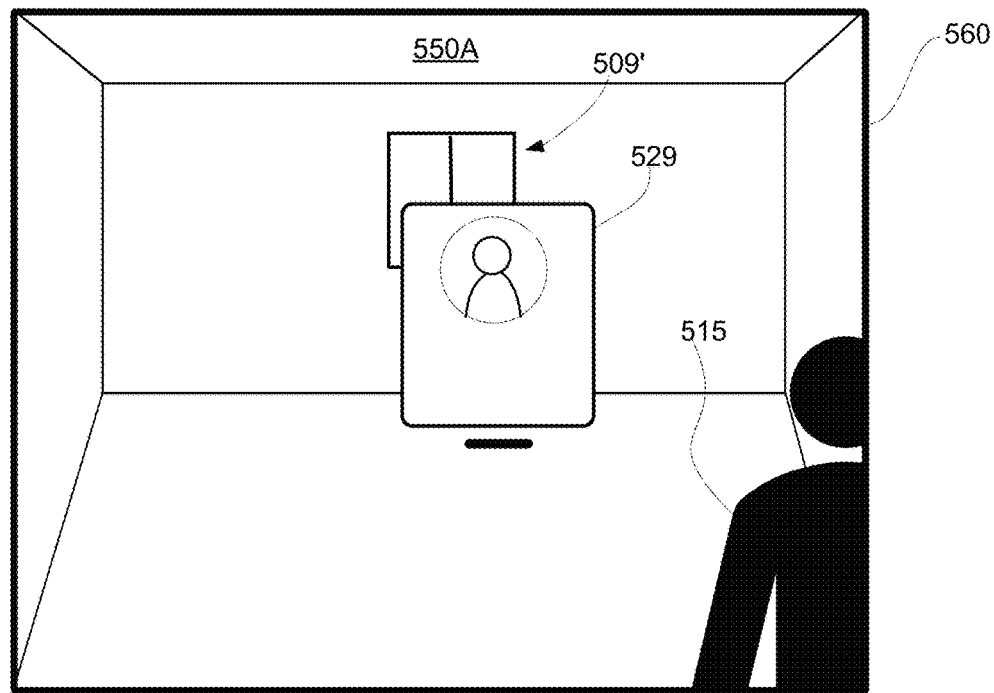
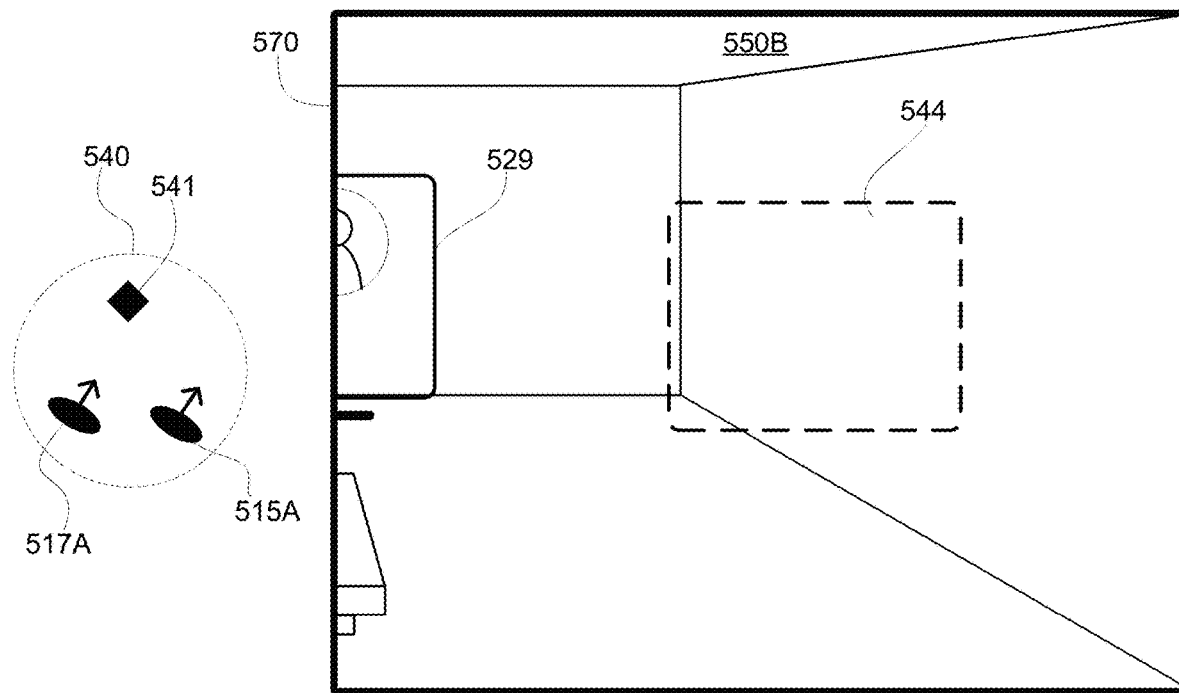
FIG. 5L

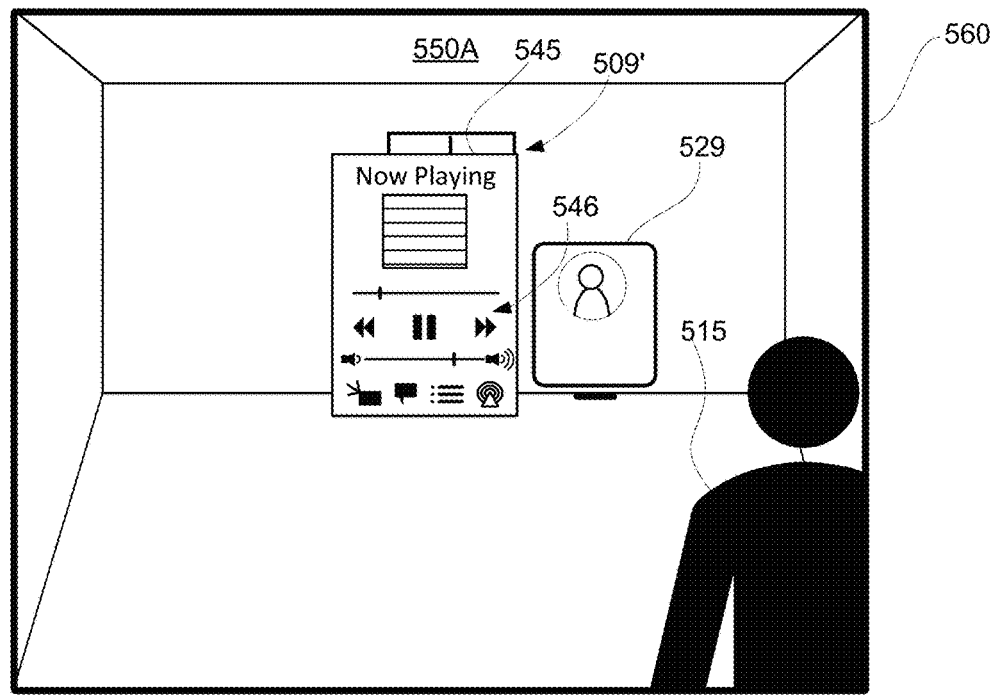
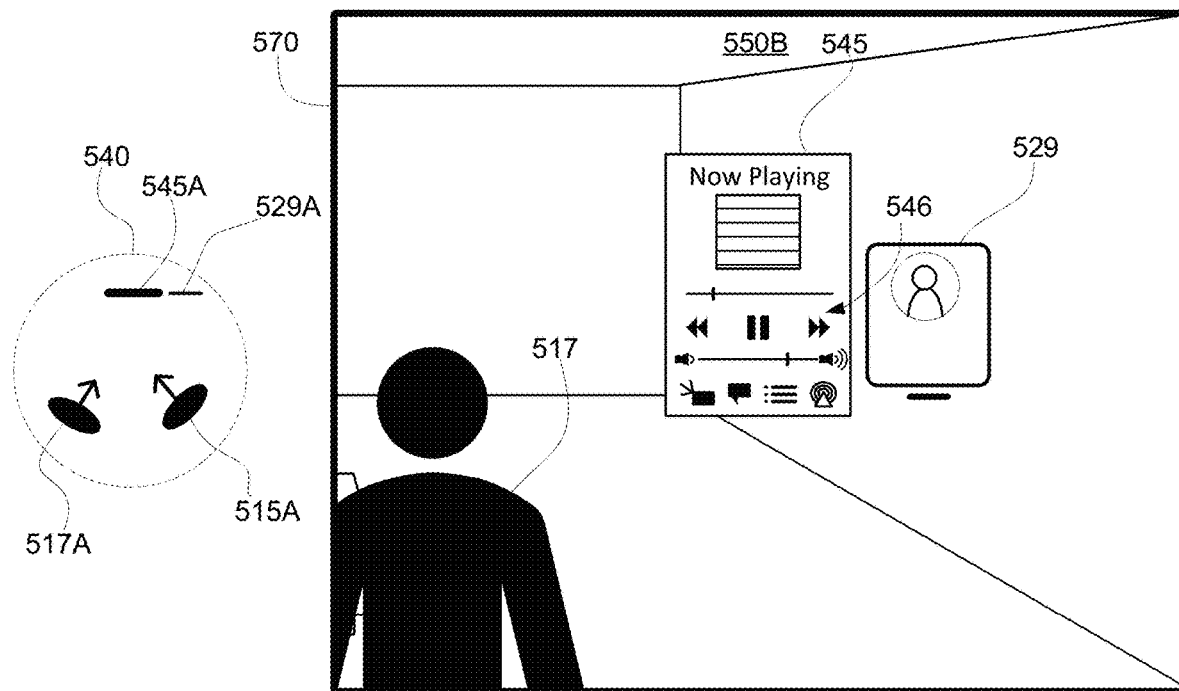
FIG. 5M

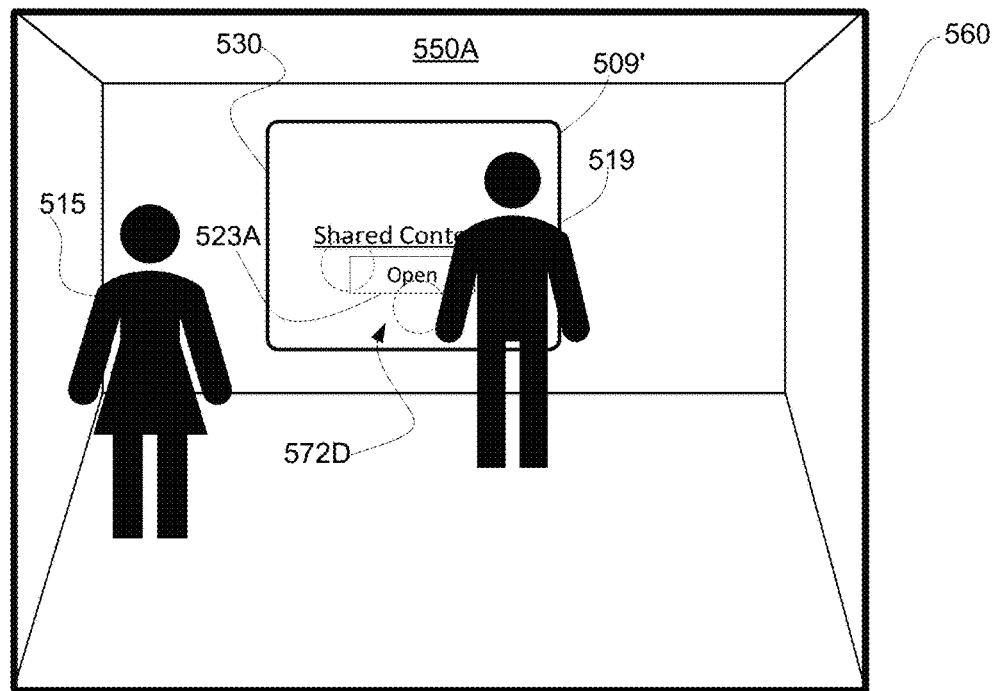
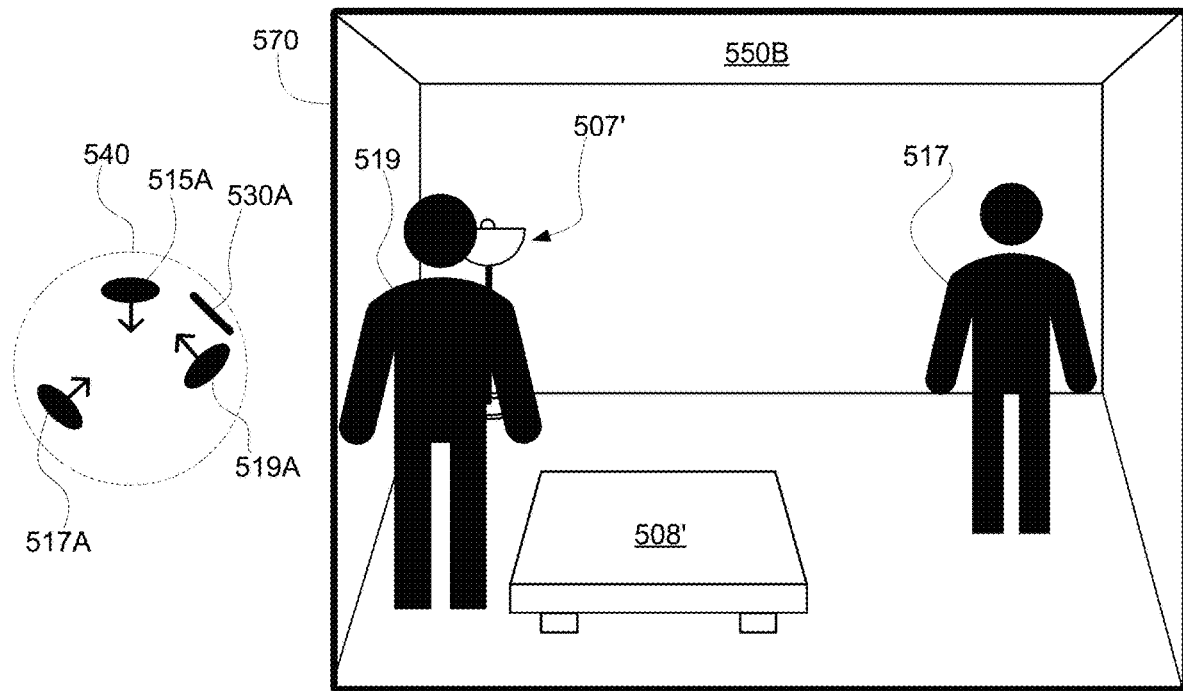
FIG. 5N

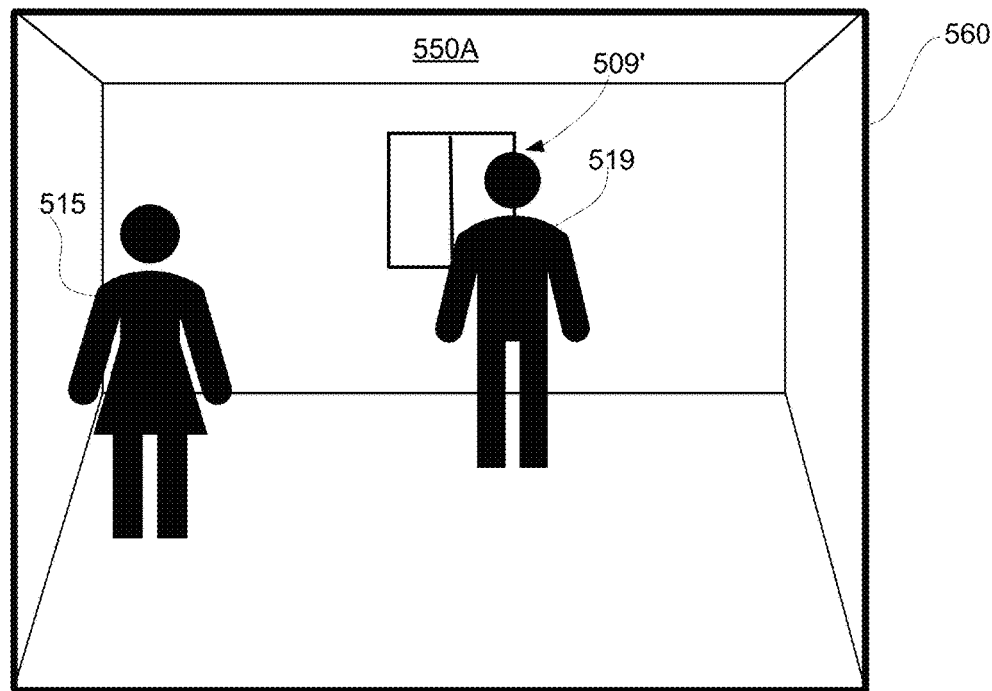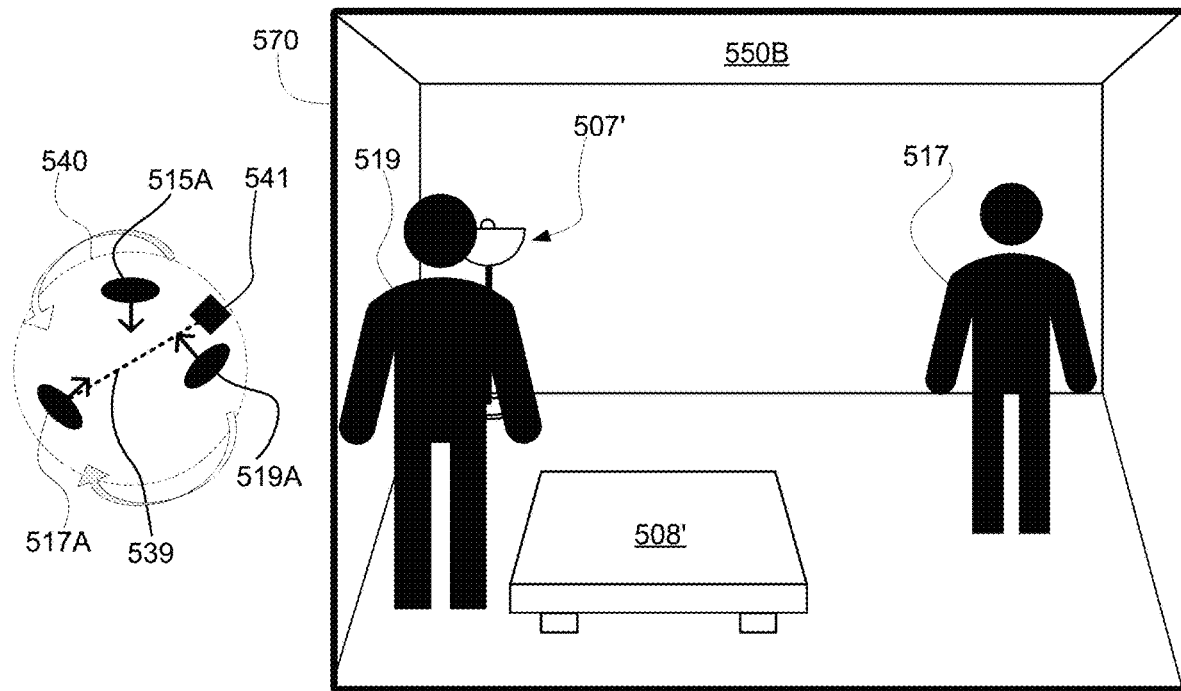
FIG. 5O

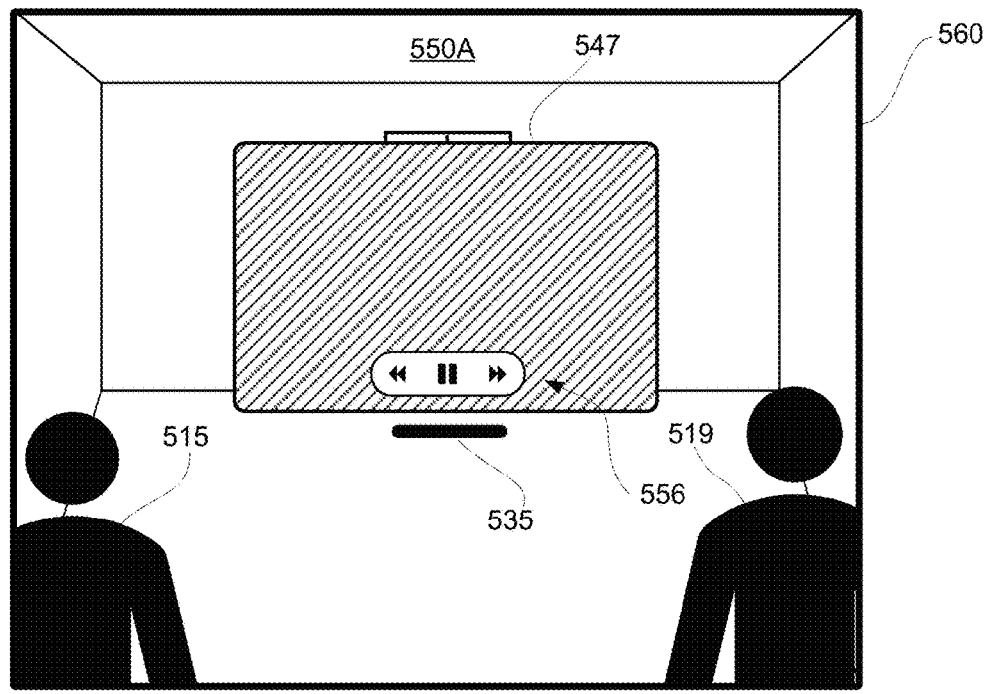
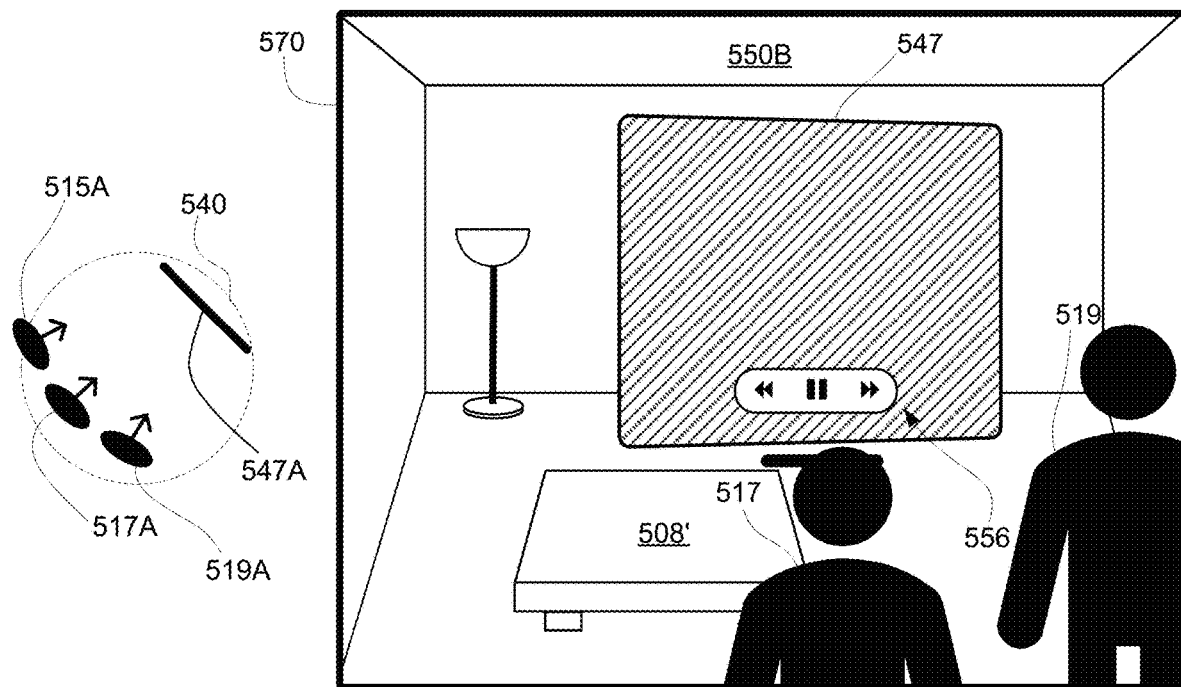
FIG. 5P

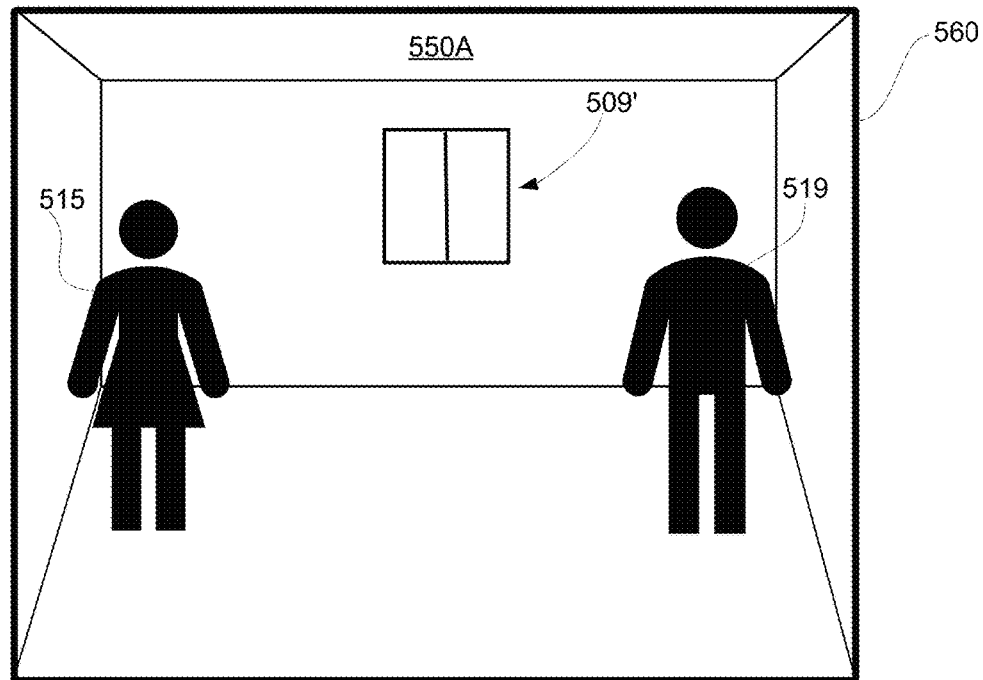
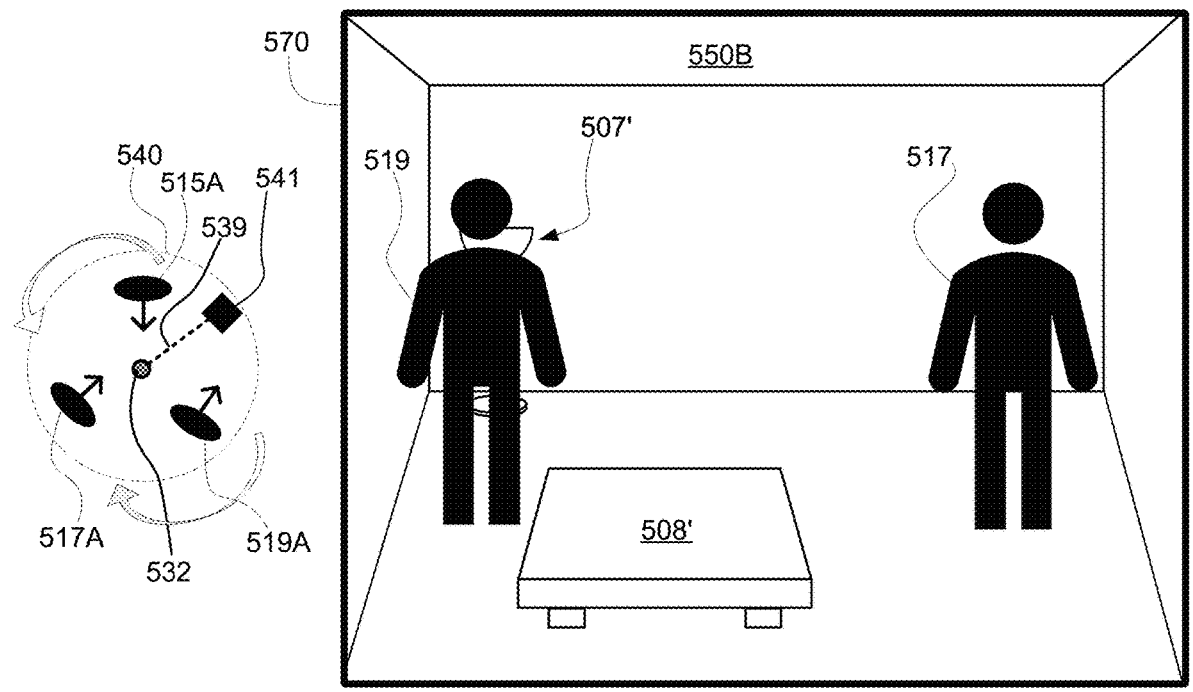
FIG. 5R

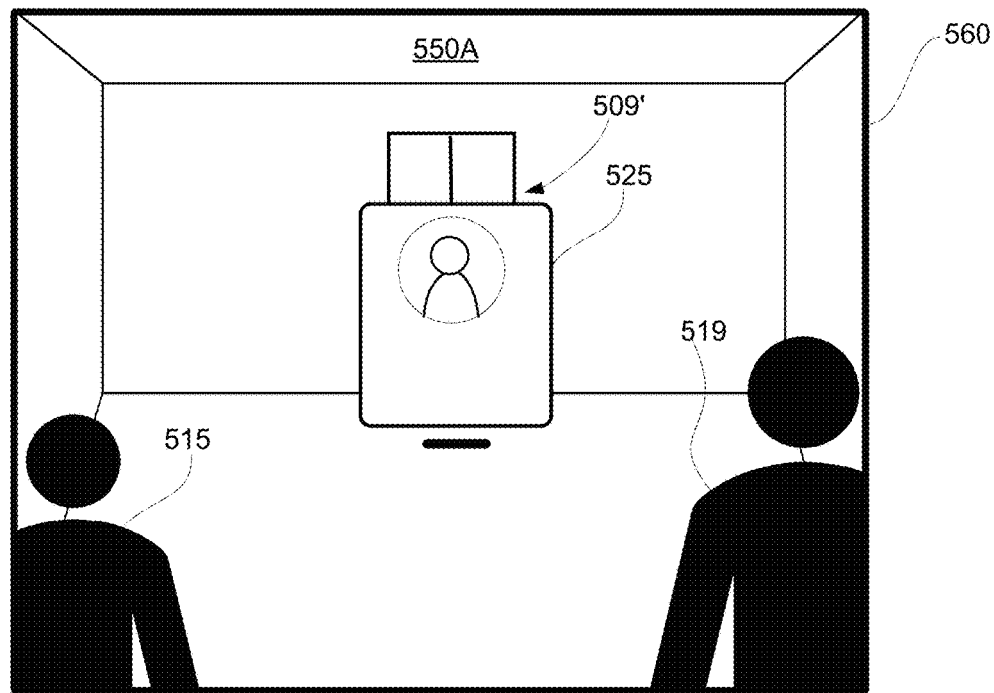
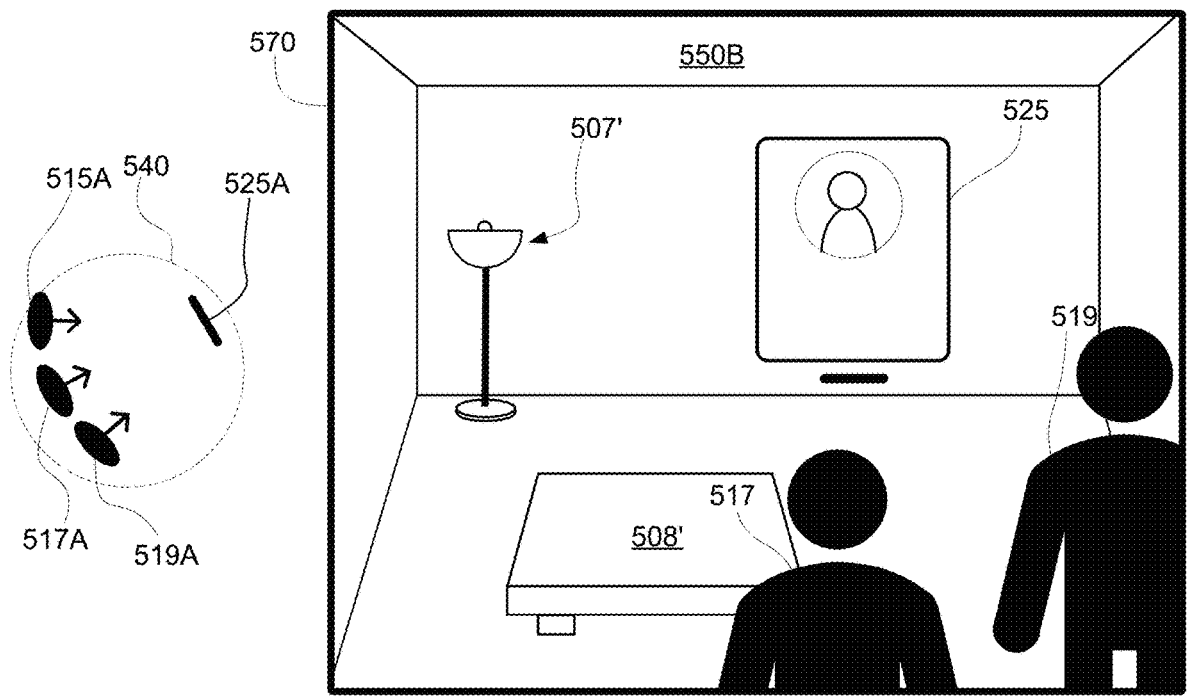
FIG. 5S

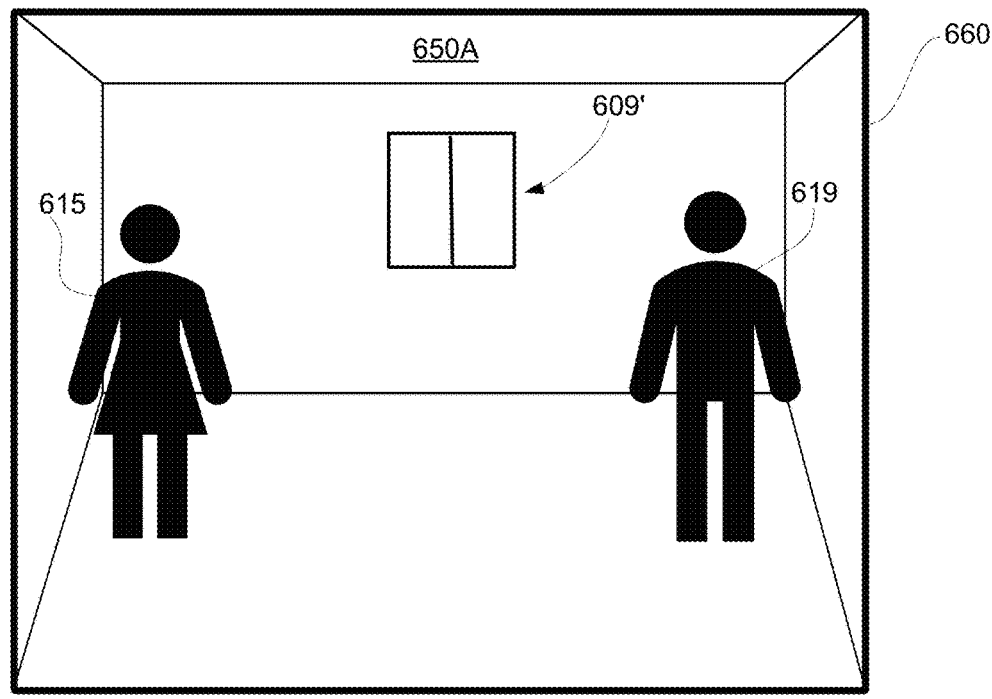
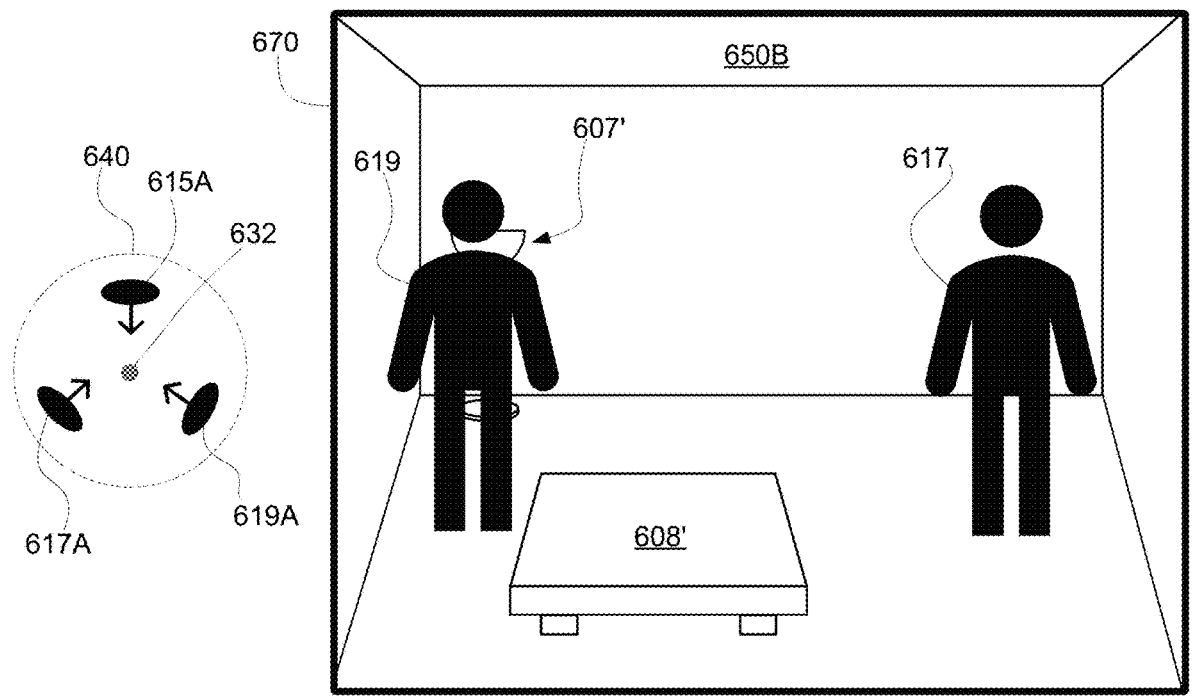
FIG. 6A

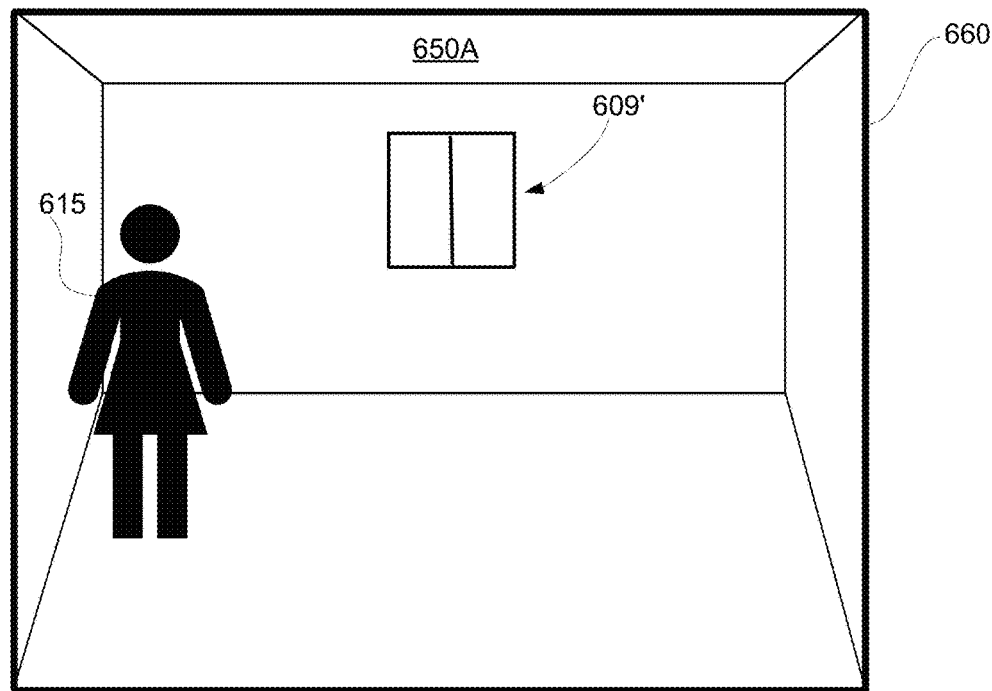
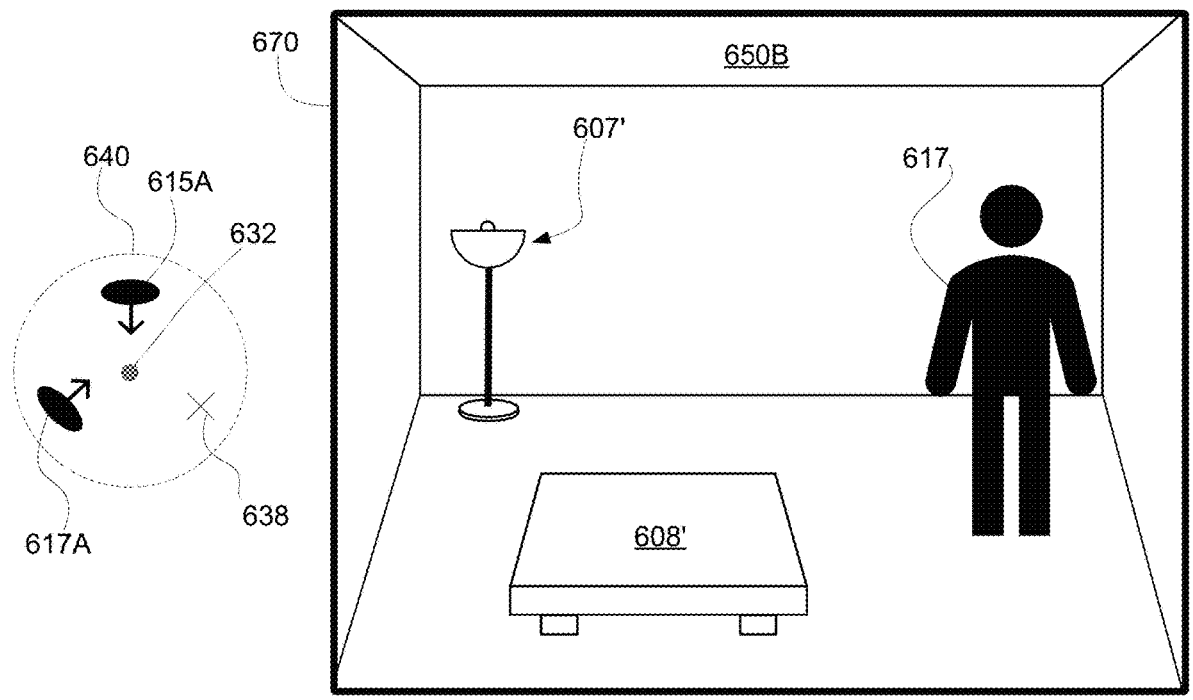
FIG. 6B

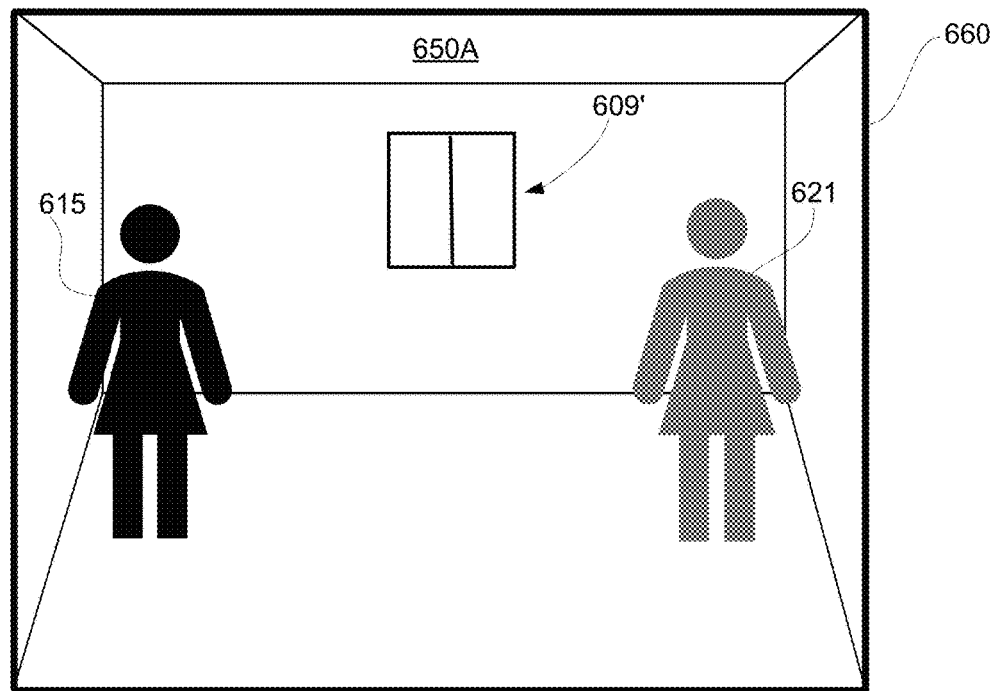
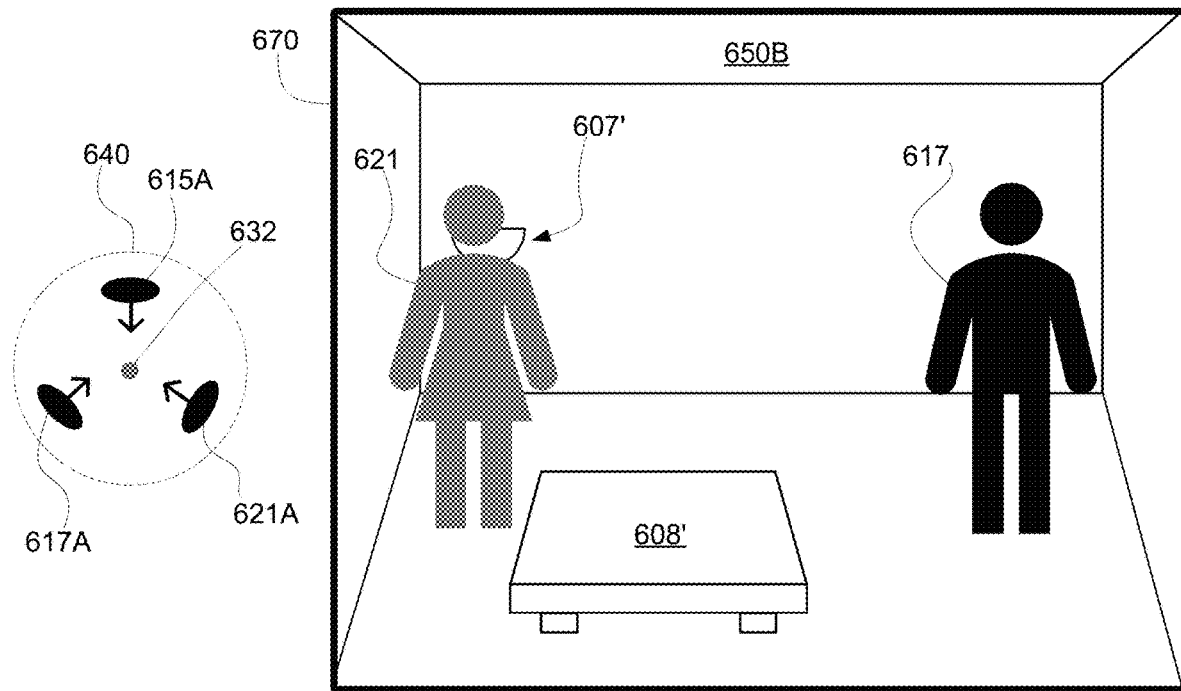
FIG. 6C

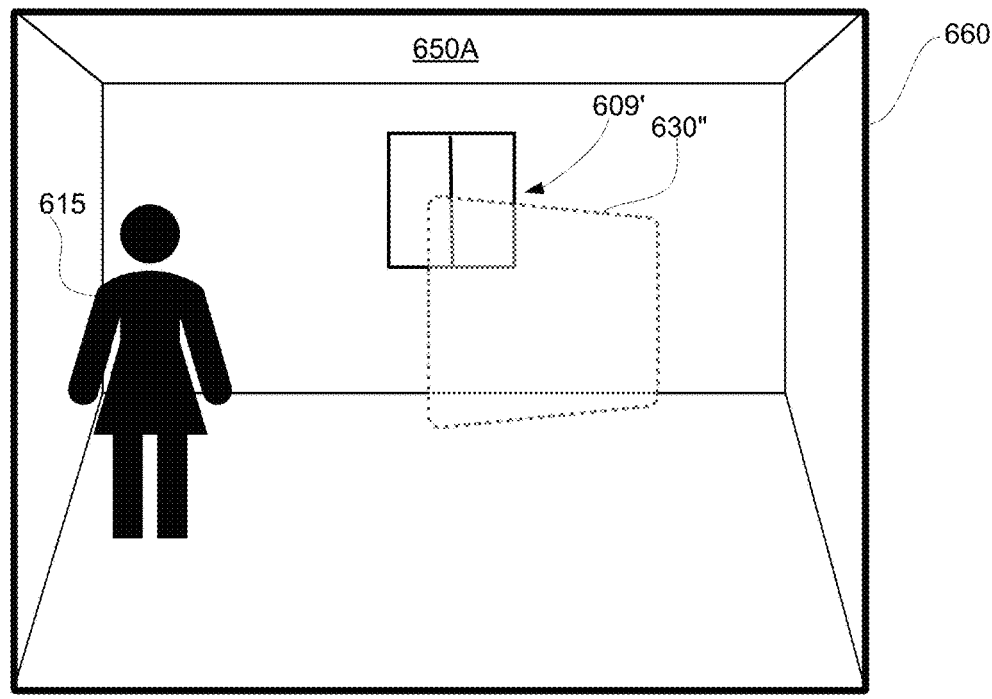
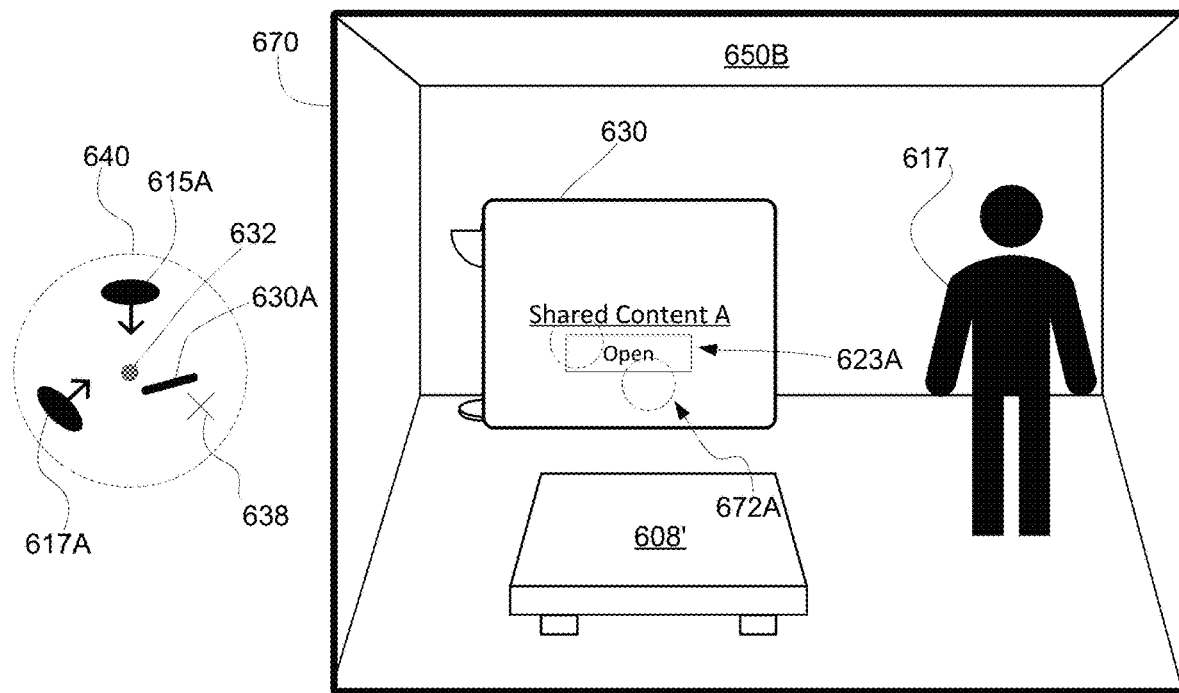
FIG. 6D

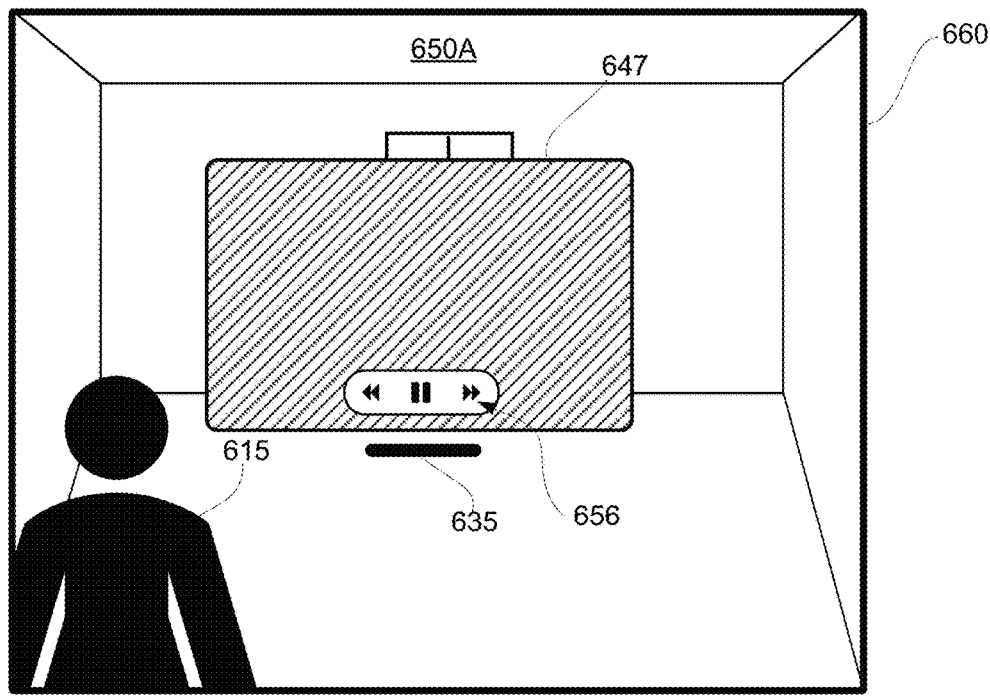
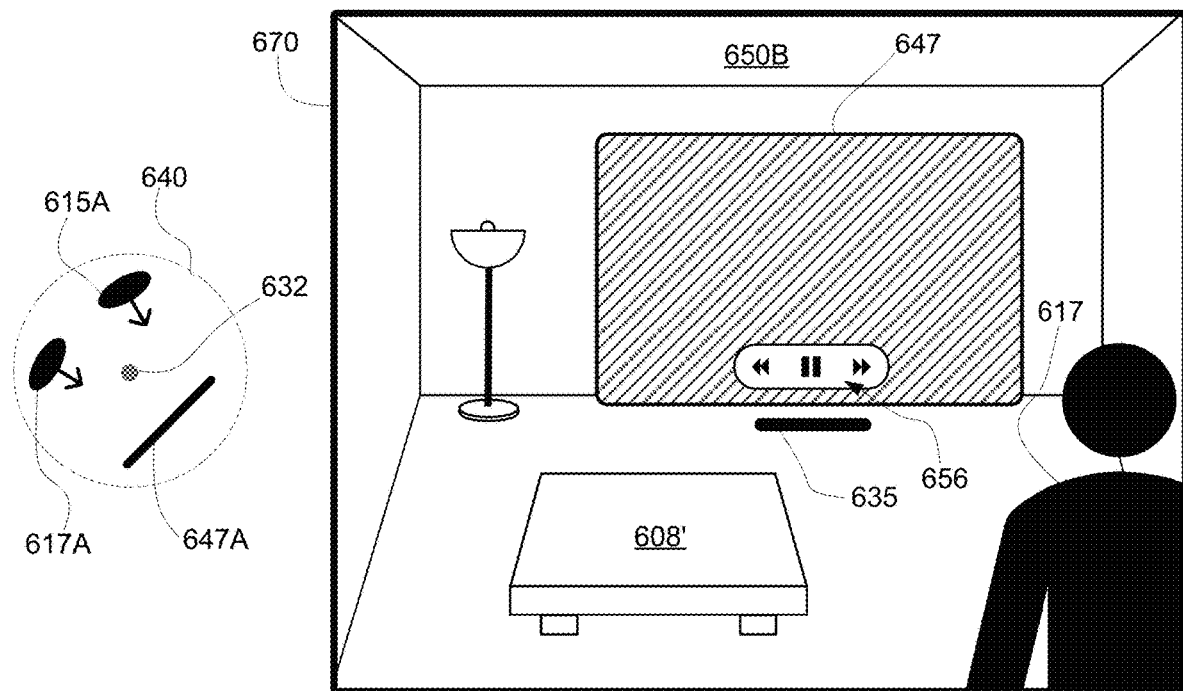
FIG. 6E

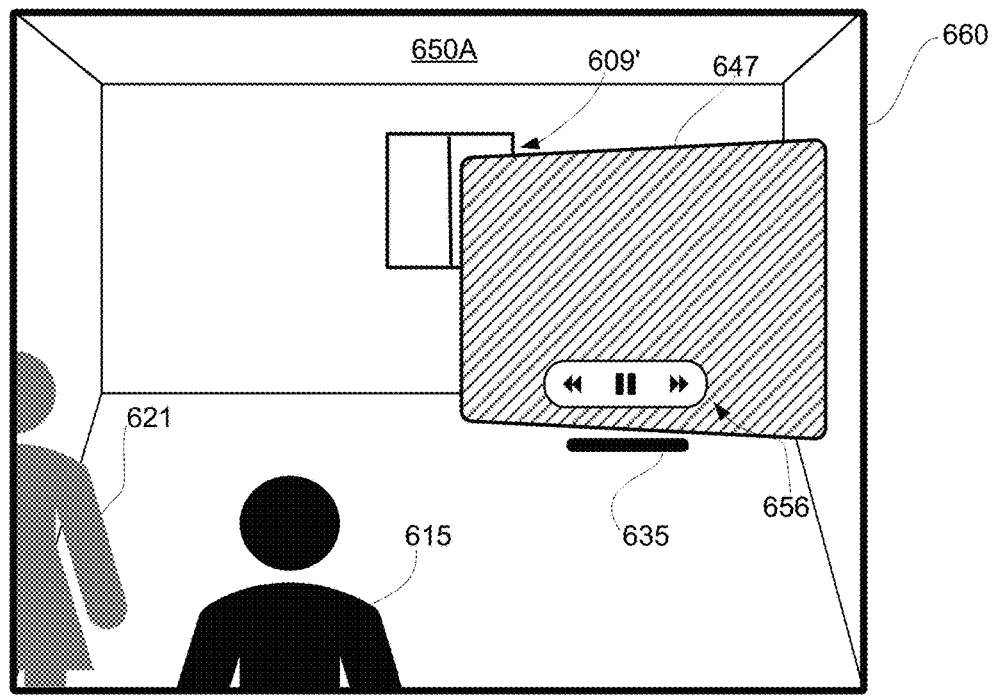
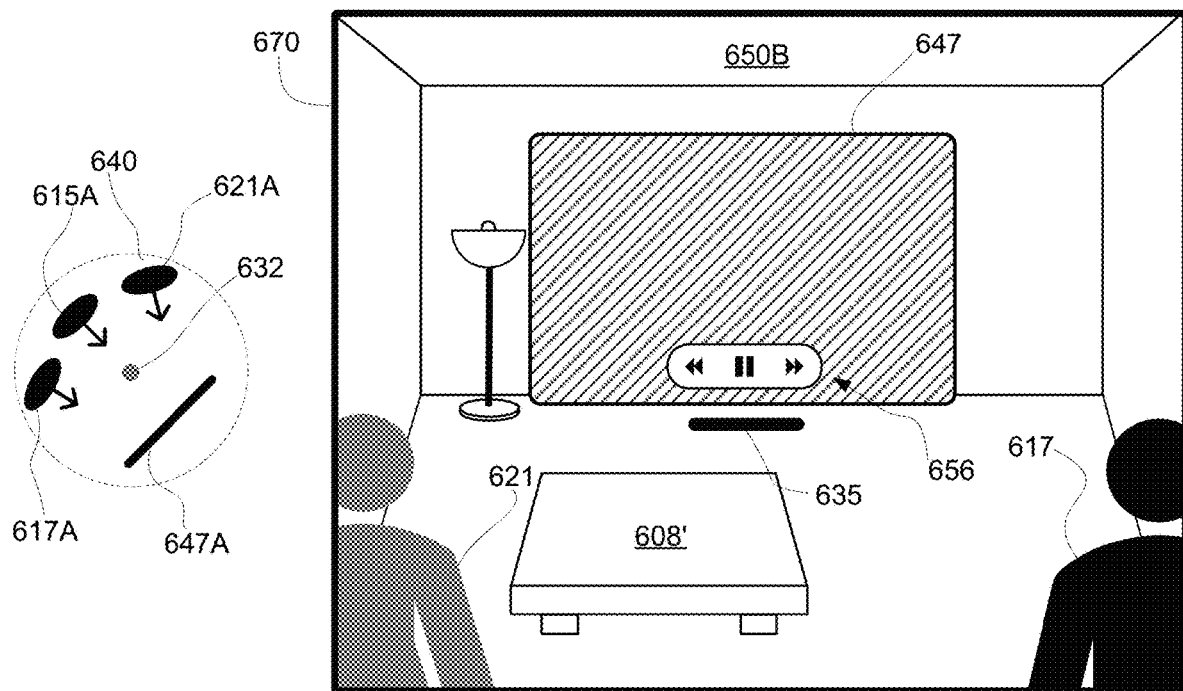
FIG. 6F

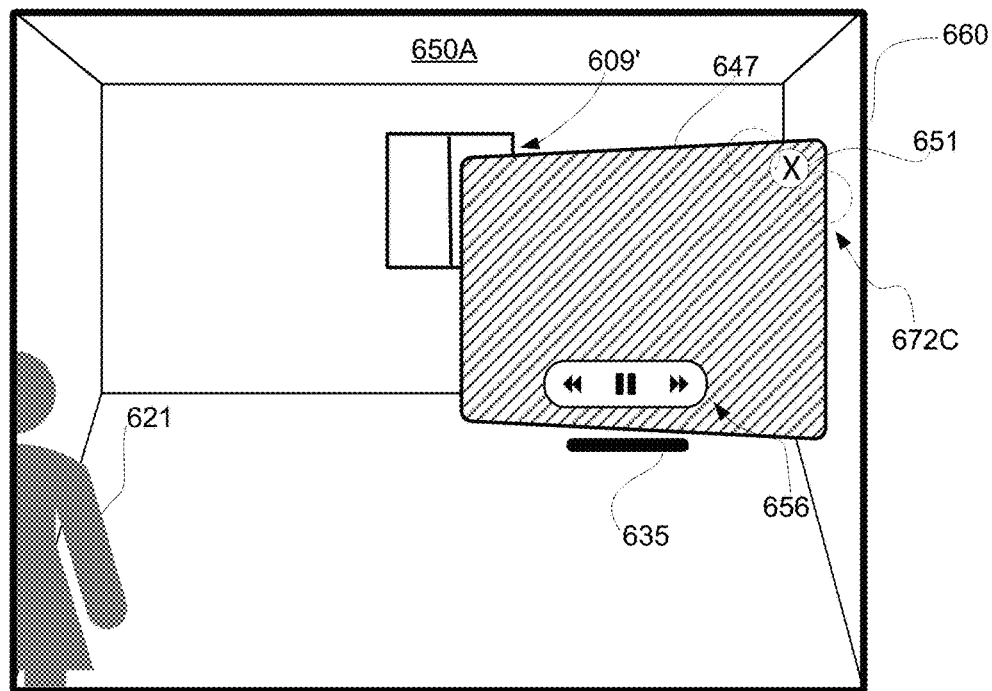
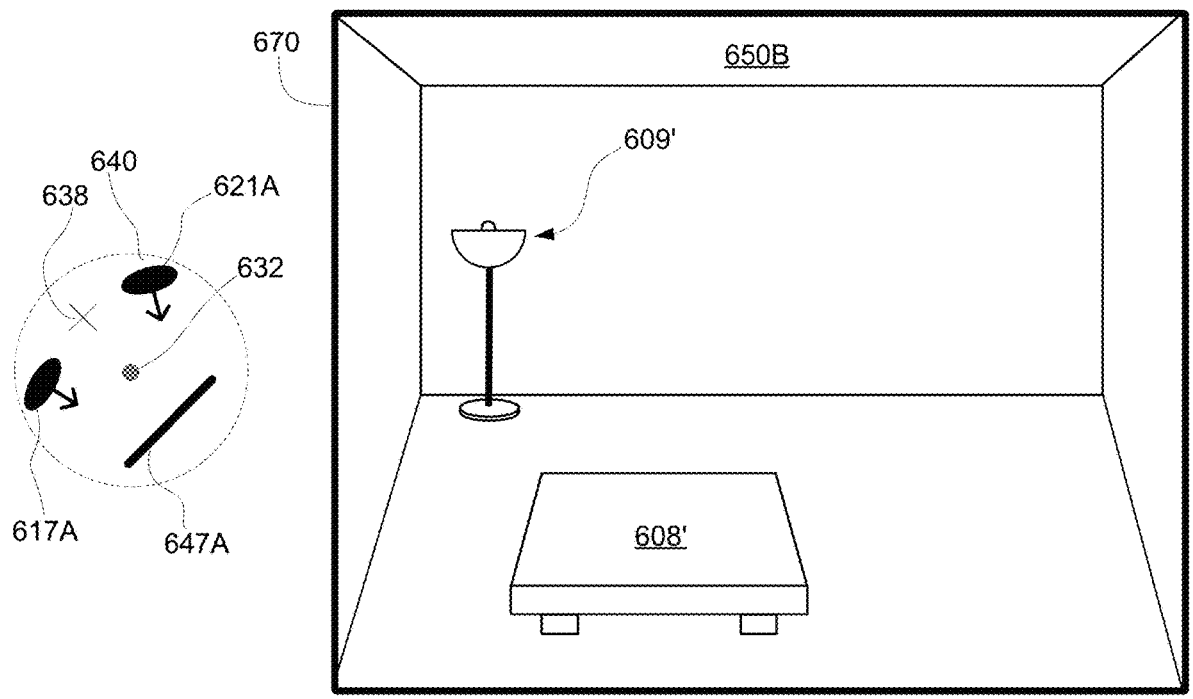
FIG. 6H

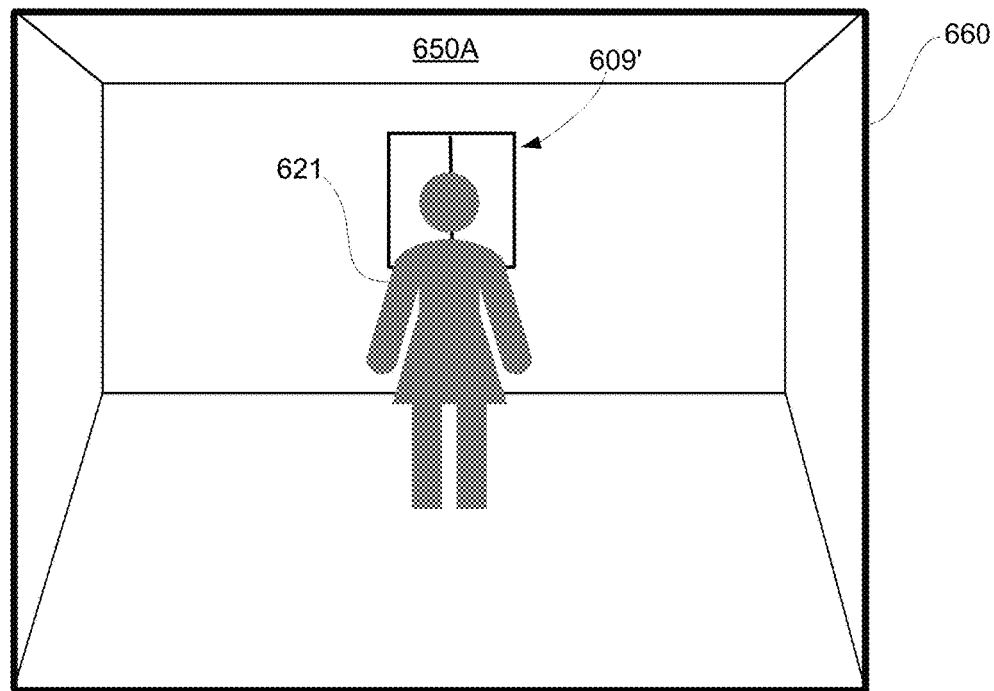
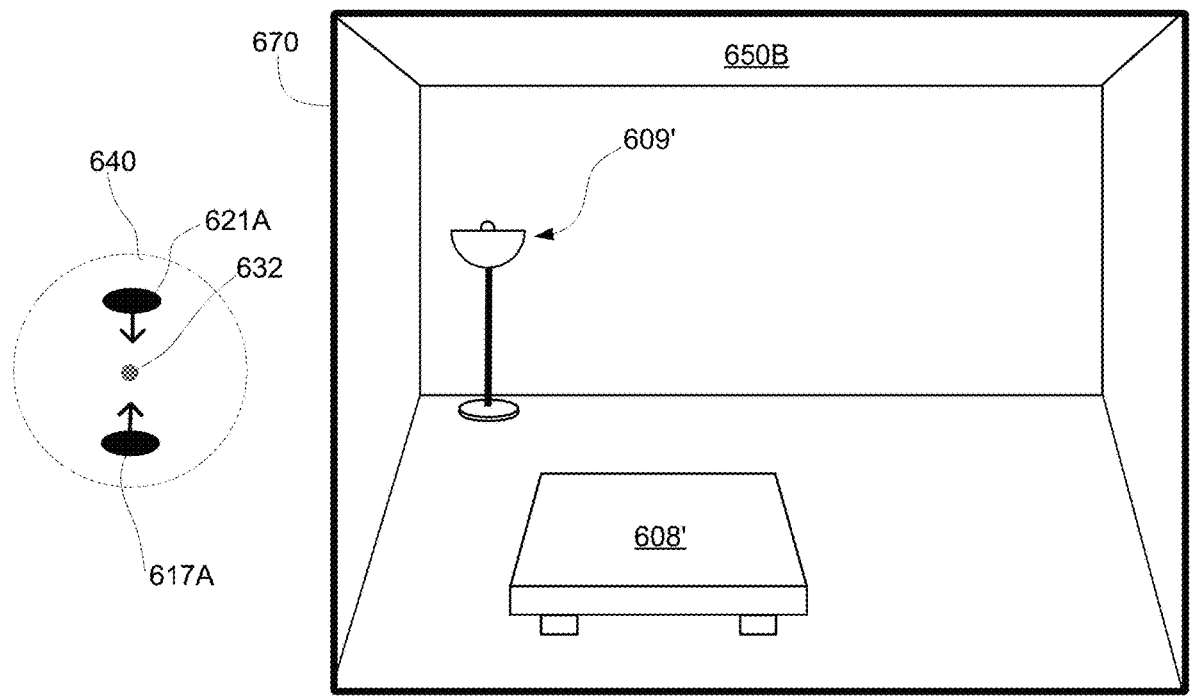
FIG. 6I

700

702 — While in a communication session with a second electronic device and a third electronic device, display, via a display, a computer-generated environment including a three-dimensional representation corresponding to a user of the second electronic device and a three-dimensional representation corresponding to a user of the third electronic device, wherein the three-dimensional representation corresponding to the user of the second electronic device and the three-dimensional representation corresponding to the user of the third electronic device are separated by a first distance

704 — While displaying the computer-generated environment including the three-dimensional representation corresponding to the user of the second electronic device and the three-dimensional representation corresponding to the user of the third electronic device, receive, via one or more input devices, a first input corresponding to a request to display shared content in the computer-generated environment

706 — In response to receiving the first input:

708 — In accordance with a determination that the shared content is a first type of content:

710 — Display, via the display, a first object corresponding to the shared content in the computer-generated environment

712 — Update display of the three-dimensional representation corresponding to the user of the second electronic device and the three-dimensional representation corresponding to the user of the third electronic device, such that the three-dimensional representation corresponding to the user of the second electronic device and the three-dimensional representation corresponding to the user of the third electronic device are separated by a second distance, different from the first distance (A)

802 — While in a communication session with a second electronic device and a third electronic device, display, via a display, a computer-generated environment including a three-dimensional representation corresponding to a user of the second electronic device at a first location and a three-dimensional representation corresponding to a user of the third electronic device at a second location, different from the first location, in the computer-generated environment relative to a viewpoint of a first electronic device

804 — While displaying the computer-generated environment including the three-dimensional representation corresponding to the user of the second electronic device and the three-dimensional representation corresponding to the user of the third electronic device, receive, via one or more input devices, a first input corresponding to a request to display content in the computer-generated environment

806 — In response to receiving the first input, in accordance with a determination that the content corresponds to shared content:

808 — Display, via the display, a first object corresponding to the shared content in the computer-generated environment

810 — Display the three-dimensional representation corresponding to the user of the second electronic device at a first updated location and the three-dimensional representation corresponding to the user of the third electronic device at a second updated location, different from the first updated location, in the computer-generated environment relative to the viewpoint, including:

812 — Moving the three-dimensional representation of the user of the second electronic device to the first updated location and moving the three-dimensional representation of the user of the third electronic device to the second updated location in a respective direction that is selected based on a location of the first object

FIG. 8

SYSTEMS AND METHODS OF MANAGING SPATIAL GROUPS IN MULTI-USER COMMUNICATION SESSIONS

CROSS-REFERENCE TO RELATED APPLICATIONS

This application claims the benefit of U.S. Provisional Application No. 63/506,116, filed Jun. 4, 2023, U.S. Provisional Application No. 63/514,327, filed Jul. 18, 2023, U.S. Provisional Application No. 63/578,616, filed Aug. 24, 2023, and U.S. Provisional Application No. 63/587,595, filed Oct. 3, 2023, the contents of which are herein incorporated by reference in their entireties for all purposes.

FIELD OF THE DISCLOSURE

This relates generally to systems and methods of managing spatial groups within multi-user communication sessions.

BACKGROUND OF THE DISCLOSURE

Some computer graphical environments provide two-dimensional and/or three-dimensional environments where at least some objects displayed for a user's viewing are virtual and generated by a computer. In some examples, the three-dimensional environments are presented by multiple devices communicating in a multi-user communication session. In some examples, an avatar (e.g., a representation) of each user participating in the multi-user communication session (e.g., via the computing devices) is displayed in the three-dimensional environment of the multi-user communication session. In some examples, content can be shared in the three-dimensional environment for viewing and interaction by multiple users participating in the multi-user communication session.

SUMMARY OF THE DISCLOSURE

Some examples of the disclosure are directed to systems and methods for managing locations of users in a spatial group within a multi-user communication session based on the display of shared content in a three-dimensional environment. In some examples, a first electronic device, a second electronic device, and a third electronic device are communicatively linked in a multi-user communication session. In some examples, the first electronic device displays a three-dimensional environment including an avatar corresponding to a user of the second electronic device and an avatar corresponding to a user of the third electronic device, wherein the avatar corresponding to the user of the second electronic device and the avatar corresponding to the user of the third electronic device are separated by a first distance. In some examples, in response to detecting an input corresponding to a request to display shared content in the three-dimensional environment, in accordance with a determination that the shared content is a first type of content, the first electronic device displays a first object corresponding to the shared content in the three-dimensional environment. In some examples, the first electronic device updates the avatar corresponding to the user of the second electronic device and the avatar corresponding to the user of the third electronic device, such that the avatar corresponding to the user of the second electronic device and the avatar corresponding to the user of the third electronic device are separated by a second distance different from the first distance. In some examples, in accordance with a determination that the shared content is a second type of content, different from the first type, the first electronic device displays a second object corresponding to the shared content in the three-dimensional environment. In some examples, the first electronic device maintains display of the avatar corresponding to the user of the second electronic device and the avatar corresponding to the user of the third electronic device to be separated by the first distance.

In some examples, a first electronic device, a second electronic device, and a third electronic device are communicatively linked in a multi-user communication session. In some examples, the first electronic device displays a three-dimensional environment including an avatar corresponding to a user of the second electronic device and an avatar corresponding to a user of the third electronic device, wherein the avatar corresponding to the user of the second electronic device is displayed at a first location and the avatar corresponding to the user of the third electronic device is displayed at a second location relative to a viewpoint of the first electronic device. In some examples, in response to detecting an input corresponding to a request to display content in the three-dimensional environment, in accordance with a determination that the content corresponds to shared content, the first electronic device displays a first object corresponding to the shared content in the three-dimensional environment. In some examples, the first electronic device moves the avatar corresponding to the user of the second electronic device to a first updated location and moves the avatar corresponding to the user of the third electronic device to a second updated location, different from the first updated location, relative to the viewpoint of the first electronic device. In some examples, the first electronic device moves the avatars in a respective direction that is based on a location of the first object in the three-dimensional environment.

The full descriptions of these examples are provided in the Drawings and the Detailed Description, and it is understood that this Summary does not limit the scope of the disclosure in any way.

BRIEF DESCRIPTION OF THE DRAWINGS

For improved understanding of the various examples described herein, reference should be made to the Detailed Description below along with the following drawings. Like reference numerals often refer to corresponding parts throughout the drawings.

FIG. 3 illustrates an example of a spatial group of a user of a first electronic device and a user of a second electronic device in a multi-user communication session according to some examples of the disclosure.

FIGS. 4A-4N illustrate example interactions among users in a multi-user communication session according to some examples of the disclosure.

FIGS. 6A-6I illustrate example interactions among users in a multi-user communication session according to some examples of the disclosure.

FIGS. 7A-7B illustrate a flow diagram illustrating an example process for updating a spatial group of users in a multi-user communication session based on content that is displayed in a three-dimensional environment according to some examples of the disclosure.

FIG. 8 illustrates a flow diagram illustrating an example process for moving three-dimensional representations of users within a multi-user communication session when sharing content in a three-dimensional environment according to some examples of the disclosure.

DETAILED DESCRIPTION

Figure 1:
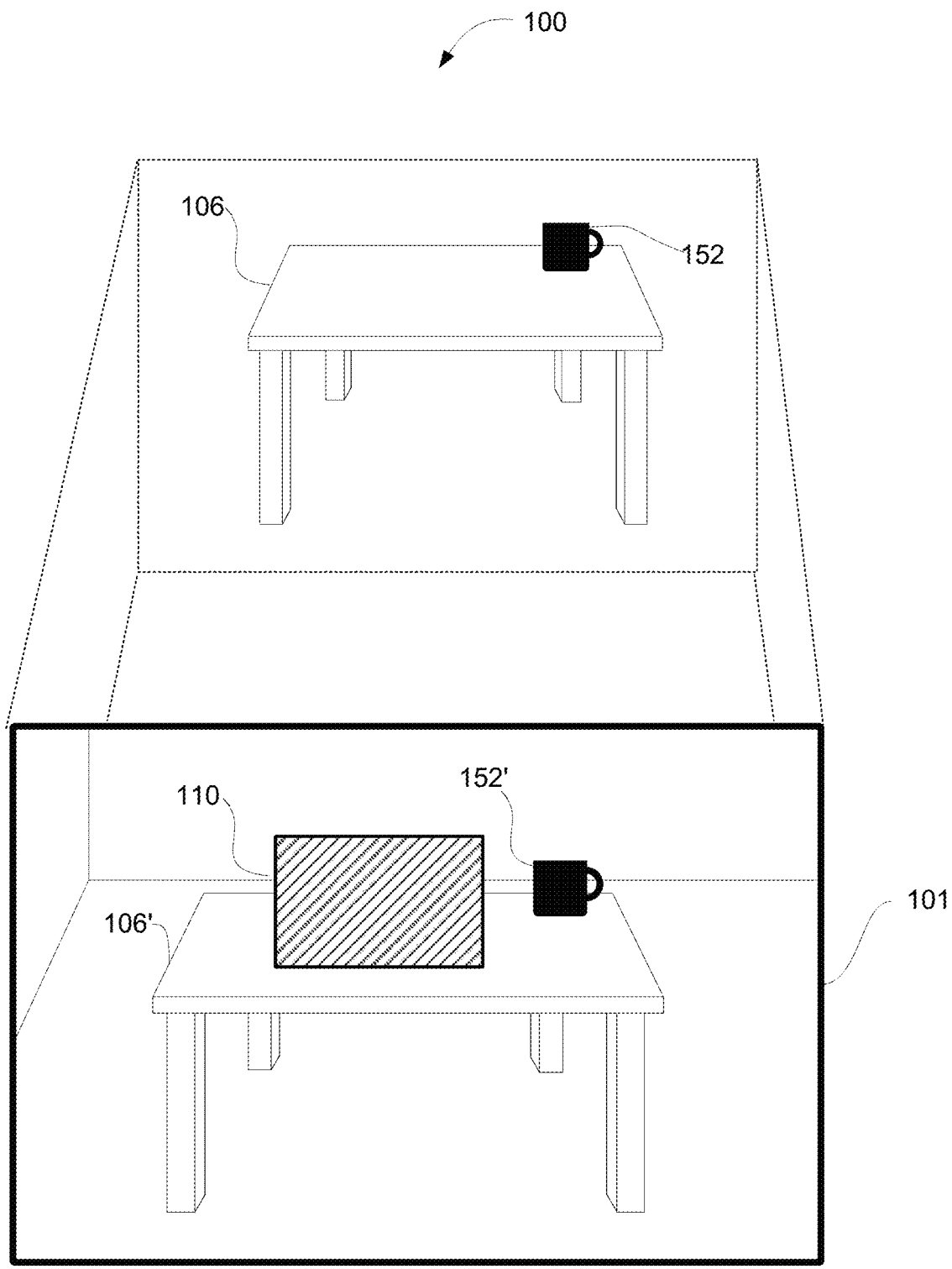
FIG. 1 illustrates an electronic device presenting an extended reality environment according to some examples of the disclosure.

Some examples of the disclosure are directed to systems and methods for managing locations of users in a spatial group within a multi-user communication session based on the display of shared content in a three-dimensional environment. In some examples, a first electronic device, a second electronic device, and a third electronic device are communicatively linked in a multi-user communication session. In some examples, the first electronic device displays a three-dimensional environment including an avatar corresponding to a user of the second electronic device and an avatar corresponding to a user of the third electronic device, wherein the avatar corresponding to the user of the second electronic device and the avatar corresponding to the user of the third electronic device are separated by a first distance. In some examples, in response to detecting an input corresponding to a request to display shared content in the three-dimensional environment, in accordance with a determination that the shared content is a first type of content, the first electronic device displays a first object corresponding to the shared content in the three-dimensional environment. In some examples, the first electronic device updates the avatar corresponding to the user of the second electronic device and the avatar corresponding to the user of the third electronic device, such that the avatar corresponding to the user of the second electronic device and the avatar corresponding to the user of the third electronic device are separated by a second distance different from the first distance. In some examples, in accordance with a determination that the shared content is a second type of content, different from the first type, the first electronic device displays a second object corresponding to the shared content in the three-dimensional environment. In some examples, the first electronic device maintains display of the avatar corresponding to the user of the second electronic device and the avatar corresponding to the user of the third electronic device to be separated by the first distance.

In some examples, a first electronic device, a second electronic device, and a third electronic device are communicatively linked in a multi-user communication session. In some examples, the first electronic device displays a three-dimensional environment including an avatar corresponding to a user of the second electronic device and an avatar corresponding to a user of the third electronic device, wherein the avatar corresponding to the user of the second electronic device is displayed at a first location and the avatar corresponding to the user of the third electronic device is displayed at a second location relative to a viewpoint of the first electronic device. In some examples, in response to detecting an input corresponding to a request to display content in the three-dimensional environment, in accordance with a determination that the content corresponds to shared content, the first electronic device displays a first object corresponding to the shared content in the three-dimensional environment. In some examples, the first electronic device moves the avatar corresponding to the user of the second electronic device to a first updated location and moves the avatar corresponding to the user of the third electronic device to a second updated location, different from the first updated location, relative to the viewpoint. In some examples, the first electronic device moves the avatars in a respective direction that is based on a location of the first object in the three-dimensional environment.

In some examples, a plurality of users in a multi-user communication session has or is associated with a spatial group that dictates locations of one or more users and/or content in a shared three-dimensional environment. In some examples, users that share the same spatial group within the multi-user communication session experience spatial truth (e.g., defined later herein) according to a spatial arrangement of the users (e.g., distances between adjacent users) in the spatial group. In some examples, when a user of a first electronic device shares a spatial arrangement with a user of a second electronic device, the users experience spatial truth relative to three-dimensional representations (e.g., avatars) corresponding to the users in their respective three-dimensional environments.

In some examples, displaying (e.g., sharing) content in the three-dimensional environment while in the multi-user communication session may include interaction with one or more user interface elements. In some examples, a user's gaze may be tracked by the electronic device as an input for targeting a selectable option/affordance within a respective user interface element that is displayed in the three-dimensional environment. For example, gaze can be used to identify one or more options/affordances targeted for selection using another selection input. In some examples, a respective option/affordance may be selected using hand-tracking input detected via an input device in communication with the electronic device. In some examples, objects displayed in the three-dimensional environment may be moved and/or reoriented in the three-dimensional environment in accordance with movement input detected via the input device.

FIG. 1 illustrates an electronic device 101 presenting an extended reality (XR) environment (e.g., a computer-generated environment) according to some examples of the disclosure. In some examples, electronic device 101 is a hand-held or mobile device, such as a tablet computer, laptop computer, smartphone, or head-mounted display. Examples of electronic device 101 are described below with reference to the architecture block diagram of FIG. 2. As shown in FIG. 1, electronic device 101, table 106, and coffee mug 152 are located in the physical environment 100. The physical environment may include physical features such as a physical surface (e.g., floor, walls) or a physical object (e.g., table, lamp, etc.). In some examples, electronic device 101 may be configured to capture images of physical environment 100 including table 106 and coffee mug 152 (illustrated in the field of view of electronic device 101). In some examples, in response to a trigger, the electronic device 101 may be configured to display a virtual object 110 (e.g., two-dimensional virtual content) in the computer-generated environment (e.g., represented by a rectangle illustrated in FIG. 1) that is not present in the physical environment 100, but is displayed in the computer-generated environment positioned on (e.g., anchored to) the top of a computer-generated representation 106' of real-world table 106. For example, virtual object 110 can be displayed on the surface of the computer-generated representation 106' of the table in the computer-generated environment next to the computer-generated representation 152' of real-world coffee mug 152 displayed via electronic device 101 in response to detecting the planar surface of table 106 in the physical environment 100.

It should be understood that virtual object 110 is a representative virtual object and one or more different virtual objects (e.g., of various dimensionality such as two-dimensional or three-dimensional virtual objects) can be included and rendered in a three-dimensional computer-generated environment. For example, the virtual object can represent an application, or a user interface displayed in the computer-generated environment. In some examples, the virtual object can represent content corresponding to the application and/or displayed via the user interface in the computer-generated environment. In some examples, the virtual object 110 is optionally configured to be interactive and responsive to user input, such that a user may virtually touch, tap, move, rotate, or otherwise interact with, the virtual object. In some examples, the virtual object 110 may be displayed in a three-dimensional computer-generated environment within a multi-user communication session ("multi-user communication session," "communication session"). In some such examples, as described in more detail below, the virtual object 110 may be viewable and/or configured to be interactive and responsive to multiple users and/or user input provided by multiple users, respectively. Additionally, it should be understood, that the 3D environment (or 3D virtual object) described herein may be a representation of a 3D environment (or three-dimensional virtual object) projected or presented at an electronic device.

In the discussion that follows, an electronic device that is in communication with a display generation component and one or more input devices is described. It should be understood that the electronic device optionally is in communication with one or more other physical user-interface devices, such as a touch-sensitive surface, a physical keyboard, a mouse, a joystick, a hand tracking device, an eye tracking device, a stylus, etc. Further, as described above, it should be understood that the described electronic device, display, and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device, or touch input received on the surface of a stylus) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

Figure 2:
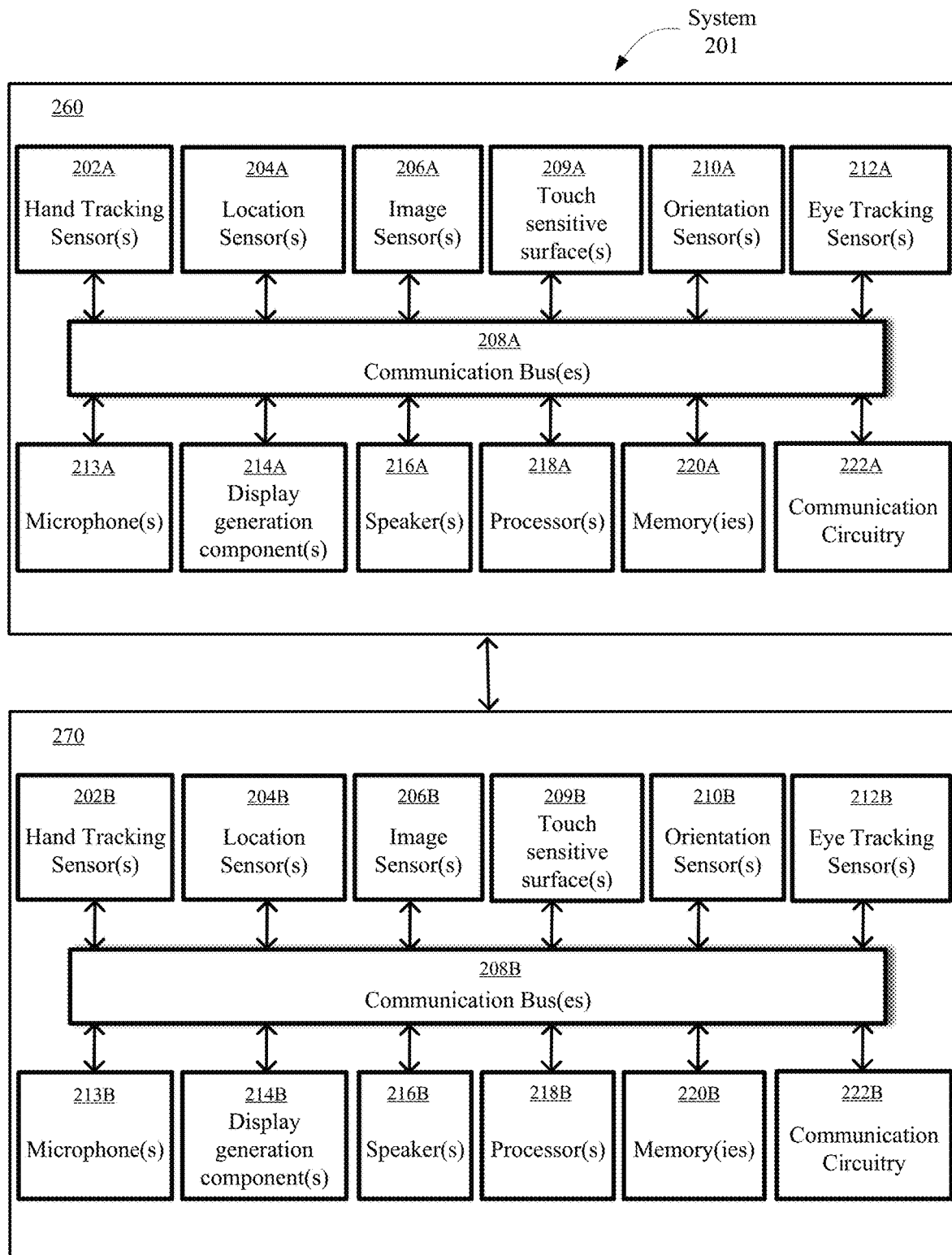
FIG. 2 illustrates a block diagram of an exemplary architecture for a system according to some examples of the disclosure.

FIG. 2 illustrates a block diagram of an exemplary architecture for a system 201 according to some examples of the disclosure. In some examples, system 201 includes multiple devices. For example, the system 201 includes a first electronic device 260 and a second electronic device 270, wherein the first electronic device 260 and the second electronic device 270 are in communication with each other. In some examples, the first electronic device 260 and the second electronic device 270 are a portable device, such as a mobile phone, smart phone, a tablet computer, a laptop computer, an auxiliary device in communication with another device, etc., respectively.

As illustrated in FIG. 2, the first electronic device 260 optionally includes various sensors (e.g., one or more hand tracking sensor(s) 202A, one or more location sensor(s) 204A, one or more image sensor(s) 206A, one or more touch-sensitive surface(s) 209A, one or more motion and/or orientation sensor(s) 210A, one or more eye tracking sensor(s) 212A, one or more microphone(s) 213A or other audio sensors, etc.), one or more display generation component(s) 214A, one or more speaker(s) 216A, one or more processor(s) 218A, one or more memories 220A, and/or communication circuitry 222A. In some examples, the second electronic device 270 optionally includes various sensors (e.g., one or more hand tracking sensor(s) 202B, one or more location sensor(s) 204B, one or more image sensor(s) 206B, one or more touch-sensitive surface(s) 209B, one or more motion and/or orientation sensor(s) 210B, one or more eye tracking sensor(s) 212B, one or more microphone(s) 213B or other audio sensors, etc.), one or more display generation component(s) 214B, one or more speaker(s) 216, one or more processor(s) 218B, one or more memories 220B, and/or communication circuitry 222B. One or more communication buses 208A and 208B are optionally used for communication between the above-mentioned components of electronic devices 260 and 270, respectively. First electronic device 260 and second electronic device 270 optionally communicate via a wired or wireless connection (e.g., via communication circuitry 222A-222B) between the two devices.

Communication circuitry 222A, 222B optionally includes circuitry for communicating with electronic devices, networks, such as the Internet, intranets, a wired network and/or a wireless network, cellular networks, and wireless local area networks (LANs). Communication circuitry 222A, 222B optionally includes circuitry for communicating using near-field communication (NFC) and/or short-range communication, such as Bluetooth®.

Processor(s) 218A, 218B include one or more general processors, one or more graphics processors, and/or one or more digital signal processors. In some examples, memory 220A, 220B is a non-transitory computer-readable storage medium (e.g., flash memory, random access memory, or other volatile or non-volatile memory or storage) that stores computer-readable instructions configured to be executed by processor(s) 218A, 218B to perform the techniques, processes, and/or methods described below. In some examples, memory 220A, 220B can include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

In some examples, display generation component(s) 214A, 214B include a single display (e.g., a liquid-crystal display (LCD), organic light-emitting diode (OLED), or other types of display). In some examples, display generation component(s) 214A, 214B includes multiple displays, such as a stereo pair of displays. In some examples, display generation component(s) 214A, 214B can include a display with touch capability (e.g., a touch screen), a projector, a holographic projector, a retinal projector, a transparent or translucent display, etc. In some examples, electronic devices 260 and 270 include touch-sensitive surface(s) 209A and 209B, respectively, for receiving user inputs, such as tap inputs and swipe inputs or other gestures. In some examples, display generation component(s) 214A, 214B and touch-sensitive surface(s) 209A, 209B form touch-sensitive display(s) (e.g., a touch screen integrated with electronic devices 260 and 270, respectively, or external to electronic devices 260 and 270, respectively, that is in communication with electronic devices 260 and 270).

Electronic devices 260 and 270 optionally include image sensor(s) 206A and 206B, respectively. Image sensors(s) 206A/206B optionally include one or more visible light image sensors, such as charged coupled device (CCD) sensors, and/or complementary metal-oxide-semiconductor (CMOS) sensors operable to obtain images of physical objects from the real-world environment. Image sensor(s) 206A/206B also optionally include one or more infrared (IR) sensors, such as a passive or an active IR sensor, for detecting infrared light from the real-world environment. For example, an active IR sensor includes an IR emitter for emitting infrared light into the real-world environment. Image sensor(s) 206A/206B also optionally include one or more cameras configured to capture movement of physical objects in the real-world environment. Image sensor(s) 206A/206B also optionally include one or more depth sensors configured to detect the distance of physical objects from device 260/270. In some examples, information from one or more depth sensors can allow the device to identify and differentiate objects in the real-world environment from other objects in the real-world environment. In some examples, one or more depth sensors can allow the device to determine the texture and/or topography of objects in the real-world environment.

In some examples, electronic devices 260 and 270 use CCD sensors, event cameras, and depth sensors in combination to detect the physical environment around electronic devices 260 and 270. In some examples, image sensor(s) 206A/206B include a first image sensor and a second image sensor. The first image sensor and the second image sensor work in tandem and are optionally configured to capture different information of physical objects in the real-world environment. In some examples, the first image sensor is a visible light image sensor and the second image sensor is a depth sensor. In some examples, device 260/270 uses image sensor(s) 206A/206B to detect the position and orientation of device 260/270 and/or display generation component(s) 214A/214B in the real-world environment. For example, device 260/270 uses image sensor(s) 206A/206B to track the position and orientation of display generation component(s) 214A/214B relative to one or more fixed objects in the real-world environment.

In some examples, device 260/270 includes microphone(s) 213A/213B or other audio sensors. Device 260/270 uses microphone(s) 213A/213B to detect sound from the user and/or the real-world environment of the user. In some examples, microphone(s) 213A/213B includes an array of microphones (a plurality of microphones) that optionally operate in tandem, such as to identify ambient noise or to locate the source of sound in space of the real-world environment.

In some examples, device 260/270 includes location sensor(s) 204A/204B for detecting a location of device 260/270 and/or display generation component(s) 214A/214B. For example, location sensor(s) 204A/204B can include a global positions system (GPS) receiver that receives data from one or more satellites and allows device 260/270 to determine the device's absolute position in the physical world.

In some examples, device 260/270 includes orientation sensor(s) 210A/210B for detecting orientation and/or movement of device 260/270 and/or display generation component(s) 214A/214B. For example, device 260/270 uses orientation sensor(s) 210A/210B to track changes in the position and/or orientation of device 260/270 and/or display generation component(s) 214A/214B, such as with respect to physical objects in the real-world environment. Orientation sensor(s) 210A/210B optionally include one or more gyroscopes and/or one or more accelerometers.

Device 260/270 includes hand tracking sensor(s) 202A/202B and/or eye tracking sensor(s) 212A/212B, in some examples. Hand tracking sensor(s) 202A/202B are configured to track the position/location of one or more portions of the user's hands, and/or motions of one or more portions of the user's hands with respect to the extended reality environment, relative to the display generation component(s) 214A/214B, and/or relative to another defined coordinate system. Eye tracking sensor(s) 212A/212B are configured to track the position and movement of a user's gaze (eyes, face, or head, more generally) with respect to the real-world or extended reality environment and/or relative to the display generation component(s) 214A/214B. In some examples, hand tracking sensor(s) 202A/202B and/or eye tracking sensor(s) 212A/212B are implemented together with the display generation component(s) 214A/214B. In some examples, the hand tracking sensor(s) 202A/202B and/or eye tracking sensor(s) 212A/212B are implemented separate from the display generation component(s) 214A/214B.

In some examples, the hand tracking sensor(s) 202A/202B can use image sensor(s) 206A/206B (e.g., one or more IR cameras, 3D cameras, depth cameras, etc.) that capture three-dimensional information from the real-world including one or more hands (e.g., of a human user). In some examples, the hands can be resolved with sufficient resolution to distinguish fingers and their respective positions. In some examples, one or more image sensor(s) 206A/206B are positioned relative to the user to define a field of view of the image sensor(s) 206A/206B and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures, touch, tap, etc.) can be advantageous in that it does not require the user to touch, hold or wear any sort of beacon, sensor, or other marker.

In some examples, eye tracking sensor(s) 212A/212B includes at least one eye tracking camera (e.g., infrared (IR) cameras) and/or illumination sources (e.g., IR light sources, such as LEDs) that emit light towards a user's eyes. The eye tracking cameras may be pointed towards a user's eyes to receive reflected IR light from the light sources directly or indirectly from the eyes. In some examples, both eyes are tracked separately by respective eye tracking cameras and illumination sources, and a focus/gaze can be determined from tracking both eyes. In some examples, one eye (e.g., a dominant eye) is tracked by a respective eye tracking camera/illumination source(s).

Device 260/270 and system 201 are not limited to the components and configuration of FIG. 2, but can include fewer, other, or additional components in multiple configurations. In some examples, system 201 can be implemented in a single device. A person or persons using system 201, is optionally referred to herein as a user or users of the device(s). Attention is now directed towards exemplary concurrent displays of a three-dimensional environment on a first electronic device (e.g., corresponding to electronic device 260) and a second electronic device (e.g., corresponding to electronic device 270). As discussed below, the first electronic device may be in communication with the second electronic device in a multi-user communication session. In some examples, an avatar (e.g., a representation of) a user of the first electronic device may be displayed in the three-dimensional environment at the second electronic device, and an avatar of a user of the second electronic device may be displayed in the three-dimensional environment at the first electronic device. In some examples, the user of the first electronic device and the user of the second electronic device may be associated with a spatial group in the multi-user communication session. In some examples, interactions with content in the three-dimensional environment while the first electronic device and the second electronic device are in the multi-user communication session may cause the user of the first electronic device and the user of the second electronic device to become associated with different spatial groups in the multi-user communication session.

FIG. 3 illustrates an example of a spatial group of a user of a first electronic device and a user of a second electronic device in a multi-user communication session according to some examples of the disclosure. In some examples, the first electronic device 360 may present a three-dimensional environment 350A, and the second electronic device 370 may present a three-dimensional environment 350B. The first electronic device 360 and the second electronic device 370 may be similar to electronic device 101 or 260/270, and/or may be a head mountable system/device and/or projection-based system/device (including a hologram-based system/device) configured to generate and present a three-dimensional environment, such as, for example, heads-up displays (HUDs), head mounted displays (HMDs), windows having integrated display capability, displays formed as lenses designed to be placed on a person's eyes (e.g., similar to contact lenses), respectively. In the example of FIG. 3, a first user is optionally wearing the first electronic device 360 and a second user is optionally wearing the second electronic device 370, such that the three-dimensional environment 350A/350B can be defined by X, Y and Z axes as viewed from a perspective of the electronic devices (e.g., a viewpoint associated with the electronic device 360/370, which may be a head-mounted display, for example).

As shown in FIG. 3, the first electronic device 360 may be in a first physical environment that includes a table 306 and a window 309. Thus, the three-dimensional environment 350A presented using the first electronic device 360 optionally includes captured portions of the physical environment surrounding the first electronic device 360, such as a representation of the table 306' and a representation of the window 309'. In other examples, the three-dimensional environment 350A presented using the first electronic device 360 optionally includes portions of the physical environment viewed through a transparent or translucent display of the first electronic device 360. Similarly, the second electronic device 370 may be in a second physical environment, different from the first physical environment (e.g., separate from the first physical environment), that includes a floor lamp 307 and a coffee table 308. Thus, the three-dimensional environment 350B presented using the second electronic device 370 optionally includes captured portions of the physical environment surrounding the second electronic device 370, such as a representation of the floor lamp 307' and a representation of the coffee table 308'. In other examples, the three-dimensional environment 350B presented using the second electronic device 370 optionally includes portions of the physical environment viewed through a transparent or translucent display of the second electronic device 370. Additionally, the three-dimensional environments 350A and 350B may include representations of the floor, ceiling, and walls of the room in which the first electronic device 360 and the second electronic device 370, respectively, are located.

As mentioned above, in some examples, the first electronic device 360 is optionally in a multi-user communication session with the second electronic device 370. For example, the first electronic device 360 and the second electronic device 370 (e.g., via communication circuitry 222A/222B) are configured to present a shared three-dimensional environment 350A/350B that includes one or more shared virtual objects (e.g., content such as images, video, audio and the like, representations of user interfaces of applications, etc.). As used herein, the term "shared three-dimensional environment" refers to a three-dimensional environment that is independently presented, displayed, and/or visible at two or more electronic devices via which content, applications, data, and the like may be shared and/or presented to users of the two or more electronic devices. In some examples, while the first electronic device 360 is in the multi-user communication session with the second electronic device 370, an avatar corresponding to the user of one electronic device is optionally displayed in the three-dimensional environment that is displayed via the other electronic device. For example, as shown in FIG. 3, at the first electronic device 360, an avatar 315 corresponding to the user of the second electronic device 370 is displayed in the three-dimensional environment 350A. Similarly, at the second electronic device 370, an avatar 317 corresponding to the user of the first electronic device 360 is displayed in the three-dimensional environment 350B.

In some examples, the presentation of avatars 315/317 as part of a shared three-dimensional environment is optionally accompanied by an audio effect corresponding to a voice of the users of the electronic devices 370/360. For example, the avatar 315 displayed in the three-dimensional environment 350A using the first electronic device 360 is optionally accompanied by an audio effect corresponding to the voice of the user of the second electronic device 370. In some such examples, when the user of the second electronic device 370 speaks, the voice of the user may be detected by the second electronic device 370 (e.g., via the microphone(s) 213B) and transmitted to the first electronic device 360 (e.g., via the communication circuitry 222B/222A), such that the detected voice of the user of the second electronic device 370 may be presented as audio (e.g., using speaker(s) 216A) to the user of the first electronic device 360 in three-dimensional environment 350A. In some examples, the audio effect corresponding to the voice of the user of the second electronic device 370 may be spatialized such that it appears to the user of the first electronic device 360 to emanate from the location of avatar 315 in the shared three-dimensional environment 350A (e.g., despite being outputted from the speakers of the first electronic device 360). Similarly, the avatar 317 displayed in the three-dimensional environment 350B using the second electronic device 370 is optionally accompanied by an audio effect corresponding to the voice of the user of the first electronic device 360. In some such examples, when the user of the first electronic device 360 speaks, the voice of the user may be detected by the first electronic device 360 (e.g., via the microphone(s) 213A) and transmitted to the second electronic device 370 (e.g., via the communication circuitry 222A/222B), such that the detected voice of the user of the first electronic device 360 may be presented as audio (e.g., using speaker(s) 216B) to the user of the second electronic device 370 in three-dimensional environment 350B. In some examples, the audio effect corresponding to the voice of the user of the first electronic device 360 may be spatialized such that it appears to the user of the second electronic device 370 to emanate from the location of avatar 317 in the shared three-dimensional environment 350B (e.g., despite being outputted from the speakers of the first electronic device 360).

In some examples, while in the multi-user communication session, the avatars 315/317 are displayed in the three-dimensional environments 350A/350B with respective orientations that correspond to and/or are based on orientations of the electronic devices 360/370 (and/or the users of electronic devices 360/370) in the physical environments surrounding the electronic devices 360/370. For example, as shown in FIG. 3, in the three-dimensional environment 350A, the avatar 315 is optionally facing toward the viewpoint of the user of the first electronic device 360, and in the three-dimensional environment 350B, the avatar 317 is optionally facing toward the viewpoint of the user of the second electronic device 370. As a particular user moves the electronic device (and/or the particular user moves) in the physical environment, the viewpoint of the user changes in accordance with the movement, which may thus also change an orientation of the user's avatar in the three-dimensional environment. For example, with reference to FIG. 3, if the user of the first electronic device 360 were to look leftward in the three-dimensional environment 350A such that the first electronic device 360 is rotated (e.g., a corresponding amount) to the left (e.g., counterclockwise), the user of the second electronic device 370 would see the avatar 317 corresponding to the user of the first electronic device 360 rotate to the right (e.g., clockwise) relative to the viewpoint of the user of the second electronic device 370 in accordance with the movement of the first electronic device 360.

Additionally, in some examples, while in the multi-user communication session, a viewpoint of the three-dimensional environments 350A/350B and/or a location of the viewpoint of the three-dimensional environments 350A/350B optionally changes in accordance with movement of the electronic devices 360/370 (e.g., by the users of the electronic devices 360/370). For example, while in the communication session, if the first electronic device 360 is moved closer toward the representation of the table 306' and/or the avatar 315 (e.g., because the user of the first electronic device 360 moved forward in the physical environment surrounding the first electronic device 360), the viewpoint of the three-dimensional environment 350A would change accordingly, such that the representation of the table 306', the representation of the window 309' and the avatar 315 appear larger in the field of view. In some examples, each user may independently interact with the three-dimensional environment 350A/350B, such that changes in viewpoints of the three-dimensional environment 350A and/or interactions with virtual objects in the three-dimensional environment 350A by the first electronic device 360 optionally do not affect what is shown in the three-dimensional environment 350B at the second electronic device 370, and vice versa.

In some examples, the avatars 315/317 are a representation (e.g., a full-body rendering) of the users of the electronic devices 370/360. In some examples, the avatar 315/317 is a representation of a portion (e.g., a rendering of a head, face, head and torso, etc.) of the users of the electronic devices 370/360. In some examples, the avatars 315/317 are a user-personalized, user-selected, and/or user-created representation displayed in the three-dimensional environments 350A/350B that is representative of the users of the electronic devices 370/360. It should be understood that, while the avatars 315/317 illustrated in FIG. 3 correspond to full-body representations of the users of the electronic devices 370/360, respectively, alternative avatars may be provided, such as those described above.

As mentioned above, while the first electronic device 360 and the second electronic device 370 are in the multi-user communication session, the three-dimensional environments 350A/350B may be a shared three-dimensional environment that is presented using the electronic devices 360/370. In some examples, content that is viewed by one user at one electronic device may be shared with another user at another electronic device in the multi-user communication session. In some such examples, the content may be experienced (e.g., viewed and/or interacted with) by both users (e.g., via their respective electronic devices) in the shared three-dimensional environment. For example, as shown in FIG. 3, the three-dimensional environments 350A/350B include a shared virtual object 310 (e.g., which is optionally a three-dimensional virtual sculpture) that is viewable by and interactive to both users. As shown in FIG. 3, the shared virtual object 310 may be displayed with a grabber affordance (e.g., a handlebar) 335 that is selectable to initiate movement of the shared virtual object 310 within the three-dimensional environments 350A/350B.

In some examples, the three-dimensional environments 350A/350B include unshared content that is private to one user in the multi-user communication session. For example, in FIG. 3, the first electronic device 360 is displaying a private application window 330 in the three-dimensional environment 350A, which is optionally an object that is not shared between the first electronic device 360 and the second electronic device 370 in the multi-user communication session. In some examples, the private application window 330 may be associated with a respective application that is operating on the first electronic device 360 (e.g., such as a media player application, a web browsing application, a messaging application, etc.). Because the private application window 330 is not shared with the second electronic device 370, the second electronic device 370 optionally does not display a representation of the private application window 330" in three-dimensional environment 350B or optionally displays a representation of the private application window 330" in three-dimensional environment 350B. As shown in FIG. 3, in some examples, the representation of the private application window 330" may be a faded, occluded, discolored, and/or translucent representation of the private application window 330 that prevents the user of the second electronic device 370 from viewing contents of the private application window 330. Additionally, as shown in FIG. 3, the representation of the private application window 330" is optionally displayed in the three-dimensional environment 350B at a location relative to the avatar 317 corresponding to the user of the first electronic device 360 (e.g., based on a distance between the private application window 330 and the viewpoint of the user of the first electronic device 360 at the first electronic device 360).

As mentioned previously above, in some examples, the user of the first electronic device 360 and the user of the second electronic device 370 are associated with a spatial group 340 within the multi-user communication session. In some examples, the spatial group 340 controls locations at which the users and/or content are (e.g., initially) positioned in the shared three-dimensional environment. For example, the spatial group 340 may be a baseline (e.g., a first or default) spatial group within the multi-user communication session. For example, when the user of the first electronic device 360 and the user of the second electronic device 370 initially join the multi-user communication session, the user of the first electronic device 360 and the user of the second electronic device 370 are automatically (and initially, as discussed in more detail below) positioned according to the spatial group 340 within the multi-user communication session. In some examples, while the users are in the spatial group 340 as shown in FIG. 3, the user of the first electronic device 360 and the user of the second electronic device 370 have a spatial arrangement within the shared three-dimensional environment. For example, the user of the first electronic device 360 and the user of the second electronic device 370, including objects that are displayed in the shared three-dimensional environment, have spatial truth within the spatial group 340. In some examples, spatial truth requires a consistent spatial arrangement between users (or representations thereof) and virtual objects in the shared three-dimensional environment. For example, a distance between the viewpoint of the user of the first electronic device 360 and the avatar 315 corresponding to the user of the second electronic device 370 (e.g., corresponding to oval 315A) may be the same as a distance between the viewpoint of the user of the second electronic device 370 and the avatar 317 corresponding to the user of the first electronic device 360 (e.g., corresponding to oval 317A). As described herein, if the location of the viewpoint of the user of the first electronic device 360 moves, the avatar 317 corresponding to the user of the first electronic device 360 moves in the three-dimensional environment 350B in accordance with the movement of the location of the viewpoint of the user relative to the viewpoint of the user of the second electronic device 370. Additionally, if the user of the first electronic device 360 performs an interaction on the shared virtual object 310 (e.g., moves the virtual object 310 in the three-dimensional environment 350A), the second electronic device 370 alters display of the shared virtual object 310 in the three-dimensional environment 350B in accordance with the interaction (e.g., moves the virtual object 310 in the three-dimensional environment 350B).

It should be understood that, in some examples, more than two electronic devices may be communicatively linked in a multi-user communication session. For example, in a situation in which three electronic devices are communicatively linked in a multi-user communication session, a first electronic device would display two avatars, rather than just one avatar, corresponding to the users of the other two electronic devices. It should therefore be understood that the various processes and exemplary interactions described herein with reference to the first electronic device 360 and the second electronic device 370 in the multi-user communication session optionally apply to situations in which more than two electronic devices are communicatively linked in a multi-user communication session.

In some examples, it may be advantageous to selectively alter (e.g., update relative to the first, default spatial group) the spatial group of users in a multi-user communication session based on content that is displayed in the three-dimensional environment, including updating display of the avatars corresponding to the users of electronic devices that are communicatively linked in the multi-user communication session. For example, as described herein, content may be shared and presented in the three-dimensional environment such that the content is optionally viewable by and/or interactive to multiple users in the multi-user communication session. As discussed above, the three-dimensional environment optionally includes avatars corresponding to the users of the electronic devices that are in the communication session. In some instances, the presentation of the content in the three-dimensional environment with the avatars corresponding to the users of the electronic devices may cause portions of the content to be blocked or obscured from a viewpoint of one or more users in the multi-user communication session. In some examples, a change in the presentation of the content (e.g., a change in a size of the content) in the three-dimensional environment may similarly produce obstructions and/or other complications relative to a viewpoint of one or more users in the multi-user communication session. Accordingly, in some examples, the positions of the avatars corresponding to the users in the multi-user communication session may be updated based on the type of content that is being presented, as described herein in more detail.

FIGS. 4A-4N illustrate example interactions among users in a multi-user communication session according to some examples of the disclosure. In some examples, while a first electronic device 460 is in the multi-user communication session with a second electronic device 470 (and a third electronic device (not shown)), three-dimensional environment 450A is presented using the first electronic device 460 and three-dimensional environment 450B is presented using the second electronic device 470. In some examples, the electronic devices 460/470 optionally correspond to electronic devices 360/370 discussed above. In some examples, the three-dimensional environments 450A/450B include optical see-through or video pass-through portions of the physical environment in which the electronic devices 460/470 are located. For example, the three-dimensional environment 450A includes a window (e.g., representation of window 409'), and the three-dimensional environment 450B includes a coffee table (e.g., representation of coffee table 408') and a floor lamp (e.g., representation of floor lamp 407'). In some examples, the three-dimensional environments 450A/450B optionally correspond to the three-dimensional environments 350A/350B described above with reference to FIG. 3. As described above, the three-dimensional environments also include avatars 415/417 corresponding to the users of the electronic devices 470/460, respectively, as well as avatar 419 corresponding to a user of a third electronic device (not shown). In some examples, the avatars 415/417 optionally corresponds to avatars 315/317 described above with reference to FIG. 3.

As similarly described above with reference to FIG. 3, the user of the first electronic device 460, the user of the second electronic device 470 and the user of the third electronic device may be in a spatial group 440 (e.g., a baseline spatial group, such as a circular (e.g., "conversational" spatial group)) within the multi-user communication session (e.g., represented by the placement of ovals 415A, 417A and 419A in FIG. 4A). In some examples, the spatial group 440 optionally corresponds to spatial group 340 discussed above with reference to FIG. 3. As similarly described above, while the user of the first electronic device 460, the user of the second electronic device 470 and the user of the third electronic device are in the spatial group 440 within the multi-user communication session, the users have a spatial arrangement in the shared three-dimensional environment (e.g., represented by the orientations of, locations of, and/or distance between the ovals 415A, 417A and 419A in FIG. 4A), such that the electronic devices maintain consistent spatial relationships (e.g., spatial truth) between locations of the viewpoints of the users (e.g., which correspond to the locations of the ovals 415A/417A/419A) and shared virtual content at each electronic device. For example, as shown in FIG. 4A, while the user of the first electronic device 460, the user of the second electronic device 470 and the user of the third electronic device (not shown) have the spatial arrangement in multi-user communication session, each user is separated by a first distance 431A (e.g., a predetermined/predefined distance) in the three-dimensional environment. For example, at the first electronic device 460, from the viewpoint of the user of the first electronic device 460, the avatar 415 corresponding to the user of the second electronic device 470 and the avatar 419 corresponding to the user of the third electronic device are separated by the first distance 431A in the three-dimensional environment 450A, and the avatar 415 and the avatar 419 are each positioned from the viewpoint of the user of the first electronic device 460 the first distance 431A away as well. Similarly, at the second electronic device 470, from the viewpoint of the user of the second electronic device 470, the avatar 419 and the avatar 417 corresponding to the user of the first electronic device 460 are separated by the first distance 431A, and the avatar 419 and the avatar 417 are each positioned from the viewpoint of the user of the second electronic device 470 the first distance 431A away as well.

In some examples, as previously discussed above with reference to FIG. 3, the avatars corresponding to the users of the electronic devices in the multi-user communication session are displayed with respective orientations that are (e.g., initially) based on the spatial group of the users. For example, as shown in FIG. 4A, in the spatial group 440, the avatars corresponding to the users of the first electronic device 460, the second electronic device 470, and the third electronic device (not shown) are displayed with orientations that face toward a (e.g., predetermined) center 432 of the spatial group 440. For example, in the examples of FIGS. 4A-4N, the orientations of the avatars are represented by directionality of the arrows of the ovals 415A/417A/419A.

In some examples, the spatial group of the users in the multi-user communication session selectively changes in accordance with a determination that a number of the users in the multi-user communication session changes. For example, from FIG. 4A to FIG. 4B, a user of a fourth electronic device (not shown) joins the multi-user communication session that includes the user of the first electronic device 460, the user of the second electronic device 470, and the user of the third electronic device (not shown). In some examples, as shown in FIG. 4B, when the user of the fourth electronic device joins the multi-user communication session, the shared three-dimensional environment is updated to include an avatar 421 corresponding to the user of the fourth electronic device (not shown). For example, as shown in FIG. 4B, the first electronic device 460 updates the three-dimensional environment 450A to include the avatar 421 corresponding to the user of the fourth electronic device and, similarly, the second electronic device 470 updates the three-dimensional environment 450B to include the avatar 421.

In some examples, when the avatar 421 corresponding to the user of the fourth electronic device is displayed in the shared three-dimensional environment, the spatial group of the users in the multi-user communication session is updated to accommodate the user of the fourth electronic device (not shown), however a spatial separation between adjacent users in the multi-user communication session is maintained. For example, as shown in FIG. 4B, the locations of the ovals 415A, 417A, and 419A are shifted within the spatial group 440 to provide space/availability for oval 421A, which corresponds to the user of the fourth electronic device. However, as shown in FIG. 4B, when the spatial group is updated, the spatial separation between pairs of the users of the first electronic device 460, the second electronic device 470, the third electronic device (not shown) and the fourth electronic device (not shown) in the multi-user communication session is maintained. For example, as shown in FIG. 4B, in the updated spatial group 440, each oval is still spaced apart from an adjacent oval by the first distance 431A. Accordingly, as shown in FIG. 4B, at the first electronic device 460, the avatar 415 is separated from the avatar 421 by the first distance 431A and the avatar 421 is also separated from the avatar 419 by the first distance 431A. Similarly, as shown in FIG. 4B, at the second electronic device 470, the avatar 421 is separated from the avatar 419 by the first distance 431A and the avatar 419 is separated from the avatar 417 by the first distance 431A. Further, as shown in FIG. 4B, when the avatar 421 corresponding to the user of the fourth electronic device is displayed in the shared three-dimensional environment, the avatars 415, 417, and 419 remain oriented to face toward the center 432 of the spatial group 440.

Alternatively, in some examples, when a new user joins the multi-user communication session, the avatars corresponding to the users in the multi-user communication session may not remain separated from adjacent avatars (and/or viewpoint(s) of the user(s)) by the first distance 431A. For example, as additional users join the multi-user communication session, such as the user of the fourth electronic device represented by the avatar 421 or an additional user, such as a user of a fifth electronic device (not shown), the distance between adjacent avatars and/or viewpoints in the shared three-dimensional environment (e.g., the three-dimensional environments 450A/450B) is decreased to a distance smaller than the first distance 431A in FIG. 4B (e.g., or increased to a distance larger than the first distance 431A). However, the avatars and/or the viewpoints of the users in the real-time communication session are optionally still positioned radially (e.g., in a circular arrangement with the same radius) relative to the center 432 of the spatial group 440 and are evenly spaced apart from adjacent avatars (e.g., as similarly shown in FIG. 4B) by the same distance (e.g., which is smaller than the first distance 431A as discussed above) or same angular separation.

It should be understood that a similar treatment as the above would be applied to an instance in which a user leaves the multi-user communication session in the examples of FIGS. 4A-4N. For example, if the user of the second electronic device 470 were to leave the multi-user communication session in FIG. 4B, rather than the user of the fourth electronic device (not shown) joining the multi-user communication session, the multi-user communication session would include the user of the first electronic device 460, represented by the oval 417A, and the user of the third electronic device (not shown), represented by the oval 419A. In such an instance, the spatial group 440 would be updated to resemble to the spatial group 340 in FIG. 3, but the user of the first electronic device 460 and the user of the third electronic device would be separated from each other by the first distance 431A (e.g., across from and facing each other in the spatial group 440).

In some examples, the spatial group of the users, and thus the spatial separation between pairs of users, in the multi-user communication session is not updated when a respective user ceases sharing their avatar (e.g., toggles off a setting for sharing their avatar). For example, from FIG. 4B to FIG. 4C, the user of the fourth electronic device provides input that is detected at the fourth electronic device (not shown) for causing the avatar 421 to no longer be displayed in the shared three-dimensional environment. Accordingly, as shown in FIG. 4C, at the first electronic device 460 and at the second electronic device 470, the avatar 421 corresponding to the user of the fourth electronic device is no longer displayed in the three-dimensional environments 450A/450B, respectively. Additionally, in some examples, because the user of the fourth electronic device is still in the multi-user communication session, the avatar 421 is replaced with a two-dimensional representation 427 corresponding to the user of the fourth electronic device. For example, as shown in FIG. 4C, the first electronic device 460 and the second electronic device 470 replace display of the avatar 421 with a two-dimensional object (e.g., canvas/tile) that includes a representation of the user of the fourth electronic device in the three-dimensional environments 450A and 450B, respectively. In some examples, the two-dimensional representation 427 includes an image (e.g., a photograph) that is representative of the user of the fourth electronic device. In some examples, the two-dimensional representation 427 includes an image of the avatar 421 corresponding to the user of the fourth electronic device. In some examples, the two-dimensional representation 427 includes video (e.g., a live stream of the avatar corresponding to the user of the fourth electronic device or a recorded video that includes the user of the fourth electronic device) that is representative of the user of the fourth electronic device. Additionally or alternatively, in some examples, the two-dimensional representation 427 includes text corresponding to the user of the fourth electronic device, such as a name of the user of the fourth electronic device, initials of the name of the user of the fourth electronic device, a nickname of the user of the fourth electronic device, etc.

Further, as shown in FIG. 4C, when the two-dimensional representation 427 is placed in the shared three-dimensional environment, the spatial group 440 is not updated in the multi-user communication session. For example, as shown in FIG. 4C, in the spatial group 440, the two-dimensional representation 427, represented by rectangle 427A, is separated from the avatar 415, represented by the oval 415A, and the avatar 419, represented by the oval 419A, by the first distance 431A. Additionally, as shown in FIG. 4C, the avatars corresponding to the users, represented by the ovals 415A/417A/419A, remain oriented to face toward the center 432 of the spatial group 440 when the two-dimensional representation, represented by the rectangle 427A, is displayed in the shared three-dimensional environment.

In some examples, as mentioned above, the spatial separation between adjacent users in the multi-user communication session is selectively updated when content is shared in the shared three-dimensional environment. For example, in FIG. 4D, the second electronic device 470 is displaying user interface object 430, represented by rectangle 430A in the three-dimensional environment 450B. In some examples, the user interface object 430 is associated with a respective application (e.g., a media player application) running on the second electronic device 470, and is thus private to the user of the second electronic device 470. Accordingly, as shown in FIG. 4D, the three-dimensional environment 450A at the first electronic device 460 includes a representation of the user interface object 430" (which would similarly be displayed at the third electronic device (not shown) and the fourth electronic device (not shown)). In FIG. 4D, the user interface object 430 optionally includes option 423A that is selectable to display shared content (e.g., "Content A") corresponding to the respective application (e.g., media content corresponding to the media player application).

In some examples, as shown in FIG. 4D, when private content, such as the user interface object 430 that is private to the user of the second electronic device 470, is displayed in the three-dimensional environment 450A/450B, the spatial group 440, and thus the spatial separation between pairs of users in the multi-user communication session, is maintained. For example, as shown in FIG. 4D, the spatial group 440 is not updated when the user interface object 430, represented by the rectangle 430A, is displayed and the ovals 415A/417A/419A/421A corresponding to the users of the electronic devices remain spaced apart from each other by the first distance 431A.

In FIG. 4D, while displaying the user interface object 430 in the three-dimensional environment 450B, the second electronic device receives a selection input 472A directed to the option 423A in the user interface object 430 in the three-dimensional environment 450B. For example, the selection input corresponds to a pinch gesture provided by a hand of the user of the second electronic device 470 (e.g., in which an index finger and thumb of the hand make contact), optionally while a gaze of the user is directed to the option 423A in the user interface object 430. In some examples, the selection input 472A corresponds to some other suitable input, such as a tap input, gaze for more than a threshold period of time, verbal command, etc.

In some examples, in response to receiving the selection input 472A, the second electronic device 470 displays media player user interface 445 in the three-dimensional environment 450B, as shown in FIG. 4E. In some examples, as shown in FIG. 4E, the media player user interface 445 is configured to present audio-based media (e.g., a song, podcast, or other audio-based content) in the three-dimensional environment 450B. For example, in FIG. 4E, the media player user interface 445 is presenting a song (e.g., outputted by the second electronic device 470 as spatial or stereo audio) and includes a plurality of media controls 446, such as playback controls (e.g., forward, backward and pause/play buttons), scrubber bar with play head, volume level controls, share options, etc. In some examples, as mentioned above, the media player user interface 445 may be a shared object in the multi-user communication session. Accordingly, the media player user interface 445 is viewable by and interactive to the users in the multi-user communication session, including the user of the first electronic device 460, the user of the second electronic device 470, the user of the third electronic device (not shown), and the user of the fourth electronic device (not shown). For example, as shown in FIG. 4E, when the second electronic device 470 displays the media player user interface 445 in the three-dimensional environment 450B, the first electronic device 460 displays the media player user interface 445 in the three-dimensional environment 450A.

In some examples, in FIG. 4E, when the media player user interface 445 is displayed in the three-dimensional environments 450A/450B, the spatial group 440 and the spatial separation between pairs of users in the multi-user communication session are selectively updated based on a type of the content of the media player user interface 445. In some examples, content that is a first type of content includes content that is below a threshold size when it is displayed in the three-dimensional environment 450A/450B. For example, because the media player user interface 445 is a two-dimensional object, the threshold size is optionally a threshold width (e.g., 1, 2, 5, 10, 15, 30, 50, 100, 150, etc. cm), a threshold length, and/or a threshold area. Alternatively, if a three-dimensional object having a volume were displayed in the three-dimensional environment 450A/450B, the threshold size would optionally be a threshold volume and/or a threshold surface area.

In the example of FIG. 4E, the media player user interface 445 is determined to be below the threshold size discussed above, and thus, is the first type of content. In some examples, in accordance with the determination that the media player user interface 445 is the first type of content, the spatial group 440 is updated to accommodate display of the media player user interface 445 in the shared three-dimensional environment, without updating the spatial separation between pairs of adjacent users in the multi-user communication session. For example, as shown in FIG. 4E, the locations of the users (e.g., their viewpoints and corresponding avatars) are shifted in the multi-user communication session to accommodate the display of the media player user interface 445, represented by rectangle 445A, in the spatial group 440. However, as shown in FIG. 4E, the spatial separation is maintained as the first distance 431A in the multi-user communication. For example, in FIG. 4E, the user of the second electronic device 470, represented by the oval 415A, and the user of the fourth electronic device, represented by the oval 421A, are separated by the first distance 431A. Similarly, in FIG. 4E, the user of the third electronic device, represented by the oval 419A, and the media player user interface 445, represented by the rectangle 445A, are also separated by the first distance 431A. Additionally, as shown in FIG. 4E, in some examples, when shared content is displayed in the three-dimensional environment 450A/450B, the orientations of the avatars corresponding to the users in the multi-user communication session are updated to face toward the shared content, rather than toward the center of the spatial group. For example, in FIG. 4E, the ovals 415A/417A/419A/421A are rotated to face toward the media player user interface 445, represented by the rectangle 445A, in the spatial group 440. Accordingly, when content of the first type is shared in the multi-user communication session, the spatial separation between users and/or the shared content is maintained. In other examples, when shared content is displayed in the three-dimensional environment 450A/450B, the orientations of the avatars corresponding to the users in the multi-user communication session continue to face toward the center of the spatial group.

Alternatively, in some examples, when content of the first type is shared in the multi-user communication session, the avatars corresponding to the users in the multi-user communication session may not remain separated from adjacent avatars (and/or viewpoint(s) of the user(s)) by the first distance 431A. For example, when content of the first type discussed above is displayed in the shared three-dimensional environment, the distance between adjacent avatars and/or viewpoints in the shared three-dimensional environment (e.g., the three-dimensional environments 450A/450B) is decreased to a distance smaller than the first distance 431A in FIG. 4E (e.g., or increased to a distance larger than the first distance 431A). However, the avatars and/or the viewpoints of the users in the real-time communication session are optionally still positioned radially (e.g., in a circular arrangement) relative to the center 432 of the spatial group 440 and are evenly spaced apart from adjacent avatars and/or the shared content (e.g., as similarly shown in FIG. 4E) by the same distance (e.g., which is smaller than the first distance 431A as discussed above).

Alternatively, in some examples, content that is a second type of content, different from the first type of content discussed above, includes content that is above the threshold size discussed above when it is displayed in the three-dimensional environment 450A/450B. For example, in FIG. 4F, the second electronic device 470 alternatively receives an input corresponding to a request to display shared content (e.g., "Content B") that is content of the second type. As shown in FIG. 4F, as an example, the user interface object 430 discussed above alternatively includes option 423B that is selectable to initiate display of shared content of the second type in the multi-user communication session. In FIG. 4F, the second electronic device 470 receives a selection input 472B directed to the option 423B. For example, as similarly discussed above, the second electronic device 470 detects an air pinch gesture, a tap or touch gesture, a gaze dwell, a verbal command, etc. corresponding to selection of the option 423B in the three-dimensional environment 450B.

In some examples, as shown in FIG. 4G, in response to receiving the selection of the option 423B, the second electronic device 470 displays a playback user interface 447 that is configured to present video content (e.g., movie content, episodic content associated with a television show, video clips, music videos, etc.) in the three-dimensional environment 450B. In some examples, as shown in FIG. 4G, the playback user interface 447 includes playback controls 456 (e.g., forward, backward, and/or pause/play buttons) for controlling playback of the video content and is displayed with a grabber or handlebar affordance 435 that is selectable to initiate movement of the playback user interface 447 in the three-dimensional environment 450B. In some examples, as mentioned above, the playback user interface 447 may be shared content in the multi-user communication session, such that the playback user interface 447 is viewable by and interactive to the users in the multi-user communication session. Accordingly, as shown in FIG. 4G, the first electronic device 460 optionally also displays the playback user interface 447 in the three-dimensional environment 450A when the playback user interface 447 is displayed in the three-dimensional environment 450B.

In some examples, as mentioned above, the playback user interface 447 is content of the second type, particularly because, for example, the playback user interface 447 has a size that is greater than the threshold size discussed above. For example, width and/or length of the two-dimensional playback user interface 447 is greater than a threshold width and/or length (and/or area), as similarly discussed above. Accordingly, in some examples, when the playback user interface 447 is displayed in the shared three-dimensional environment, the spatial group 440 is updated to accommodate display of the playback user interface 447, which includes updating the spatial separation between pairs of users in the multi-user communication session due to the larger size (e.g., width and/or length) of the playback user interface 447. For example, in FIG. 4G, in the updated spatial group 440, the separation spacing is reduced to a second distance 431B, smaller than the first distance 431A above, such that from the viewpoint of the user of the first electronic device 460, the avatars 419, 421, and 415 are each spaced the second distance apart in the three-dimensional environment 450A, and from the viewpoint of the user of the second electronic device 470, the avatars 419 and 421 are spaced the second distance apart and the avatar 417 is positioned the second distance 431B away from the viewpoint of the user of the second electronic device 470 in the three-dimensional environment 450B. In some examples, in the updated spatial group 440, a distance (e.g., the second distance 431B) between adjacent avatars (e.g., avatars 419 and 421) is not equal to a distance between an avatar (e.g., avatar 419 or 417) and the playback user interface 447. For example, as shown in FIG. 4H, in the updated spatial group 440, the distance between the avatar 417, represented by the oval 417A, and the playback user interface 447, represented by the rectangle 447A, is larger than the distance (e.g., the second distance 431B) between the avatar 417, represented by the oval 417A, and the avatar 415, represented by the oval 415A. Additionally, as similarly mentioned above, because the playback user interface 447 is a shared object, the orientations of the avatars, represented by the arrows of the ovals 415A-421A in the spatial group 440, in the shared three-dimensional environment are oriented to face toward the playback user interface 447, represented by the rectangle 447A, when the playback user interface 447 is displayed.

In some examples, the spatial separation discussed above changes based on changes in the size of the playback user interface 447. For example, in FIG. 4H, while displaying the playback user interface 447 in the three-dimensional environment 450A, the first electronic device 460 detects an input corresponding to a request to increase the size of the playback user interface 447 in the three-dimensional environment 450A. As an example of the input, the first electronic device 460 detects a first selection input 472C-i (e.g., provided by a first hand of the user of the first electronic device 460) directed to a top right corner of the playback user interface 447 and detects a second selection input 472C-ii (e.g., provided by a second hand of the user of the first electronic device 460) directed to a bottom left corner of the playback user interface 447 in the three-dimensional environment 450B. In some examples, the first selection input 472C-i and the second selection input 472C-ii are followed by corresponding movements of the first hand and the second hand of the user of the first electronic device apart, as indicated by the arrows in FIG. 4H. In some examples, the input alternatively corresponds to a selection of a user interface element that is selectable to increase the size of the playback user interface 447.

In some examples, as shown in FIG. 4I, in response to detecting the input(s) discussed above corresponding to the request to increase the size of the playback user interface 447, the first electronic device 460 increases the size of the playback user interface 447 in the three-dimensional environment 450A in accordance with the input. Additionally, as shown in FIG. 4I, because the playback user interface 447 is a shared object, the size of the playback user interface 447 is also increased in size in the three-dimensional environment 450B at the second electronic device 470 (e.g., and at the respective three-dimensional environments at the third electronic device and the fourth electronic device).

Additionally or alternatively, in some examples, when a size of the playback user interface 447 (e.g., a true or real size (e.g., width, length, area, volume, etc.) of the playback user interface 447 and/or an aspect ratio of the playback user interface 447) is changed in the shared three-dimensional environment 450A/450B (e.g., in accordance with the input discussed above), one or more visual properties (e.g., including a visual appearance) of the content of the playback user interface 447 is adjusted to account for the transition in size of the playback user interface 447 across the electronic devices in the communication session. For example, as shown in FIG. 4N, when the first electronic device 460 and/or the second electronic device 470 increase the size of the playback user interface 447 in the three-dimensional environments 450A/450B, the video content of the playback user interface 447, and optionally the playback controls 456, is faded, occluded, decreased in brightness, increased in opacity, and/or otherwise visually adjusted such that the video content is no longer visible to the users at their respective electronic devices. In some examples, the content of the playback user interface 447 immediately ceases to be displayed (e.g., is immediately faded out) when the size of the playback user interface 447 is changed. It should be understood that the same fading behavior is similarly applied for instances in which, in response to user input detected by one of the electronic devices in the multi-user communication session, the size of the playback user interface 447 is decreased in the shared three-dimensional environment. In some examples, the content of the playback user interface 447 remains visually adjusted until the size (e.g., including the aspect ratio) of the playback user interface 447 remains stationary (e.g., unchanged) for at least a threshold amount of time (e.g., 0.1, 0.2, 0.3, 0.5, 1, 1.5, 2, 3, 5, etc. seconds). For example, the video content of the playback user interface 447 in FIG. 4N remains faded and/or not visible to the users of the first electronic device 460, the second electronic device 470, the third electronic device (not shown), and the fourth electronic device (not shown) for at least the threshold amount of time after detecting an end of the input(s) discussed above with reference to FIG. 4H. Additionally or alternatively, in some examples, the content of the playback user interface 447 remains visually adjusted until the size of the content (e.g., size and/or the aspect ratio of the video content) corresponds to (e.g., matches) the new size (e.g., and/or aspect ratio) of the playback user interface 447 for a threshold amount of time (e.g., 0.1, 0.2, 0.3, 0.5, 1, 1.5, 2, 3, 5, etc. seconds).

In some examples, in accordance with a determination that the threshold amount of time discussed above has elapsed without detecting input (or some other indication, such as an indication of input(s) received at an electronic device different from the first electronic device 460) that causes the size (e.g., including the aspect ratio) of the playback user interface 447 to change in the shared three-dimensional environment, the content of the playback user interface 447 is (e.g., gradually) redisplayed and/or is once again made visible in the playback user interface 447. For example, as shown in FIG. 4I, the video content, including the playback controls 456, is once again displayed and/or visible (e.g., faded back into display) in the playback user interface 447 in the three-dimensional environments 450A/450B. In some examples, as shown in FIG. 4I, when the video content is redisplayed in the playback user interface 447, a size of the video content (e.g., including an aspect ratio of the video content) is increased in the three-dimensional environments 450A/450B in accordance with the increased size of the playback user interface 447. Accordingly, adjusting the visibility of the content of the playback user interface 447 when the size of the playback user interface 447 is changed in the shared three-dimensional environment helps prevent and/or reduce occurrences of visual blurring and/or warping of the content of the playback user interface 447, thereby helping reduce or prevent eye strain or other discomfort for the users in the communication session.

It should be understood that, in some examples, alternative forms of inputs may cause the size (e.g., including the aspect ratio) of the playback user interface 447 to change, which optionally causes the content of the playback user interface 447 to be visually adjusted in the manner discussed above while the size of the playback user interface 447 is adjusted. For example, an input (or other indication) that causes the video content of the playback user interface 447 to be presented in an alternate orientation (e.g., from a landscape orientation as shown in FIG. 4H to a portrait orientation in which a width of the playback user interface 447 is smaller than a length of the playback user interface 447). In such an instance, the video content of the playback user interface 447 is visually adjusted (e.g., faded out) while the playback user interface 447 is updated to have the alternate orientation as similarly discussed above. Additionally, it should be understood that, in some examples, additional or alternative types of content are similarly visually adjusted when a size of a virtual object (e.g., window) in which the content is displayed is changed in a similar manner as discussed above. For example, if the input(s) discussed above with reference to FIG. 4H were alternatively directed to the media player user interface 445 of FIG. 4E, which cause the media player user interface 445 to be changed in size (e.g., including aspect ratio), the content of the media player user interface 445, including the plurality of media controls 446, would optionally be visually adjusted (e.g., faded out) in a similar manner as discussed above. It should also be understood that, in some examples, an indication of user input may be provided by a user who is not actively participating in the multi-user communication session, which causes the content to be visually adjusted in the manner discussed above. For example, if the video content in the playback user interface 447 corresponds to a live stream of content (e.g., content being provided by a particular person, entity, etc.), one or more actions performed by the live streamer may cause the size (e.g., including the aspect ratio) of the playback user interface 447 to change as similarly discussed above.

In some examples, when the size of the playback user interface 447 is increased in the shared three-dimensional environment, as represented by the increase in size of the rectangle 447A in FIG. 4I, the separation spacing in the spatial group 440 decreases based on (e.g., proportionally or equally to) the increase in the size of the playback user interface 447. For example, as shown in FIG. 4I, each avatar, represented by the ovals 415A-421A, is separated from an adjacent avatar by a third distance 431C, less than the second distance 431B and the first distance 431A discussed above. Accordingly, as shown in FIG. 4I, at the first electronic device 460, when the size of the playback user interface 447 is increased in the three-dimensional environment 450A, the avatars 415, 419, and 421 are shifted in the field of view of the first electronic device 460, such that the avatar 419 is separated from the avatar 421 by the third distance, the avatar 421 is separated from the avatar 415 by the third distance, and the avatar 415 is separated from the viewpoint of the user of the first electronic device 460 by the third distance. Similarly, as shown in FIG. 4I, at the second electronic device 470, the avatar 419 and the avatar 421 are separated by the third distance, the avatar 421 is separated from the viewpoint of the user of the second electronic device 470 by the third distance, and the avatar 417 is separated from the viewpoint of the user of the second electronic device 470 by the third distance. Additionally, the orientations of the avatars 415-421 remain directed toward the playback user interface 447 in the shared three-dimensional environment when the size of the playback user interface 447 is increased.

In some examples, as shown in FIG. 4I, when the size of a shared object, such as the playback user interface 447, is increased in the shared three-dimensional environment, a distance between the center 432 of the spatial group 440 and the shared object is increased as well (e.g., proportionally or equally). For example, as shown in FIG. 4I, when the size of the playback user interface 447 is increased in the shared three-dimensional environment, the distance between the playback user interface 447, represented by the rectangle 447A, and the center 432 of the spatial group 440 is increased as well, such that the playback user interface 447 appears farther away in the three-dimensional environments 450A/450B from the viewpoints of the users of the electronic devices 460/470.

In some examples, the separation spacing described above is associated with a minimum separation spacing. For example, the minimum separation spacing is a fourth distance (e.g., 431D in FIG. 4J), smaller than the third distance. In some examples, as the size of a shared object, such as the playback user interface 447, continues to be increased in the shared three-dimensional environment (e.g., in response to user input), the separation spacing discussed herein continues to decrease to the minimum separation spacing (e.g., the fourth distance). In some examples, while the separation spacing is the minimum separation spacing, if the size of the shared object, such as the playback user interface 447 is increased further in the shared three-dimensional environment, the separation spacing is maintained at the minimum separation spacing.

In some examples, the updating of the separations between adjacent avatars within the spatial group 440 according to shared content of the first type and the second type may be similarly applied to the two-dimensional representation 427 discussed previously with reference to FIG. 4C. For example, referring back to FIG. 4C, because the size (e.g., width and/or length, as previously discussed above) of the two-dimensional representation 427 is within the threshold size discussed previously above, when the two-dimensional representation 427 is displayed in the three-dimensional environments 450A/450B, the separation between adjacent avatars (e.g., avatar 417, represented by the oval 417A, and avatar 419, represented by the oval 419A) remains unchanged (e.g., is maintained at the first distance 431A), as previously discussed above. However, if the first electronic device 460 or the second electronic device 470 were to receive an input for changing the size of the two-dimensional representation 427, such as the scaling input discussed above with reference to FIG. 4H, that causes the size of the two-dimensional representation 427 to increase past the threshold size in the three-dimensional environments 450A/450B, the separation between adjacent avatars and/or viewpoints of users would be decreased (e.g., to the second distance 431B or the third distance 431C) as similarly discussed above.

In some examples, while the playback user interface 447 is shared and displayed in the multi-user communication session, if a user of a fifth electronic device (not shown)

joins the multi-user communication session without sharing their avatar (e.g., with a setting for sharing their avatar toggled off), as similarly discussed herein above, the shared three-dimensional environment includes a two-dimensional representation corresponding to the user of the fifth electronic device. For example, in FIG. 4J, the first electronic device 460 and the second electronic device 470 update the three-dimensional environments 450A and 450B, respectively, to include two-dimensional representation 429, represented by rectangle 429A in the spatial group 440. In some examples, because the playback user interface 447 is displayed when the user of the fifth electronic device joins the multi-user communication session, the two-dimensional representation 429 corresponding to the user of the fifth electronic device is docked beside the playback user interface 447 in the shared three-dimensional environment, as shown in FIG. 4J.

As previously discussed above, when the size of the playback user interface 447 is increased in the shared three-dimensional environment, the separation spacing between adjacent users in the spatial group 440 is decreased accordingly (e.g., proportionally or equally), such as to the third distance 431C shown in FIG. 4I. In some examples, when the two-dimensional representation 429 is displayed in the shared three-dimensional environment and is docked beside (e.g., displayed at a fixed position adjacent to) the playback user interface 447, the separation spacing is updated based on the sizes of both the playback user interface 447 and the two-dimensional representation 429, such as a total size (e.g., a sum of the widths and/or lengths) of the playback user interface 447 and the two-dimensional representation 429 (e.g., including a size of any unoccupied space between them). Accordingly, as shown in FIG. 4J, when the two-dimensional representation 429 corresponding to the user of the fifth electronic device is displayed in the shared three-dimensional environment, the separation spacing is reduced to a fourth distance 431D, smaller than the third distance 431C, in the spatial group 440 (e.g., which is optionally the minimum separation spacing discussed previously above). For example, as shown in FIG. 4J, at the first electronic device 460, the avatars 419, 421, and 415 are shifted in the field of view of the three-dimensional environment 450A such that the avatar 419 is separated from avatar 421 by the fourth distance, the avatar 421 is separated from the avatar 415 by the fourth distance, and the avatar 415 is separated from the viewpoint of the user of the first electronic device 460 by the fourth distance. Similarly, in some examples, as shown in FIG. 4J, at the second electronic device 470, the avatar 419 is shifted to be the fourth distance away from the avatar 421, the avatar 421 is shifted to be the fourth distance away from the viewpoint of the user of the second electronic device 470, and the avatar 417 is shifted to be the fourth distance away from the viewpoint of the user of the second electronic device 470 in the three-dimensional environment 450B.

In some examples, while in the multi-user communication session, the first electronic device 460 and the second electronic device 470 display a respective avatar corresponding to a respective user at a respective location within a spatial group based on a location of a two-dimensional representation of the respective user within a communication representation (e.g., canvas) that is displayed in the shared three-dimensional environment. For example, in FIG. 4K, while the user of the first electronic device 460, the user of the second electronic device 470, the user of the third electronic device (not shown), and the user of the fourth electronic device (not shown) are in the multi-user communication session as similarly described above, the first electronic device 460 and the second electronic device 470 are displaying representations of the users in the shared three-dimensional environment according to a spatial state of the users. As shown in FIG. 4K, the user of the first electronic device 460, the user of the second electronic device 470, and the user of the third electronic device are spatially enabled, such that the users are represented by their respective avatars in the shared three-dimensional environment as previously discussed herein, such as avatars 415, 417 and 419. Additionally, as shown in FIG. 4K, the user of the fourth electronic device is optionally not spatially enabled, such that the user is represented by a two-dimensional representation 427 (e.g., within a window or canvas), as similarly discussed above.

In the example of FIG. 4K, as similarly discussed above, the users in the multi-user communication session are arranged in spatial group 440. In some examples, as similarly discussed above, as shown in FIG. 4K, while in the spatial group 440, the avatars 415, 417, and 419, which are represented by the ovals 415A, 417A, and 419A, and the two-dimensional representation 427, which is represented by the rectangle 427A, are separated from an adjacent user by spatial separation 431A. For example, in FIG. 4K, the user of the first electronic device 460, which is represented by oval 417A in the spatial group 440, is separated from the user of the third electronic device, which is represented by the oval 419A, by the spatial separation 431A in the spatial group 440. In some examples, as previously discussed above, the spatial separation 431A corresponds to a default and/or initial spatial separation within the spatial group 440. Additionally, as shown in FIG. 4K, the representations of the users are optionally oriented to face toward a center 432 of the spatial group 440 (e.g., in accordance with a conversational (e.g., circular) arrangement within the shared three-dimensional environment).

In FIG. 4L, the first electronic device 460 and the second electronic device 470 optionally detect a user of a fifth electronic device (not shown) join the multi-user communication session. In some examples, the user of the fifth electronic device joins the multi-user communication session while the user is in a non-spatial state (e.g., an avatar representation or other video-based representation of the user of the fifth electronic device is not currently enabled/activated when the user of the fifth electronic device joins the multi-user communication session). Accordingly, as shown in FIG. 4L, when the user of the fifth electronic device joins the multi-user communication session, the first electronic device 460 and the second electronic device 470 display a two-dimensional representation of the user of the fifth electronic device in the three-dimensional environment 450A/450B. Particularly, as shown in FIG. 4L, the two-dimensional representation of the user of the fourth electronic device is updated to be a canvas 427 that includes a first representation 428a (e.g., an image or other two-dimensional representation) of the user of the fourth electronic device and a second representation 428b of the user of the fifth electronic device (who has just joined the multi-user communication session). In some examples, as shown in FIG. 4L, the first representation 428a of the user of the fourth electronic device is displayed on a left side of the canvas 427 and the second representation 428b of the user of the fifth electronic device is displayed on a right side of the canvas 427 in the three-dimensional environment 450A/450B.

In some examples, in accordance with a determination that a respective user who is currently represented in the shared three-dimensional environment by a two-dimensional representation toggles on their avatar such that the respective user is in a spatial state, a location of the avatar corresponding to the respective user within the spatial group 440 is selected based on a position of the two-dimensional representation in the canvas. For example, in FIG. 4M, the user of the fifth electronic device provides an input (e.g., that is detected by the fifth electronic device) for toggling on their avatar, such that the user of the fifth electronic device is transitioned from a non-spatial state to being in a spatial state within the multi-user communication session. Accordingly, as shown in FIG. 4M, the first electronic device 460 and the second electronic device 470 display avatar 411 corresponding to the user of the fifth electronic device. Additionally, as shown in FIG. 4M, the first electronic device 460 and the second electronic device 470 cease displaying the second representation 428*b* of the user of the fifth electronic device in canvas 427 in the three-dimensional environment 450A/450B.

In some examples, as mentioned above, a location at which the avatar 411 is displayed within the spatial group 440 is selected based on a position of the second representation 428*b* within the canvas 427 in FIG. 4L. For example, as discussed previously above with reference to FIG. 4L, the second representation 428*b* of the user of the fifth electronic device was positioned on the right side of the canvas 427 (with the first representation 428*a* on the left side of the canvas 427) while the user of the fifth electronic device was in the non-spatial state within the multi-user communication session. As such, in FIG. 4M, when the avatar 411 corresponding to the user of the fifth electronic device is displayed in the three-dimensional environment 450A/450B, the avatar 411 is displayed to the right of the canvas 427, which still includes the two-dimensional representation of the user of the fourth electronic device, based on the positioning of the second representation 428*b* on the right side of the canvas 427. For example, as shown in FIG. 4M, the avatar 411, represented by oval 411A, is positioned between the two-dimensional representation 427, represented by the rectangle 427A, and the avatar 419, represented by the oval 419A, in the spatial group 440.

Alternatively, in some examples, if the user of the fourth electronic device (not shown) provided input for toggling on their avatar, rather than the user of the fifth electronic device as discussed above, an avatar corresponding to the user of the fourth electronic device would be displayed in the three-dimensional environment 450A/450B rather than the avatar 411 discussed above. Additionally, as similarly discussed above, the avatar corresponding to the user of the fourth electronic device would optionally be displayed at a location within the spatial group 440 based on a position of the first representation 428*a* within the canvas 427 in FIG. 4L. For example, because the first representation 428*a* of the user of the fourth electronic device was positioned on the left side of the canvas 427 while the user of the fourth electronic device was in the non-spatial state within the multi-user communication session, the avatar corresponding to the user of the fourth electronic device would be displayed to the left of the canvas 427 in the three-dimensional environment 450A/450B.

Additionally, in some examples, as shown in FIG. 4M, when the avatar 411 is displayed in the three-dimensional environment 450A/450B, the first electronic device 460 and the second electronic device 470 update a spatial arrangement between adjacent users in the multi-user communication session. For example, as shown in FIG. 4M, to accommodate the display of the avatar 411, represented by the oval 411A, the first electronic device 460 and the second electronic device 470 separate adjacent user in the multi-user communication session according to updated spatial separation 431E within the spatial group 440. As shown in FIG. 4M, the avatar 411, represented by the oval 411A, is optionally separated from the avatar 419, represented by the oval 419A, by the updated spatial separation 431E in the spatial group 440. In some examples, the updated spatial separation 431E is smaller than the spatial separation 431A in FIG. 4L, as similarly described with reference to the other examples above. Additionally, in some examples, as shown in FIG. 4M, the first electronic device 460 and the second electronic device 470 maintain the orientations of the avatars 411-419 to be facing toward the center 432 of the spatial group 440. It should be understood that, as similarly discussed herein, if the user of the fourth electronic device (not shown) were to toggle on their avatar in a similar fashion as the user of the fifth electronic device, the first electronic device 460 and the second electronic device 470 would update the three-dimensional environment 450A/450B to include an avatar corresponding to the user of the fourth electronic device in place of the two-dimensional representation or canvas 427.

Thus, one advantage of the disclosed method of automatically updating a spatial group of users, which includes changing a spatial separation between adjacent users (e.g., represented by their avatars), in a multi-user communication session based on a type of content that is shared and displayed in a shared three-dimensional environment is that users may be provided with an unobscured viewing experience of the shared content, which also allows for unobstructed interaction with the shared content. As another benefit, automatically updating the spatial group of the users as discussed above helps prevent and/or reduce the need for user input for manually rearranging the shared content and/or positions of users in the shared three-dimensional environment, which helps reduce power consumption of the electronic devices that would otherwise be required to respond to such user corrections. Additionally, automatically updating a spatial group of users, which includes changing a spatial separation between adjacent users, in a multi-user communication session when transitioning between displaying two-dimensional representations and displaying three-dimensional representations (e.g., avatars) of users enables a spatial context of a two-dimensional representation of a respective user to be automatically preserved relative to viewpoints of the other users, thereby maintaining a spatial context of the users within the spatial group overall, which further improves user-device interaction.

As described above, while electronic devices are communicatively linked in a multi-user communication session, displaying shared content in a shared three-dimensional environment causes a spatial group of the users of the electronic devices to be updated based on the content type. Attention is now directed to additional or alternative examples of updating the spatial group of users in a multi-user communication session when shared content is displayed in a three-dimensional environment shared between electronic devices.

FIGS. 5A-5S illustrate example interactions among users in a multi-user communication session according to some examples of the disclosure. In some examples, while a first electronic device 560 is in the multi-user communication session with a second electronic device 570 and a third electronic device (not shown), three-dimensional environment 550A is presented using the first electronic device 560 and three-dimensional environment 550B is presented using the second electronic device 570. In some examples, the electronic devices 560/570 optionally correspond to electronic devices 460/470 discussed above and/or electronic devices 360/370 in FIG. 3. In some examples, the three-dimensional environments 550A/550B include optical see-through or video-passthrough portions of the physical environment in which the electronic devices 560/570 are located. For example, the three-dimensional environment 550A includes a window (e.g., representation of window 509'), and the three-dimensional environment 550B includes a coffee table (e.g., representation of coffee table 508') and a floor lamp (e.g., representation of floor lamp 507'). In some examples, the three-dimensional environments 550A/550B optionally correspond to three-dimensional environments 450A/450B described above and/or three-dimensional environments 350A/350B in FIG. 3. As described above, the three-dimensional environments also include avatars 515/517/519 corresponding to a user of the first electronic device 560, a user of the second electronic device 570, and a user of the third electronic device (not shown). In some examples, the avatars 515/517/519 optionally correspond to avatars 415/417/419 described above and/or avatars 315/317 in FIG. 3.

As previously discussed herein, in FIG. 5A, the user of the first electronic device 560, the user of the second electronic device 570, and the user of the third electronic device (not shown) may share a spatial group 540 (e.g., a baseline or initial spatial group, such as a conversational distribution) within the multi-user communication session. In some examples, the spatial group 540 optionally corresponds to spatial group 440 discussed above and/or spatial group 340 discussed above with reference to FIG. 3. As similarly described above with reference to FIGS. 4A-4N, while the user of the first electronic device 560, represented by oval 517A, the user of the second electronic device 570, represented by oval 515A, and the user of the third electronic device, represented by oval 519A, have the spatial group 540 within the multi-user communication session, adjacent users are separated by a spatial separation in the shared three-dimensional environment, such as first distance 531, as shown in FIG. 5A. Additionally, as previously discussed herein, while communicatively linked in the multi-user communication session, the electronic devices maintain consistent spatial relationships (e.g., spatial truth) between locations of the viewpoints of the users (e.g., which correspond to the locations of the avatars 515/517/519 in the shared three-dimensional environment and are represented by the ovals 515A/517A/519A in the spatial group 540) and virtual content at each electronic device. In some examples, as shown in FIG. 5A and as previously discussed herein, the avatars 515/517/519 are displayed with respective orientations while arranged according to the spatial group 540 that cause the avatars 515/517/519 to face toward a center 532 (e.g., a predetermined or predefined center) of the spatial group 540.

In some examples, as previously discussed above with reference to FIG. 3, a location of a user within the spatial group 540 may change in response to detecting input that causes a location of the viewpoint of the user to change in the shared three-dimensional environment. For example, from FIG. 5A to FIG. 5B, the location of the viewpoint of the user of the third electronic device, which is represented by the oval 519A, is shifted in the shared three-dimensional environment (e.g., in response to a movement of the third electronic device caused by movement of the user of the third electronic device, as similarly discussed previously). In some examples, as shown in FIG. 5B, the location of the avatar 519 corresponding to the user of the third electronic device is updated in the shared three-dimensional environment in accordance with the shift in the location of the viewpoint of the user of the third electronic device. For example, at the first electronic device 560, the avatar 519 is shifted backward in the three-dimensional environment 550A such that the avatar 519 is located farther away from the viewpoint of the user of the first electronic device 560, and at the second electronic device 570, the avatar 519 is shifted forward in the three-dimensional environment 550B such that the avatar 519 is located closer to the viewpoint of the user of the second electronic device 570, based on the shift in the location of the viewpoint of the user of the third electronic device (not shown). In some examples, the center 532 of the spatial group 540 is updated based on the updated location of the viewpoint of the user of the third electronic device, represented by the oval 519A, in the shared three-dimensional environment, as shown in FIG. 5B.

As previously discussed herein, while the user of the first electronic device 560, the user of the second electronic device 570, and the user of the third electronic device (not shown) are in the multi-user communication session, content may be shared and displayed in the shared three-dimensional environment such that the content is viewable by and interactive to the users. In some examples, as shown in FIG. 5C, the three-dimensional environment 550A may include user interface object 530 associated with a respective application running on the first electronic device 560. In some examples, as shown in FIG. 5C, the user interface object 530 includes option 523A that is selectable to initiate a process to display shared content (e.g., "Content B") corresponding to the respective application in the shared three-dimensional environment. In the example of FIG. 5C, the user interface object 530, represented by rectangle 530A in the spatial group 540, is a private object that is only viewable by and interactive to the user of the first electronic device 560. Accordingly, as shown in FIG. 5C, the three-dimensional environment 550B at the second electronic device 570 includes a representation of the user interface object 530" (e.g., which does not include the content of the user interface object 530), as previously discussed herein.

In some examples, as shown in FIG. 5C, the first electronic device 560 may detect a selection input 572A directed to the option 523A in the user interface object 530 in the three-dimensional environment 550A. For example, as similarly discussed above, the first electronic device 560 detects the user of the first electronic device 560 provide a pinch input (e.g., in which the index finger and the thumb of the hand of the user make contact) while the gaze of the user is directed toward the option 523A (or other suitable input such as a tap input, a verbal command, gaze for more than a threshold period of time, etc.).

In some examples, in response to receiving the selection of the option 523A in the user interface object 530, the first electronic device initiates a process to share and display content associated with the user interface object 530 in the shared three-dimensional environment. In some examples, when shared content is displayed in the shared three-dimensional environment, the spatial group 540 is updated such that the avatars 515/517/519 are repositioned in the shared three-dimensional environment based on a location at which the shared content is to be displayed. For example, as shown in FIG. 5D, square 541 represents a placement location for the shared content in the shared three-dimensional environment. In some examples, the placement location is selected based on the location of the user interface object 530, represented by the rectangle 530A in the spatial group 540, in FIG. 5C. For example, as shown in FIG. 5D, the square 541 representing the placement location is located at the location of the rectangle 530A in FIG. 5C. In other examples, the placement location is selected arbitrarily, is selected based on the viewpoint of the user who provided input for sharing the content in the shared three-dimensional environment, and/or is a default placement location (e.g., selected by the application with which the content is associated) within the spatial group 540 in the multi-user communication session.

In some examples, when the placement location for the shared content is determined, a reference line 539 is established between the placement location, represented by the square 541, and the center 532 of the spatial group 540, as shown in FIG. 5D. In some examples, the avatars corresponding to the users (e.g., including the viewpoints of the users) in the multi-user communication session are repositioned (e.g., shifted/moved) relative to the reference line 539. In some examples, as indicated in FIG. 5E, the avatars (e.g., including the viewpoints of the users) are moved/shifted (e.g., radially) relative to the reference line 539 to be positioned in front of and facing the placement location represented by square 541. For example, as shown by the arrows in FIG. 5E, the avatar 519, represented by the oval 519A, is shifted counterclockwise around the reference line 539, the avatar 515, represented by the oval 515A, is shifted counterclockwise around the reference line 539 in the spatial group 540, and the avatar 517, represented by the oval 517A, is shifted clockwise relative to the reference line 539. Accordingly, in some examples, as shown in FIG. 5F, when the shared content is displayed in the shared three-dimensional environment, the avatars (e.g., including the viewpoints of the users), represented by the ovals 515A/517A/519A, are repositioned in the spatial group 540 such that, at the first electronic device 560, the avatar 515 corresponding to the user of the second electronic device 570 and the avatar 519 corresponding to the user of the third electronic device (not shown) are located to the left of the viewpoint of the user of the first electronic device 560. Similarly, as shown in FIG. 5F, at the second electronic device 570, when the shared content is displayed in the three-dimensional environment 550B, the avatar 517 corresponding to the user of the first electronic device 560 is located to the right of the viewpoint of the user of the second electronic device 570 and the avatar 519 corresponding to the user of the third electronic device (not shown) is located to the left of the viewpoint of the user of the second electronic device 570. In some examples, the movement of the avatars corresponding to the users, represented by the ovals 515A/517A/519A, is displayed with an animation, such that, at the first electronic device 560, the avatars 515 and 519, and at the second electronic device 570, the avatars 517 and 519, are gradually moved/repositioned relative to the viewpoints of the users of the first electronic device 560 and the second electronic device 570, respectively. It should be understood that, while the avatars 515 and 519 are discussed as being moved counterclockwise and the avatar 517 is discussed as being moved clockwise relative to the reference line 539, in some examples, the avatars 515 and/or 519 are alternatively moved clockwise and the avatar 517 is alternatively moved counterclockwise relative to the reference line 539 (e.g., based on a location of the placement location represented by square 541 as discussed above).

In some examples, as shown in FIG. 5F, the shared content corresponds to playback user interface 547, corresponding to the playback user interface 447 discussed previously above. As discussed above, the playback user interface 547 includes playback controls 556 and grabber or handlebar affordance 535 that is selectable to initiate movement of the playback user interface 547 in the three-dimensional environment 550B. Additionally, in some examples, as shown in FIG. 5F, the avatars 515/517/519, represented by the ovals 515A/517A/519A, are oriented to face toward the playback user interface 547 in the shared three-dimensional environment. In some examples, a separation between adjacent avatars 515/517/519 in the spatial group 540 is determined in accordance with the approaches described similarly above with reference to FIGS. 4A-4N. For example, as previously discussed above with reference to FIG. 4G, because the shared content in FIG. 5F is the playback user interface 547 (e.g., which is content of the second type as previously discussed above), the avatar 515, represented by the oval 515A, is separated from the avatar 517, represented by the oval 517A, by a distance (e.g., second distance 431B in FIG. 4G) that is based on the size of the playback user interface 547, and the avatar 517, represented by the oval 517A, is separated from the avatar 519, represented by the oval 519A, by the same. Accordingly, as discussed above, when content is shared for display in the shared three-dimensional environment, the locations of the avatars corresponding to the users (e.g., including the viewpoints of the users) in the spatial group 540 are updated (e.g., repositioned/moved) with a directionality (e.g., clockwise or counterclockwise direction) that is based on the location at which the shared content is displayed in the shared three-dimensional environment.

In some examples, the approach above of moving/shifting the avatars about the reference line 539 allows a context of the spatial arrangement of the users to be preserved when the playback user interface 547 is displayed in the shared three-dimensional environment. For example, in FIG. 5C, before the playback user interface 547 is displayed, in the spatial group 540, the user interface object 530, represented by the rectangle 530A, is located to the right of the viewpoint of the user of the first electronic device 560, and the avatar 515 corresponding to the user of the second electronic device 570, represented by the oval 515A, is located to the left of the viewpoint of the user of the first electronic device 560, represented by the oval 517A. In FIG. 5F, after the playback user interface 547, represented by rectangle 547A, is displayed in the shared three-dimensional environment, in the spatial group 540, the avatar 515, represented by the oval 515A, is still located to the left of the viewpoint of the user of the first electronic device 560, represented by the oval 517A, and the playback user interface 547, represented by the rectangle 547A, which corresponds to the user interface object 530, is still located to the right (and forward) of the viewpoint of the user of the first electronic device 560.

In some examples, if the playback user interface 547 ceases to be shared and/or displayed in the three-dimensional environments 550A/550B (e.g., in response to user input), the avatars 515/517/519 are rearranged in the spatial group 540 to have a conversational arrangement, as similarly shown in FIG. 5A. Alternatively, in some examples, if the playback user interface 547 ceases to be shared and/or displayed in the three-dimensional environments 550A/550B, the avatars 515/517/519 are returned to their previous arranged just prior to the sharing of the playback user interface 547, as similarly shown in FIG. 5B.

In some examples, the locations of the avatars corresponding to the users (e.g., including the viewpoints of the users) are repositioned in the spatial group 540 when a respective user in the multi-user communication session toggles their avatar off. For example, in FIG. 5G, while the user of the first electronic device 560, the user of the second electronic device 570, and the user of the third electronic device (not shown) are in the multi-user communication session, the second electronic device 570 detects an input corresponding to a request to toggle off the avatar 515 corresponding to the user of the second electronic device 570 in the multi-user communication session. As an example, as shown in FIG. 5G, the three-dimensional environment 550B includes user interface element 520 for controlling display of the avatar 515 corresponding to the user of the second electronic device 570 in the multi-user communication session, such as via selectable option 521.

Figure 5G:
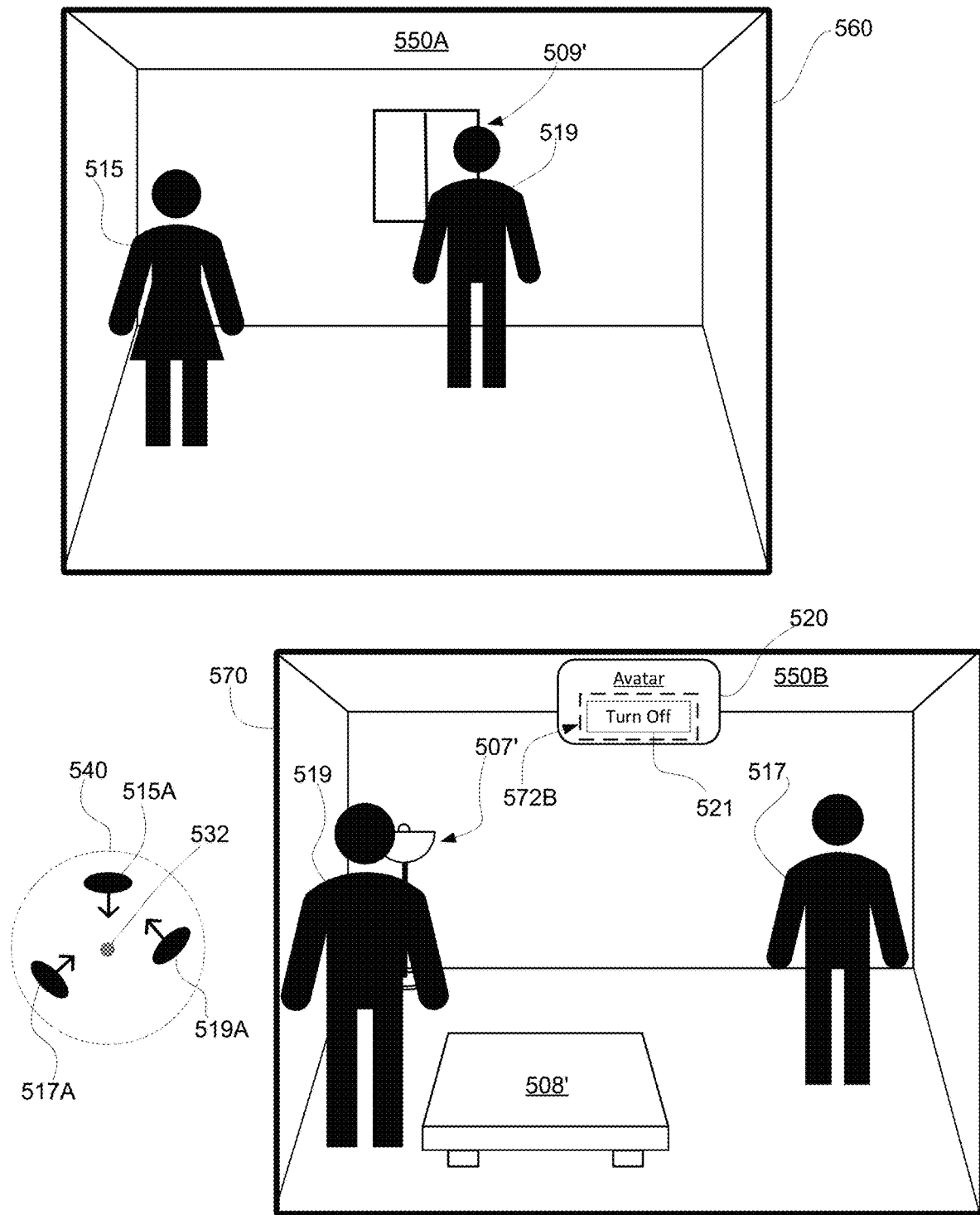
FIGS. 5A-5S illustrate example interactions among users in a multi-user communication session according to some examples of the disclosure.

In FIG. 5G, while displaying the user interface element 520 that includes the selectable option 521, the second electronic device 570 detects a selection input 572B directed to the selectable option 521 in the three-dimensional environment 550B. For example, as similarly discussed above, the second electronic device 570 detects an air pinch gesture, a tap or touch gesture, a gaze dwell, a verbal command, etc. corresponding to a request to select the selectable option 521 in the three-dimensional environment 550B.

In some examples, as shown in FIG. 5H, in response to detecting the selection of the selectable option 521, the second electronic device 570 initiates a process to cease display of the avatar 515 corresponding to the user of the second electronic device 570 in the multi-user communication session. For example, as shown in FIG. 5H, at the first electronic device 560, the avatar 515 corresponding to the user of the second electronic device 570 is no longer displayed in the three-dimensional environment 550A. Additionally, at the second electronic device 570, because the user of the second electronic device 570 is no longer represented spatially by an avatar in the multi-user communication session, the second electronic device 570 initiates a process for replacing display of the avatars 517 and 519 corresponding to the users of the first electronic device 560 and the third electronic device (not shown), respectively, with two-dimensional representations, as discussed in more detail below.

In some examples, when the avatar 515 corresponding to the user of the second electronic device 570 ceases to be displayed in the shared three-dimensional environment, the locations of the avatars corresponding to the users (e.g., including the viewpoints of the users) of the first electronic device 560 and the third electronic device (not shown) are updated (e.g., repositioned) in the spatial group 540 in the multi-user communication session. In some examples, as similarly discussed above, the locations of the avatars (e.g., including the viewpoints of the users), represented by the ovals 517A/519A, are repositioned based on the location at which the avatar corresponding to the user of the second electronic device 570 (e.g., including the viewpoint of the user of the second electronic device 570) occupied in the spatial group 540. For example, as shown in FIG. 5H, the location in the spatial group 540 that was occupied by the avatar 515 corresponding to the user of the second electronic device 570 is represented by square 543. As similarly discussed above, a reference line 539 may be established between the location represented by the square 543 and the center 532 of the spatial group 540. In some examples, when the avatars corresponding to the users (e.g., including the viewpoints of the users) of the first electronic device 560 and the third electronic device (not shown), represented by the ovals 517A/519A, are repositioned in the spatial group 540, the avatars are moved (e.g., with an animation) with a directionality (e.g., clockwise or counter-clockwise direction) about the reference line 539 in FIG. 5H. For example, as shown by the arrows in FIG. 5H, the avatar 519, represented by the oval 519A, is shifted clockwise away from the reference line 539 and the avatar 515, represented by the oval 515A, is shifted counterclockwise away from the reference line 539 in the spatial group 540.

Accordingly, in some examples, as shown in FIG. 5I, when the locations of the avatars corresponding to the users (e.g., including the viewpoints of the users) of the first electronic device 560 and the third electronic device (not shown) are shifted in the spatial group 540, at the first electronic device 560, the avatar 519 corresponding to the user of the third electronic device is located to the right of the viewpoint of the user of the first electronic device 560. Additionally, as shown in FIG. 5I, the three-dimensional environment 550A is updated to include a two-dimensional representation 525 corresponding to the user of the second electronic device 570, as similarly discussed herein. In some examples, as shown in FIG. 5I, the avatars 517 and 519, represented by the ovals 517A and 519A, are oriented to face toward the two-dimensional representation 525 in the shared three-dimensional environment.

Additionally, as shown in FIG. 5I, at the second electronic device 570, the three-dimensional environment 550B is updated to include a two-dimensional representation 527 corresponding to the user of the first electronic device 560 and a two-dimensional representation 529 corresponding to the user of the third electronic device (not shown). In some examples, because the user of the second electronic device 570 has toggled their avatar off in the multi-user communication session, the user of the second electronic device 570 no longer experiences spatial truth with the users of the first electronic device 560 and the third electronic device (e.g., via their respective avatars). Accordingly, as discussed above, when a respective user in the multi-user communication session causes their avatar to no longer be displayed in the shared three-dimensional environment, the locations of the avatars corresponding to the other users (e.g., including the viewpoints of the users) in the spatial group 540 are updated (e.g., repositioned/moved) with a directionality (e.g., clockwise or counter-clockwise direction) that is based on the location previously occupied by the respective user (e.g., via their avatar) in the shared three-dimensional environment.

In some examples, if the user of the second electronic device 570 provides input to toggle on the avatar 515 corresponding to the user of the second electronic device 570, when the avatar 515 corresponding to the user of the second electronic device 570 is redisplayed in the three-dimensional environments 550A/550B, the avatars 515/517/519 are rearranged in the spatial group 540 to have a conversational arrangement, as similarly shown in FIG. 5A. Alternatively, in some examples, if the user of the second electronic device 570 provides input to toggle on the avatar 515 corresponding to the user of the second electronic device 570, when the avatar 515 corresponding to the user of the second electronic device 570 is redisplayed in the three-dimensional environments 550A/550B, the avatars 515/517/519 are returned to their previous arrangement just prior to the ceasing display of the avatar 515 in the three-dimensional environments 550A/550B, as similarly shown in FIG. 5G.

In some examples, referring back to FIG. 5B, if a new user joins the multi-user communication session but does not have their avatar enabled for display in the shared three-dimensional environment (e.g., their avatar is toggled off, as similarly discussed above), the first electronic device 560 and the second electronic device 570 display a two-dimensional representation (e.g., similar to the two-dimensional representation 525 in FIG. 5I) corresponding to the new user in the three-dimensional environments 550A/550B. In some examples, because the new user had no prior spatial location within the spatial group 540, the electronic devices 560/570 may default to selecting a placement location for the two-dimensional representation that is to the left of the avatar 515 (e.g., to the left of the oval 515A in the spatial group 540). In some examples, the placement location for the two-dimensional representation is any other desired location, such as a user-specified location. In some examples, after the placement location for the two-dimensional representation is determined, the avatars 515/517/519 are rearranged relative to a reference line extending from the placement location in the manner discussed above.

In some examples, an arrangement of the avatars relative to a location at which content is shared and displayed in the shared three-dimensional environment is based on a location at which existing content is displayed in the shared three-dimensional environment. For example, in FIG. 5J, while the user of the first electronic device 560, the user of the second electronic device 570, and the user of the third electronic device (not shown) are in the multi-user communication session, two-dimensional representation 529 is displayed at a respective location in the three-dimensional environment 550A/550B. In some examples, the two-dimensional representation 529, represented by rectangle 529A in the spatial group 540, corresponds to the user of the third electronic device (e.g., the user of the third electronic device is currently in a non-spatial state), as similarly discussed above. Alternatively, in some examples, the two-dimensional representation 529 corresponds to a shared application window (e.g., similar to playback user interface 447) that is viewable by and interactive to the users in the multi-user communication session.

In FIG. 5K, the second electronic device 570 detects movement of the viewpoint of the user of the second electronic device 570. For example, as shown in FIG. 5K, the second electronic device 570 detects rotation of the head of the user rightward relative to the three-dimensional environment 550B, which causes the viewpoint of the second electronic device 570 to rotate rightward relative to the three-dimensional environment 550B. In some examples, when the viewpoint of the user changes, as shown in FIG. 5K, the portion of the physical environment that is visible in the three-dimensional environment 550B shifts in accordance with the movement of the viewpoint. For example, as shown in FIG. 5K, the representation of the coffee table 508' is shifted leftward in the current field of view and a greater portion of the right side wall is visible in the current field of view.

Additionally, in FIG. 5K, the user of the second electronic device 570 has initiated a process to share content in the three-dimensional environment 550A/550B. For example, as shown in FIG. 5K, the second electronic device 570 is displaying user interface object 544 associated with a respective application running on the second electronic device 570. In some examples, as shown in FIG. 5K and as similarly discussed above, the user interface object 544 includes option 543A that is selectable to initiate a process to display shared content (e.g., "Content C") corresponding to the respective application in the shared three-dimensional environment. In the example of FIG. 5K, the user interface object 544, represented by rectangle 544A in the spatial group 540, is a private object that is only viewable by and interactive to the user of the second electronic device 570, as previously discussed herein.

In FIG. 5K, the second electronic device 570 detects a selection input 572C directed to the option 543A in the user interface object 544 in the three-dimensional environment 550B. For example, as similarly discussed above, the second electronic device 570 detects the user of the second electronic device 570 provide a pinch input (e.g., in which the index finger and the thumb of the hand of the user make contact) while the gaze of the user is directed toward the option 543A (or other suitable input such as a tap input, a verbal command, gaze for more than a threshold period of time, etc.).

In some examples, in response to receiving the selection of the option 543A in the user interface object 544, the second electronic device 570 initiates a process to share and display content associated with the user interface object 544 in the shared three-dimensional environment. In some examples, as similarly discussed above, when shared content is displayed in the shared three-dimensional environment, the spatial group 540 is updated such that the avatars 515/517 are repositioned in the shared three-dimensional environment based on a location at which the shared content is to be displayed. In some examples, the location at which the shared content is to be displayed corresponds to the location at which existing content is displayed in the shared three-dimensional environment. For example, as shown in FIG. 5L, square 541 represents a placement location for the shared content in the shared three-dimensional environment. In some examples, as shown in FIG. 5L, the placement location is selected based on the location of the two-dimensional representation 529, represented by the rectangle 529A in the spatial group 540 in FIG. 5K. For example, as shown in FIG. 5L, the square 541 representing the placement location is located at the location of the rectangle 529A in FIG. 5K.

In some examples, as shown in FIG. 5M, when the shared content is displayed in the three-dimensional environment 550A/550B, the shared content is displayed at the location of the placement location represented by square 541 in the spatial group 540 in FIG. 5L. For example, as shown in FIG. 5M, the shared content corresponds to media player user interface 545 (e.g., corresponding to media player user interface 445 discussed above), represented by rectangle 545A in the spatial group 540, including a plurality of media controls 546 (e.g., corresponding to plurality of media controls 446 discussed above). In some examples, as shown in FIG. 5M, when the media player user interface 545 is displayed at the first electronic device 560, the media player user interface 545 replaces display of the two-dimensional representation 529 in the three-dimensional environment 550A at the placement location. Additionally, in some examples, as shown in FIG. 5M, the two-dimensional representation 529 is redisplayed as an object docked to the side of (e.g., to the left or to the right of) the media player user interface 545. For example, though the two-dimensional representation 529 is illustrated in FIG. 5M as being displayed to the right of the media player user interface 545, the two-dimensional representation 529 may alternatively be displayed to the left of the media player user interface 545 (e.g., based on preserving a prior arrangement of the two-dimensional representation 529 relative to the user of the first electronic device 560 in FIG. 5L). Alternatively, in some examples, if the two-dimensional representation 529 corresponds to a shared application window, the first electronic device 560 and the second electronic device 570 cease displaying the two-dimensional representation 529 in the three-dimensional environment 550A/550B. Accordingly, as shown in FIG. 5M, the avatars corresponding to the users in the multi-user communication session are not repositioned (e.g., shifted/moved) relative to the placement location represented by square 541, which is the location of the two-dimensional representation 529 (or other existing shared content) in the three-dimensional environment 550A/550B prior to the user of the second electronic device 570 providing input to share the media player user interface 545 in the three-dimensional environment 550A/550B. As such, in FIG. 5M, at the first electronic device 560, the avatar 515 corresponding to the user of the second electronic device 570 remains displayed to the right of the viewpoint of the user of the first electronic device 560, and at the second electronic device 570, the avatar 517 corresponding to the user of the first electronic device 560 remains displayed to the left of the viewpoint of the user of the second electronic device 570 when the media player user interface 545 is shared and displayed in the three-dimensional environment 550A/550B.

Further, in some examples, in line with the above, at the first electronic device 560, when the media player user interface 545 is shared and displayed in the three-dimensional environment 550A, the two-dimensional representation 529 remains displayed at the same location relative to the viewpoint of the user of the first electronic device 560. For example, the two-dimensional representation 529 is optionally displayed with a reduced size in the three-dimensional environment 550A and is shifted rightward (or leftward) in the three-dimensional environment 550A when the media player user interface 545 is displayed, but the two-dimensional representation 529 and the media player user interface 545 occupy the same location in the three-dimensional environment 550A as the two-dimensional representation 529 in FIG. 5K relative to the viewpoint of the user of the first electronic device 560 prior to the media player user interface 545 being shared in the multi-user communication session. Additionally, in some examples, at the first electronic device 560, the avatar 515 corresponding to the user of the second electronic device 570 is angled/rotated relative to the viewpoint of the user of the first electronic device 560 to be facing toward a location that is based on a location at which the user interface object 544 was displayed at the second electronic device 570 in FIG. 5K when the content (e.g., media player user interface 545) was shared in the multi-user communication session. In some examples, as shown in FIG. 5M, at the second electronic device 570, when the media player user interface 545 is shared and displayed in the three-dimensional environment 550B, the media player user interface 545 and the two-dimensional representation 529 are displayed in place of the user interface object 544 in FIG. 5K from the viewpoint of the user of the second electronic device 570. For example, from the viewpoint of the user of the second electronic device 570, the two-dimensional representation 529 is reduced in size and is optionally moved in the three-dimensional environment 550B based on the location of the two-dimensional representation 529 relative to the user interface object 544 in FIG. 5K (e.g., the distance between and the orientation of the two-dimensional representation 529 relative to the user interface object 544). Further, in some examples, from the viewpoint of the user of the second electronic device 570, the avatar 517 corresponding to the user of the first electronic device 560 is moved in the three-dimensional environment 550B based on the location of the avatar 517 relative to the user interface object 544 in FIG. 5K (e.g., the distance between and the orientation of the avatar 517 relative to the user interface object 544).

In some examples, the placement location for the shared content is alternatively selected relative to the viewpoint of the user who provided input for sharing the content in the shared three-dimensional environment. In FIG. 5N, the while the user of the first electronic device 560, the user of the second electronic device 570, and the user of the third electronic device (not shown) are in the multi-user communication session, the user of the first electronic device 560 has initiated a process to share content in the shared three-dimensional environment. For example, as shown in FIG. 5N, the first electronic device 560 is displaying user interface object 530, represented by rectangle 530A in the spatial group 540, that is associated with a respective application running on the first electronic device 560. In some examples, as shown in FIG. 5N and as similarly discussed above, the user interface object 530 includes option 523A that is selectable to initiate a process to display shared content corresponding to the respective application in the shared three-dimensional environment. In the example of FIG. 5N, the user interface object 530 is a private object that is only viewable by and interactive to the user of the first electronic device 560, as previously discussed herein.

In FIG. 5N, the first electronic device 560 detects a selection input 572D directed to the option 523A in the user interface object 530 in the three-dimensional environment 550A. For example, as similarly discussed above, the first electronic device 560 detects the user of the first electronic device 560 providing a pinch input (e.g., in which the index finger and the thumb of the hand of the user make contact) while the gaze of the user is directed toward the option 523A (or other suitable input such as a tap input, a verbal command, gaze for more than a threshold period of time, etc.).

In some examples, in response to receiving the selection of the option 523A in the user interface object 530, the first electronic device 560 initiates a process to share and display content associated with the user interface object 530 in the shared three-dimensional environment. In some examples, when shared content is displayed in the shared three-dimensional environment containing to existing shared content (e.g., no existing canvas), as similarly discussed above, the spatial group 540 is updated such that the avatars 515/517/519 are repositioned in the shared three-dimensional environment based on a location at which the shared content is to be displayed. For example, as shown in FIG. 5O, square 541 represents a placement location for the shared content in the shared three-dimensional environment. In some examples, the placement location is selected based on the location of the user interface object 530, represented by the rectangle 530A in the spatial group 540, in FIG. 5N. For example, as shown in FIG. 5O, the square 541 representing the placement location is located at the location of the rectangle 530A in FIG. 5N.

In some examples, when the placement location for the shared content is determined, a reference line 539 is established between the placement location, represented by the square 541, and the location of the user of the first electronic device 560, represented by oval 517A in the spatial group 540, as shown in FIG. 5O. Particularly, the reference line 539 is established between the placement location represented by square 541 and the viewpoint of the user sharing the content in the shared three-dimensional environment. In some examples, as similarly discussed above, the avatars corresponding to the users (e.g., including the viewpoints of the users) in the multi-user communication session are repositioned (e.g., shifted/moved) relative to the reference line 539. In some examples, as indicated in FIG. 5O, the avatars (e.g., including the viewpoints of the users) are moved/shifted (e.g., radially) relative to the reference line 539 to be positioned in front of and facing the placement location represented by square 541. For example, as shown by the arrows in FIG. 5O, the avatar 519, represented by the oval 519A, is shifted clockwise around the reference line 539 and the avatar 515, represented by the oval 515A, is shifted counterclockwise around the reference line 539 in the spatial group 540. As discussed above, because the reference line 539 is determined based on the viewpoint of the user of the first electronic device 560, the avatar 517, represented by the oval 517A, is not shifted (e.g., clockwise or counterclockwise) relative to the reference line 539 in the spatial group 540. Accordingly, in some examples, as shown in FIG. 5P, when the shared content is displayed in the shared three-dimensional environment, the avatars (e.g., including the viewpoints of the users), represented by the ovals 515A/519A, corresponding to the users other than the user who shared the content are repositioned in the spatial group 540 such that, at the first electronic device 560, the avatar 515 corresponding to the user of the second electronic device 570 is located to the left of (e.g., counterclockwise movement relative to) the viewpoint of the user of the first electronic device 560 and the avatar 519 corresponding to the user of the third electronic device (not shown) is located to the right of (e.g., clockwise movement relative to) the viewpoint of the user of the first electronic device 560. Similarly, as shown in FIG. 5P, at the second electronic device 570, when the shared content is displayed in the three-dimensional environment 550B, the avatar 517 corresponding to the user of the first electronic device 560 and the avatar 519 corresponding to the user of the third electronic device (not shown) are located to the right of the viewpoint of the user of the second electronic device 570. In some examples, as similarly discussed above, the movement of the avatars corresponding to the users, represented by the ovals 515A/517A/519A, is displayed with an animation.

Alternatively, in some examples, the arrangement of the users in the spatial group 540 when the content discussed above is shared in the multi-user communication session is determined based on a position of each user relative to a midpoint of the reference line 539. For example, individual lines may be established between the midpoint of the reference line 539 to each of the ovals 515A, representing the user of the second electronic device 570, and 519A, representing the user of the third electronic device (not shown), in the spatial group 540 in FIG. 5O. The order of the individual lines relative to the reference line 539 may be used to determine the arrangement of the users in the spatial group 540 shown in FIG. 5P. For example, because the individual line drawn between the oval 515A and the midpoint of the reference line 539 is to the left of the reference line 539, the avatar 515 is positioned to the left of the viewpoint of the user of the first electronic device 560, represented by the oval 517A, and because the individual line drawn between the oval 517A and the midpoint of the reference line 539 is to the right of the reference line 539, the avatar 517 is positioned to the right of the viewpoint of the user of the first electronic device 560, as shown at the first electronic device 560 in FIG. 5P.

In some examples, as shown in FIG. 5P, the shared content corresponds to playback user interface 547, corresponding to the playback user interface 447 discussed previously above. As discussed above, the playback user interface 547 includes playback controls 556 and grabber or handlebar affordance 535 that is selectable to initiate movement of the playback user interface 547 in the three-dimensional environment 550B. Additionally, in some examples, as shown in FIG. 5P, the avatars 515/517/519, represented by the ovals 515A/517A/519A, are oriented to face toward the playback user interface 547 in the shared three-dimensional environment. Accordingly, as outlined above, in some examples, when content is shared in the shared three-dimensional environment, the users other than the user who shared the content in the spatial group 540 are repositioned within the shared three-dimensional environment relative to the location of the user who shared the content.

In some examples, in accordance with a determination that an event occurs for updating the spatial arrangement of the users within the spatial group 540 that is not associated with a user who is currently in a spatial state within the multi-user communication session, the users are rearranged in the shared three-dimensional environment at least in part based on an average detected orientation of the users' respective electronic devices. For example, as mentioned previously above, the electronic devices discussed herein are worn on a head of a particular user during use, such that the orientation of a particular electronic device is determined by an orientation of the head of the user (e.g., a particular degree of rotation along the pitch, yaw, and/or roll directions).

Figure 5Q:
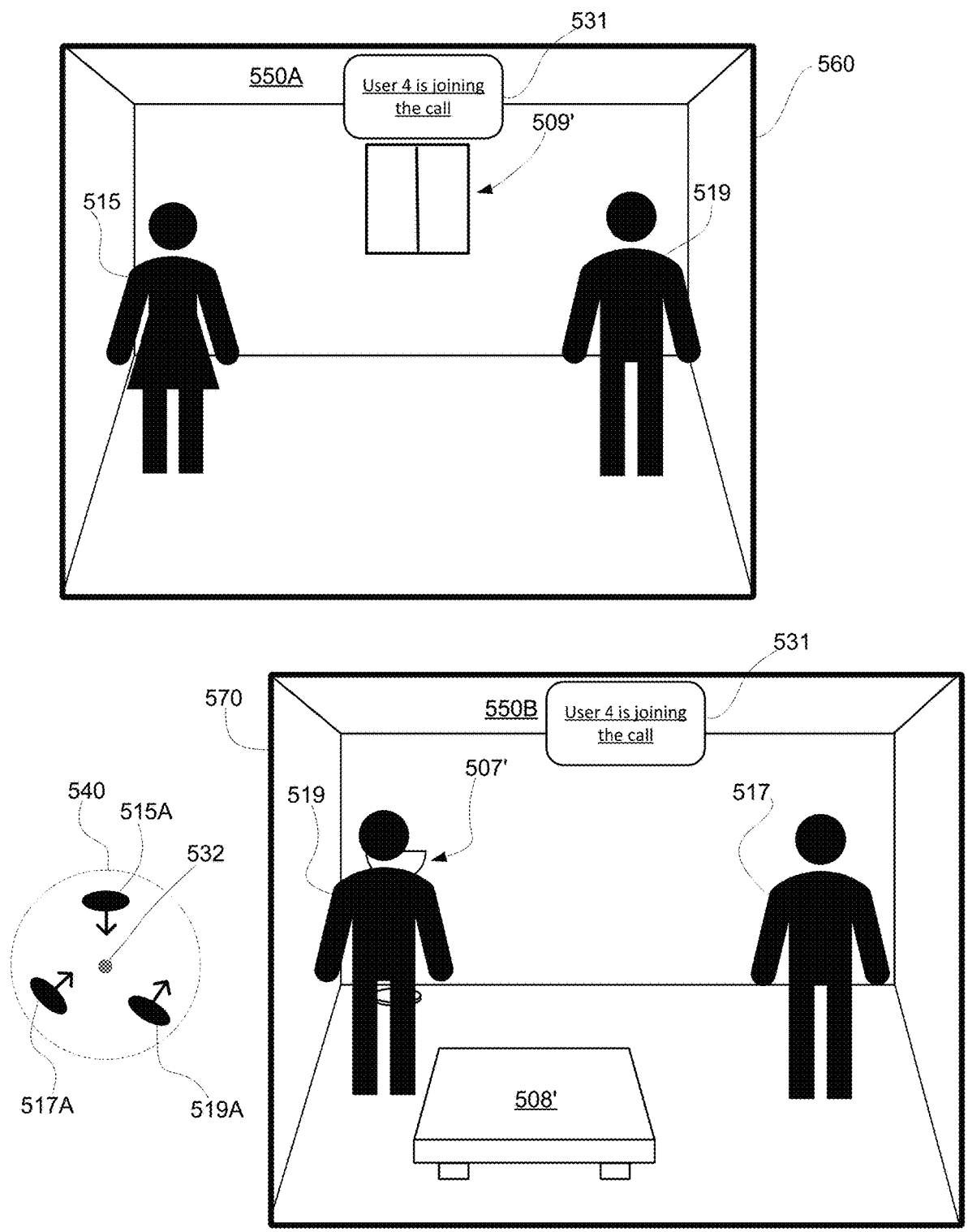

In FIG. 5Q, while the user of the first electronic device 560, the user of the second electronic device 570, and the user of the third electronic device (not shown) are in a spatial state in the multi-user communication session, their avatars (e.g., avatars 515/517/519) are displayed with respective orientations determined based on the orientations of the heads of the users. For example, as shown in the FIG. 5Q, the user of the first electronic device 560, represented by oval 517A, and the user of the third electronic device, represented by oval 519A, have orientations directed leftward and rightward, respectively, relative to the direction from the respective user to the center, in the spatial group 540, and the user of the second electronic device 560, represented by oval 515A, has an orientation directed forward (e.g., straight ahead) in the spatial group 540 (e.g., neutral with respect to the direction from the respective user at the center). Accordingly, in FIG. 5Q, at the first electronic device 560, the avatar 515 corresponding to the user of the second electronic device 570 is oriented to face rightward in the shared three-dimensional environment relative to the viewpoint of the first electronic device 560. Additionally, the avatar 519 corresponding to the user of the third electronic device is oriented to face away from the viewpoint of the user of the first electronic device 560 but toward a same direction as a forward-facing direction of the user of the first electronic device 560. Similarly, as shown in FIG. 5Q, at the second electronic device 570, the avatar 517 corresponding to the user of the first electronic device 560 and the avatar 519 corresponding to the user of the third electronic device are oriented to face leftward relative to the viewpoint of the user of the second electronic device 570.

In FIG. 5Q, an event occurs that causes the spatial arrangement of the users in the spatial group 540 to be updated. For example, in FIG. 5Q, the first electronic device 560, the second electronic device 570, and/or the third electronic device (not shown) detect a new user joining the multi-user communication session (e.g., a user of a fourth electronic device (not shown)). In some examples, as shown in FIG. 5Q, in response to detecting the new user joining the multi-user communication session, the first electronic device 560 and the second electronic device 570 display visual indication 531 in the shared three-dimensional environment indicating that a new user (e.g., "User 4") is joining the multi-user communication session.

In some examples, when the new user (e.g., the user of the fourth electronic device (not shown)) joins the multi-user communication session, the new user is in a non-spatial state. For example, as similarly discussed above, when the user of the fourth electronic device (not shown) joins the spatial group 540, the user of the fourth electronic device is represented by a two-dimensional representation in the shared three-dimensional environment rather than an avatar similar to the avatars 515/517/519 in FIG. 5R. In some examples, the user of the fourth electronic device joining the multi-user communication session in the non-spatial state corresponds to an event that causes the spatial arrangement of the users in the spatial group 540 to be updated. Accordingly, in some examples, the currently spatial users (e.g., the user of the first electronic device 560, the user of the second electronic device 570, and the user of the third electronic device (not shown)) are repositioned within the spatial group 540 when the first electronic device 560, the second electronic device 570, and the third electronic device (not shown) initiate display of a two-dimensional representation of the user of the fourth electronic device. In some examples, as described in more detail below, the spatial group 540 is updated such that the avatars 515/517/519 are repositioned in the shared three-dimensional environment based on a location at which the two-dimensional representation of the user of the fourth electronic device (not shown) is to be displayed.

In some examples, the placement location for the two-dimensional representation of the user of the second electronic device 570 is determined based on an average position of the users in the spatial group 540 and an average orientation of the electronic devices associated with the spatial users in the spatial group 540. As shown in FIG. 5R, an average center 532 of the spatial group 540 is determined based on the positions of the spatial users in the spatial group 540, which correspond to the locations of the ovals 515A/517A/519A. In some examples, the average orientation of the electronic devices is determined for those users who are currently in a spatial state in the spatial group 540 (e.g., excluding those users who are not in the spatial state). For example, as described previously above, the user of the first electronic device 560 and the user of the third electronic device (not shown) are both oriented to face rightward in the spatial group 540, which causes the orientations of the first electronic device 560 and the third electronic device to also be directed rightward, as indicated by the orientations of the ovals 517A and 519A in FIG. 5R. Similarly, as discussed above, the user of the second electronic device 570 is oriented to face forward in a direction toward the avatars 517/519, which causes the orientation of the second electronic device 570 to also be directed forward toward the avatars 517/519, as indicated by the orientation of the oval 515A in FIG. 5R. Accordingly, the average orientation of the first electronic device 560, the second electronic device 570, and the third electronic device is determined to be in a rightward direction in the spatial group 540, as shown in FIG. 5R. In some examples, the average orientation of the electronic devices is determined independent of a location and/or direction of gaze.

Alternatively, in some examples, the average orientation of the electronic devices is determined individually by the electronic devices relative to a nominal center of a field of view of each electronic device. For example, rather than averaging vectors corresponding to the orientation of the electronic devices in the manner discussed above, the positions of the users in the spatial group 540 relative to the center of the field of view of each user at each electronic device are determined, and the average orientation is determined based on the offsets of the positions.

In some examples, when the average center 532 and the average orientation are determined in the manners above, the placement location for the two-dimensional representation corresponding to the user of the fourth electronic device (not shown) may then be determined. In some examples, the placement location, represented by square 541, corresponds to a location in the spatial group 540 that is a predetermined distance away from the average center 532 and in the direction of the average orientation of the first electronic device 560, the second electronic device 570, and the third electronic device. For example, as shown in FIG. 5R, the placement location represented by square 541 for the two-dimensional representation of the user of the fourth electronic device is determined to be at a predetermined distance away from the average center 532 and in the direction of the average orientation of the first electronic device 560, the second electronic device 570, and the third electronic device (not shown).

In some examples, in accordance with a determination that the average direction of the orientations of the first electronic device 560, the second electronic device 570, and/or the third electronic device (not shown) are equal and opposite (e.g., is zero) due to the electronic devices being oriented to face in opposite directions, the determination of the placement location for the two-dimensional representation would be similar as one of the provided approaches above. For example, the placement location for the two-dimensional representation corresponding to the user of the fourth electronic device is selected arbitrarily and/or is selected based on the average center 532 of the spatial group 540 (e.g., irrespective of the orientations of the electronic devices).

In some examples, as similarly discussed above, when the placement location for the two-dimensional representation is determined, a reference line 539 is established between the placement location, represented by the square 541, and the average center 532 of the spatial group 540, as shown in FIG. 5R. Particularly, the reference line 539 is established between the placement location represented by square 541 and the average position of the spatial users in the shared three-dimensional environment. In some examples, as similarly discussed above, the avatars corresponding to the users (e.g., including the viewpoints of the users) in the multi-user communication session are repositioned (e.g., shifted/moved) relative to the reference line 539. In some examples, as indicated in FIG. 5R, the avatars (e.g., including the viewpoints of the users) are moved/shifted (e.g., radially) relative to the reference line 539 to be positioned in front of and facing the placement location represented by square 541. For example, as shown by the arrows in FIG. 5R, the avatar 515, represented by the oval 515A, and the avatar 517, represented by the oval 517A, are shifted counterclockwise around the reference line 539 in the spatial group 540, and the avatar 519, represented by the oval 519A, is shifted clockwise around the reference line 539. Accordingly, in some examples, as shown in FIG. 5S, when the two-dimensional representation 525, represented by rectangle 525A, is displayed in the shared three-dimensional environment, the avatars (e.g., including the viewpoints of the users), represented by the ovals 515A/517A/519A, corresponding to the users who are currently in the spatial state, are repositioned in the spatial group 540 such that, at the first electronic device 560, the avatar 515 corresponding to the user of the second electronic device 570 is located to the left of the viewpoint of the user of the first electronic device 560 and the avatar 519 corresponding to the user of the third electronic device (not shown) is located to the right of the viewpoint of the user of the first electronic device 560. Similarly, in some examples, as shown in FIG. 5S, at the second electronic device 570, the avatar 517 corresponding to the user of the first electronic device 560 and the avatar 519 corresponding to the user of the third electronic device (not shown) are located to the right of the viewpoint of the user of the second electronic device 570.

Accordingly, as outlined above, in some examples, when an event is detected that is associated with a user who is not currently in a spatial state and that causes the spatial arrangement of users in the spatial group 540 to be updated, the users currently in a spatial state within the spatial group 540 are repositioned within the shared three-dimensional environment based on the average position of the users and the average orientation of their respective electronic devices. It should be understood that, in the example shown in FIGS. 5Q-5S, the spatial arrangement of the users in the spatial group is updated irrespective of whether content is currently shared and displayed in the three-dimensional environments 550A/550B. For example, if content is shared in the spatial group 540 when a new user joins the multi-user communication session in a non-spatial state, the avatars corresponding to the users in the spatial group are repositioned in the same manner as discussed above (e.g., based on the average position of the users in the spatial state and the average orientation of their respective electronic devices) without considering the location and/or orientation of the shared content.

Thus, one advantage of the disclosed method of automatically repositioning users in a spatial group in a multi-user communication session with a directionality that is based on a location of shared content when the shared content is displayed in the shared three-dimensional environment is that a spatial context of an arrangement of the users may be preserved when the shared content is displayed, while also providing an unobscured view of the shared content in the shared three-dimensional environment and providing a visually seamless transition in the movement of the avatars corresponding to the users. As another benefit, automatically repositioning users in the spatial group in the multi-user communication session when a respective user causes their avatar to no longer be displayed in the shared three-dimensional environment helps reduce the need for input for manually repositioning themselves in the spatial group after the avatar corresponding to the respective user is no longer displayed.

As described above, while electronic devices are communicatively linked in a multi-user communication session, displaying shared content in the multi-user communication session causes relative locations of the users of the electronic devices to be updated based on the location of the shared content, including moving the avatars corresponding to the users in a direction relative to the location of the shared content. Attention is now directed to examples pertaining to selectively updating a number of "seats" (e.g., unoccupied spatial openings) within a spatial group of users in a multi-user communication session.

As used herein, a spatial group within the multi-user communication session may be associated with a plurality of seats that determines the spatial arrangement of the spatial group. For example, the spatial group is configured to accommodate a plurality of users (e.g., from two users up to "n" users) and each user of the plurality of users is assigned to (e.g., occupies) a seat of the plurality of seats within the spatial group. In some examples, when a user joins or leaves the multi-user communication session, a number of seats in the spatial group is selectively changed. For example, if a user joins the multi-user communication session, the number of seats in the spatial group is increased by one. On the other hand, if a user leaves the multi-user communication session, the number of seats in the spatial group is not decreased by one; rather, the number of seats in the spatial group is maintained until an event occurs that causes the number of seats to be reset to correspond to a current number of users in the multi-user communication session, as illustrated via the examples below. Accordingly, if a new user joins the multi-user communication session while a seat is unoccupied in the spatial group, the new user will be placed at the unoccupied seat within the spatial group, which results in fewer and/or less perceptible changes in the arrangement of avatars corresponding to the users in the shared three-dimensional environment.

Figure 6G:
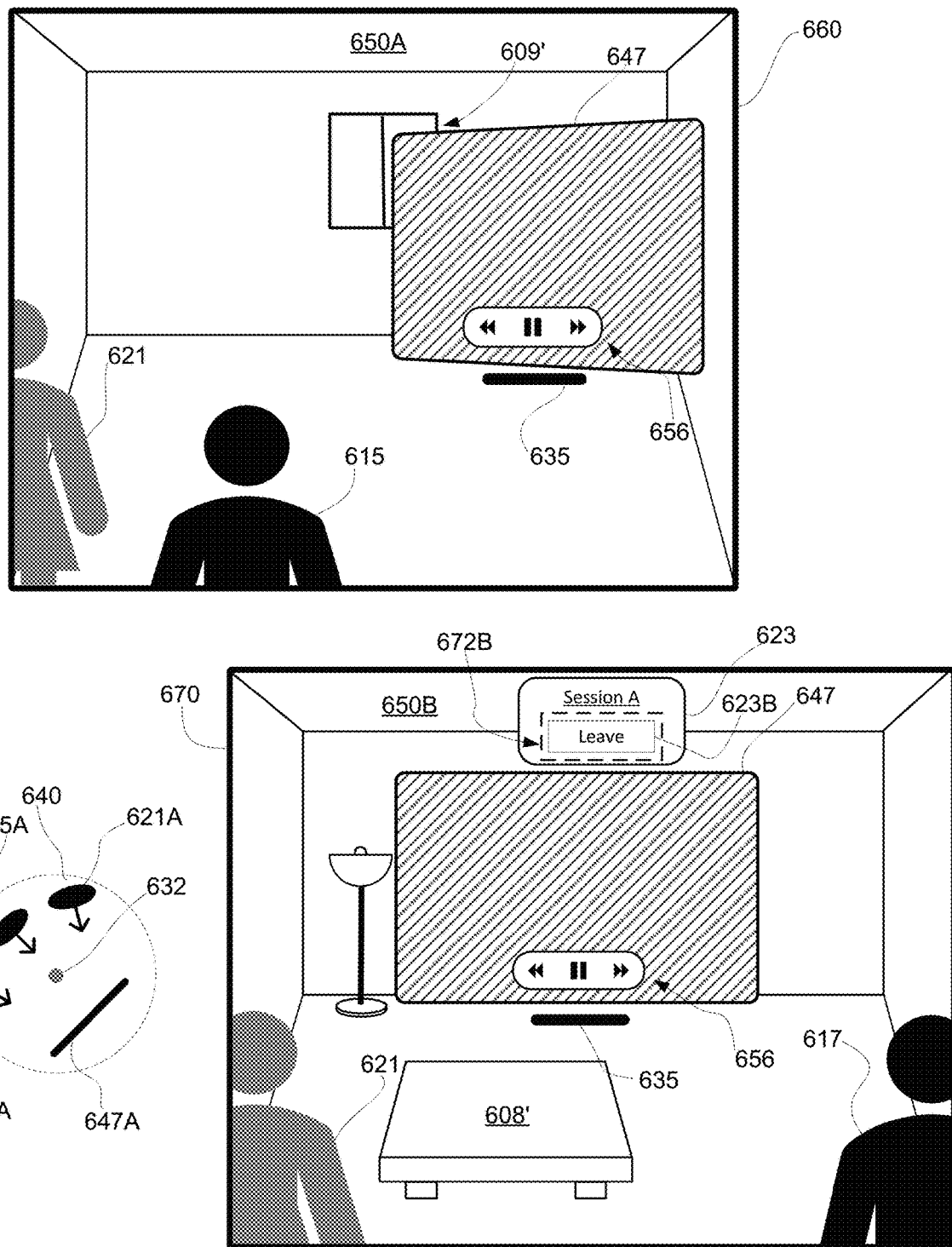

FIGS. 6A-6I illustrate example interactions among users in a multi-user communication session according to some examples of the disclosure. In some examples, a first electronic device 660, a second electronic device 670, and a third electronic device (not shown) may be communicatively linked in a multi-user communication session, as shown in FIG. 6A. In some examples, while the first electronic device 660 is in the multi-user communication session with the second electronic device 670 and the third electronic device (not shown), the three-dimensional environment 650A is presented using the first electronic device 660 and the three-dimensional environment 650B is presented using the second electronic device 670. It should be understood that it then follows that the third electronic device (not shown) is displaying a three-dimensional environment (not shown) akin to the three-dimensional environments 650A/650B. In some examples, the electronic devices 660/670 optionally correspond to electronic devices 560/570 discussed above, electronic devices 460/470 in FIGS. 4A-4F, and/or electronic devices 360/370 in FIG. 3. In some examples, the three-dimensional environments 650A/650B include optical see-through or video-passthrough portions of the physical environment in which electronic device 660/670 is located. For example, the three-dimensional environment 650A includes a window (e.g., representation of window 609'), and the three-dimensional environment 650B includes a coffee table (e.g., representation of coffee table 608') and a floor lamp (e.g., representation of floor lamp 607'). In some examples, the three-dimensional environments 650A/650B optionally correspond to three-dimensional environments 550A/550B described above, three-dimensional environments 450A/450B in FIGS. 4A-4F, and/or three-dimensional environments 350A/350B in FIG. 3. As described above, the three-dimensional environments also include avatars 615/617 corresponding to users of the electronic devices 670/660. In some examples, the avatars 615/617 optionally correspond to avatars 515/517 described above, avatars 415/417 in FIGS. 4A-4F, and/or avatars 315/317 in FIG. 3. Further, as shown in FIG. 6A, the three-dimensional environments 650A/650B also include an avatar 619 corresponding to a user of the third electronic device (not shown).

As previously discussed herein, in FIG. 6A, the user of the first electronic device 660, the user of the second electronic device 670, and the user of the third electronic device (not shown) may be arranged according to a spatial group 640 (e.g., an initial or baseline spatial group, such as a conversational spatial group) within the multi-user communication session. In some examples, the spatial group 640 optionally corresponds to spatial group 540 discussed above, spatial group 440 discussed above with reference to FIGS. 4A-4F, and/or spatial group 340 discussed above with reference to FIG. 3. As similarly described above, while the user of the first electronic device 660, the user of the second electronic device 670, and the user of the third electronic device (not shown) are in the spatial group 640 within the multi-user communication session, the users have a spatial arrangement in the shared three-dimensional environment (e.g., represented by the locations of and/or distance between the ovals 615A, 617A, and 619A in the spatial group 640 in FIG. 6A), such that the first electronic device 660, the second electronic device 670, and the third electronic device (not shown) maintain consistent spatial relationships (e.g., spatial truth) between locations of the viewpoints of the users (e.g., which correspond to the locations of the ovals 617/615/619) and virtual content at each electronic device. Additionally, as shown in FIG. 6A, in the spatial group 640, the avatars (e.g., represented by their ovals 615A, 619A, and 617A) are displayed with respective orientations that cause the avatars to face toward a center 632 of the spatial group 640.

In some examples, as similarly discussed above, the spatial group 640 may be associated with a plurality of "seats" (e.g., predetermined spatial openings) in the shared three-dimensional environment that are configured to be occupied by one or more users in the multi-user communication session. For example, the plurality of seats determines the spatial arrangement of the spatial group 640 discussed above. In some examples the plurality of seats in the shared three-dimensional environment may generally be radially arranged around the center 632 of the spatial group 640, where each seat of the plurality of seats is positioned an equal distance from the center 632 and is separated by an adjacent seat by an equal distance, angle, and/or arc length relative to the center 632. In FIG. 6A, a location of each user (e.g., represented by the ovals 515A/517A/519A) in the spatial group 640 corresponds to a seat of the plurality of seats in the shared three-dimensional environment. In some examples, as discussed herein, a seat remains established in the spatial group 640 in the multi-user communication session, irrespective of whether a user (e.g., represented by their avatar) is occupying the seat, until an event occurs that causes the seat to be reset (e.g., cleared out) in the spatial group 640.

From FIG. 6A to FIG. 6B, the first electronic device 660 and the second electronic device 670 detect an indication that the user of the third electronic device (not shown) has left the multi-user communication session. For example, in FIG. 6B, the third electronic device (not shown) is no longer communicatively linked with the first electronic device 660 and the second electronic device 670 in the multi-user communication session. Accordingly, as shown in FIG. 6B, the first electronic device 660 and the second electronic device 670 update the three-dimensional environments 650A/650B, respectively, to no longer include the avatar 619 corresponding to the user of the third electronic device. Similarly, in FIG. 6B, the spatial group 640 no longer includes the user of the third electronic device (e.g., represented by the oval 619A).

In some examples, as alluded to above, despite the user of the third electronic device (not shown) no longer being in the multi-user communication session, a seat 638 associated with the user of the third electronic device (e.g., previously occupied by the user of the third electronic device) remains established in the spatial group 640. For example, as shown in FIG. 6B, the seat 638 is still included in the spatial group 640 despite the seat 638 being unoccupied by a user (e.g., by an avatar corresponding to the user, such as the user of the third electronic device as discussed above). In some examples, the unoccupied seat 638 may be represented in the shared three-dimensional environment visually. For example, the electronic devices display, in their respective three-dimensional environments, a visual indicator, such as a virtual ring, virtual orb/ball, or other virtual object or user interface element at a location in the three-dimensional environment corresponding to the seat 638. Alternatively, in some examples, the unoccupied seat 638 is visually represented by open space at the location corresponding to the seat 638 in the shared three-dimensional environment (e.g., rather than by a virtual user interface element).

In some examples, while the seat 638 is unoccupied in the spatial group 640, if a new user joins the multi-user communication session, the new user is placed at the seat 638 in the spatial group 640 (e.g., an avatar corresponding to the new user is displayed at a location in the shared three-dimensional environment that corresponds to the seat 638 in the spatial group 640). For example, from FIG. 6B to FIG. 6C, the first electronic device 660 and the second electronic device 670 detect an indication that a user of a fourth electronic device (not shown) has joined the multi-user communication session. For example, in FIG. 6C, the fourth electronic device (not shown) is communicatively linked with the first electronic device 660 and the second electronic device 670 in the multi-user communication session.

In some examples, as shown in FIG. 6C, when the user of the fourth electronic device (not shown) joins the multi-user communication session, the first electronic device 660 and the second electronic device 670 update the three-dimensional environments 650A/650B, respectively, to include an avatar 621 corresponding to the user of the fourth electronic device (not shown). In some examples, as mentioned above, when the user of the fourth electronic device joins the multi-user communication session, the user, represented by oval 621A, is placed/assigned to the seat 638 in FIG. 6B in the spatial group 640 (e.g., because the seat 638 was unoccupied when the user of the fourth electronic device joined). Accordingly, the avatar 621 corresponding to the user of the fourth electronic device (not shown) is displayed at a location in the shared three-dimensional environment that corresponds to the seat 638 in the spatial group 640.

As mentioned above, in some examples, if the spatial group 640 includes an unoccupied seat (e.g., such as seat 638), the seat remains established (e.g., included) in the spatial group 640 until an event occurs that causes the seat to be reset (e.g., cleared out) in the spatial group 640. In some examples, one such event includes the display of shared content in the multi-user communication session. In FIG. 6D, while the seat 638 is unoccupied in the spatial group 640, the second electronic device 670 detects an input corresponding to a request to display shared content in the three-dimensional environment 650B. For example, as shown in FIG. 6D, the three-dimensional environment 650B includes user interface object 630 (e.g., corresponding to user interface object 530 and/or user interface object 430 discussed above) associated with an application running on the second electronic device 670. In some examples, the user interface object 630, represented by rectangle 630A, is private to the user of the second electronic device 670, such that the user interface object 630 is only visible to the user of the first electronic device as a representation of the user interface object 630" in the three-dimensional environment 650A. In some examples, as previously discussed herein, the user interface object 630 includes option 623A that is selectable to display shared content (e.g., "Content A") in the three-dimensional environment 650B. As shown in FIG. 6D, the display of private content, such as the user interface object 630, does not cause the seat 638 to be reset (e.g., cleared out) in the spatial group 640.

In FIG. 6D, while displaying the user interface object 630 that includes the option 623A, the second electronic device 670 detects a selection input 672A directed to the option 623A in the three-dimensional environment 650B. For example, as similarly discussed above, the second electronic device 670 detects the user of the second electronic device 670 provide an air pinch gesture, an air tap or touch gesture, a gaze dwell, a verbal command, etc. corresponding to a request to select the option 623A.

In some examples, as shown in FIG. 6E, in response to detecting the selection of the option 623A, the second electronic device 670 displays playback user interface 647 associated with the user interface object 630. In some examples, the playback user interface 647 corresponds to playback user interface 547 and/or playback user interface 447 discussed above. In some examples, the playback user interface 647 includes playback controls 656 and a grabber or handlebar affordance 635 that is selectable to initiate movement of the playback user interface 657 in the three-dimensional environment 650B. As mentioned above, the playback user interface 647 is optionally displayed as a shared object in the three-dimensional environment 650B. Accordingly, the three-dimensional environment 650A at the first electronic device 660 is updated to include the playback user interface 647.

In some examples, when the playback user interface 647 is displayed in the three-dimensional environments 650A/650B, the spatial arrangement of the spatial group 640 is updated according to any of the exemplary methods discussed herein above. Additionally, as mentioned above, when the playback user interface 647, represented by rectangle 647A, is displayed in the three-dimensional environments 650A/650B, the spatial group 640 is updated to reset any unoccupied seats in the spatial group 640. Particularly, as shown in FIG. 6E, when the playback user interface 647, represented by the rectangle 647A, is displayed, the spatial group 640 is updated to no longer include the seat 638 of FIG. 6D. Accordingly, in FIG. 6E, the spatial group 640 is updated to include two seats, each occupied by the users of the first electronic device 660 and the second electronic device 670 (e.g., represented by the ovals 615A and 617A), respectively.

From FIG. 6E to FIG. 6F, while the playback user interface 647 is displayed in the three-dimensional environments 650A/650B, the first electronic device 660 and the second electronic device 670 detect the user of the fourth electronic device (not shown) join the multi-user communication session, as similarly discussed above. In some examples, as shown in FIG. 6F, the first electronic device 660 and the second electronic device 670 update the three-dimensional environments 650A/650B, respectively, to include the avatar 621 corresponding to the user of the fourth electronic device (not shown). In some examples, when the user of the fourth electronic device, represented by the oval 621A, joins the multi-user communication session, the spatial group 640 is updated to include a third seat that is occupied by the user of the fourth electronic device (e.g., by the avatar 621 in the shared three-dimensional environment), as shown in FIG. 6F. For example, in the spatial group 640, the location of the user of the first electronic device 660, represented by the oval 617A, and the location of the user of the second electronic device 670, represented by the oval 615A, are shifted to accommodate the user of the fourth electronic device, represented by the oval 621A and occupying the new third seat in the spatial group 640.

In FIG. 6G, while the user of the first electronic device 660, the user of the second electronic device 670, and the user of the fourth electronic device (not shown) are in the multi-user communication session, the second electronic device 670 detects an input corresponding to a request to leave the multi-user communication session. For example, as shown in FIG. 6G, the three-dimensional environment 650B includes user interface element 623 that includes selectable option 623B for initiating a process to leave the multi-user communication session. As shown in FIG. 6G, the second electronic device 670 may receive a selection input 672B directed to the selectable option 623B in the user interface element 623. For example, as similarly discussed above, the second electronic device 670 detects the user of the second electronic device 670 provide an air pinch gesture, a tap or touch gesture, a gaze dwell, a verbal command, etc. corresponding to a request to select the selectable option 623B in the three-dimensional environment 650B.

In some examples, as shown in FIG. 6H, in response to detecting the selection of the selectable option 623B, the second electronic device 670 terminates communication with the first electronic device 660 and the fourth electronic device (not shown) in the multi-user communication session. For example, as shown in FIG. 6H, in the spatial group 640, the user of the second electronic device 670, represented by the oval 615A, is no longer associated with the spatial group 640 in the multi-user communication session. Accordingly, as shown in FIG. 6H, the second electronic device 670 updates the three-dimensional environment 650B to no longer include the playback user interface 647, the avatar 617 corresponding to the user of the first electronic device 660, and the avatar 621 corresponding to the user of the fourth electronic device (not shown). In some examples, because the user of the second electronic device 670 is no longer in the multi-user communication session, the first electronic device 660 updates the three-dimensional environment 650A to no longer include the avatar 615 corresponding to the user of the second electronic device 670.

In some examples, as similarly discussed above, when the user of the second electronic device 670 is no longer associated with the spatial group 640, the spatial group 640 maintains seat 638 that was previously occupied by the user of the second electronic device 670 (e.g., by the avatar 615). In some examples, as mentioned above, the seat 638 remains established (e.g., included) in the spatial group 640 until an event occurs that causes the seat 638 to be reset (e.g., cleared out). In some examples, because the shared three-dimensional environment includes shared content (e.g., the playback user interface 647) in FIG. 6H, one such event that causes the seat 638 to be reset includes ceasing display of the shared content, as discussed below.

In the example of FIG. 6H, at the first electronic device 660, the playback user interface 647 may include exit affordance 651 that is selectable to stop sharing, and thus cease displaying, the playback user interface 647 in the shared three-dimensional environment. In FIG. 6H, while displaying the playback user interface 647 that includes the exit affordance 651, the first electronic device 660 detects a selection input 672C directed to the exit affordance 651. For example, the first electronic device 660 detects the user of the first electronic device 660 provide an air pinch gesture, a tap or touch gesture, a gaze dwell, a verbal command, etc. corresponding to a request to select the exit affordance 651.

In some examples, as shown in FIG. 6I, in response to detecting the selection of the exit affordance 651, the first electronic device 660 ceases displaying the playback user interface 647 in the three-dimensional environment 650A (e.g., which also causes the playback user interface 647 to no longer be displayed in the three-dimensional environment at the fourth electronic device (not shown)). In some examples, as shown in FIG. 6I, when the playback user interface 647 is no longer displayed in the shared three-dimensional environment, the spatial arrangement of the users in the spatial group 640 is updated to no longer include the seat 638 of FIG. 6H. For example, as discussed above, before ceasing display of the playback user interface 647, the seat 638 was unoccupied in the spatial group 640 (e.g., but was not yet reset/cleared). As shown in FIG. 6I, after the first electronic device 660 causes the playback user interface 647 to no longer be displayed in the shared three-dimensional environment (e.g., in response to detecting the selection of the exit affordance 651), the unoccupied seat 638 is no longer included in the spatial group 640. Accordingly, in FIG. 6I, when the locations of the users (e.g., and their corresponding avatars), represented by the ovals 617A and 621A, in the multi-user communication session are updated in the spatial group 640, at the first electronic device 660, the avatar 621 corresponding to the user of the fourth electronic device (not shown) is shifted/moved to be displayed directly across from the viewpoint of the user of the first electronic device 660 in the three-dimensional environment 650A. In some examples, updating the locations of the users in the spatial group 640 may be performed according to any of the approaches described previously herein.

Accordingly, as outlined above, while users are associated with a spatial group in a multi-user communication session, a seat belonging to a user who leaves the multi-user communication session will remain open such that a new user who joins the multi-user communication session will automatically occupy the open seat, until an event occurs that causes the open seat to be cleared out in the spatial group. Thus, as one advantage, the disclosed method helps avoid frequent and/or unnecessary shifting of avatars and/or viewpoints of users in a spatial group in the multi-user communication session, which could be distracting and/or otherwise disruptive for the users who are engaging in a shared experience within the multi-user communication session. Another advantage of the disclosed method is that, because the resetting of the number of seats in the spatial group coincides with a transition in the display of shared content in the multi-user communication session, one spatial arrangement update accounts for two transition events, which helps reduce power consumption.

It is understood that the examples shown and described herein are merely exemplary and that additional and/or alternative elements may be provided within the three-dimensional environments for interacting with the illustrative content. It should be understood that the appearance, shape, form and size of each of the various user interface elements and objects shown and described herein are exemplary and that alternative appearances, shapes, forms and/or sizes may be provided. For example, the virtual objects representative of user interfaces (e.g., private application window 330, user interface objects 430, 530 and 630 and/or user interfaces 445, 447, 547, and 647) may be provided in an alternative shape than a rectangular shape, such as a circular shape, triangular shape, etc. In some examples, the various selectable options (e.g., the options 423A, 523A, 623A, and 623B and/or the affordance 651), user interface elements (e.g., user interface elements 520 and/or 623), control elements (e.g., playback controls 456, 556 and/or 656), etc. described herein may be selected verbally via user verbal commands (e.g., "select option" verbal command). Additionally or alternatively, in some examples, the various options, user interface elements, control elements, etc. described herein may be selected and/or manipulated via user input received via one or more separate input devices in communication with the electronic device(s). For example, selection input may be received via physical input devices, such as a mouse, trackpad, keyboard, etc. in communication with the electronic device(s).

Figure 7B:
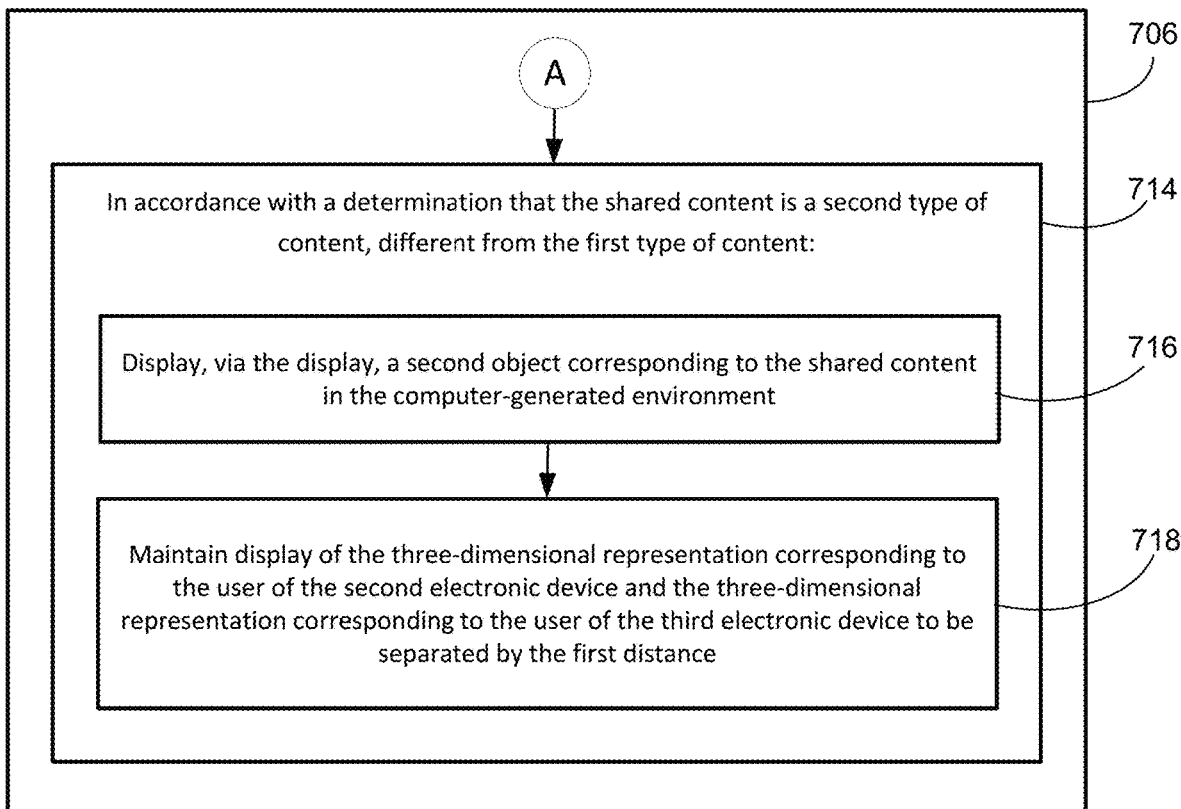

FIGS. 7A-7B illustrate a flow diagram illustrating an example process for updating a spatial group of users in a multi-user communication session based on content that is displayed in a three-dimensional environment according to some examples of the disclosure. In some examples, process 700 begins at a first electronic device in communication with a display, one or more input devices, a second electronic device, and a third electronic device. In some examples, the first electronic device, the second electronic device and the third electronic device are optionally a head-mounted display, respectively, similar or corresponding to devices 260/270 of FIG. 2. As shown in FIG. 7A, in some examples, at 702, while in a communication session with the second electronic device and the third electronic device, the first electronic device displays, via the display, a computer-generated environment including a three-dimensional representation corresponding to a user of the second electronic device and a three-dimensional representation corresponding to a user of the third electronic device, wherein the three-dimensional representation corresponding to the user of the second electronic device and the three-dimensional representation corresponding to the user of the third electronic device are separated by a first distance. For example, as shown in FIG. 4A, first electronic device 460 displays three-dimensional environment 450A that includes an avatar 415 corresponding to a user of second electronic device 470 and an avatar 419 corresponding to a user of a third electronic device (not shown), and the avatar 415, represented by oval 415A in spatial group 440, and the avatar 419, represented by oval 419A, are separated by a first distance 431A.

In some examples, at 704, while displaying the computer-generated environment including the three-dimensional representation corresponding to the user of the second electronic device and the three-dimensional representation corresponding to the user of the third electronic device, the first electronic device receives, via the one or more input devices, a first input corresponding to a request to display shared content in the computer-generated environment. For example, as shown in FIG. 4D, the second electronic device 470 detects a selection input 472A directed to option 423A that is selectable to display shared content (e.g., "Content A") in the three-dimensional environment 450B.

In some examples, at 706, in response to receiving the first input, at 708, in accordance with a determination that the shared content is a first type of content, at 710, the first electronic device displays, via the display, a first object corresponding to the shared content in the computer-generated environment. For example, as shown in FIG. 4G, in response to detecting the selection of the option 423B in FIG. 4F, the first electronic device 460 and the second electronic device 470 display playback user interface 447 in the three-dimensional environments 450A and 450B, respectively. In some examples, at 712, the first electronic device updates display of the three-dimensional representation corresponding to the user of the second electronic device and the three-dimensional representation corresponding to the user of the third electronic device, such that the three-dimensional representation corresponding to the user of the second electronic device and the three-dimensional representation corresponding to the user of the third electronic device are separated by a second distance, different from the first distance. For example, as shown in FIG. 4G, the playback user interface 447 corresponds to the first type of content because the playback user interface 447 is greater than a threshold size (e.g., threshold width, length, and/or area as discussed previously herein), which causes a spatial separation between adjacent users, such as between ovals 415A and 421A representing users in spatial group 440, to be decreased to second distance 431B.

In some examples, as shown in FIG. 7B, at 714, in accordance with a determination that the shared content is a second type of content, different from the first type of content, at 716, the first electronic device displays, via the display, a second object corresponding to the shared content in the computer-generated environment. For example, as shown in FIG. 4E, in response to detecting the selection of the option 423A, the first electronic device 460 and the second electronic device 470 display media player user interface 445 in the three-dimensional environments 450A and 450B, respectively. In some examples, at 718, the first electronic device maintains display of the three-dimensional representation corresponding to the user of the second electronic device and the three-dimensional representation corresponding to the user of the third electronic device to be separated by the first distance. For example, as shown in FIG. 4E, the media player user interface 445 corresponds to the second type of content because the media player user interface 445 is less than the threshold size (e.g., threshold width, length, and/or area as discussed previously herein), which causes the spatial separation between adjacent users, such as between ovals 415A and 421A representing users in the spatial group 440, to remain at the first distance 431A.

It is understood that process 700 is an example and that more, fewer, or different operations can be performed in the same or in a different order. Additionally, the operations in process 700 described above are, optionally, implemented by running one or more functional modules in an information processing apparatus such as general-purpose processors (e.g., as described with respect to FIG. 2) or application specific chips, and/or by other components of FIG. 2.

FIG. 8 illustrates a flow diagram illustrating an example process for moving three-dimensional representations of users within a multi-user communication session when sharing content in a three-dimensional environment according to some examples of the disclosure. In some examples, process 800 begins at a first electronic device in communication with a display, one or more input devices, a second electronic device and a third electronic device. In some examples, the first electronic device, the second electronic device and the third electronic device are optionally a head-mounted display, respectively, similar or corresponding to devices 260/270 of FIG. 2. As shown in FIG. 8, in some examples, at 802, while in a communication session with the second electronic device and the third electronic device, the first electronic device displays, via the display, a computer-generated environment including a three-dimensional representation corresponding to a user of the second electronic device at a first location and a three-dimensional representation corresponding to a user of the third electronic device at a second location, different from the first location, in the computer-generated environment relative to a viewpoint of the first electronic device. For example, as shown in FIG. 5B, first electronic device 560 displays three-dimensional environment 550A that includes an avatar 515 corresponding to a user of second electronic device 570 and an avatar 519 corresponding to a user of a third electronic device (not shown), and the avatar 515, represented by oval 515A is located at a first location in the spatial group 540, and the avatar 519, represented by oval 519A, is located at a second location in the spatial group 540.

In some examples, at 804, while displaying the computer-generated environment including the three-dimensional representation corresponding to the user of the second electronic device and the three-dimensional representation corresponding to the user of the third electronic device, the first electronic device receives, via the one or more input devices, a first input corresponding to a request to display content in the computer-generated environment. For example, as shown in FIG. 5C, the first electronic device 560 detects a selection input 572A directed to option 523A that is selectable to display content (e.g., "Content B") in the three-dimensional environment 550A. In some examples, at 806, in response to receiving the first input, in accordance with a determination that the content corresponds to shared content, at 808, the first electronic device displays, via the display, a first object corresponding to the shared content in the computer-generated environment. For example, as shown in FIG. 5F, in response to detecting the selection of the option 523A, the first electronic device 560 and the second electronic device 570 display playback user interface 547 in the three-dimensional environments 550A/550B, respectively.

In some examples, at 810, the first electronic device displays the three-dimensional representation corresponding to the user of the second electronic device at a first updated location and the three-dimensional representation corresponding to the user of the third electronic device at a second updated location, different from the first updated location, in the computer-generated environment relative to the viewpoint, including, at 812, moving the three-dimensional representation of the user of the second electronic device to the first updated location and moving the three-dimensional representation of the user of the third electronic device to the second updated location in a respective direction that is selected based on a location of the first object. For example, at shown in FIG. 5F, the avatar 515, represented by the oval 515A, is displayed at a first updated location in the spatial group 540, and the avatar 519, represented by the oval 519A, is displayed at a second updated location in the spatial group 540, which includes, as shown in FIG. 5E, moving the avatars 515 and 519 clockwise or counterclockwise relative to the placement location represented by square 541.

It is understood that process 800 is an example and that more, fewer, or different operations can be performed in the same or in a different order. Additionally, the operations in process 800 described above are, optionally, implemented by running one or more functional modules in an information processing apparatus such as general-purpose processors (e.g., as described with respect to FIG. 2) or application specific chips, and/or by other components of FIG. 2.

Figure 9A:
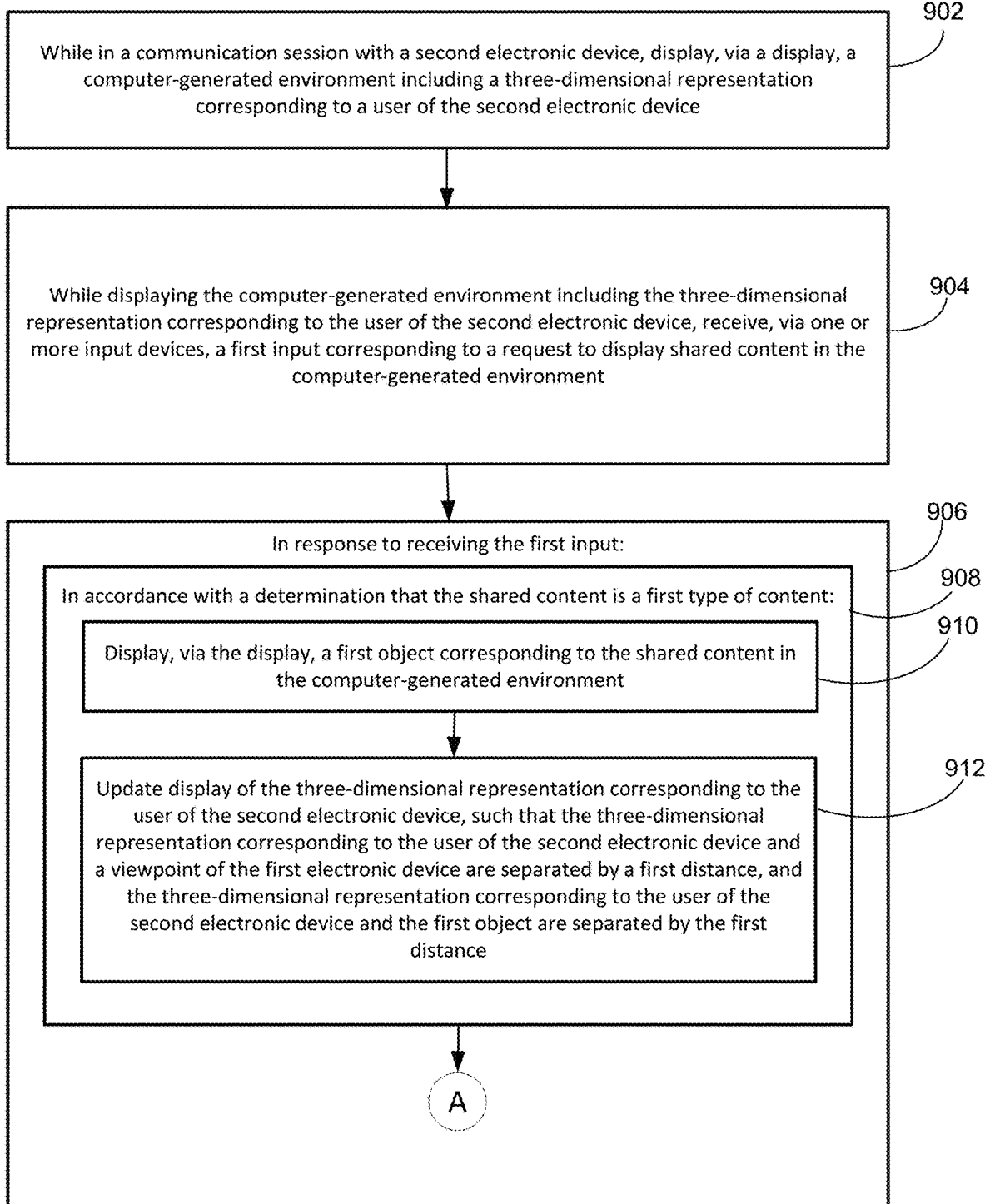
FIGS. 9A-9B illustrate a flow diagram illustrating an example process for updating a spatial group of users in a multi-user communication session based on content that is displayed in a three-dimensional environment according to some examples of the disclosure.
Figure 9B:
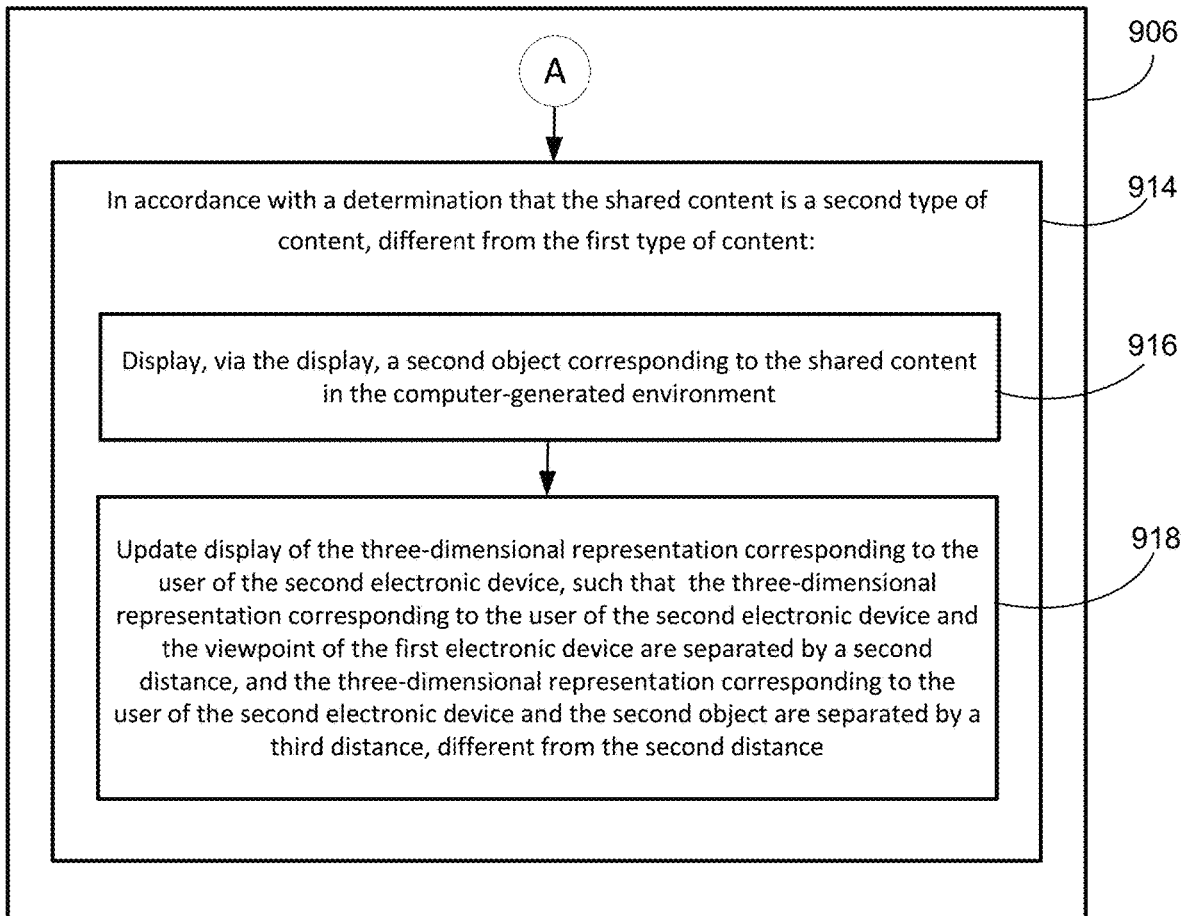

FIGS. 9A-9B illustrate a flow diagram illustrating an example process for updating a spatial group of users in a multi-user communication session based on content that is displayed in a three-dimensional environment according to some examples of the disclosure. In some examples, process 900 begins at a first electronic device in communication with a display, one or more input devices, and a second electronic device. In some examples, the first electronic device and the second electronic device are optionally a head-mounted display, respectively, similar or corresponding to devices 260/270 of FIG. 2. As shown in FIG. 9A, in some examples, at 902, while in a communication session with the second electronic device, the first electronic device displays, via the display, a computer-generated environment including a three-dimensional representation corresponding to a user of the second electronic device. For example, as shown in FIG. 4A, first electronic device 460 displays three-dimensional environment 450A that includes an avatar 415 corresponding to a user of second electronic device 470, represented by oval 415A in spatial group 440.

In some examples, at 904, while displaying the computer-generated environment including the three-dimensional representation corresponding to the user of the second electronic device, the first electronic device receives, via the one or more input devices, a first input corresponding to a request to display shared content in the computer-generated environment. For example, as shown in FIG. 4D, the second electronic device 470 detects a selection input 472A directed to option 423A that is selectable to display shared content (e.g., "Content A") in the three-dimensional environment 450B. In some examples, at 906, in response to receiving the first input, at 908, in accordance with a determination that the shared content is a first type of content, at 910, the first electronic device displays, via the display, a first object corresponding to the shared content in the computer-generated environment. For example, as shown in FIG. 4E, in response to detecting the selection of the option 423A, the first electronic device 460 and the second electronic device 470 display media player user interface 445 in the three-dimensional environments 450A and 450B, respectively. In some examples, at 912, the first electronic device updates display of the three-dimensional representation corresponding to the user of the second electronic device, such that the three-dimensional representation corresponding to the user of the second electronic device and a viewpoint of the first electronic device are separated by a first distance, and the three-dimensional representation corresponding to the user of the second electronic device and the first object are separated by the first distance. For example, as shown in FIG. 4E, the media player user interface 445 corresponds to the first type of content because the media player user interface 445 is less than the threshold size (e.g., threshold width, length, and/or area as discussed previously herein), which causes a spatial separation between the viewpoint of the second electronic device 470 and the avatar 417, represented by ovals 415A and 417A in the spatial group 440, respectively, to be a first distance 431A, and the spatial separation between the avatar 419 and the media player user interface 445, represented by oval 419A and rectangle 445A, respectively, to also be the first distance 431A.

As shown in FIG. 9B, in some examples, at 914, in accordance with a determination that the shared content is a second type of content, different from the first type of content, at 916, the first electronic device displays, via the display, a second object corresponding to the shared content in the computer-generated environment. For example, as shown in FIG. 4G, in response to detecting the selection of the option 423B in FIG. 4F, the first electronic device 460 and the second electronic device 470 display playback user interface 447 in the three-dimensional environments 450A and 450B, respectively. In some examples, at 918, the first electronic device updates display of the three-dimensional representation corresponding to the user of the second electronic device, such that the three-dimensional representation corresponding to the user of the second electronic device and the viewpoint of the first electronic device are separated by a second distance, and the three-dimensional representation corresponding to the user of the second electronic device and the second object are separated by a third distance, different from the second distance. For example, as shown in FIG. 4G, the playback user interface 447 corresponds to the second type of content because the playback user interface 447 is greater than a threshold size (e.g., threshold width, length, and/or area as discussed previously herein), which causes the spatial separation between the viewpoint of the second electronic device 470 and the avatar 417, represented by ovals 415A and 417A in the spatial group 440, respectively, to be decreased to second distance 431B, and the spatial separation between the avatar 417 and the playback user interface 447, represented by the oval 417A and rectangle 447A, respectively, to be increased to a third distance, greater than the second distance 431B.

It is understood that process 800 is an example and that more, fewer, or different operations can be performed in the same or in a different order. Additionally, the operations in process 800 described above are, optionally, implemented by running one or more functional modules in an information processing apparatus such as general-purpose processors (e.g., as described with respect to FIG. 2) or application specific chips, and/or by other components of FIG. 2.

Therefore, according to the above, some examples of the disclosure are directed to a method comprising at a first electronic device in communication with a display, one or more input devices, and a second electronic device: while in a communication session with the second electronic device, displaying, via the display, a computer-generated environment including a three-dimensional representation corresponding to a user of the second electronic device; while displaying the computer-generated environment including the three-dimensional representation corresponding to the user of the second electronic device, receiving, via the one or more input devices, a first input corresponding to a request to display shared content in the computer-generated environment; and in response to receiving the first input: in accordance with a determination that the shared content is a first type of content, displaying, via the display, a first object corresponding to the shared content in the computer-generated environment, and updating display of the three-dimensional representation corresponding to the user of the second electronic device, such that the three-dimensional representation corresponding to the user of the second electronic device and a viewpoint of the first electronic device are separated by a first distance, and the three-dimensional representation corresponding to the user of the second electronic device and the first object are separated by the first distance; and in accordance with a determination that the shared content is a second type of content, different from the first type of content, displaying, via the display, a second object corresponding to the shared content in the computer-generated environment, and updating display of the three-dimensional representation corresponding to the user of the second electronic device, such that the three-dimensional representation corresponding to the user of the second electronic device and the viewpoint of the first electronic device are separated by a second distance, and the three-dimensional representation corresponding to the user of the second electronic device and the second object are separated by a third distance, different from the second distance.

Additionally or alternatively, in some examples, the determination that the shared content is the second type of content is in accordance with a determination that the first object corresponding to the shared content is configured to have a size that is greater than a threshold size when the first object is displayed in the computer-generated environment. Additionally or alternatively, in some examples, the determination that the shared content is the first type of content is in accordance with a determination that the second object corresponding to the shared content is configured to have a size that is within a threshold size when the second object is displayed in the computer-generated environment. Additionally or alternatively, in some examples, the determination that the shared content is the first type of content is in accordance with a determination that the second object corresponding to the shared content corresponds to a two-dimensional representation of the user of the second electronic device or a two-dimensional representation of the user of the third electronic device. Additionally or alternatively, in some examples, the first object is a shared application window associated with an application operating on the first electronic device. Additionally or alternatively, in some examples, the second distance is smaller than the third distance. Additionally or alternatively, in some examples, the method further comprises: while displaying the second object corresponding to the shared content in the computer-generated environment in accordance with a determination that the shared content is the second type of content in response to receiving the first input, receiving, via the one or more input devices, a second input corresponding to a request to scale the second object in the computer-generated environment; and in response to receiving the second input, in accordance with a determination that the request is to increase a size of the second object relative to the viewpoint of the first electronic device, increasing the size of the second object in the computer-generated environment relative to the viewpoint of the first electronic device in accordance with the second input, and updating display of the three-dimensional representation corresponding to the user of the second electronic device, such that the three-dimensional representation corresponding to the user of the second electronic device and the viewpoint of the first electronic device are separated by a fourth distance, smaller than the second distance.

Additionally or alternatively, in some examples, prior to receiving the first input: a user of the first electronic device and the user of the second electronic device have a spatial group within the communication session, such that the three-dimensional representation corresponding to the user of the second electronic device is positioned the first distance from the viewpoint of the first electronic device; and the three-dimensional representation corresponding to the user of the second electronic device has a first orientation that is facing toward a center of the spatial group. Additionally or alternatively, in some examples, in response to receiving the first input, in accordance with the determination that the shared content is the second type of content: the user of the first electronic device, the user of the second electronic device, and the second object have a second spatial group, different from the spatial group, within the communication session; and the three-dimensional representation corresponding to the user of the second electronic device has a first updated orientation that is facing toward the second object in the computer-generated environment. Additionally or alternatively, in some examples, the method further comprises: while displaying the second object corresponding to the shared content in the computer-generated environment in accordance with a determination that the shared content is the second type of content in response to receiving the first input, receiving, via the one or more input devices, a second input corresponding to a request to increase a size of the second object in the computer-generated environment; and in response to receiving the second input: increasing the size of the second object in the computer-generated environment relative to the viewpoint of the first electronic device in accordance with the second input; and in accordance with a determination that the second input causes the size of the second object to be increased above a threshold size in the computer-generated environment, updating display of the three-dimensional representation corresponding to the user of the second electronic device, such that the three-dimensional representation corresponding to the user of the second electronic device and the viewpoint of the first electronic device are separated by a minimum distance.

Additionally or alternatively, in some examples, the method further comprises: receiving, via the one or more input devices, a third input corresponding to a request to increase the size of the second object further above the threshold size in the computer-generated environment; and in response to receiving the third input, increasing the size of the second object further above the threshold size in the computer-generated environment relative to the viewpoint of the first electronic device in accordance with the third input, and maintaining display of the three-dimensional representation corresponding to the user of the second electronic device to be separated from the viewpoint of the first electronic device by the minimum distance. Additionally or alternatively, in some examples, displaying the second object corresponding to the shared content in the computer-generated environment comprises displaying the second object corresponding to the shared content at a first position in the computer-generated environment relative to the viewpoint of the first electronic device. In some examples, the method further comprises: while displaying the second object corresponding to the shared content at the first position in the computer-generated environment, receiving, via the one or more input devices, a second input corresponding to a request to scale the second object in the computer-generated environment; and in response to receiving the second input, in accordance with a determination that the request is to increase a size of the second object relative to the viewpoint of the first electronic device, increasing the size of the second object in the computer-generated environment relative to the viewpoint of the first electronic device in accordance with the second input, and updating a position of the second object in the computer-generated environment to be a second position, farther from the first position, in the computer-generated environment relative to the viewpoint.

Additionally or alternatively, in some examples, the method further comprises: while displaying the first object corresponding to the shared content in the computer-generated environment in accordance with the determination that the shared content is the first type of content in response to receiving the first input, detecting an indication that a user of a third electronic device has joined the communication session; and in response to detecting the indication, displaying, via the display, a three-dimensional representation corresponding to the user of the third electronic device in the computer-generated environment; wherein the three-dimensional representation corresponding to the user of the second electronic device and the three-dimensional representation corresponding to the user of the third electronic device remain separated by the first distance. Additionally or alternatively, in some examples, the method further comprises: while displaying the second object corresponding to the shared content in the computer-generated environment in accordance with the determination that the shared content is the second type of content in response to receiving the first input, detecting an indication of a change in state of the second electronic device; and in response to detecting the indication, replacing display of the three-dimensional representation corresponding to the user of the second electronic device with a two-dimensional representation of the user of the second electronic device, wherein the two-dimensional representation of the user of the second electronic device is displayed adjacent to the second object in the computer-generated environment, and updating display of the three-dimensional representation of the user of the third electronic device to be positioned at a location in the computer-generated environment that is based on a total of a size of the second object and a size of the two-dimensional representation of the user of the second electronic device. Additionally or alternatively, in some examples, the first electronic device and the second electronic device include a head-mounted display, respectively.

Some examples of the disclosure are directed to a method comprising at a first electronic device in communication with a display, one or more input devices, a second electronic device and a third electronic device: while in a communication session with the second electronic device and the third electronic device, displaying, via the display, a computer-generated environment including a three-dimensional representation corresponding to a user of the second electronic device at a first location and a three-dimensional representation corresponding to a user of the third electronic device at a second location, different from the first location, in the computer-generated environment relative to a viewpoint of the first electronic device; while displaying the computer-generated environment including the three-dimensional representation corresponding to the user of the second electronic device and the three-dimensional representation corresponding to the user of the third electronic device, receiving, via the one or more input devices, a first input corresponding to a request to display content in the computer-generated environment; and in response to receiving the first input, in accordance with a determination that the content corresponds to shared content, displaying, via the display, a first object corresponding to the shared content in the computer-generated environment, and displaying the three-dimensional representation corresponding to the user of the second electronic device at a first updated location and the three-dimensional representation corresponding to the user of the third electronic device at a second updated location, different from the first updated location, in the computer-generated environment relative to the viewpoint, including moving the three-dimensional representation of the user of the second electronic device to the first updated location and moving the three-dimensional representation of the user of the third electronic device to the second updated location in a respective direction that is selected based on a location of the first object.

Additionally or alternatively, in some examples, the first object is a shared application window associated with an application operating on the first electronic device. Additionally or alternatively, in some examples, the first updated location and the second updated location are determined relative to a reference line in the computer-generated environment. Additionally or alternatively, in some examples, before receiving the first input, the user of the first electronic device, the user of the second electronic device, and the user of the third electronic device are arranged within a spatial group having a center point, and the reference line extends between the location of the first object in the computer-generated environment and the center point of the spatial group. Additionally or alternatively, in some examples, the center point is determined based on a calculated average of the viewpoint of the first electronic device, the first location, and the second location. Additionally or alternatively, in some examples, the respective direction of movement of the three-dimensional representation corresponding to the user of the second electronic device is clockwise relative to the reference line in the computer-generated environment, and the respective direction of movement of the three-dimensional representation corresponding to the user of the third electronic device is counterclockwise relative to the reference line in the computer-generated environment. Additionally or alternatively, in some examples, the method further comprises: before receiving the first input, detecting an indication of a change in state of the second electronic device; and in response to detecting the indication, replacing display of the three-dimensional representation corresponding to the user of the second electronic device with a two-dimensional representation of the user of the second electronic device, and displaying the three-dimensional representation corresponding to the user of the third electronic device at a third updated location relative to the viewpoint, including moving the three-dimensional representation of the user of the third electronic device to the third updated location in the respective direction that is selected based on a location of the two-dimensional representation of the user of the second electronic device.

Additionally or alternatively, in some examples, the first electronic device, the second electronic device, and the third electronic device include a head-mounted display, respectively. Additionally or alternatively, in some examples, the three-dimensional representation of the user of the second electronic device and the three-dimensional representation of the user of the third electronic device are moved to the first updated location and the second updated location, respectively, in the respective direction with an animation of the movement. Additionally or alternatively, in some examples, the method further comprises: in response to receiving the first input, in accordance with a determination that the content corresponds to private content, displaying, via the display, a second object corresponding to the private content in the computer-generated environment, and maintaining display of the three-dimensional representation corresponding to the user of the second electronic device at the first location and maintaining display of the three-dimensional representation corresponding to the user of the third electronic device at the second location in the computer-generated environment. Additionally or alternatively, in some examples, the method further comprises: while displaying the computer-generated environment including the three-dimensional representation corresponding to the user of the second electronic device, the three-dimensional representation corresponding to the user of the third electronic device, and the second object, receiving, via the one or more input devices, a second input corresponding to a request to share the private content with the user of the second electronic device and the user of the third electronic device; and in response to receiving the second input, redisplaying the second object as a shared object in the computer-generated environment, and displaying the three-dimensional representation corresponding to the user of the second electronic device at a third updated location and the three-dimensional representation corresponding to the user of the third electronic device at a fourth updated location, different from the third updated location, in the computer-generated environment relative to the viewpoint, including moving the three-dimensional representation of the user of the second electronic device to the third updated location and moving the three-dimensional representation of the user of the third electronic device to the fourth updated location in the respective direction that is selected based on a location of the second object.

Additionally or alternatively, in some examples, the method further comprises: while displaying the computer-generated environment including the three-dimensional representation corresponding to the user of the second electronic device and the three-dimensional representation corresponding to the user of the third electronic device, detecting an indication of a request to display shared content in the computer-generated environment; and in response to detecting the indication, displaying, via the display, a second object corresponding to the shared content in the computer-generated environment, and updating the viewpoint of the first electronic device in the computer-generated environment relative to a location of the second object. Additionally or alternatively, in some examples, the viewpoint of the first electronic device, the first location, and the second location are arranged according to a spatial group in the computer-generated environment. In some examples, the method further comprises: while displaying the computer-generated environment including the three-dimensional representation corresponding to the user of the second electronic device and the three-dimensional representation corresponding to the user of the third electronic device, detecting an indication that the user of the second electronic device is no longer in the communication session; and in response to detecting the indication, ceasing display of the three-dimensional representation corresponding to the user of the second electronic device in the computer-generated environment, and maintaining display of the three-dimensional representation corresponding to the user of the third electronic device at the second location in the computer-generated environment. Additionally or alternatively, in some examples, the method further comprises: while displaying the computer-generated environment including the three-dimensional representation corresponding to the user of the third electronic device, detecting an indication that a user of a fourth electronic device has joined the communication session; and in response to detecting the indication displaying, via the display, a three-dimensional representation corresponding to the user of the fourth electronic device at the first location in the computer-generated environment.

Additionally or alternatively, in some examples, the method further comprises: while displaying the computer-generated environment including the three-dimensional representation corresponding to the user of the third electronic device, receiving, via the one or more input devices, a second input corresponding to a request to display shared content in the computer-generated environment; and in response to receiving the second input, displaying, via the display, a respective object corresponding to the shared content in the computer-generated environment, and displaying the three-dimensional representation corresponding to the user of the third electronic device at a third location, different from the first location and the second location, in the computer-generated environment. Additionally or alternatively, in some examples, prior receiving the second input, the second location at which the three-dimensional representation corresponding to the user of the third electronic device is displayed is a first distance from the viewpoint of the first electronic device, and in response to receiving the second input, the third location at which the three-dimensional representation corresponding to the user of the third electronic device is displayed is a second distance, smaller than the first distance, from the viewpoint. Additionally or alternatively, in some examples, the computer-generated environment further includes a respective object corresponding to shared content. In some examples, the method further comprises: while displaying the computer-generated environment including the three-dimensional representation corresponding to the user of the third electronic device and the respective object, receiving, via the one or more input devices, a second input corresponding to a request to cease display of the shared content in the computer-generated environment; and in response to receiving the second input, ceasing display of the respective object in the computer-generated environment, and displaying the three-dimensional representation corresponding to the user of the third electronic device at a third location, different from the first location and the second location, in the computer-generated environment.

Additionally or alternatively, in some examples, the viewpoint of the first electronic device, the first location, and the second location are arranged according to a spatial group in the computer-generated environment. In some examples, the method further comprises: while displaying the computer-generated environment including the three-dimensional representation corresponding to the user of the second electronic device and the three-dimensional representation corresponding to the user of the third electronic device, detecting an indication that a user of a fourth electronic device has joined the communication session; and in response to detecting the indication, displaying, via the display, a three-dimensional representation corresponding to the user of the fourth electronic device at a third location in the computer-generated environment, moving the three-dimensional representation corresponding to the user of the second electronic device to a fourth location, different from the first location, in the computer-generated environment, and moving the three-dimensional representation corresponding to the user of the third electronic device to a fifth location, different from the second location, in the computer-generated environment.

Some examples of the disclosure are directed to a method comprising at a first electronic device in communication with a display, one or more input devices, a second electronic device and a third electronic device: while in a communication session with the second electronic device and the third electronic device, displaying, via the display, a computer-generated environment including a three-dimensional representation corresponding to a user of the second electronic device and a three-dimensional representation corresponding to a user of the third electronic device, wherein the three-dimensional representation corresponding to the user of the second electronic device and the three-dimensional representation corresponding to the user of the third electronic device are separated by a first distance; while displaying the computer-generated environment including the three-dimensional representation corresponding to the user of the second electronic device and the three-dimensional representation corresponding to the user of the third electronic device, receiving, via the one or more input devices, a first input corresponding to a request to display shared content in the computer-generated environment; and in response to receiving the first input: in accordance with a determination that the shared content is a first type of content, displaying, via the display, a first object corresponding to the shared content in the computer-generated environment, and updating display of the three-dimensional representation corresponding to the user of the second electronic device and the three-dimensional representation corresponding to the user of the third electronic device, such that the three-dimensional representation corresponding to the user of the second electronic device and the three-dimensional representation corresponding to the user of the third electronic device are separated by a second distance, different from the first distance; and in accordance with a determination that the shared content is a second type of content, different from the first type of content, displaying, via the display, a second object corresponding to the shared content in the computer-generated environment, and maintaining display of the three-dimensional representation corresponding to the user of the second electronic device and the three-dimensional representation corresponding to the user of the third electronic device to be separated by the first distance.

Additionally or alternatively, in some examples, the determination that the shared content is the first type of content is in accordance with a determination that the first object corresponding to the shared content is configured to have a size that is greater than a threshold size when the first object is displayed in the computer-generated environment. Additionally or alternatively, in some examples, the determination that the shared content is the second type of content is in accordance with a determination that the second object corresponding to the shared content is configured to have a size that is within a threshold size when the second object is displayed in the computer-generated environment. Additionally or alternatively, in some examples, the determination that the shared content is the second type of content is in accordance with a determination that the second object corresponding to the shared content corresponds to a two-dimensional representation of the user of the second electronic device or a two-dimensional representation of the user of the third electronic device. Additionally or alternatively, in some examples, the first object is a shared application window associated with an application operating on the first electronic device. Additionally or alternatively, in some examples, the second distance is smaller than the first distance. Additionally or alternatively, in some examples, the method further comprises: while displaying the first object corresponding to the shared content in the computer-generated environment in accordance with a determination that the shared content is the first type of content in response to receiving the first input, receiving, via the one or more input devices, a second input corresponding to a request to scale the first object in the computer-generated environment; and in response to receiving the second input, in accordance with a determination that the request is to increase a size of the first object relative to a viewpoint of the first electronic device, increasing the size of the first object in the computer-generated environment relative to the viewpoint of the first electronic device in accordance with the second input, and updating display of the three-dimensional representation corresponding to the user of the second electronic device and the three-dimensional representation corresponding to the user of the third electronic device, such that the three-dimensional representation corresponding to the user of the second electronic device and the three-dimensional representation corresponding to the user of the third electronic device are separated by a third distance, smaller than the second distance.

Additionally or alternatively, in some examples, prior to receiving the first input: a user of the first electronic device, the user of the second electronic device, and the user of the third electronic device have a spatial group within the communication session, such that the three-dimensional representation corresponding to the user of the second electronic device and the three-dimensional representation corresponding to the user of the third electronic device are positioned the first distance from a viewpoint of the first electronic device; and the three-dimensional representation corresponding to the user of the second electronic device has a first orientation and the three-dimensional representation corresponding to the user of the third electronic device has a second orientation that are facing toward a center of the spatial group. Additionally or alternatively, in some examples, in response to receiving the first input, in accordance with the determination that the shared content is the first type of content: the user of the first electronic device, the user of the second electronic device, the user of the third electronic device, and the first object have a second spatial group, different from the spatial group, within the communication session; and the three-dimensional representation corresponding to the user of the second electronic device has a first updated orientation and the three-dimensional representation corresponding to the user of the third electronic device has a second updated orientation that are facing toward the first object in the computer-generated environment.

Additionally or alternatively, in some examples, the method further comprises: while displaying the first object corresponding to the shared content in the computer-generated environment in accordance with a determination that the shared content is the first type of content in response to receiving the first input, receiving, via the one or more input devices, a second input corresponding to a request to increase a size of the first object in the computer-generated environment; and in response to receiving the second input, increasing the size of the first object in the computer-generated environment relative to a viewpoint of the first electronic device in accordance with the second input, and in accordance with a determination that the second input causes the size of the first object to be increased above a threshold size in the computer-generated environment, updating display of the three-dimensional representation corresponding to the user of the second electronic device and the three-dimensional representation corresponding to the user of the third electronic device, such that the three-dimensional representation corresponding to the user of the second electronic device and the three-dimensional representation corresponding to the user of the third electronic device are separated by a minimum distance. Additionally or alternatively, in some examples, the method further comprises: receiving, via the one or more input devices, a third input corresponding to a request to increase the size of the first object further above the threshold size in the computer-generated environment, and in response to receiving the third input, increasing the size of the first object further above the threshold size in the computer-generated environment relative to the viewpoint of the first electronic device in accordance with the third input, and maintaining display of the three-dimensional representation corresponding to the user of the second electronic device and the three-dimensional representation corresponding to the user of the third electronic device to be separated by the minimum distance.

Additionally or alternatively, in some examples, the method further comprises: while displaying the first object corresponding to the shared content at a first position in the computer-generated environment relative to a viewpoint of the first electronic device in accordance with a determination that the shared content is the first type of content in response to receiving the first input, receiving, via the one or more input devices, a second input corresponding to a request to scale the first object in the computer-generated environment;

and in response to receiving the second input, in accordance with a determination that the request is to increase a size of the first object relative to the viewpoint of the first electronic device, increasing the size of the first object in the computer-generated environment relative to the viewpoint of the first electronic device in accordance with the second input, and updating a position of the first object in the computer-generated environment to be a second position, farther from the first position, in the computer-generated environment relative to the viewpoint.

Additionally or alternatively, in some examples, the method further comprises: while displaying the second object corresponding to the shared content in the computer-generated environment in accordance with the determination that the shared content is the second type of content in response to receiving the first input, detecting an indication that a user of a fourth electronic device has joined the communication session; and in response to detecting the indication, displaying, via the display, a three-dimensional representation corresponding to the user of the fourth electronic device in the computer-generated environment; wherein the three-dimensional representation corresponding to the user of the second electronic device and the three-dimensional representation corresponding to the user of the third electronic device remain separated by the first distance. Additionally or alternatively, in some examples, the method further comprises: while displaying the first object corresponding to the shared content in the computer-generated environment in accordance with the determination that the shared content is the first type of content in response to receiving the first input, detecting an indication of a change in state of the second electronic device; and in response to detecting the indication, replacing display of the three-dimensional representation corresponding to the user of the second electronic device with a two-dimensional representation of the user of the second electronic device, wherein the two-dimensional representation of the user of the second electronic device is displayed adjacent to the first object in the computer-generated environment, and updating display of the three-dimensional representation of the user of the third electronic device to be positioned at a location in the computer-generated environment that is based on a total of a size of the first object and a size of the two-dimensional representation of the user of the second electronic device. Additionally or alternatively, in some examples, the first electronic device, the second electronic device, and the third electronic device include a head-mounted display, respectively.

Some examples of the disclosure are directed to an electronic device comprising: one or more processors; memory; and one or more programs stored in the memory and configured to be executed by the one or more processors, the one or more programs including instructions for performing any of the above methods.

Some examples of the disclosure are directed to a non-transitory computer readable storage medium storing one or more programs, the one or more programs comprising instructions, which when executed by one or more processors of an electronic device, cause the electronic device to perform any of the above methods.

Some examples of the disclosure are directed to an electronic device, comprising: one or more processors; memory; and means for performing any of the above methods.

Some examples of the disclosure are directed to an information processing apparatus for use in an electronic device, the information processing apparatus comprising means for performing any of the above methods.

The foregoing description, for purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the invention and its practical applications, to thereby enable others skilled in the art to best use the invention and various described examples with various modifications as are suited to the particular use contemplated.

What is claimed is:

1. A method comprising:
at a first electronic device in communication with a display, one or more input devices, a second electronic device and a third electronic device:
while in a communication session with the second electronic device and the third electronic device, displaying, via the display, a computer-generated environment including a three-dimensional representation corresponding to a user of the second electronic device at a first location and a three-dimensional representation corresponding to a user of the third electronic device at a second location, different from the first location, in the computer-generated environment relative to a viewpoint of the first electronic device;
while displaying the computer-generated environment including the three-dimensional representation corresponding to the user of the second electronic device and the three-dimensional representation corresponding to the user of the third electronic device, receiving, via the one or more input devices, a first input corresponding to a request to display content in the computer-generated environment; and
in response to receiving the first input, in accordance with a determination that the content corresponds to shared content:
displaying, via the display, a first object corresponding to the shared content in the computer-generated environment; and
displaying the three-dimensional representation corresponding to the user of the second electronic device at a first updated location and the three-dimensional representation corresponding to the user of the third electronic device at a second updated location, different from the first updated location, in the computer-generated environment relative to the viewpoint, including:
moving the three-dimensional representation of the user of the second electronic device to the first updated location and moving the three-dimensional representation of the user of the third electronic device to the second updated location in a respective direction that is selected based on a location of the first object.

2. The method of claim 1, wherein the first object is a shared application window associated with an application operating on the first electronic device.

3. The method of claim 1, wherein the first updated location and the second updated location are determined relative to a reference line in the computer-generated environment.

4. The method of claim 3, wherein:
before receiving the first input, the user of the first electronic device, the user of the second electronic device, and the user of the third electronic device are arranged within a spatial group having a center point; and
the reference line extends between the location of the first object in the computer-generated environment and the center point of the spatial group.

5. The method of claim 4, wherein the center point is determined based on a calculated average of the viewpoint of the first electronic device, the first location, and the second location.

6. The method of claim 3, wherein:
the respective direction of movement of the three-dimensional representation corresponding to the user of the second electronic device is clockwise relative to the reference line in the computer-generated environment; and
the respective direction of movement of the three-dimensional representation corresponding to the user of the third electronic device is counterclockwise relative to the reference line in the computer-generated environment.

7. The method of claim 1, further comprising:
before receiving the first input, detecting an indication of a change in state of the second electronic device; and
in response to detecting the indication:
replacing display of the three-dimensional representation corresponding to the user of the second electronic device with a two-dimensional representation of the user of the second electronic device; and
displaying the three-dimensional representation corresponding to the user of the third electronic device at a third updated location relative to the viewpoint, including:
moving the three-dimensional representation of the user of the third electronic device to the third updated location in the respective direction that is selected based on a location of the two-dimensional representation of the user of the second electronic device.

8. The method of claim 1, wherein the first electronic device, the second electronic device, and the third electronic device include a head-mounted display, respectively.

9. The method of claim 1, wherein the three-dimensional representation of the user of the second electronic device and the three-dimensional representation of the user of the third electronic device are moved to the first updated location and the second updated location, respectively, in the respective direction with an animation of the movement.

10. The method of claim 1, further comprising:
in response to receiving the first input, in accordance with a determination that the content corresponds to private content:
displaying, via the display, a second object corresponding to the private content in the computer-generated environment; and
maintaining display of the three-dimensional representation corresponding to the user of the second electronic device at the first location and maintaining display of the three-dimensional representation corresponding to the user of the third electronic device at the second location in the computer-generated environment.

11. The method of claim 10, further comprising:
while displaying the computer-generated environment including the three-dimensional representation corresponding to the user of the second electronic device, the three-dimensional representation corresponding to the user of the third electronic device, and the second object, receiving, via the one or more input devices, a second input corresponding to a request to share the private content with the user of the second electronic device and the user of the third electronic device; and
in response to receiving the second input:
redisplaying the second object as a shared object in the computer-generated environment; and
displaying the three-dimensional representation corresponding to the user of the second electronic device at a third updated location and the three-dimensional representation corresponding to the user of the third electronic device at a fourth updated location, different from the third updated location, in the computer-generated environment relative to the viewpoint, including:
moving the three-dimensional representation of the user of the second electronic device to the third updated location and moving the three-dimensional representation of the user of the third electronic device to the fourth updated location in the respective direction that is selected based on a location of the second object.

12. The method of claim 1, further comprising:
while displaying the computer-generated environment including the three-dimensional representation corresponding to the user of the second electronic device and the three-dimensional representation corresponding to the user of the third electronic device, detecting an indication of a request to display shared content in the computer-generated environment; and
in response to detecting the indication:
displaying, via the display, a second object corresponding to the shared content in the computer-generated environment; and
updating the viewpoint of the first electronic device in the computer-generated environment relative to a location of the second object.

13. The method of claim 1, wherein the viewpoint of the first electronic device, the first location, and the second location are arranged according to a spatial group in the computer-generated environment, the method further comprising:
while displaying the computer-generated environment including the three-dimensional representation corresponding to the user of the second electronic device and the three-dimensional representation corresponding to the user of the third electronic device, detecting an indication that the user of the second electronic device is no longer in the communication session; and
in response to detecting the indication:
ceasing display of the three-dimensional representation corresponding to the user of the second electronic device in the computer-generated environment; and
maintaining display of the three-dimensional representation corresponding to the user of the third electronic device at the second location in the computer-generated environment.

14. The method of claim 13, further comprising:
while displaying the computer-generated environment including the three-dimensional representation corresponding to the user of the third electronic device, detecting an indication that a user of a fourth electronic device has joined the communication session; and in response to detecting the indication:

displaying, via the display, a three-dimensional representation corresponding to the user of the fourth electronic device at the first location in the computer-generated environment.

15. The method of claim 13, further comprising:

while displaying the computer-generated environment including the three-dimensional representation corresponding to the user of the third electronic device, receiving, via the one or more input devices, a second input corresponding to a request to display shared content in the computer-generated environment; and in response to receiving the second input:

displaying, via the display, a respective object corresponding to the shared content in the computer-generated environment; and displaying the three-dimensional representation corresponding to the user of the third electronic device at a third location, different from the first location and the second location, in the computer-generated environment.

16. The method of claim 15, wherein:

prior receiving the second input, the second location at which the three-dimensional representation corresponding to the user of the third electronic device is displayed is a first distance from the viewpoint of the first electronic device; and in response to receiving the second input, the third location at which the three-dimensional representation corresponding to the user of the third electronic device is displayed is a second distance, smaller than the first distance, from the viewpoint.

17. The method of claim 13, wherein the computer-generated environment further includes a respective object corresponding to shared content, the method further comprising:

while displaying the computer-generated environment including the three-dimensional representation corresponding to the user of the third electronic device and the respective object, receiving, via the one or more input devices, a second input corresponding to a request to cease display of the shared content in the computer-generated environment; and in response to receiving the second input:

ceasing display of the respective object in the computer-generated environment; and displaying the three-dimensional representation corresponding to the user of the third electronic device at a third location, different from the first location and the second location, in the computer-generated environment.

18. The method of claim 1, wherein the viewpoint of the first electronic device, the first location, and the second location are arranged according to a spatial group in the computer-generated environment, the method further comprising:

while displaying the computer-generated environment including the three-dimensional representation corresponding to the user of the second electronic device and the three-dimensional representation corresponding to the user of the third electronic device, detecting an indication that a user of a fourth electronic device has joined the communication session; and in response to detecting the indication:

displaying, via the display, a three-dimensional representation corresponding to the user of the fourth electronic device at a third location in the computer-generated environment;

moving the three-dimensional representation corresponding to the user of the second electronic device to a fourth location, different from the first location, in the computer-generated environment; and moving the three-dimensional representation corresponding to the user of the third electronic device to a fifth location, different from the second location, in the computer-generated environment.

19. An electronic device comprising:

one or more processors;

memory; and one or more programs stored in the memory and configured to be executed by the one or more processors, the one or more programs including instructions for performing a method comprising:

while in a communication session with a second electronic device and a third electronic device, displaying, via a display, a computer-generated environment including a three-dimensional representation corresponding to a user of the second electronic device at a first location and a three-dimensional representation corresponding to a user of the third electronic device at a second location, different from the first location, in the computer-generated environment relative to a viewpoint of the electronic device;

while displaying the computer-generated environment including the three-dimensional representation corresponding to the user of the second electronic device and the three-dimensional representation corresponding to the user of the third electronic device, receiving, via one or more input devices, a first input corresponding to a request to display content in the computer-generated environment; and in response to receiving the first input, in accordance with a determination that the content corresponds to shared content:

displaying, via the display, a first object corresponding to the shared content in the computer-generated environment; and displaying the three-dimensional representation corresponding to the user of the second electronic device at a first updated location and the three-dimensional representation corresponding to the user of the third electronic device at a second updated location, different from the first updated location, in the computer-generated environment relative to the viewpoint, including:

moving the three-dimensional representation of the user of the second electronic device to the first updated location and moving the three-dimensional representation of the user of the third electronic device to the second updated location in a respective direction that is selected based on a location of the first object.

20. A non-transitory computer readable storage medium storing one or more programs, the one or more programs comprising instructions, which when executed by one or more processors of an electronic device, cause the electronic device to perform a method comprising:

while in a communication session with a second electronic device and a third electronic device, displaying, via a display, a computer-generated environment including a three-dimensional representation corresponding to a user of the second electronic device at a first location and a three-dimensional representation corresponding to a user of the third electronic device at a second location, different from the first location, in the computer-generated environment relative to a viewpoint of the electronic device;

while displaying the computer-generated environment including the three-dimensional representation corresponding to the user of the second electronic device and the three-dimensional representation corresponding to the user of the third electronic device, receiving, via one or more input devices, a first input corresponding to a request to display content in the computer-generated environment; and in response to receiving the first input, in accordance with a determination that the content corresponds to shared content:

displaying, via the display, a first object corresponding to the shared content in the computer-generated environment; and displaying the three-dimensional representation corresponding to the user of the second electronic device at a first updated location and the three-dimensional representation corresponding to the user of the third electronic device at a second updated location, different from the first updated location, in the computer-generated environment relative to the viewpoint, including:

moving the three-dimensional representation of the user of the second electronic device to the first updated location and moving the three-dimensional representation of the user of the third electronic device to the second updated location in a respective direction that is selected based on a location of the first object.

\* \* \* \* \*